United States Patent
Takahara

(10) Patent No.: US 6,331,878 B1
(45) Date of Patent: Dec. 18, 2001

(54) REFLECTION LIGHT ABSORBING PLATE AND DISPLAY PANEL FOR USE IN A DISPLAY APPARATUS

(75) Inventor: Hiroshi Takahara, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/173,779

(22) Filed: Oct. 16, 1998

Related U.S. Application Data

(62) Division of application No. 08/504,648, filed on Jul. 20, 1995, now Pat. No. 5,875,013.

(30) Foreign Application Priority Data

Jul. 20, 1994 (JP) .................................................. 6-167944
Mar. 6, 1995 (JP) .................................................. 7-045642

(51) Int. Cl.[7] ........................ G02F 1/1335; G03B 21/00
(52) U.S. Cl. ................................. 349/5; 349/57; 349/95; 349/61; 353/122
(58) Field of Search ................................. 349/5, 8, 62, 95, 349/57; 353/122, 30, 33, 32, 34, 75, 97, 102; 359/601, 613, 614, 609

(56) References Cited

U.S. PATENT DOCUMENTS

| 4,017,157 | 4/1977 | Van Riet ........................ 349/159 |
| 4,349,817 | 9/1982 | Hoffman et al. ................ 349/63 |
| 5,083,854 | * 1/1992 | Zampolin et al. ............. 349/95 |
| 5,098,184 | * 3/1992 | van den Brandt et al. ..... 353/31 |
| 5,150,232 | 9/1992 | Gunkima et al. ............... 349/63 |
| 5,181,130 | 1/1993 | Hubby, Jr. ....................... 349/63 |
| 5,245,449 | 9/1993 | Ooi et al. . |
| 5,260,815 | 11/1993 | Takizawa ....................... 349/159 |
| 5,299,289 | 3/1994 | Omae et al. . |
| 5,353,133 | 10/1994 | Bernkopf ........................ 349/86 |
| 5,418,583 | * 5/1995 | Masumoto ...................... 353/38 |
| 5,521,726 | 5/1996 | Zimmerman et al. .......... 349/159 |
| 5,631,750 | 5/1997 | Minoura et al. ................ 349/110 |
| 5,648,860 | * 7/1997 | Ooi et al. ........................ 349/10 |
| 5,737,050 | 4/1998 | Takahara et al. ............... 349/122 |
| 5,760,849 | 6/1998 | Omae et al. .................... 349/58 |

FOREIGN PATENT DOCUMENTS

| 572996 | 8/1993 | (EP) . |
| 3-94225 | 4/1991 | (JP) . |
| 5-341269 | 12/1993 | (JP) . |

* cited by examiner

*Primary Examiner*—William L. Sikes
*Assistant Examiner*—Tai V. Duong
(74) *Attorney, Agent, or Firm*—Wenderoth, Lind & Ponack, L.L.P.

(57) ABSTRACT

A reflected light absorbing plate is divided into plural areas by light absorbing walls and is adapted to satisfy a predetermined condition among a width of one area, a thickness thereof t, and a refraction index of an absorbing plate n. The reflected light absorbing plate is applied to a display panel having a polymer dispersed liquid crystal layer as a light modulating layer via a light coupling layer. The reflected light absorbing plate and the light modulating layer are spaced by a predetermined distance taking MTF into consideration. While the light diffused at a minute area A is reflected at the interface with air, the light is absorbed by the light absorbing wall and never returns to the light modulating layer.

26 Claims, 69 Drawing Sheets

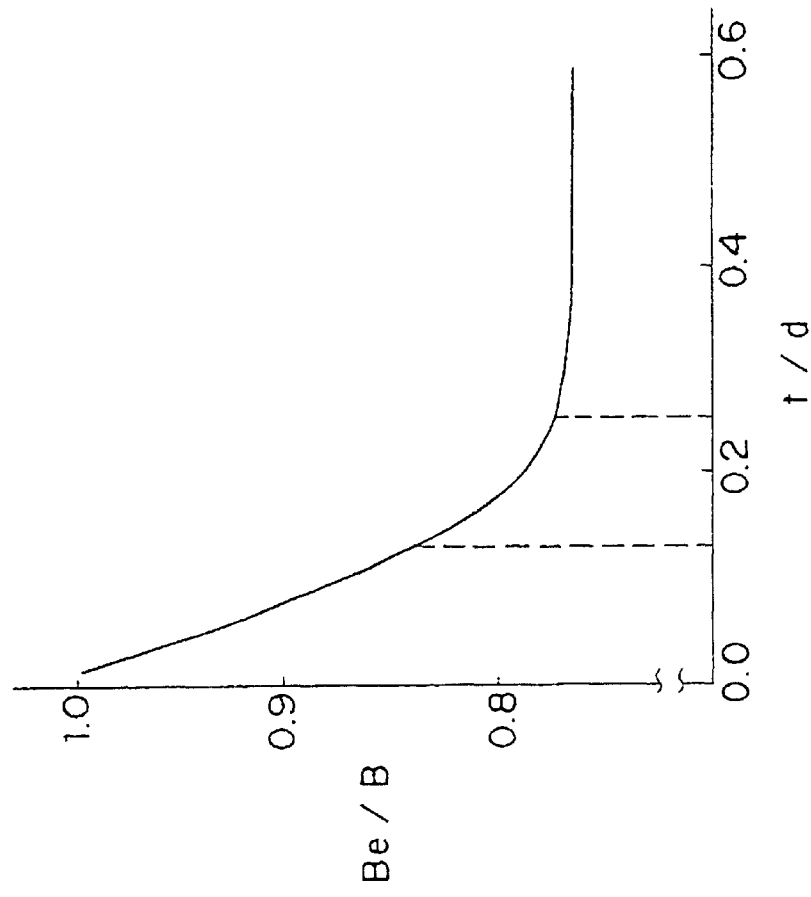
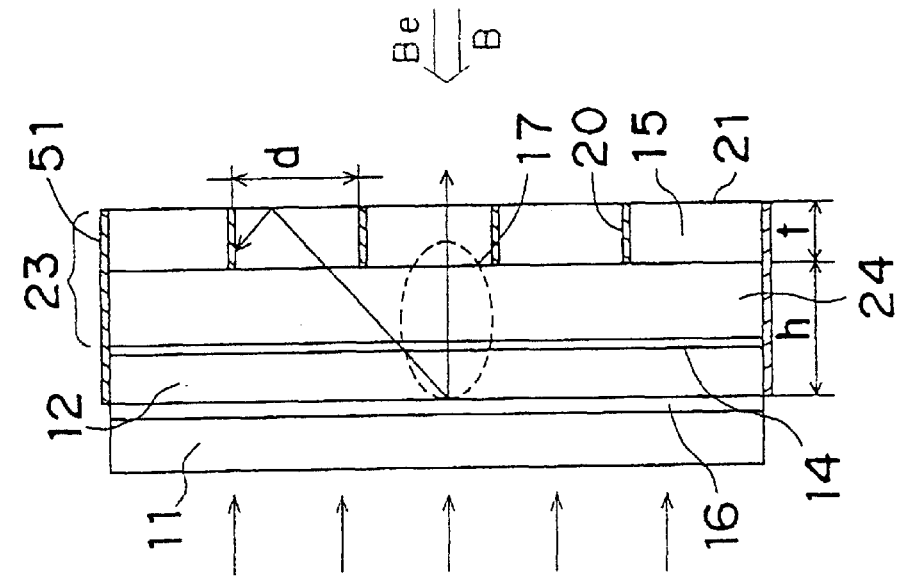

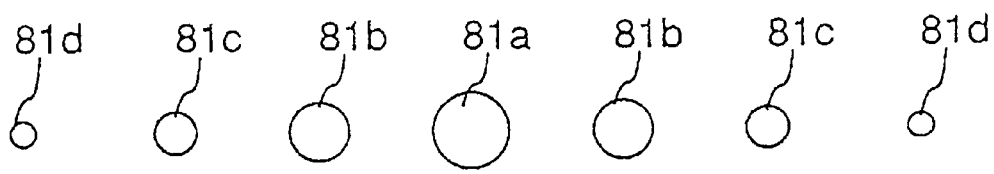
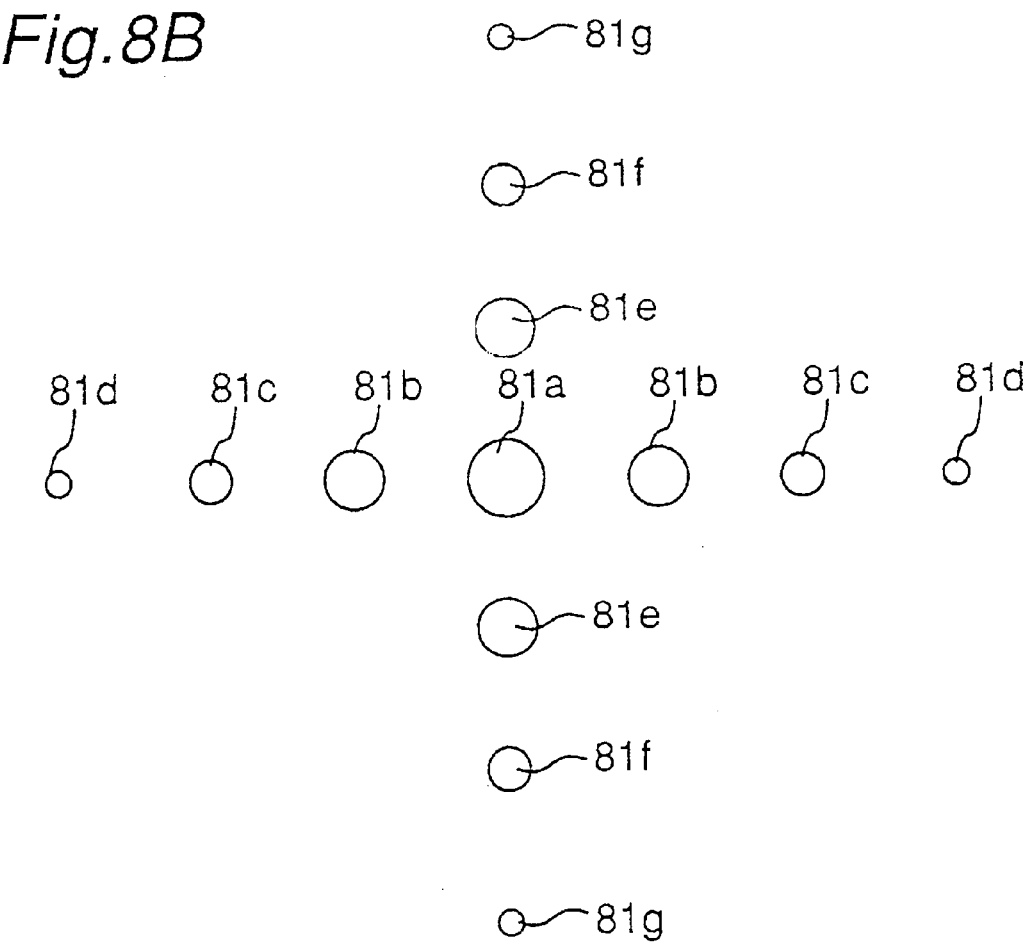

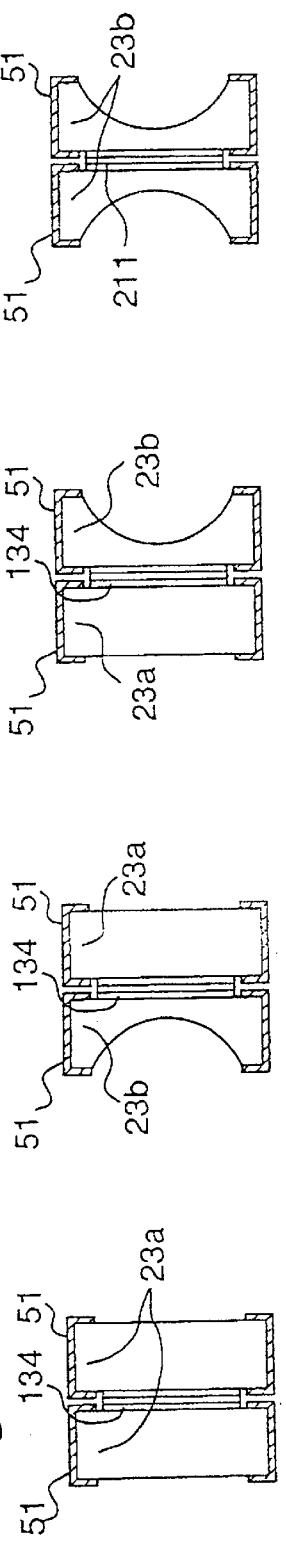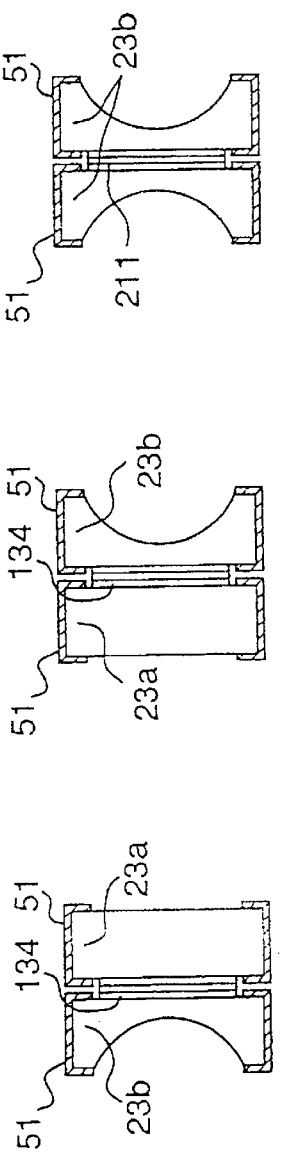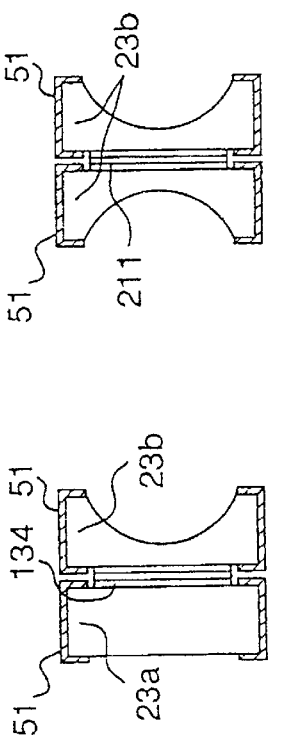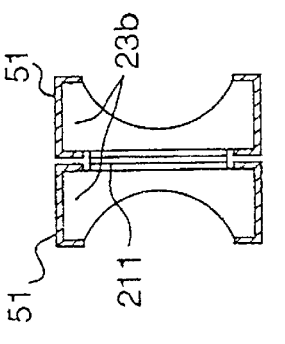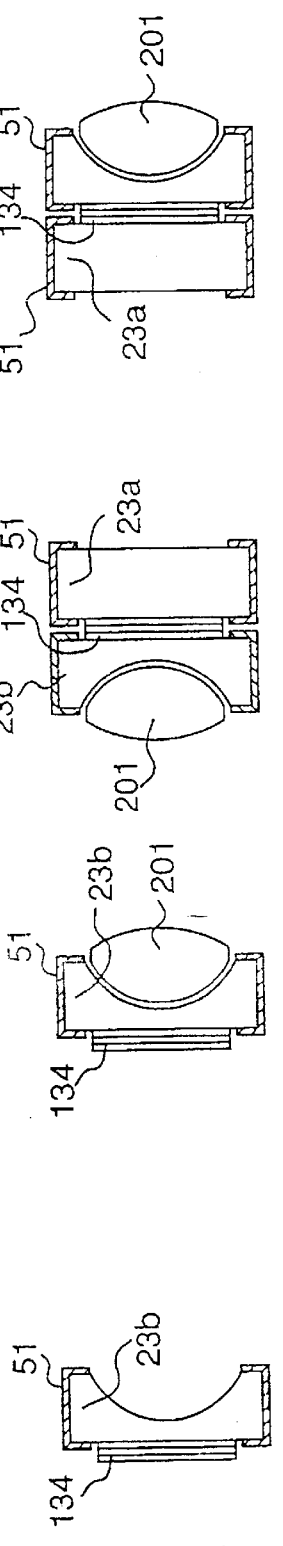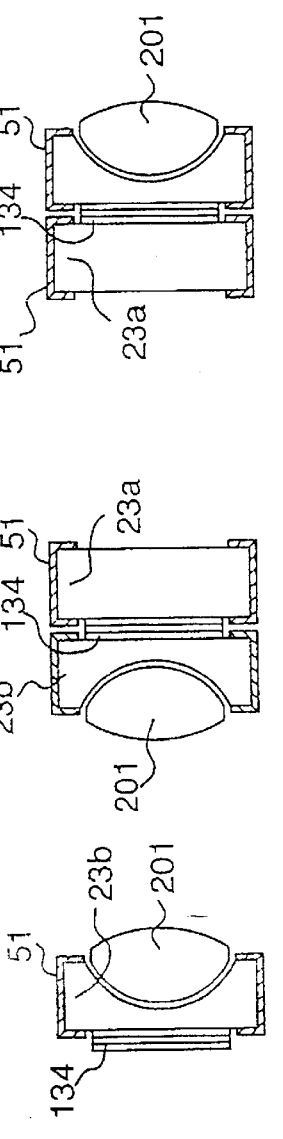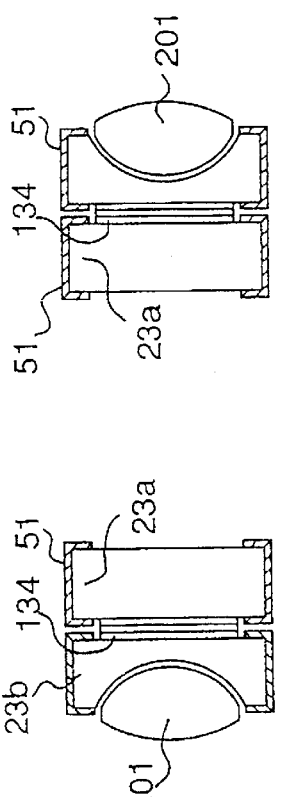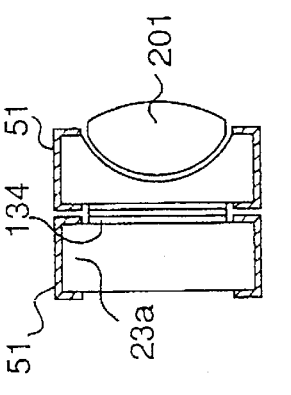

Fig.48B (OFF-STATE)

(ON-STATE)

REFLECTION LIGHT ABSORBING PLATE AND DISPLAY PANEL FOR USE IN A DISPLAY APPARATUS

This application is a divisional application of U.S. patent application Ser. No. 08/504,648, filed Jul. 20, 1995, U.S. Pat. No. 5,875,013.

BACKGROUND OF THE INVENTION

1. Field of the Invention

The present invention relates to a light reflection preventing configuration such as a reflection light absorbing plate for preventing incident light from being diffused in reflection or for reducing the reflection light, in particular to a display panel having a reflection preventing configuration and a light modulation layer at which incident light is diffused to generate a diffusion light, and more particular to a projection type display apparatus employing the display panel as a light valve, and to a display apparatus employing the display panel as an image pick-up monitor for a video camera (hereinafter referred to as, "a view-finder").

2. Description of the Prior Art

In recent years, research and development of a liquid crystal display panel is actively pursued because the liquid crystal display panel has many advantageous features such as light in weight and thin-in thickness as compared to a cathode ray tube (CRT). Also, the liquid crystal display panel is employed as a display portion of a pocket TV or a view-finder of a video camera. However, it has many problems such that, for instance, it is difficult for use in a large scale screen.

Therefore, many interests and attention have been recently focused on a projection type display apparatus which is adapted to project and enlarge an image picture displayed on a small display panel, through a projection lens or the like for displaying an enlarged image picture on a large scaled screen. It is to be noted here that, for a projection type display apparatus and a view-finder now placed on the market, employed is a twist nematic (hereinafter, referred to as, "TN") display panel utilizing a light twisting characteristic of liquid crystal.

The display panel using TN liquid crystal is required to linearly polarize incident light by using a polarizing plate (polarizer) disposed on the light incident side of the panel and also required to dispose a polarizing plate (analyzer) on the outlet side of the panel for detecting the modulated light. Namely, it is necessary to arrange, in total, two polarizing plates on the front and rear sides of the TN display panel, that is, one is a polarizer for linearly polarize incident light and the other is an analyzer for detecting the modulated light.

Assuming that the pixel opening ratio of the liquid crystal display panel is 100% and the light amount incident on the polarizer is 100%, the light amount outgoing from the polarizer is 40%, the transmittance of the display panel is 80% and the transmittance of the analyzer is 80%, and therefore, the transmittance as a whole becomes 0.4×0.8×0.8=about 25%, resulting in the effective utilization of only 25% of the incident light. As a result, the TN liquid crystal display panel can realize merely a low luminance image display.

The most of light lost in the polarizing plates and the like is primarily absorbed by the polarizing plates and converted into heat while heating the polarizing plates. The heat converted from the light also heats the display panel through radiation heat. In the case of a projection type display apparatus, the incident light amount applied to the polarizer is of more than several tens of thousands luxes. Therefore, in the case of using a TN display panel as a light valve for a projection type display apparatus, the polarizing plates and the panel are heated to a high temperature, resulting in a remarkable deterioration of performance in a short time period.

In addition, the TN display panel is required to be applied to coating with an orientation film and then subjected to rubbing process. The rubbing processing increases the number of processes, resulting in an increase of a manufacturing cost. Furthermore, the number of pixels of the display panel for use in the projection type display apparatus has recently been increased to a large capacity of more than three hundred thousand pixels and the size of each pixel is in the trend of miniaturization. The miniaturization of the pixel size results in formation of a large number of surface irregularities caused by signal lines, thin film transistors (TFTs) 14, and the like per a unit area. It is obvious that rubbing process can not be made advantageously due to the surface irregularities.

In addition, the miniaturization of each pixel in size makes the area for forming the TFTs and signal lines in one pixel relatively large, resulting in a decrease of the pixel aperture ratio. As an example, in the case where three hundred fifty thousands pixels are formed in a display panel of three-inch diagonal, the pixel aperture ratio is about 30%. In the case of a display panel formed with one million and five hundred thousand pixels, there is also estimated a value of less than 10% as the pixel aperture ratio. These decreases of the pixel aperture ratio not only decreases the luminance of the displayed image but also results in heating of the display panel by the light irradiated on a part other than an incident light aperture, which accelerates deterioration in performance of the TN display panel.

In the TN display panel, light modulation is effected by varying the orientation state of liquid crystals by applying voltage to pixel electrodes. Polarizing plates are disposed respectively on the incident and outgoing sides of the TN display panel, with the polarizing axes of the polarizer and analyzer being intersected at right angles with each other. Generally, the TN display panel is used in the mode (referred to as, "NW mode" hereinafter) wherein a black display can be effected in the voltage application state.

The displayed image on the display panel under the NW mode is excellent in color reproductibility, but it has a problem of leakage of light from the periphery of the pixel. This phenomenon takes place due to the fact that liquid crystal molecules are oriented not in the regular direction but in the opposite direction, which the orientation state is called an opposite chilled domain. This takes place due to the fact that the rising direction of the liquid crystal molecule becomes partly opposite due to the electric field generated between the pixel electrode and the source signal line, and the like. In the portion where the rising direction of the liquid crystal molecules are opposite, light passes through the analyzer located on the light outgoing side of the panel despite the application of voltage. Namely, leakage of light takes place. If the rising direction of liquid crystal molecule is regular, no leakage of light will take place.

As a method for preventing light leakage, there is available a method of increasing width of a black matrix (referred to as, "BM" hereinafter) to be formed on the confronting electrodes, but it also reduces the pixel aperture area of the matrix and thus reduces the luminance of a display image, and therefore, it cannot be regarded as a useful method.

In the display panel using TN liquid crystals as described above, it is required to use polarizing plates. In addition, because light leakage tends to take place at the peripheral portion of the pixel, the BM must be made thick. Therefore, the light utilizing rate is poor and the display image is low in luminance. The light applied to the BM heats the display panel and consequently raises the panel temperature, deteriorating the life of the display panel.

Similarly, the projection type display apparatus employing a TN display panel as a light valve is also poor in the light utilizing rate, and the luminance of the projection image picture is low in the screen.

In view of this fact, there has been proposed a projection type display apparatus employing a polymer dispersed (referred to as, "PD" hereinafter) display panel instead of using polarizing plates. As an example, an apparatus disclosed in Japanese Patent Laid-Open Unexamined Publication No. 94225/1991 can be enumerated. In the PD display panel used as a light valve in the projection type display apparatus, light modulation is effected by scattering or transmitting the incident light.

The operation of the PD display panel is briefly described with reference to FIGS. 70A and 70B. As shown in FIGS. 70A and 70B, liquid crystals 691 are shaped in a water droplet (hereinafter, referred to as "water droplet shaped liquid crystal") which are dispersed in polymer 692. TFT (not shown), and the like are connected to a pixel electrode 101 and voltage is applied to the pixel electrode 101 by switching on-off the TFT. Thus, the modulation of light is effected by changing the orientation direction of the liquid crystals dispersed on the pixel electrode 101.

In the state where no voltage is applied as shown in FIG. 70A, the respective water droplet shaped liquid crystals 691 are oriented in irregular directions. In this state, a difference in the refraction index takes place between the polymer 692 and the water droplet shaped liquid crystal 691 and the incident light is scattered.

When voltage is applied to the pixel electrode 101 as shown in FIG. 70B, the orientation directions of liquid crystal modules are aligned with each other. Assuming that the refraction index of the liquid crystals 691 when they are oriented in the regular direction is in advance set equal to the refraction index of the polymer 692, the incident light is not scattered but transmitted through and emitted from an array substrate 12.

The conventional PD display panel has also a problem such that the light diffused or scattered in the liquid crystal layer 16 is reflected at the interface between the array substrate 12 and air, reflected at the interface between the confronting substrate 11 and air. The scattered light is irregularly reflected on the interface between the liquid crystal layer 16 and substrates 11 and 12, thus resulting in deterioration in contrast of a display image.

A method for preventing the deterioration of contrast in a display image due to the irregular reflection and diffusion of light is taught in the Japanese Patent Unexamined Laid Open No. 341269/1993. In this conventional method, a thick transparent substrate is attached to a display panel with a light absorbing film formed on the side face of the transparent substrate, thus to prevent the irregular or scattered reflection.

However, in this conventional technical concept, it is required to increase the thickness of the transparent substrate. In particular, in a large scale display panel having a large display area, the thickness of the transparent substrate must be made very thick because the thickness of the transparent substrate is proportional to the diagonal length of the effective display area.

The increased thickness of the transparent substrate leads to the increase in weight of the display apparatus, and therefore, it is inconvenient when carrying or bringing therewith. In addition, in the case where a display panel with the transparent substrate attached thereto is used as a light valve in a projection type display apparatus, it is too large to be arranged within an optical block.

This is because the light valve is required to be arranged within a limited space between a dichroic mirror for color separation and a dichroic mirror for color synthesis and the limited space gives limitation on construction of a back focus of a projection lens. In order to increase the distance of the back focus of the projection lens, the number of lens pieces used for projection is generally increased, which leads directly to a cost increase. In addition, in order to obtain a sufficient space for the transparent substrate, the optical block becomes large in size, which directly leads to a large sizing in system design and an increase in weight.

Although described in the Japanese Patent Unexamined Laid Open No. 341269/1993, one of the main causes of the deterioration in display contrast on the PD display panel is the occurrence of the secondary diffused or scattered irregular reflection light. The secondary diffused or scattered light means the light which is diffused or scattered in a liquid crystal layer, and then reflected on the interface between the confronting substrate and air, which is then incident again to the liquid crystal layer and scattered or diffused (secondary diffusion) therein. The secondary diffused light reduces the display contrast to a great extent. As a result, the respective light emitted from the light modulation layer undesirably forms a light ring, generating a specific luminance distribution. In this conventional display apparatus, the array substrate is made thick or made thick with a thick light absorbing film attached to the array substrate and the light absorbing films are formed in the non-effective areas of the transparent substrate.

SUMMARY OF THE INVENTION

In order to solve the problem of deterioration in display contrast due to the secondary diffused or scattered light, there is employed a light absorbing plate formed with light absorbing films for absorbing scattered reflection light.

The display apparatus according to the present invention is adapted so that reflection preventing films are applied to the light incident and outgoing faces of the substrate of the display panel. Said reflected light absorbing plate is applied to the display panel with a transparent bonding medium having a refraction index equal to that of the substrate constituting the display panel.

The reflected light absorbing plate is adapted so that a member having light transmissibility is partitioned into plural areas by light absorbing films formed therein in the thickness direction. Assuming that the maximum width of the area partitioned by the light absorbing film is represented by d, the height of said light absorbing film is represented by t and the refraction index of said member is represented by n, the following condition is satisfied.

$$\geq d/8 \times \sqrt{(n^2-1)} \tag{1}$$

Preferably, said reflected light absorbing plate is formed in a configuration wherein the area formed with light absorbing film and the area formed with a transparent plate are formed in two layers. Therefore, the reflected light absorbing plate is of a configuration wherein the area of a transparent plate and the area formed with light absorbing film are sequentially overlapped on the display panel. In addition, the non-effective area (the area where no light is incident or outgoing) of the reflected light absorbing plate is applied with a black paint.

The projection type display apparatus, view-finder and the like according to the present invention employs the display apparatus of the present invention as a light valve. In the case of using a prism such as a dichroic prism or a polarized light beam spitter (hereinafter, referred to as PBS) as a light separation means, a display panel is applied to said prism. Furthermore, the non-effective area of the prism is applied with a paint of black or other color.

Furthermore, in order to further improve the display contrast, a first stop is arranged on the emission side of the illumination optical system and a second stop is arranged within the projection lens. Said first and second stops are adapted to be conjugated with each other.

The light diffused by the liquid crystal layer is incident on the reflected light absorbing plate and the light incident on the interface of said reflected light absorbing plate and air at an angle of more than the critical angle is total-reflected. Within the reflected light absorbing plate, light absorbing films are formed in a shape of a screen. When the height of said screen and the diagonal length of the area surrounded by said screens are maintained in the relation satisfying the equation (1), said reflected light is absorbed by said light absorbing films. Therefore, the light returning again to the liquid crystal layer id reduced or markedly reduced.

When the display apparatus according to the present invention is employed in a projection type display apparatus as a light valve, the light absorbing films within the reflected light absorbing plate of said display apparatus shield also the light emitted from the liquid crystal layer. When the distance from the liquid crystal layer to the area formed with light absorbing films is set to be more than a predetermined value, it becomes difficult for said light absorbing films to appear in the projection image. Namely, the modulation transfer function (MTF) is lowered. When MTF becomes less than 20%, said light absorbing films are hardly visible in the projection image. In order to make said light absorbing films hardly visible as described above, transparent substrates are disposed within the display panel and reflected light absorbing plate.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 5A and 5B are explanatory views of the effect of a display panel according to the present invention;

FIGS. 8A and 8B are explanatory views of a display panel according to the present invention;

FIGS. 20A, 20B, 20C, 20D, 20E, 20F, 20G, 20H, 20I, 20J and 20K are explanatory views of a display panel in still another embodiment of the present invention;

FIGS. 47A and 47B are explanatory views of a drive method for a display panel according to the present invention;

FIGS. 48A and 48B are explanatory views of a drive method for a display panel according to the present invention;

DETAILED DESCRIPTION OF THE PREFERRED EMBODIMENTS

Figure 1:
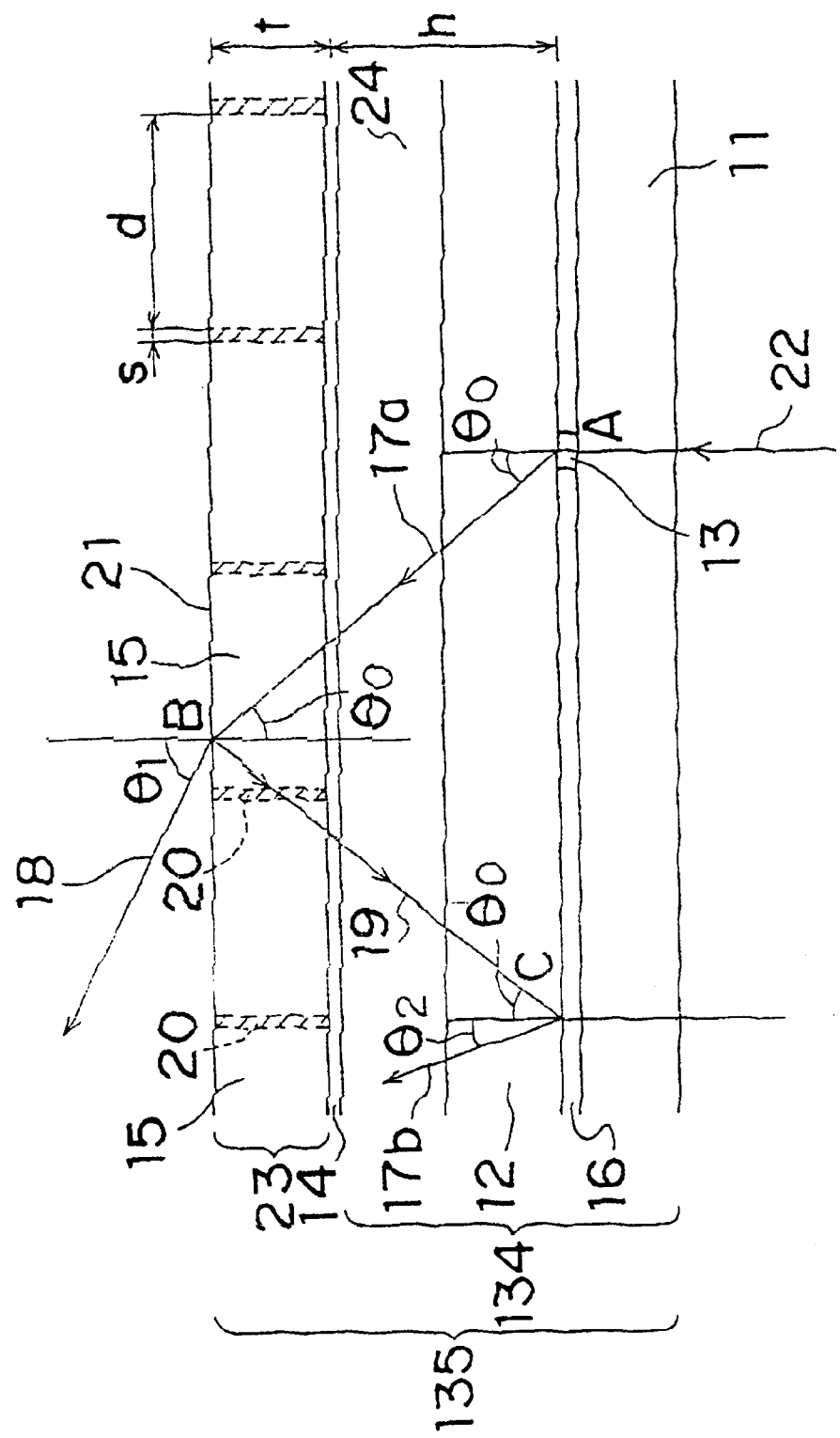
FIG. 1 is an explanatory view of a reflected light absorbing plate and display panel both according to the present invention.

The following describes the preferred embodiments of the present invention with reference to the accompanying drawings. Before the description proceeds, it is noted that since the basic structure of the embodiments is similar, like parts are designated by the same reference numerals throughout the drawings.

Firstly, in order to facilitate the understanding of the present invention, a model of a display apparatus according to the preferred embodiment is described below with reference to FIG. 1.

As shown in FIG. 1, a display apparatus serving as a light valve 135 includes a display panel 134 having a light modulation layer 16 which is interposed between an incident side substrate (i.e., confronting substrate) 11 and an outgoing side substrate (i.e., array substrate) 12. Alternatively, the outgoing side substrate may be considered to be formed by optically coupling a transparent substrate such as a glass substrate to the array substrate. It is to be noted here that "optically coupling" means to bond or junction both substrates with use of a transparent material having a refraction index approximately equal to those of the substrates, namely, means to create a state where reflected light hardly takes place on the interface between the both substrates.

In FIG. 1, it is assumed a case that, a small parallel light beam 22 is irradiated onto a minute area 13 having its center point A within a display area without applying voltage to the light modulation layer 16. In this case, the incident light 22 applied to the minute area 13 is irregularly scattered and diffused to form diffusion light 17a, which the diffusion light 17a, reaches an outgoing face 21 which is an interface between a reflection light absorbing plate 23 and air of atmosphere.

When the angle $\theta$o of the diffusion light 17a with respect to an outgoing face 21 of the light absorbing plate 23 is smaller than the critical angle, the diffusion light 17a is transmitted as a transmission light 18. When the angle $\theta$o is larger than the critical angle, the light 17a is totally reflected by the interface 21 as a reflected light 19. When the reflected light 19 is again incident to the light modulation layer 16, the incident light 19 is again scattered and diffused to form a diffused light 17b to be emitted forward (i.e., upward in the drawing). This phenomenon corresponds to formation of a secondary light source located at another point C on the light modulation layer 16. It is noted here that this phenomenon is called "secondary diffusion" and the secondary diffused light 17b is called "secondary diffusion light" which is caused by the reflected light 19 again incident to the light modulation layer 16 and scattered thereby.

When the incident angle $\theta$o becomes more than the total reflection angle, the light 17a is totally reflected by the interface 21. The total reflection angle $\theta$ is represented by a following equation.

$$\theta = \sin^{-1} 1/n \qquad (2)$$

where n is the refraction index of the substrate 12 or the plate 23. Assuming that the refraction index of the plate 12 or 23 is made equal to the refraction index of common glass, namely, 1.52, the total reflection angle $\theta$ becomes 42° from equation (2). Now, if there is not formed a light absorbing film 20 in the reflection light absorbing plate 23 as shown in FIG. 1, the respective light emitted from the light modulation layer 16 undesirably forms a light ring, generating a specific luminance distribution.

In the preferred embodiment, the display apparatus serving as a light valve 135 includes the reflection light absorbing plate 23 having a plurality of light absorbing films 20 formed therein, so that the reflected light 19 is absorbed by the light absorbing films 20 in the light absorbing plate 23.

Figure 2A:
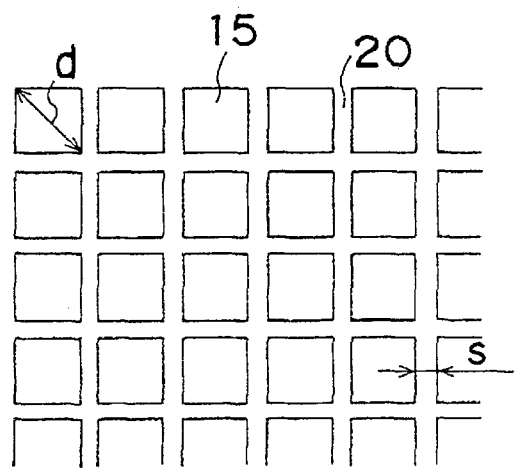
FIGS. 2A and 2B are explanatory views of a reflected light absorbing plate according to the present invention.
Figure 2B:
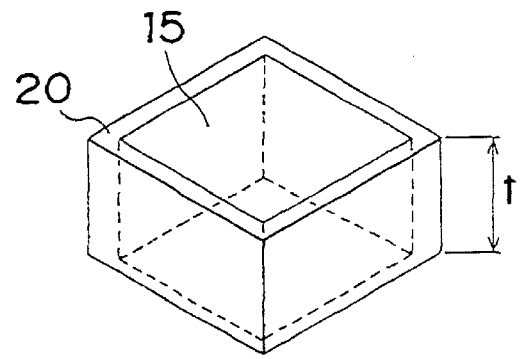
Figure 3:
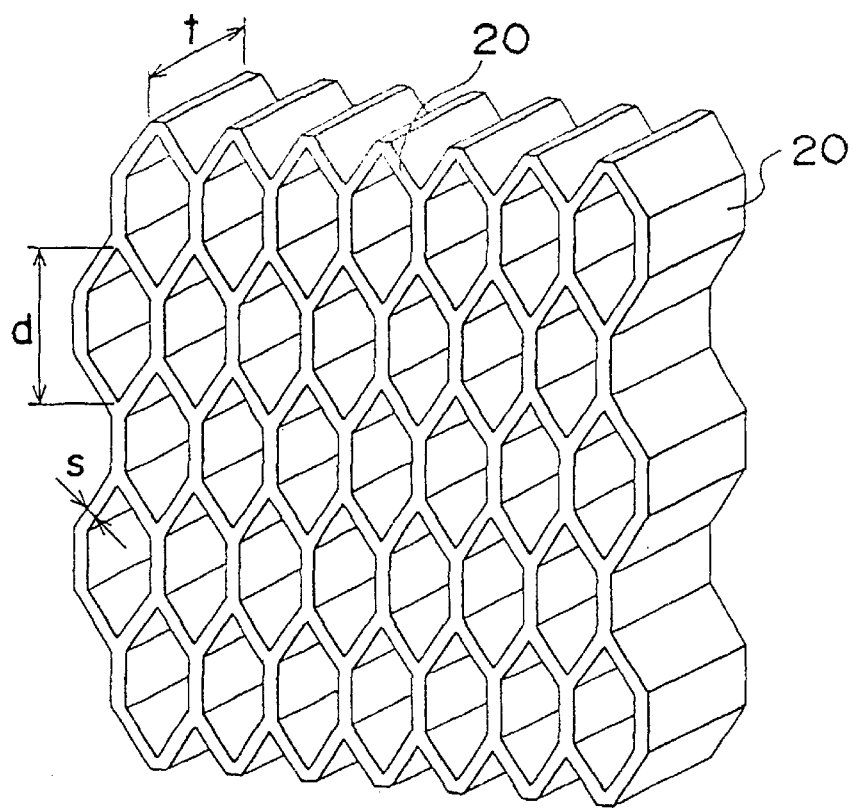
FIG. 3 is an explanatory view of a reflected light absorbing plate in another embodiment of the present invention.

With respect to the light absorbing films 20 in the light absorbing plate 23, there is shown an example of the configuration thereof in FIGS. 2A and 2B or FIG. 3.

In FIGS. 2A and 2B, the light absorbing film 20 is applied onto a surrounding peripheral portion of a transparent rectangular column 15 by coating. As a material of the transparent column 15, glass, acrylic resin or polycarbonate is available, and as a material of the light absorbing film 20, a black color paint or the like can be used. The light absorbing film of black color paint may be formed by a vapor deposition technique, thick film formation or the like technique.

It is to be noted here that the light absorbing film is not limited to a film of black color paint but any color film may be employed so long as the film absorbs the diffused light modulated in the display panel 134. For instance, in the case where the display panel modulates light of blue color, a resin mixed with a color matter absorbing blue light may be employed.

Alternatively, as shown in FIG. 3, another example of the light absorbing film 20 composed of partition walls or screens of a hexagonal shape in sectional view may be formed in advance and a transparent substance such as silicon gel, acrylic resin or glass material may be filled in the partition holes defined by the film.

In FIGS. 2 and 3, the film thickness s of the light absorbing film 20 is to be made as thin as possible. This is because if the thickness s is too large, the area of the hole portion through which light is input or output (aperture rate) is reduced, resulting in decrease in display luminance.

However, the light absorbing efficiency of the light absorbing film must be maintained at a high degree. It is to be noted here that, when the reflected light 19 is incident on the light absorbing film and emitted therefrom, the intensity of the emitted light should be held below 20% of the intensity of the incident light. This is because the emitted light from the light absorbing film causes the secondary diffusion light, resulting in deterioration in display contrast.

The display apparatus according to the present embodiment is configured, as shown in FIG. 1, so that the reflection light absorbing plate 23 is attached to the array substrate 12. The reflection light absorbing plate 23 is, as shown in FIG. 2A, partitioned into a plurality of small areas by the light absorbing film 20. Assuming that the diagonal length of said small area is represented by d, the height of the light absorbing film by t, and the refraction index of the transparent member 15 by n, it is arranged so that the relation of the following equation is satisfied.

$$t \geq d/4 \times \sqrt{(n^2-1)} \qquad (3)$$

In this equation (3), t is proportional to d, and therefore, if the diagonal length d is small, the height t can be made small. According to the present invention, in order to make the thickness of the transparent substrate thin, the substrate is partitioned into small areas each having a light absorbing film applied thereto. In other words, because the diagonal length d is made small by partitioning the transparent substrate into small areas, the height t of the transparent member 15 can be made small, and accordingly, the reflection light absorbing plate 23 can be made small in thickness.

The relative location of the reflection light absorbing plate 23 and the light modulation layer 16 is required to be spaced from each other by a specified distance. This is because the light absorbing film shields a part of the light emitted from the light modulation layer 16. This problem constitutes an important point when the display apparatus of the present invention is employed as the light valve for use in a projection type display apparatus. This is because when the light absorbing film 20 is located close to the light modulating layer 16 serving as an image forming plane, it appears on the display image as a shadow. The degree of appearance of such a shadow differs with MTF (Modulation Transfer Function).

Figure 4:
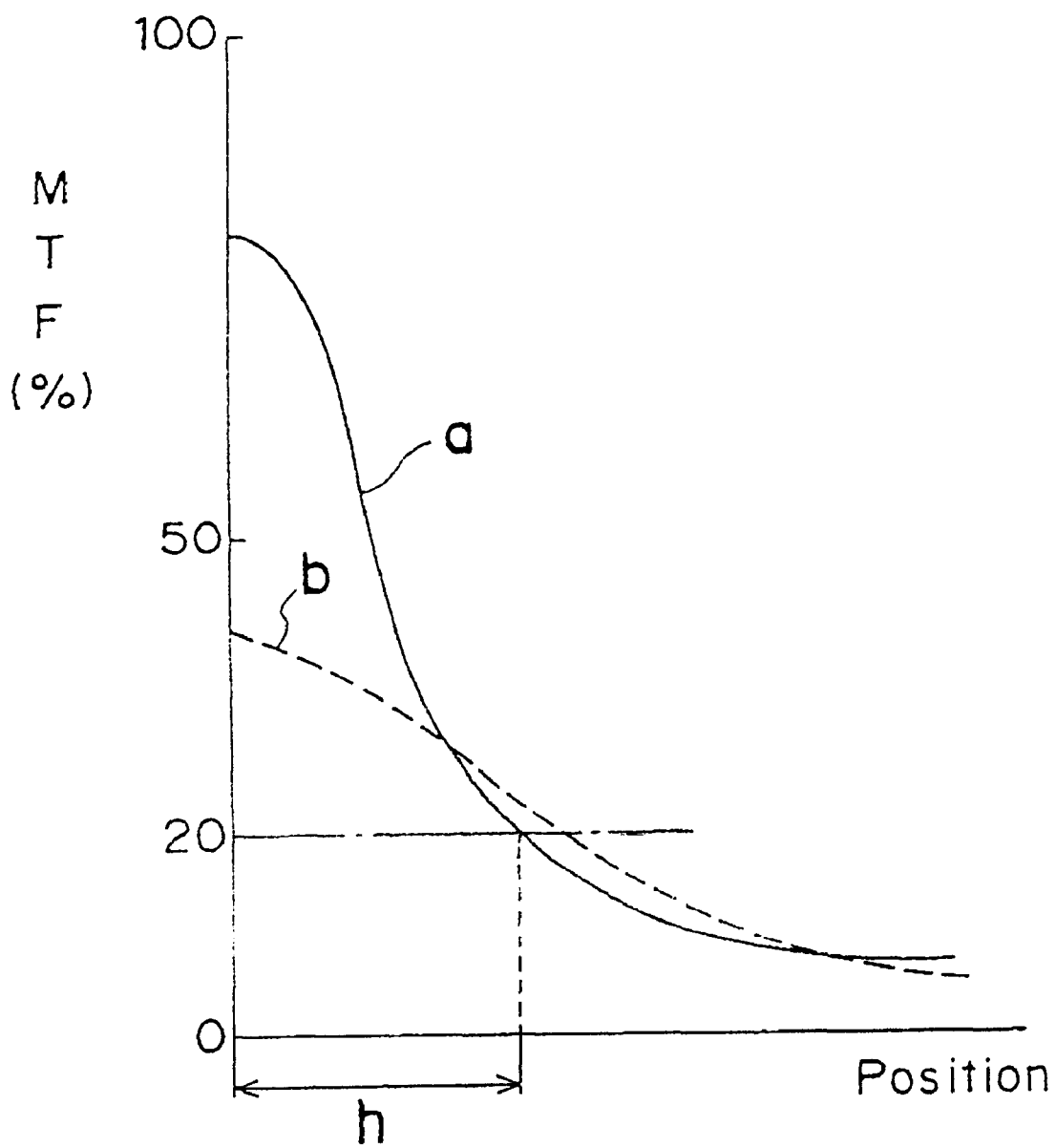
FIG. 4 is an explanatory view of MTF.

FIG. 4 shows a relationship between the MTF (%) on the longitudinal axis and the position from the optimum image forming point on the lateral axis. The optimum image forming point has the highest resolution and MTF decreases as it departs from the optimum point, namely, as the off-focus distance increases.

A projection lens employed for the projection type display apparatus may be designed so that MTF is high at the focus condition and rapidly decreases with a slight departure from the focal point as shown by a curve a in FIG. 4, for instance, as a projection lens for high vision use, or may be designed so that MTF will not decrease very much even if it somewhat departs from the focal point as shown by a curve b in FIG. 4.

In the preferred embodiment, the reflection light absorbing plate 23 can be made thin by partitioning the transparent substrate into small areas with application of the light absorbing films 20. However, if the light absorbing film 20 appears on the display image as a shadow, the image quality is lowered. Therefore, the light absorbing film 20 and the light modulation layer 16 (image forming plane) are adapted to be spaced a specified distance from each other. The distance is represented by h as shown in FIGS. 1 and 4. One yardstick of the distance h is a point where MTF becomes equal to or lower than 20% preferably lower than 10%. When MTF becomes lower than 20%, the point is considered to be in an area generally to be hardly recognized visually.

As described above, the distance h is a value changing on the design of the projection lens. In other words, in accordance with the pixel pitch or the required resolution of the display apparatus of the present invention, the MTF required in the design of the projection lens is determined, and thus the distance h is determined based on the MTF. The distance h can be made to a predetermined value by varying the thickness of the array substrate or the array substrate by attaching a glass substrate thereto.

When the light absorbing film 20 of the reflection light absorbing plate 23 and the pixel electrode of the display panel 134 are disposed too close to each other, moire fringes take place due to the interference between the pixel electrode or signal lines of the display panel and the periodical structure of the light absorbing film 20, resulting in deterioration of the display quality.

With respect to moire fringes, representing the pixel pitch of the liquid crystal display panel by Pd, and the louver pitch by Pr, the pitch P of the moire fringes generated is represented by the following equation (4).

$$1/P = n/Pd - 1/Pr \quad (4)$$

When the following formula (5) is established, the largest moire pitch becomes the minimum, $$Pr/Pd = 2/(2n+1) \quad (5)$$

and the modulation degree of moire becomes smaller as n becomes larger. Pr/Pd may be determined so as to satisfy the formula (5).

As a matter of course, by separating the formation position of the light absorbing film 20 away from the light modulation layer 16, the influence of the moire can be reduced.

The reflection light absorbing plate 23 is optically coupled with at least of one of the confronting substrate 11 and the array substrate 12 via an optical coupling layer 14. As a material of the-optical coupling layer, an ultra-violet ray hardening type bonding material can be mentioned.

In this type of bonding materials, there are many materials having a refraction index close to that of glass constituting the confronting substrate 11 and the like, and this type of the material is sufficient for this use. Transparent silicon resins are also can be used for this use. In addition, it is noted here that transparent bonding materials of epoxy resin group and liquid such as ethylene glycol and the like can be also employed. It is also to be noted that when the reflection light absorbing plate 23 is bonded to the confronting substrate 11 or array substrate 12, care should be taken not to mix air into the optical coupling layer 14. If there is an air layer, the image quality abnormality takes place due to the difference in the refraction index. In addition, it is referred to as "optical coupling" to couple the reflection light absorbing plate 23 and the confronting substrate and the like in an optical manner.

In this embodiment, while a plate formed with light absorbing films 20 therein is called a reflection light absorbing plate 23, the concept of the reflection light absorbing plate includes also an assembly of a transparent substrate 24 attached to or integrated with a reflection light absorbing plate 23. This is because the transparent substrate 24 serves as a means for maintaining a specified distance h from the light modulating layer 16 and it is also conceivable to process a transparent substrate 24 to a certain depth to thereby form the light absorbing film 20.

Now, when the refraction index n=1.52 of the transparent member 15 is entered into the equation (3), the value t/d (≈0.3) is obtained.

The results of actual examination of the effect of forming the light absorbing film 20 are shown in FIGS. 5A and 5B. As shown in FIG. 5A, parallel light rays are irradiated on the display panel and the luminance of the light modulating layer is measured viewing from the outgoing side.

In FIGS. 5A and 5B, reference character B denotes a luminance which the value is measured when the thickness t of the outgoing side substrate 12 is extremely thin with respect to the diagonal length of the effective display area without providing a light absorbing film 20. Concretely, the thickness of the outgoing side substrate is 1 mm (t=0, h=1) under the condition of d=50 mm. Reference character Be denotes a luminance which the value is measured when h is so adapted as MTF become equal to or lower than 10% while varying the thickness t of the reflection light absorbing plate 23. In FIG. 5B, the luminance ratio Be/B is plotted on the vertical axis and the relative substrate thickness ratio t/d is plotted on the horizontal axis. It is found from FIG. 5B that the luminance ratio becomes constant at t/d=0.3, and when in the range of t/d<0.3, the falling rate of the luminance ratio Be/B is large.

A small luminance ratio indicates a high display contrast. Referring to FIG. 5B, it is found that the effect of the contrast improvement is sufficient when t/d is above 0.25 or 0.3 or in the range of t/d=0.25 to 0.3, and even when the point t/d=0.15 (which is ½ of the foregoing value 0.3), the area thereof is of practical use since the effect of approximately 80% is obtained. Whereas, in a range of t/d≧0.15, the contrast is merely improved to a degree of at most 20% even with increase of the thickness t. Therefore, when the refraction index n=1.52, the value t/d is preferably equal to or larger than 0.15 and further preferably above 0.3.

Thus, even with ½ of the condition of the equation (3), there is no problem in the practical use. Accordingly, it is only required that the relation between the thickness t of the reflection light absorbing plate and the diagonal length d of the transparent member satisfies the following equation (6).

$$t \geq d/8 \times \sqrt{(n^2-1)} \quad (6)$$

In addition, as shown in FIG. 5A, in order to surely suppress the secondary diffusion or scattering light more reliably, it is preferable to form a pair of light absorbing films 51 on the non-effective area of such as an array substrate wherein the non-effective area means an area which is not on the route of the incident and outgoing light of the display panel.

As shown in FIG. 5B, the relative substrate thickness t/d and the luminance ratio Be/B have a predetermined relation and if the relation of the equation (6) is satisfied, it is sufficient for placing into practical use, and furthermore it is preferable to meet the relation of equation (3).

If the thickness of the reflection light absorbing plate 23 is increased, the plate 23 can not be accommodated within the optical block. Contrary to this, if the reflection light absorbing plate 23 is made too thin, the effect of suppressing occurrence of the secondary diffusion light is lowered and, in addition, the light absorbing film 20 comes close to the light modulating layer 16, resulting in that the image of the light absorbing film 20 is undesirably projected on the display image.

Therefore, it is necessary to secure a certain distance h from the light modulating layer 16 up to the position of forming the light absorbing film 20 by providing a transparent substrate 24, where the distance h is determined by MTF. MTF is made lower than 20% and preferably below 10%, and further preferably below 5%. When MTF is below 5%, the image of the light absorbing film 20 even formed on the projected image can not be generally recognized.

Figure 6A:
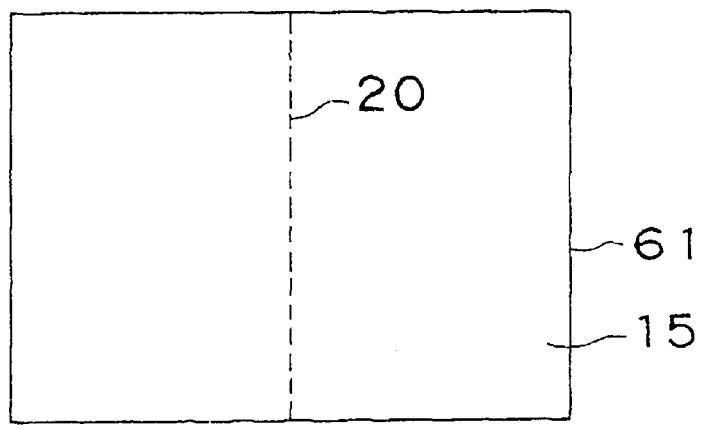
FIGS. 6A, 6B and 6C are explanatory views of a reflected light absorbing plate and display panel both according to the present invention.
Figure 6B:
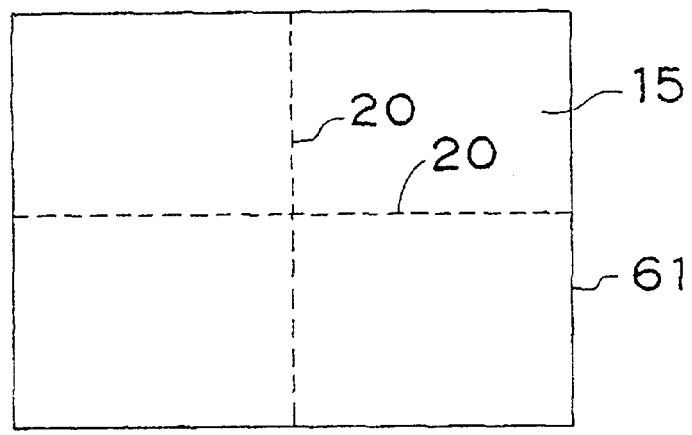
Figure 6C:
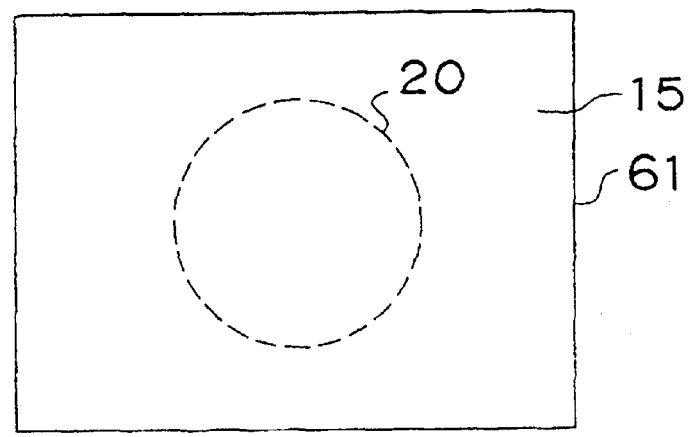

While the display area is illustrated as being divided into considerably minute partition areas by forming the light absorbing films 20 in FIGS. 2 and 3, the present invention is not limited to this configuration, and other configuration is conceivable, wherein the display area 61 may be divided into two parts as shown in FIG. 6A, into four sub-areas as shown in FIG. 6B or into two sub-areas by forming a circular light absorbing film as shown in FIG. 6C.

The degree of minutely dividing the display area 51 by the light absorbing films is determined in accordance with the setting value of the effect of the luminance ratio Be/B shown in FIG. 5B and to the degree of the allowable thickness of the reflection light absorbing plate. When the thickness of the reflection light absorbing plate 23 is sufficiently allowable, the partition number of dividing the light absorbing plate 23 is preferably small from the view-point of preventing the projection of the light absorbing film from appearing as a shadow and also in order to fully obtain the effect of the luminance ratio Be/B. On the contrary, in the case where the projection of the light absorbing film as a shadow is in the allowable range and the space for accommodating the light valve within the optical block is limited, it is preferable to increase the number of division of the light absorbing plate 23 with the light absorbing film.

Referring to FIG. 1, the description is made of a display panel in which an image is displayed on the light modulating layer as a change in the light diffusion state of PD (polymer dispersed) liquid crystals. However, the essential technical concept of the present embodiment is to absorb the light reflected at the interface between the reflection light absorbing plate and air by providing the reflection light absorbing plate for preventing the reflection light from entering again to the light modulating layer.

Therefore, the light modulating layer is not limited to an element for displaying an image thereon as a change in light diffusion state. For example, an optical image may be formed as a change in a light diffraction state. As a display panel forming an optical image as a change in the light diffraction state, an example is disclosed in U.S. Pat. No. 5,299,289. Generally, in this type of the display panel, a diffraction grating is formed on one of the two electrode substrates and liquid crystals are filled in the space between the both substrates.

Figure 7:
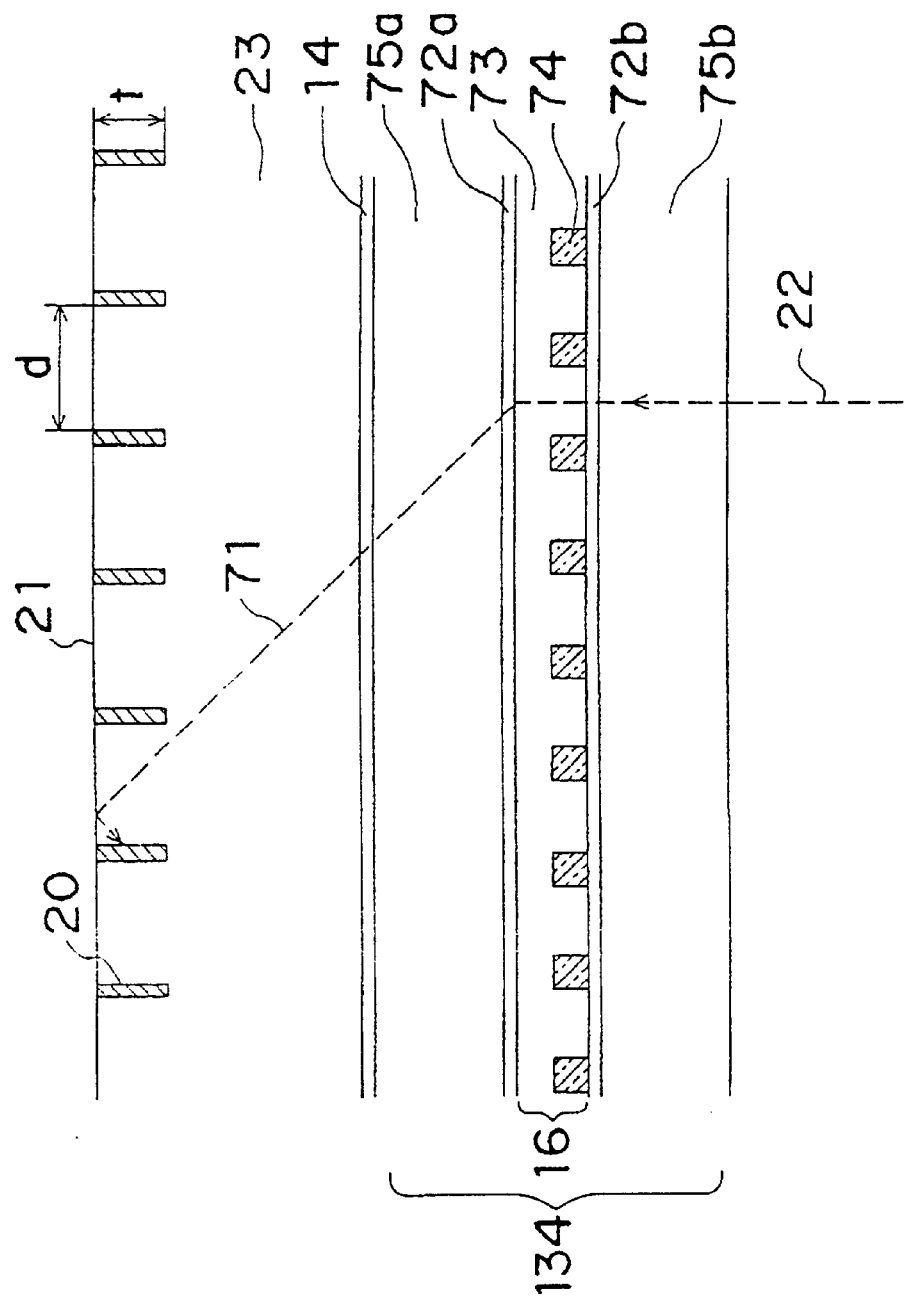
FIG. 7 is an explanatory view of a display panel according to the present invention.

FIG. 7 shows a construction of a light valve having a reflection light absorbing plate 23 disposed on a display panel 134 which forms an optical image as a change in the light diffraction state through modulation of light. A pair of glass substrates 75a and 75b are provided with a pair of transparent electrodes 72a and 72b, respectively. A diffraction grating 74 is arranged on the incident side transparent electrode 72b disposed on the glass substrate 75b. Twist nematic liquid crystals or polymer dispersed (PD) liquid crystals are filled between the transparent electrodes 72a and 72b to form a light modulation liquid crystal layer 73.

With regard to the refraction index of the liquid crystal layer 73, it is assumed that $n_o$ represents the refraction index when voltage is applied between the electrodes 72a and 72b so that liquid crystal molecules are oriented in the normal direction and that $n_x$ represents the refraction index when no voltage is applied. In addition, it is assumed that the refraction index of the diffraction grating is represented by $n_p$, where $n_p$ is made nearly equal to $n_o$. When a high voltage is applied to the liquid crystal layer 73, the refraction index of the liquid crystal layer 73 become $n_o$ and $n_o$ is nearly equal to $n_p$, eliminating the refraction index distribution within the liquid crystal layer 73.

In the case where $n_o$ voltage is applied to the liquid crystal layer 23, the refraction index of the liquid crystal layer 73 is $n_x$, and since $n_x$ is $n_o$ t nearly equal to $n_p$, therefor a periodic refraction index distribution takes place within the liquid crystal layer 73 and the incident light 22 is diffracted by the liquid crystal layer 73. By changing the voltage applied to the liquid crystal layer 73, the intensity of the diffracted light can be changed. Thus, the diffraction state of the incident light 22 can be changed so as to form an optical image.

There are two kinds of the diffraction gratings 74, namely, one-dimensional diffraction gratings and two-dimensional diffraction gratings. An one-dimensional diffraction grating is referred to a diffraction grating member in which diffraction gratings are formed in a stripe shape, while a two-dimensional diffraction grating is referred to a diffraction grating member in which dot-shaped diffraction gratings are formed in a matrix shape.

In the one-dimensional diffraction grating, as shown in FIG. 8A, when a main light spot 81a is irradiated, multiple order of light spots 81b, 81c, 81d, . . . appear on the right and left sides of the light spot 81a.

In the two-dimensional diffraction grating, as shown in FIG. 8B, when a main light spot 81a is irradiated, multiple order of light spots 81b, 81c, 81d, . . . and 81e, 81f, 81g, . . . appear on the right and left sides and the upper and lower sides of the light spot 81a.

As shown in FIG. 7, multiple order of diffraction light 71 tends to be reflected on the interface between the light absorbing plate 23 and air and to return again to the light modulating layer 73. However, since the reflection light absorbing plate 23 is provided with the light absorbing films 20, therefore the diffraction light 71 is incident on the light absorbing film 20 to be absorbed thereby and eliminated.

In this case, it is noted here that the reflection light absorbing plate 23 is regarded as a member not to suppress the secondary diffusion light but to suppress the re-diffraction. The re-diffraction is a phenomenon that the diffraction light is incident on the light modulating layer 16 and is again diffracted. With respect to other construction and function matters, the contents described in connection with FIG. 1 are applicable in the same manner as they are.

In addition, the effect shown in FIG. 5 or the relations represented by equations (3) and (6) are applicable as they are.

Figure 9A:
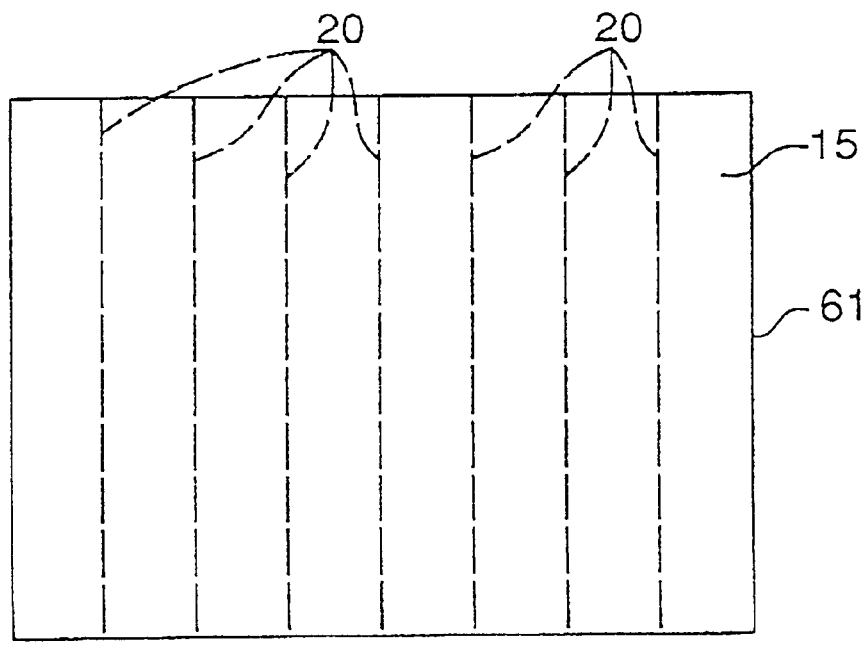
FIGS. 9A and 9B are explanatory views of a display panel according to the present invention.
Figure 9B:
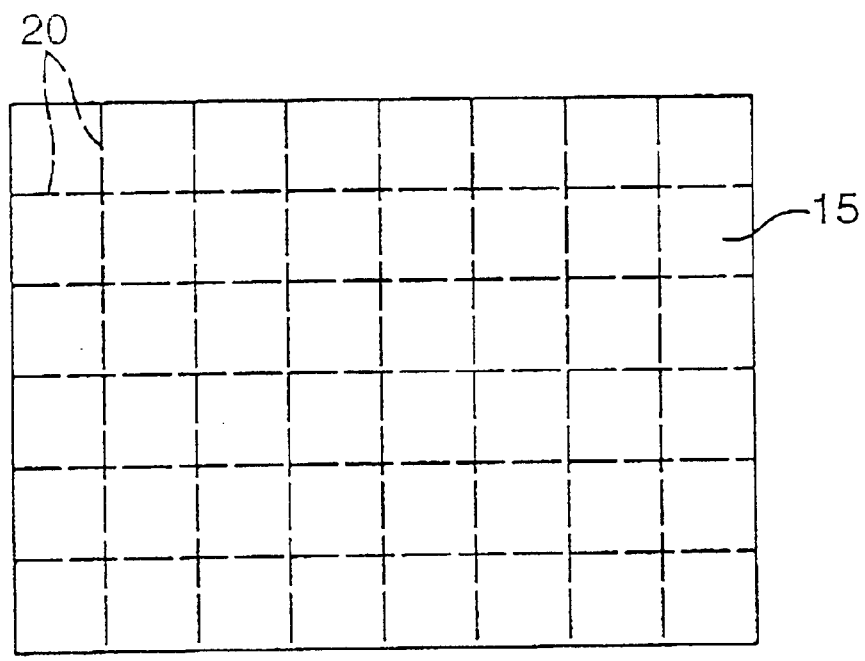

The one-dimensional diffraction grating diffracts light only in the right and left direction or in the upper and lower direction as shown in FIG. 8A, the light absorbing films 20 may be formed in one direction as shown in FIG. 9A. Thus, the display area 61may be divided by the light absorbing films 20 of the reflection light absorbing plate 23 in a shape of stripes as shown in FIG. 9A. However, in the case of the two-dimensional diffraction grating, the light absorbing films 20 is formed in a shape-of a matrix as shown in FIG. 9B.

Figure 14:
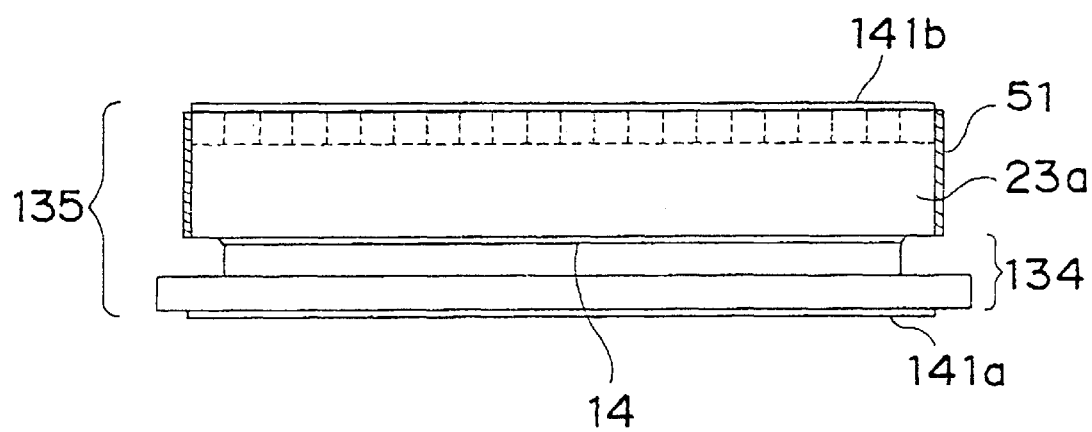
FIG. 14 is an explanatory view of a display panel in still another embodiment of the present invention.
Figure 15:
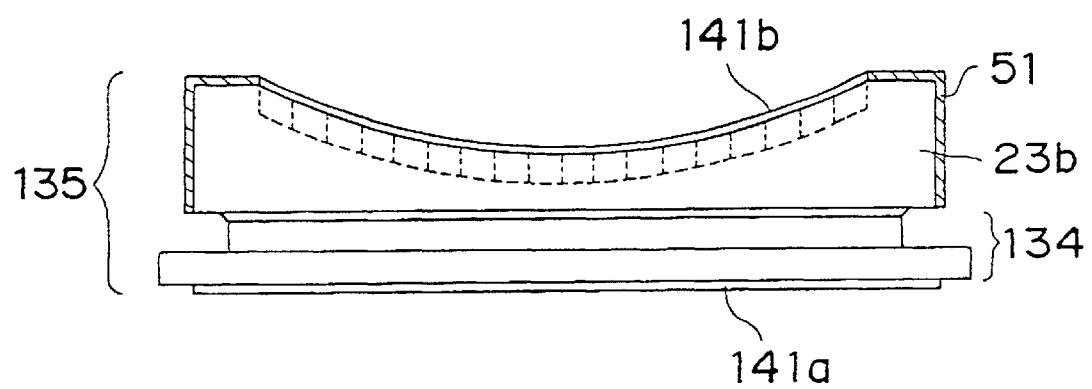
FIG. 15 is an explanatory view of a display panel in still another embodiment of the present invention.

The reflection light absorbing plate 23 is not limited to the plate shape shown in FIG. 14. For instance, it may be formed in a shape of a concave lens as shown in FIG. 15.

Figure 16:
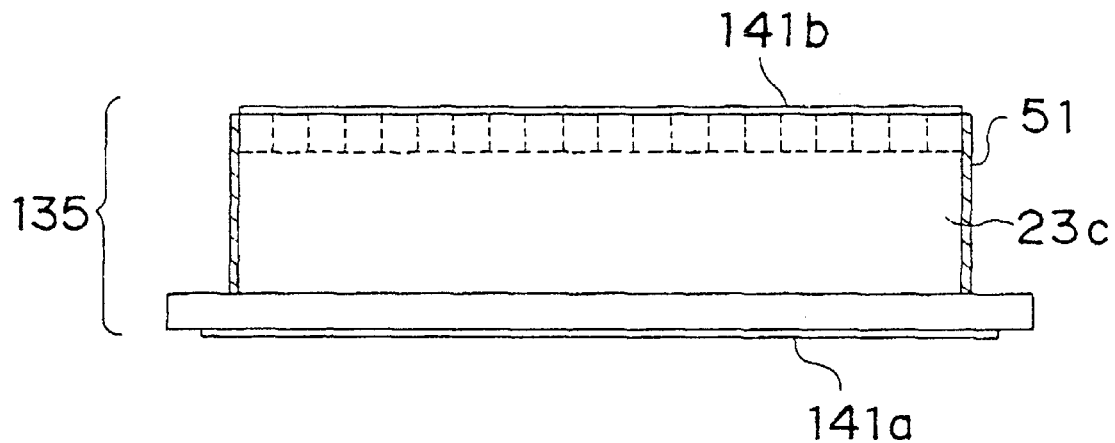
FIG. 16 is an explanatory view of a display panel in still another embodiment of the present invention.

Furthermore, the confronting substrate 12 and the transparent substrate 24 may be formed integrally as shown in FIG. 16. In this construction, in order to prevent the light from reflecting on the interface between the reflection light absorbing plate 23 and air, a reflection preventing film 141$b$ is formed on the interface 21.

Figure 17:
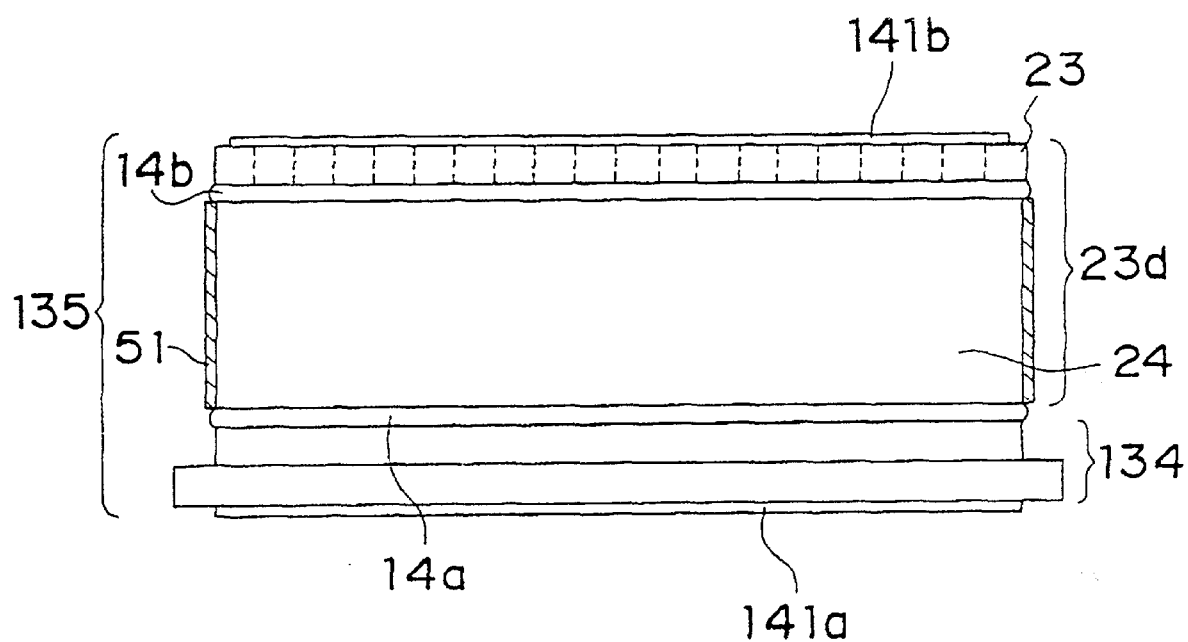
FIG. 17 is an explanatory view of a display panel in still another embodiment of the present invention.

As a matter of course, further another configuration, as shown in FIG. 17, may be used in which a transparent substrate 24 is attached to the display panel 134 with a light coupling layer 14$a$ and further, a reflection light absorbing film 23 is attached to the transparent substrate 24 via a light coupling layer 14$b$.

The reflection preventing film-(141$a$, 141$b$) may be formed in three layers or in two layers. The three-layered reflection prevention film is employed to prevent reflection in the wide wavelength band of visible light and this configuration is referred to as "multi-coat" hereinafter. The two-layered configuration is employed to prevent reflection in a specified wavelength band of visible light and this is referred to as "V-coat" hereinafter. The multi-coat and V-coat are selectively used depending on the use of the display panel. Normally, the V-coat is adopted in the case where the display panel is used as the light valve in the projection type display apparatus, and the multi-coat is adopted when the display panel is used as a straight-looking type panel.

In the case of employing a multi-coat, the reflection preventing film is formed by laminating aluminum oxide ($Al_2O_3$) having an optical thickness of $nd1=\lambda/4$, zirconium ($ZrO_2$) having an optical thickness of $nd1=\lambda/2$, and magnesium fluoride ($MgF_2$) having an optical thickness of $nd1=\lambda/4$. Normally, a thin film is formed while taking the value of 520 nm or its vicinity as $\lambda$. Herein, n denotes the refraction index of each thin film, d1 denotes physical thickness of the thin film and $\lambda$ denotes the main wavelength in design.

In the case of employing a V-coat, the reflection preventing film is formed by laminating-silicon monoxide (SiO) having an optical thickness of $nd1=\lambda/4$, and magnesium fluoride ($MgF_2$) having an optical thickness of $nd1=\lambda/4$, or yttrium oxide ($Y_2O_3$) having an optical thickness of $nd1=\lambda/4$ and magnesium fluoride ($MgF_2$) having an optical thickness of $nd1=\lambda/4$. In this construction, because SiO has an absorbing band on the side of blue color, it is preferable to employ $Y_2O_3$ in the case of modulating blue light and further from the view-point of stability of material.

Figure 18A:
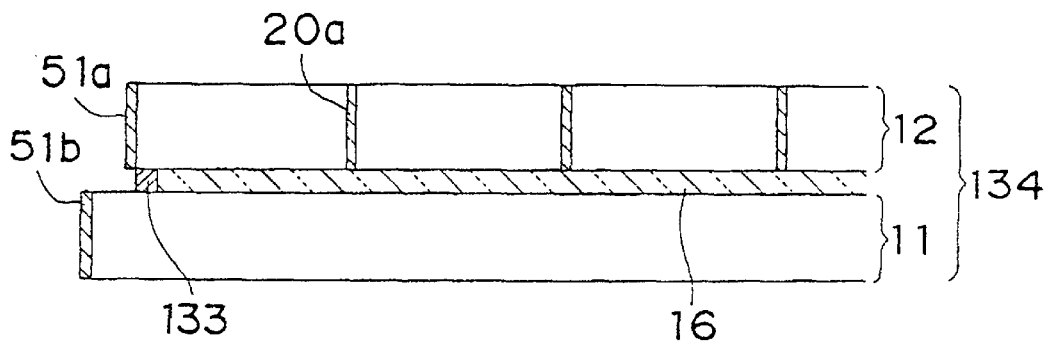
FIGS. 18A and 18B are explanatory views of a display panel in still another embodiment of the present invention.
Figure 18B:
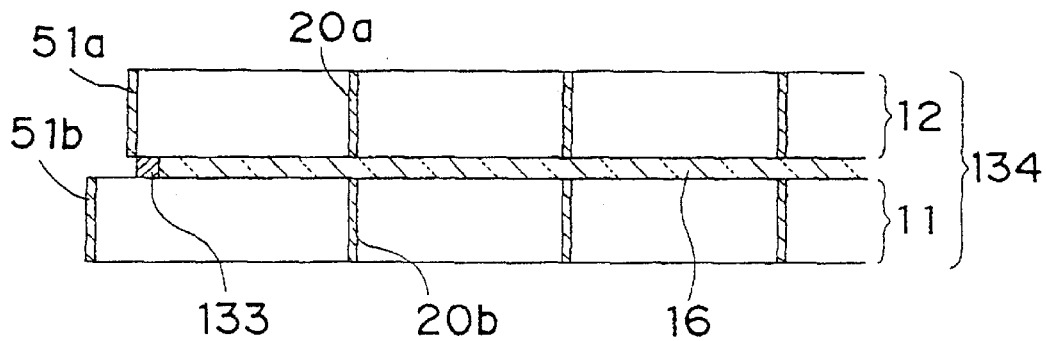

FIGS. 14 $a$ and 15 show configurations in which a reflection light absorbing plate 23 is attached to or arranged on the display panel 134. In addition, a light absorbing film 20 may be formed directly in the confronting substrate 11 or array substrate 12 of the display panel 134 as shown in FIGS. 18A and 18B. FIG. 18A shows an embodiment in which light absorbing films 20$a$ are formed only in the array substrate 12, and FIG. 18B shows an embodiment in which light absorbing films 20 are formed in both of the confronting substrate 11 and the array substrate 12.

With the configuration as shown in FIGS. 18A and 18B, no reflected light absorbing plate 23 is required because the array or confronting substrate serves as the reflected light absorbing plate 23. However, there is a problem that the light modulating layer 16 is shielded by the light absorbing films 20 depending on a viewing direction, but sufficiently available in many use fields such as display apparatuses in which the viewing direction is fixed, for instance, a viewfinder to be shown later in connection with FIG. 61.

In addition, the position of forming the light absorbing film 20 is not limited to an area defined by the interface 21 in the reflection light absorbing plate 23. For instance, the film 20 may be formed not only at a position 20$a$ close to the interface 21 with air but also at an intermediate position 20$b$ or at a position 20$c$ close to the array substrate 12 and the like. These positions may be determined, taking ease formation and the relation with MTF shown in FIG. 4 into consideration.

As shown in FIGS. 20A through 20K, various modifications are considerable with respect to the display panel according to the present invention. The righthand portion of the drawings corresponds to the input side while a transparent plate and a plano-concave lens are connected to the liquid crystal panel by transparent adhesive. Meanwhile, black paint is coated on ineffective faces of the transparent plate 23$a$ and the plano-concave lens 23$b$. When the plano-concave lens is employed, a positive lens 201 may be combined with the plano-concave lens. Meanwhile, in order to brighten a peripheral portion of the projected image, it is desirable that a field lens be provided at the input side of the light valve. However, in the case where the plano-concave lens is provided at the input side of the liquid crystal panel and the positive lens is provided at the input side of and in close vicinity to the plano-concave lens, the positive lens functions as a field lens. In any of the arrangements of FIGS. 20A through 20K, the projected image has excellent contrast as compared with the conventional arrangements. Meanwhile, in the light valve, a section from the liquid crystal layer to a surface in contact with air may be made of a single material or of a plurality of materials.

Figure 13:
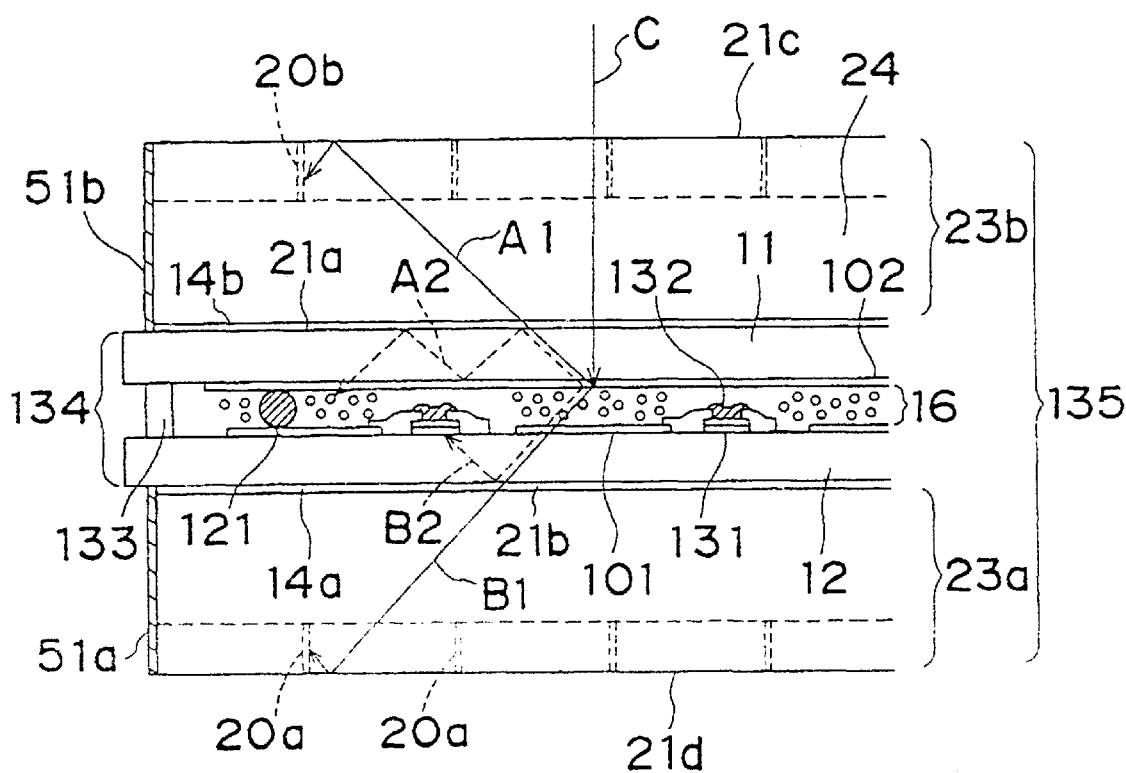
FIG. 13 is an explanatory view of a display panel according to the present invention.

The following describes an embodiment of a display panel of the present invention employing polymer dispersed (PD) liquid crystals for the light modulating layer 16 with reference to FIG. 13.

FIG. 13 is a sectional view of a display panel according to the present invention. The confronting substrate 11 and the array substrate 12 are made of glass, wherein the thickness thereof is 1.1 mm and the refraction index n thereof is 1.52. On the array substrate 12, formed are a plurality of pixel electrodes 101 made of ITO, TFT 131 as a switching element for applying an image signal to the pixel electrodes 101 and various signal lines (not shown) and the like. As the switching element, in addition to the TFT, a two-terminal element such as a ring diode and MIM or a varicap or a thyristor element may be employed.

It is to be noted that in the embodiments of the present invention, the substrate (for example, substrate 11, 12, 23 or 24) is not limited to a glass substrate. For example, a substrate made of acrylic or polycarbonate resin may be used. In addition, a film or sheet made of such resin material may be applicable in the present invention.

As shown in FIG. 13, each TFT 131 is formed with a light shielding film 132. The light shielding film 132 primarily prevent the light scattered in the liquid crystal layer 16 from entering a semi-conductor layer of TFT 131. If the light is applied to the semi-conductor layer, there is caused a photo-conductor phenomenon (hereafter, abbreviated as photo-con) where TFT 131 is not switched to the off state or the off resistance of TFT 131 will fall.

As the material of the light shielding film 132, acrylic resin dispersed with carbon can be used. In addition, an optimum-prepared mixture of various pigments of primary colors (coloring material of red, green, blue, cyan, magenta, and yellow) and a method for forming an insulating thin film with $SiO_2$ and other material on TFT 131 and forming a metallic film as the light shielding film on the insulating thin film by patterning are also employed. Furthermore, there is also available a method for forming a light shielding film by vapor depositing amorphous silicon with a large thickness. In addition, it is preferable for TFT 131 to adopt an inverted stagger structure in which a semi-conductor layer is formed below the gate.

In a PD display panel, it is preferable to form TFT 131 by a polysilicon technique in order to suppress occurrence of photo-con. The poly-silicon technique includes a high temperature poly-silicon technique which is a semi-conductor technique for manufacturing normal IC and a low temperature poly-silicon technique which has been actively developed recently for forming amorphous silicon film and crystallizing the amorphous silicon film.

In particular, it is preferable to form TFT 131 by a low temperature poly-silicon technique which is capable of accommodating a drive circuit within TFT and is capable of manufacturing the display panel at a low cost. In the TFT 131 manufactured by the techniques mentioned above, the photo-conductor phenomenon is remarkably made difficult to take place as compared with the TFT formed by the amorphous silicon technique which is now put into practical use in the field of pocket TV sets and the like. Therefore, the TFT is optimum for the polymer dispersed liquid crystal display panel performing light modulation through diffusion and transmission of the light.

In the case of forming the light shielding film 132 with a resin, any material may be used for the light absorbing material to be contained in the resin so long as the material has a high electric insulating property and will not adversely affect the liquid crystal layer 16. For instance, a resin material with a black coloring matter or pigment dispersed therein may be used, or gelatin or casein may be dyed with a black acid dye as in a color filter. As an example of black dye, a coloring matter of fluoran group coloring in black itself may be used by coloring, or a color-adjusted black prepared by mixing coloring matters of green color and red color may be also employed.

In particular, the light shielding film 132 is preferably made of an acrylic resin. In the display panel of the present invention, PD liquid crystals are used as a light modulating layer. It is recommended to employ an acrylic resin as a resin component of the PD liquid crystals. When the acrylic resin is used for the liquid crystal layer and also for the light shielding film 132, there is an effect of improving the contacting property between the liquid crystal layer and the light shielding film, preventing occurrence of peeling.

While the above-described resin materials are all of black color, the material is not limited to those of black color when the display panel of the present invention is employed as a light valve of a projection type display apparatus. The projection type display apparatus modulates respectively light of three colors R, G and B using three display panels. The light shielding film 132 of the display panel for modulating light of R color may absorb light of R color.

Namely, in order to absorb a specified wavelength of light, for instance, the light absorbing material for use in a color filter may be improved so as to obtain a desirable light absorbing characteristic. Basically, similarly as with the black color absorbing material described above, natural resin may be dyed with a coloring agent to be employed, or a material with a coloring agent dispersed within a synthetic resin may be employed. The selection range of the coloring agent is wider rather than that using the black coloring material, and one element or two or more elements may be properly combined selected from azo dyes, anthraquinone dye, phthalocyanine dye, and triphenylmethane dye for employment. Against the foreign materials contained in the light absorbing film, a counter measure can be carried out by removing alkaline metals in the coloring material (pigment).

Since black coloring materials such as carbon contain many materials adversely affecting the liquid crystal layer 16, therefore the use thereof is not preferable. Accordingly, it is desirable to adopt a coloring material capable of absorbing a specified wavelength as the coloring material contained in the light absorbing film.

In the projection type display apparatus employing three display panels for R light, G light and B light, respectively as light valves, it is easy to adopt the above-described coloring material absorbing a specified wavelength. Namely, a coloring agent complementary to the color of the light to be modulated may be contained in the light shielding film 132. The complementary relation means, for example, yellow color against Blue light. The light shielding film colored in yellow absorbs B light. Therefore, in the display panel modulating B light, the light shielding film 132 is colored with yellow color.

When the light shielding film 132 is formed of resin, the adhesion property between the liquid crystal layer 16 and the array substrate 12 is improved because the polymer dispersed (PD) liquid crystals 16 contain resin components. The liquid crystal layer 16 and ITO constituting the pixel electrode 101, in particular, are likely to be separated from each other. By forming a light shielding film 132 of acrylic resin on TFT 131, the light shielding film 132 serves as a buffer layer, preventing such separation from taking place. From-this view-point, it is preferable to adopt a light shielding film made of resin material. In addition, the light shielding film effectively prevents the irregular reflection or diffusion of light from occurring in the liquid crystal layer, suppressing the halation of the light.

PD liquid crystals 16 are held between the confronting electrode 102 and the pixel electrode 101. As the liquid crystal material for use in the display panel of the present invention, nematic liquid crystals, smectic liquid crystals, and cholesteric liquid crystals are preferable, and liquid crystal compound of one or more materials or a mixture containing a material other than the liquid crystal compound may be used.

Among the liquid crystal materials mentioned above, nematic liquid crystals of cyano-biphenyl group materials having a comparatively large difference between the abnormal light refractive index $n_e$ and normal light refractive index $n_o$, or nematic liquid crystals of fluorine or chlorine group which is stable in change with time lapse may be preferably used, and in particular the nematic liquid crystals of chlorine group is the most preferable because it is excellent in the diffusion characteristic and the change with time lapse will hardly take place.

As the polymer matrix material, a transparent polymer is preferable, and as the polymer, a resin of light hardening type is employed from the view-point of ease in manufacturing process and separation from the liquid crystal phase. As a concrete example, acrylic resin of UV-ray setting type is mentioned, and in particular, resin containing acrylic monomer, acrylic oligomer polymerized and set by irradiation of UV-ray may be preferably used. Above all, light setting acrylic resin having fluoric radicals is preferable because it forms a light modulating layer 16 excellent in the diffusion characteristic and the change with time lapse will hardly take place therein.

In addition, with respect to the liquid crystal materials, it is preferable to use a material with a normal light refraction index $n_o$ of 1.49 to 1.54, and in particular, a material with a normal light refraction index $n_o$ of 1.50 to 1.53. In addition, it is preferable to employ a material with a refraction index difference $\Delta n$ of more than 0.15 and less than 0.30. When $n_o$ and $\Delta n$ are increased, the heat-resistant and light-resistant property is deteriorated. While the heat-resistant and light-resistant property is improved as $n_o$ and $\Delta n$ become smaller, the light diffusion characteristic is deteriorated and the display contrast becomes insufficient.

As described above, it is preferable to employ, as the material of the light modulating layer 16, nematic liquid crystals of chlorine group having a normal light refraction index $n_o$ of 1.50 to 1.53 and a refraction index difference $\Delta n$ of more than 0.20 and less than 0.30 and to adopt, as a resin material, light setting acrylic resin having fluoric radicals.

As a monomer forming such polymers, di-ethylhexylacrylate, di-hydroxylethylacrylate, neopentylglycoldacrylate, hexanediorthodiacrylaye, diethyleneglycoldiacrylate, tripropyleneglycoldiacrylate, polyethyleneglycoldiacrylate, trimethylolpropanetriacrylate, and pentaerythytolacrylate are available.

As oligomers or pre-polymers, polyesteracrylate epoxyacrylate, polyurethaneacrylate, and so on are available.

In addition, a polymerization starting agent may be used to perform polymerization rapidly. As an example of the agent, di-hydroxyl-di-methyl-mono-phenylpropene-mono-on (Darocure 1173 manufactured by Merk Co.), mono-(4-isopropylphenyl) -di-hydroxy-di-methypropane-mono-on (Darocure 1116 manufactured by Merk Co.), mono-hydroxylphenylketone (Irgacure 651 manufactured by Ciba Geigy Co.), and so on can be mentioned. As other option ingredients, chain moving agent, light sensitivity increasing agent, dye material, bridging agent may be employed together as required by the case.

In addition, it is adapted that the refraction index $n_p$ of a resin material when it is set is made nearly equal to the normal light refraction index $n_o$ of the liquid crystals. When an electric field is applied to the liquid crystal layer, liquid crystal molecules are oriented in one direction and the refraction index of the liquid crystal layer becomes equal to $n_o$. Therefore, the refraction index $n_o$ coincides with the refraction index $n_p$ of the resin, and thus, the liquid crystal layer allows light to be transmitted. When the difference between refraction indexes $n_o$ and $n_p$ is large, a perfect transmission state can not be achieved in the liquid crystal layer even when voltage is applied to the liquid crystal layer and accordingly the display luminance is lowered. It is preferable to limit the difference between refraction indexes $n_o$ and $n_p$ within 0.1, and furthermore preferable within 0.05.

While the mixing rate of the liquid crystal material within the PD liquid crystal layer is not regulated here, generally the rate of 50% in weight to 95% in weight is good and the rate is preferably 70 wt. % to 90 wt. %. The structure of the polymer dispersed liquid crystal layer changes with the liquid crystal mixing rate, and below about 50 wt. %, liquid crystal droplets exist in an independent droplet shape, and when the mixing rate becomes more than 50 wt. %, polymers and liquid crystal molecules constitute a continuous layer interwoven mutually by polymers and liquid crystals.

The average particle diameter of droplet-shaped liquid crystals or the average hole diameter of the polymer network is preferably made to be more than 0.5 $\mu$m and less than 3.0 $\mu$m, in particular, made to be more than 0.8 $\mu$m and less than 2 $\mu$m. In the case where light modulated by the display panel is of a short wavelength (for example, B light), the average particle diameter is made small and in the case of light of a long wavelength (for example, R light), the average particle size is made large. When the average particle diameter of droplet-shaped liquid crystals or average hole diameter of the polymer network is large, the voltage for generating the transmission state becomes lower but the light diffusion characteristic is lowered, When it is small, the light diffusion characteristic is improved, but the voltage for generating the transmission state becomes higher.

In the case of using polymer dispersed liquid crystal for the display panel of the present invention, the average particle diameter of the droplet shaped liquid crystals or the average hole diameter of the polymer network of the display panel which is adapted to modulate blue light is made smaller than that of the display panel which is adapted to modulate Red light.

As described before with reference to FIGS. 70A and 70B, the polymer dispersed liquid crystals referred to in the present invention includes liquid crystals dispersed in a droplet shape within a resin material layer, liquid crystals charged between sponge-shaped resin (polymer network), and besides, a stratified resin structure as disclosed in Japanese Patent Laid-Open Unexamined No. 208126/1994, filed by Sansei Electronics Co. In addition, liquid crystals sealed within a capsule-shaped accommodating medium as disclosed in Japanese Patent Publication No. 52843/1991 is also included therein. Furthermore, a similar configuration of liquid crystal and polymer resin containing two or multiple coloring matters is also included therein.

With respect to the film thickness of the liquid crystal layer 16, the range of 5 to 20 $\mu$m is preferable, and further, the range of 8 to 15 $\mu$m is more preferable. When the film thickness is thin, the light diffusion characteristic is inferior and the contrast is insufficient. On the contrary, when the film thickness is thick, a high voltage must be applied for driving, and therefore, it becomes difficult to design a gate drive circuit for generating the signal switching TFT 131 on and off on the gate signal line and a source drive circuit for applying an image signal to the source signal line.

Figure 12:
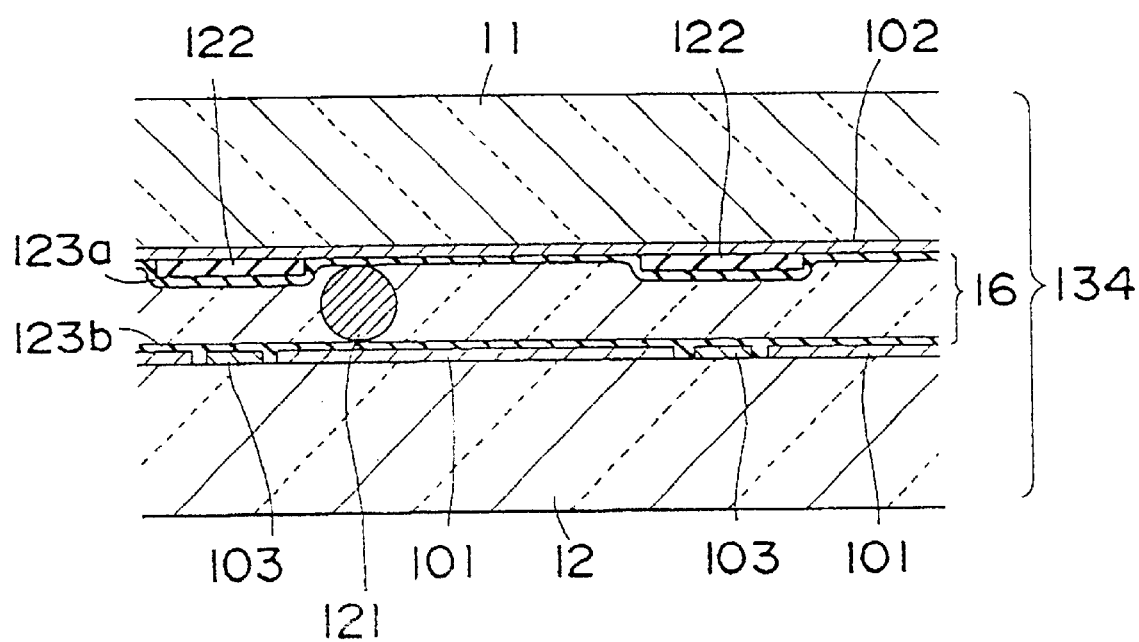
FIG. 12 is a sectional view of a display panel according to the present invention.

In controlling the thickness of the liquid crystal layer 16, black glass beads 120 or black glass fibers or black resin beads 120 or black resin fibers are preferably employed as shown in FIG. 12. Particularly, this is because, since the black glass beads or black glass fibers are very high in light absorbing property and of a hard quality, the number of pieces to be scattered within the liquid crystal layer 16 can be reduced to a small number.

While beads and fibers are black-colored in the above description, in the case of employing the display panel of the present invention as a light valve of the projection type display apparatus, they are not limited to black color. In the projection type display apparatus, the three colored light of R, G and B are respectively modulated by the three display panels. The beads 120 and other material employed in the display panel for modulating R light are satisfactory if R light is merely absorbed thereby. In other words, the beads 120 may contain coloring materials complementary with the color of light to be modulated.

The liquid crystal layer 16 diffuses the incident light (i.e., display in black mode) in the state of applying no voltage. When transparent beads are employed, even when an image is displayed in black mode, light leakage takes place through the positions of the beads and the display contrast is deteriorated. When black glass beads or black glass fibers are employed as in the display panel of the present invention, the light leakage does not take place and an excellent display contrast can be realized.

It is effective to form insulating film 123a or 123b at least on one of the pixel electrode 101 and the confronting electrode 102 as shown in FIG. 12. As the insulating film 123, an orientation film of polyimide and the like employed in the TN liquid crystal display panel and the like, organic matter such as polyvinylalcohol (PVA) and inorganic matter such as $SiO_2$ may be mentioned. Preferably, polyimide and the like organic material is preferably used from the viewpoint of adhesion property.

The PD liquid crystal layer 16 is comparatively low in the specific resistance. Therefore, there may undesirably take place a case where the electric charges applied to the pixel electrode 101 can not be held perfect during the time period of one field (1/30 or 1/60 seconds). When the electric charges can not be held, the transparent state of the liquid crystal layer 16 is not attained and the display contrast becomes low. On the contrary, since the thin film made of organic matter such as polyimide is very high in the specific resistance, therefore, the rate of holding the electric charge can be improved by forming a thin film made of organic matter on the electrode. Thus, a high luminance display and a high contrast display can be realized.

The insulating film 123a or 123b also has an effect of preventing the liquid crystal layer 16 from being separated from the electrodes because nearly half of the materials of the liquid crystal layer is comprised of organic matters made of resin. Therefore, the insulating film serves the role of a bonding layer, and the separation of the liquid crystal layer from the substrates 11 and 12 becomes is effectively prevented.

Furthermore, in the case of forming the insulating film 123 made of organic matters, there is an effect of making the hole diameters of the polymer network or the particle diameters of the droplet-shaped liquid crystals substantially uniform. This is because organic residues which may remain on the confronting electrode 102 are covered by the insulating film. Regarding this effect, PVA is superior to polyimide because it may be considered that PVA is higher than polyimide in the wetting characteristic. However, according to the reliability tests for such as anti-light resistance, anti-heat resistance conducted by forming various insulating films on the display panel, polyimide for use as an orientation film of TN liquid crystals is superior as a change with time lapse hardly take place therein. Therefore, it is preferable to use polyimide as the insulating film 123.

In forming the insulating film of organic matter, the thickness range of 0.02 to 0.1 μm is preferable, and further, the range of 0.03 to 0.08 μm is more preferable.

In the PD liquid crystal display panel, it is also important to prevent the electro-magnetic coupling between the signal line and the pixel electrode.

Figure 10:
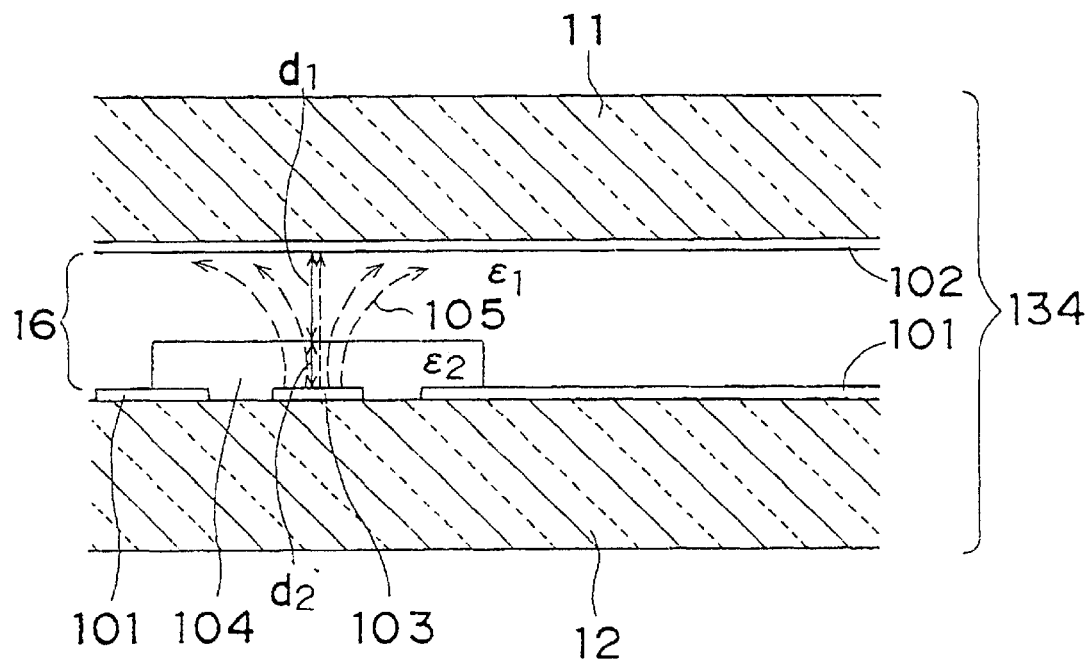
FIG. 10 is an explanatory view of a display panel according to the present invention.

As shown in FIG. 10, A.C. current is always applied to the source signal line 103. Therefore, electric force lines are generated between the pixel electrode 101 and the source signal line 103, and liquid crystal molecules are oriented along the electric force lines, resulting in causing "light leakage" from the peripheral portion of the pixel electrode 101.

In order to prevent the light leakage, the source signal line 103 and gate signal line and the vicinity of these signal lines are shielded with a material 104 having a specific dielectric constant lower than that of the liquid crystal layer 16 (hereinafter, referred to as, "low dielectric material"). As a low dielectric material, inorganic materials such as $SiO_2$, $SiN_x$, and organic materials such as polymer 692 of the liquid crystal layer 16, resist, and PVA can be used. The electro-magnetic coupling between the signal line 103 and the pixel electrode 101 can be prevented by forming the low dielectric material in a shape of a thick film as shown in FIG. 10. The electromagnetic coupling between the signal line 103 and the confronting electrode 102 can be naturally prevented, and therefore the liquid crystals 16 on the low dielectric film 104 can be always made into the light diffusion state.

In FIG. 10, assuming that, the specific dielectric constant of the low dielectric material film 104 is represented by $\in_2$, the specific dielectric constant of the liquid crystal layer 16 by $\in_1$, the film thickness of the liquid crystal layer by $d_1$, the film thickness of the low dielectric film 104 by $d_2$ and the voltage applied across the confronting electrode 102 and the source line 103 by V, the voltage E applied to the liquid crystal layer 16 of d1 is expressed by the following equation (7).

$$E=[\in_2 \cdot d_1/(\in_1 \cdot d_2+\in_2 \cdot d_1)]V \quad (7)$$

If the film thickness of the low dielectric material 104 is set so that the voltage E applied to the liquid crystal layer 16 of d1 becomes lower than the rising voltage of the liquid crystal (the voltage on which the liquid crystals are oriented and the transmittance of the liquid crystal layer starts to change), most desirably, no light leakage will take place. In the practical use, there are many cases where slight orientation of liquid crystals are allowable. Representing the state where the liquid crystal layer 16 is reduced into the perfect transmission state by 100%, the transmission rate of 30% in the liquid crystal layer is allowable. In other words, the thickness of the low dielectric film 104 is regulated so that the voltage E applied to the liquid crystal layer 16 results in a transmission rate of less than 30%.

Figure 11:
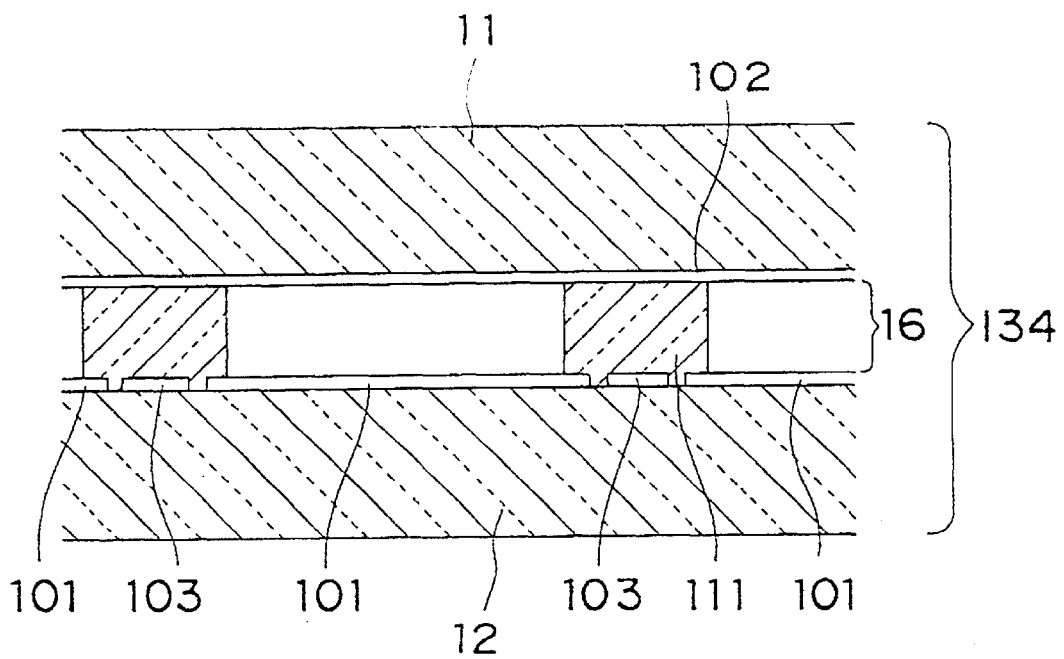
FIG. 11 is a sectional view of a display panel according to the present invention.

Although the low dielectric material is formed in a film shape in FIG. 10, it is not limited to this shape, and as shown in FIG. 11, it may be formed in a shape of a column. A low dielectric material formed in a column as shown in FIG. 11 is referred to as a low dielectric column 111 hereinafter.

In order to prevent generation of lateral electric fields between the pixel electrodes or between the pixel electrode and the signal lines, according to the display panel of the present invention, 1H inverse drive is adopted where the polarity of the voltage applied to the pixels is switched every pixel line.

It is desirable to form the dielectric column 111 on the side of the confronting substrate 11, as shown in FIG. 11, because, on the side of the confronting substrate, only the confronting electrode 102 is formed and the substrate surface is smooth and there is no possibility of causing a break due to static electricity of TFT 131 and the like components.

When the low dielectric material film is formed in a column shape like the low dielectric column 111, the thickness of the liquid crystal layer 16 can be maintained constant by the column. In this configuration, there is no needs to disperse the black beads 120 as shown in FIG. 12. Thus, the manufacturing process of the display panel is simplified. Furthermore, since no obstacle such as black beads 120 exists on the pixel electrode 101, an excellent image display can be realized.

The low dielectric column 111 and low dielectric film 104 can be formed easily as described above in the PD display panel because PD display panel does not require the orientation processing of rubbing unlike the case of TN liquid crystal display panel. In the configuration having the low dielectric column 111 or low dielectric film 104 formed on the substrate, it is impossible to perform the orientation processing of rubbing. This is because a rubbing cloth is caught by the low dielectric column 111 or the low dielectric film 104 and the surfaces of substrates 11 and 12 can not be rubbed excellently.

The low dielectric column 111 and the low dielectric film 104 may be dyed for absorbing the light irregularly diffused and reflected in the liquid crystal layer, and thus improving the image quality. As described with regard to the light shielding film 132 in FIG. 13, the low dielectric material may be formed, for example, by dispersing black coloring agent or pigment within the resin, or zelatine or casein may be dyed with black acid dye as with a color filter. As an example of black dye, a fluorane group dye coloring in black may be employed by coloring or a color coordinated black prepared by mixing green coloring agent and red coloring agent may be employed.

While the above-mentioned materials are all black color materials, in the case where the display panel of the present invention is employed as a light valve of the projection type display apparatus, they are not limited to black color materials, and any material may be used as the low dielectric column 111 of the display panel modulating R light so long as the material merely absorbs R light. Therefore, a natural resin may be dyed with a coloring agent or a material with a coloring agent dispersed within a resin can be employed. For example, one element or two or more elements may be properly combined among azo dye, anthraquinone dye, phthalocyanine dye and triphenylmethane dye.

FIG. 13 shows the effect of the-reflection light absorbing plate 23 (represented by reference numeral 23a and 23b in the drawing). Incident light C is diffused within the liquid crystal layer 16 to cause a primary diffusion light A1 or B1. The diffused light A2 and B2 show an example without providing the reflection light absorbing plate 23. Diffusion light A2 is repeatedly reflected in the area between the interface 21a on the substrate 11 and the confronting electrode 102. A part of the repeatedly reflected light A2 is again entered to the pixels located on the peripheral positions and diffused (secondary diffusion). The blurring of the outline of the image arises due to the occurrence of the secondary diffusion. Of course, the display contrast of the whole image is deteriorated.

Diffused light B2 is reflected on the interface 21b between the array substrate 12 and air, and a part of the reflected light is applied onto the semiconductor layer of TFT 131, thus causing the photo-conductor phenomenon. TFT 131 having a photo-conductor phenomenon taken place is deteriorated in "off" characteristic and it becomes impossible to hold electric charges charged on the pixel electrode 101 during the time period of one field (1F), resulting in deterioration of the display luminance.

When the reflection light absorbing plates 23a and 23b are provided on the display panel, secondary diffusion light A2 and B2 do not take place, and only the primary diffusion light A1 and B1 take place. The reflection light absorbing plate 23 is attached to the display panel 134 with a light coupling layer 14 (represented by 14a and 14b in the drawing). While the diffused light A1 is reflected on the interface 21c between the light absorbing plate 23b and air, the reflected light is absorbed by the light absorbing film 20b. Similarly, while the diffused light B1 is reflected on the interface 21d between the light absorbing plate 23a and air, the reflected light is absorbed by the light absorbing film 20a.

Therefore, the secondary diffusion, blurring of the outline, and photo-conductor phenomenon do not take place. Here, it is preferable to form in advance light absorbing films 51a and 51b in the non-effective area of the light absorbing plates 23a and 23b. The non-effective area comprehensively represents the passage through which light does not enter or go out of the effective display area (i.e., light modulating area where pixel electrode 101 is formed). Therefore, it is desirable to form the light absorbing film not only on the side faces of the light absorbing plate 23 but also on the side surfaces of the display panel 134.

Although FIG. 13 shows the configuration of the transmission type display panel, the technical concept of the present invention can be applied also to a reflection type display panel.

Figure 27:
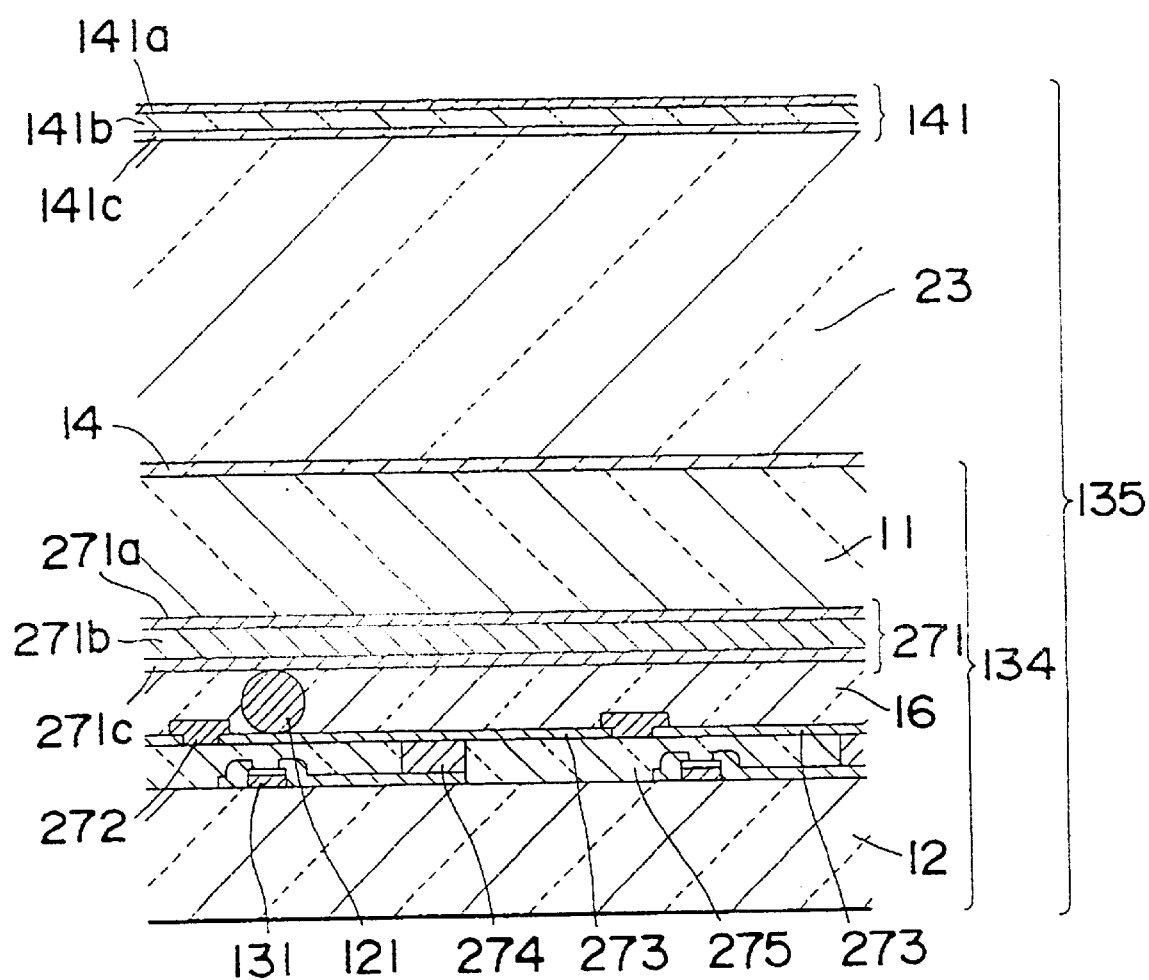
FIG. 27 is a sectional view of a reflection type display panel according to the present invention.

FIG. 27 is a sectional view of a configuration of a reflection type display panel according to the present invention. TFT 131 and the like elements are covered with an insulating film 275, and a reflection electrode 273 is formed on the insulating film 275. The reflection electrode 273 and TFT 131 are connected with each other by a contact home portion 274. As a material for the insulating film, organic material represented by polyimide, or inorganic material such as $SiO_2$ and $SiN_x$ are employed. The reflection electrode 273 is formed with Al thin film on its surface. The electrode 273 may be formed with Cr, but the refraction index thereof is lower than that of Al, and also, since Cr electrode is of hard quality, therefore, cracks is likely to take place at the peripheral portion.

In the display panel of the present invention shown in FIG. 27, TFT 131 is formed below the reflection electrode 273. In other words, the reflection electrode 273 has a function of an electrode for applying voltage to the liquid crystal layer 16 as well as a function of a light shielding film (BM) preventing the incident light diffused in the PD liquid crystal layer 16 from entering on the semi-conductor layer of TFT 131. The reflection electrode 273 is formed of metallic material, having a sufficient light shielding effect, and is simple in structure, and therefore, it can be realized at a low cost.

On the array substrate 12, there are provided source signal lines and so on (not shown). The reflection electrode 273 has also a function of shutting off the electric force lines generated from the signal lines from reaching the liquid crystal layer 16. Therefore, an image noise due to the electric force lines generated by the source signal lines is effectively suppressed.

The reflection electrode 273 and TFT 131 are electrically connected with each other by means of the contact home 274. It is necessary to vapor-deposit a metallic thin film for reflection electrode 273 thicker than the thickness of the insulating film 275 for obtaining the connection. The film thickness of the insulating film 275 is about 1 μm. Therefore, a step is produced at the connection section 274. Because the thickness of the reflection electrode 273 also becomes 1 μm, there is produced a valley of 1 μm between adjacent reflection electrodes. Because the display panel of the present invention employs polymer dispersed liquid crystals and this, rubbing is not required, there is no problem even when there are steps, and the display panel can be manufactured at a high yield.

There is formed a stepped portion of 1 μm at the connection terminal section 274. In addition, the shape of TFT 131 is patterned on the reflection electrode 273, resulting in causing surface irregularity of about 1 μm. Because the display panel of the present invention employs polymer dispersed liquid crystals, it performs light modulation as a change of the diffused state. The change in film thickness of about 1 μm of the liquid crystal layer due to the stepped portion and the surface irregularity of TFT 131 will hardly affect the light modulation. In the display panel applying the light swirling characteristic to the light modulation like a TN liquid crystal display panel, the surface irregularity would be a fatal blow to the light modulation. In addition, the fact that the film thickness of the liquid crystal layer of the present invention is as thick as 8 μm also acts favorably with respect to the thickness irregularity of the liquid crystal layer while the liquid crystal layer thickness of TN liquid crystal display panel is slightly less than 5 μm.

The reflection light absorbing plate 23 is connected to the confronting substrate 11 via a light coupling layer 14. In addition, on the interface whereat the reflected light absorbing plate 23 contact air, formed is a reflection preventing film 141 which is comprised of first, second and third layers 141a, 141b and 141c.

The confronting electrode 271 is composed of three layers, sequentially from the confronting substrate 11 side, a first dielectric thin film 271a, an ITO thin film 271b and a second dielectric thin film 271c. The optical film thickness of the ITO thin film 271b is $\lambda/2$ and the optical thickness of the first thin film 271a and the second thin film 271c are respectively $\lambda/4$. It is to be noted that the ITO thin film 271b functions as a "confronting electrode".

The refraction indexes of the first thin film 271a and the second thin film 271c are desirably more than 1.60 and less than 1.80. As an example of the materials thereof, SiO, $Al_2O_3$, $Y_2O_3$, MgO, $CeF_3$, $WO_3$, and $PbF_2$ are available.

Figure 28:
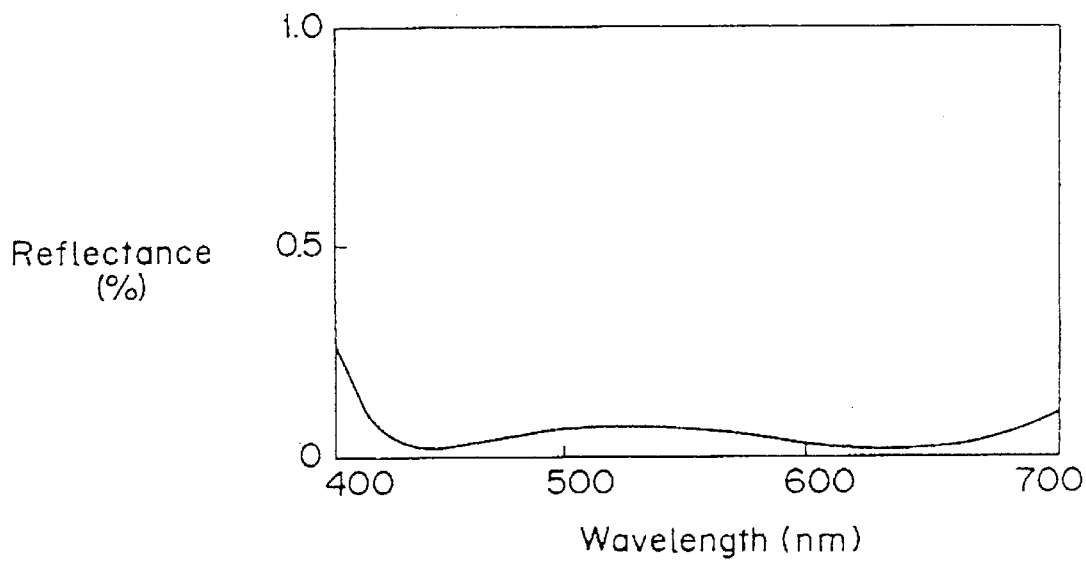
FIG. 28 is a characteristic diagram of a reflection type display panel according to the present invention.

One example of a concrete configuration is shown in Table 1 and the spectroscopic reflection index thereof is shown in FIG. 28. As can be seen from FIG. 28, according to Table 1, the characteristic of reflection index of less than 0.1% can be realized over the wavelength band width of more than 200 nm, and an extremely high reflection preventing effect can be obtained. It is to be noted here that, in each table of the present invention, while the refraction index of the liquid crystal in the diffused state is described as 1.60, this value will change if the liquid crystal material and polymer material are changed. Assuming that the refraction index of the liquid crystals in the diffused state is represented by $n_x$, the refraction index of the first and second dielectric films by $n_1$, and that of INTO thin film by $n_2$, the display panel may be configured so that the condition $n_x < n_1 < n_2$ is satisfied.

TABLE 1

| | main wavelength: λ = 520 nm | | |
|---|---|---|---|
| material | refraction index | optical film thickness (nm) | physical film thickness (nm) |
| glass substrate | 1.52 | — | — |
| SiO | 1.70 | 130.0 | 76.5 |
| INTO | 2.00 | 260.0 | 130.0 |
| SiO | 1.70 | 130.0 | 76.5 |
| liquid crystal | 1.60 | — | — |

It is desirable to use the first thin film 271a and the second thin film 271c having the refraction index of more than 1.60 and less than 1.80. In the example of Table 1, both the first and second thin films are made of SiO material but any one of $Al_2O_3$, $Y_2O_3$, MgO, $CeF_3$, $WO_3$ and $PbF_2$ may be used as the material of one or both thin films.

In Table 2 shown is another example where the first thin film 271a and the second thin film 271c are made of $Y_2O_3$. The spectroscopic reflection index is shown in FIG. 29.

TABLE 2

| | main wavelength: λ = 520 nm | | |
|---|---|---|---|
| material | refraction index | optical film thickness (nm) | physical film thickness (nm) |
| glass substrate | 1.52 | — | — |
| $Y_2O_3$ | 1.78 | 130.0 | 73.0 |
| ITO | 2.00 | 260.0 | 130.0 |
| $Y_2O_3$ | 1.78 | 130.0 | 73.0 |
| liquid crystal | 1.60 | — | — |

Figure 29:
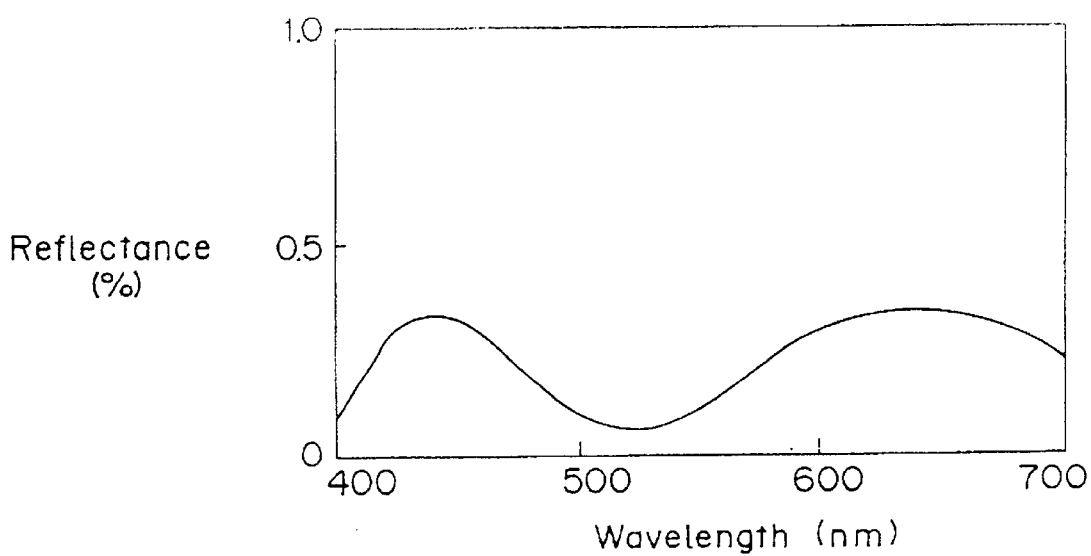
FIG. 29 is a characteristic diagram of a reflection type display panel according to the present invention.

The spectroscopic refraction index in FIG. 29 tends to be somewhat higher in B light and R light as compared with the case of FIG. 28.

Figure 30:
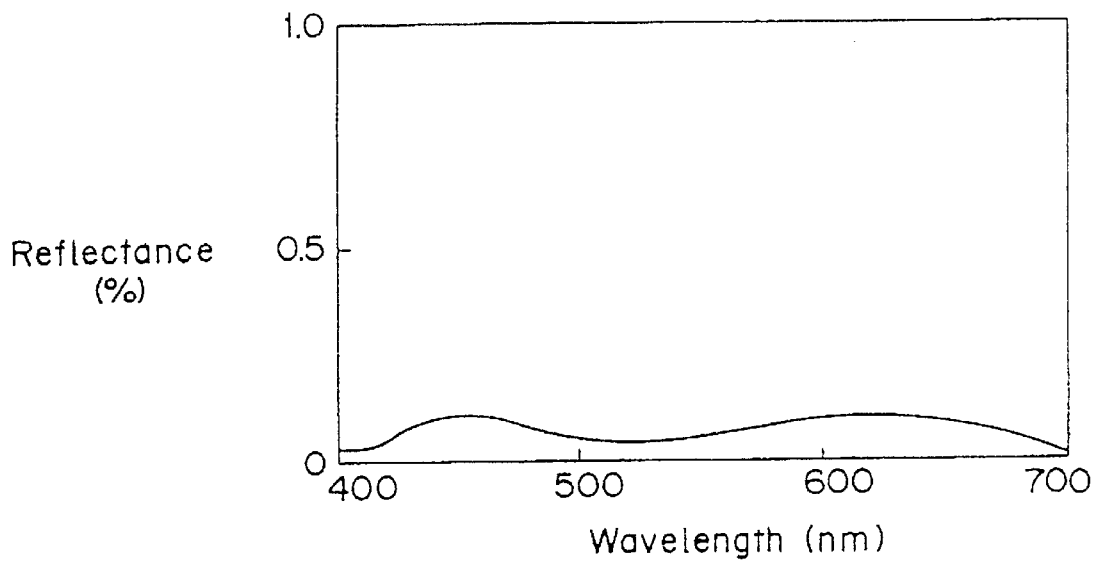
FIG. 30 is a characteristic diagram of a reflection type display panel according to the present invention.

Similarly, Table 3 shows an example of a case where the first thin film 271a is made of SiO and the second thin film 271c is made of $Y_2O_3$. In addition, the spectroscopic reflection index is shown in FIG. 30. By this arrangement, all over the visible light range, an extremely superior reflection preventing effect is realized, with suppression of the reflection rate below 0.1%.

TABLE 3

| | main wavelength: λ = 520 nm | | |
|---|---|---|---|
| material | refraction index | optical film thickness (nm) | physical film thickness (nm) |
| glass substrate | 1.52 | — | — |
| SiO | 1.70 | 130.0 | 76.5 |
| ITO | 2.00 | 260.0 | 130.0 |
| $Y_2O_3$ | 1.78 | 130.0 | 73.0 |
| liquid crystal | 1.60 | — | — |

Figure 31:
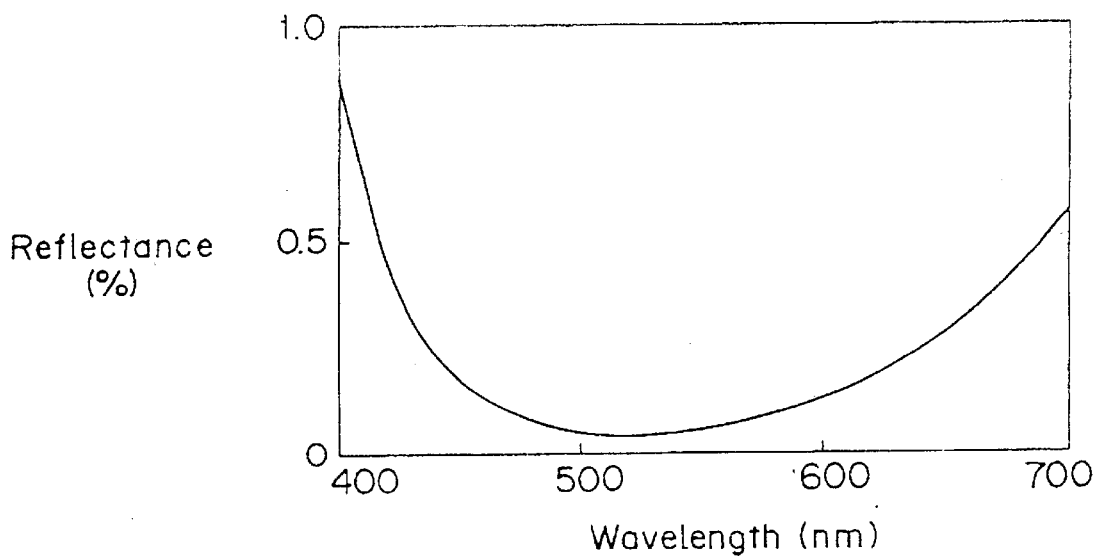
FIG. 31 is a characteristic diagram of a reflection type display panel according to the present invention.

In Table 4, another example is shown where the first thin film 271a is made of $Al_2O_3$ and the second thin film is made of SiO. In addition, the spectroscopic reflection index is shown in FIG. 31. By this arrangement, the band area of R light and B light have the reflection index exceeding 0.5%, which is not regarded appropriate.

TABLE 4

| | main wavelength: λ = 520 nm | | |
|---|---|---|---|
| material | refraction index | optical film thickness (nm) | physical film thickness (nm) |
| glass substrate | 1.52 | — | — |
| $Al_2O_3$ | 1.62 | 130.0 | 80.3 |
| ITO | 2.00 | 260.0 | 130.0 |
| SiO | 1.70 | 130.0 | 76.5 |
| liquid crystal | 1.60 | — | — |

As described above, by forming dielectric thin films 271a and 271c on both faces of ITO thin film 271b so as to form three-layered structure, the reflection light preventing effect can be achieved.

The spectroscopic reflection index shown in FIGS. 28 through 31 are varied as the refraction index of the liquid crystal layer 16 changes. Namely, because the reflection preventing effect is depending on the liquid crystal materials and so on, the optimizing design is important.

When the liquid crystal layer 16 and ITO thin film 271b are in direct contact with each other, the deterioration of the liquid crystal layer 16 tends to proceed. This is considered to be due to the phenomenon that foreign materials contained in the ITO thin film 271b are molten and flown into the liquid crystal layer 16. When the dielectric thin film 271c is formed between ITO thin film 271b and the liquid crystal layer 16 in a similar manner to the three-layered configuration mentioned above, the deterioration of the liquid crystal layer 16 can be avoided. In particular, when the dielectric thin film 271c is made of $Al_2O_3$ or $Y_2O_3$, the effect is superior.

When the dielectric thin film 271c is of SiO, the refraction index of SiO tends to be decreased. This is considered to be due to the phenomenon that the oxygen atoms of $H_2O$ and $O_2$ contained in minute amount in the liquid crystals 16 are bonded with SiO, so that SiO is changed to $SiO_2$. From this view-point, the configurations of Table 1 and Table 4 are not appropriate. Meanwhile, SiO will not be changed into $SiO_2$ in a short time period, and in many cases, it can be put into practical use.

In the confronting electrode 271, it is noted here that, while the optical thicknesses of the first dielectric thin film 271a and the second dielectric thin film 271c are respectively set to be $\lambda/4$ with the ITO thin film 271b set at $\lambda/2$, the optical thicknesses of the first and second dielectric thin films may be respectively set to be $\lambda/4$ with the ITO thin film 271b set at $\lambda/4$.

Furthermore, describing in accordance with the theory of the reflection preventing film, when N is assumed as an odd integer above 1 and M is assumed as an integer above 1, the optical thickness of the first and second dielectric thin films may be set at $(N\cdot\lambda)/4$, respectively and that of ITO thin film 271b may be set at $(N\cdot\lambda)/4$. Or the optical thickness of the first and second dielectric thin films may be set at $(N\cdot\lambda)/4$, respectively and that of ITO thin film 271b may be set at $(M\cdot\lambda)/2$.

Furthermore, one of the first and second thin films can be omitted. In this case, while the performance as a reflection preventing film will be lowered somewhat, in many cases, it is sufficient for the practical use. In this case, also, the theory of the reflection preventing film described above is applicable.

By forming the confronting electrode 271, reflection light can be prevented without application of light on the liquid crystal layer 16, and therefore, the display contrast can be improved to a great extent.

Figure 32:
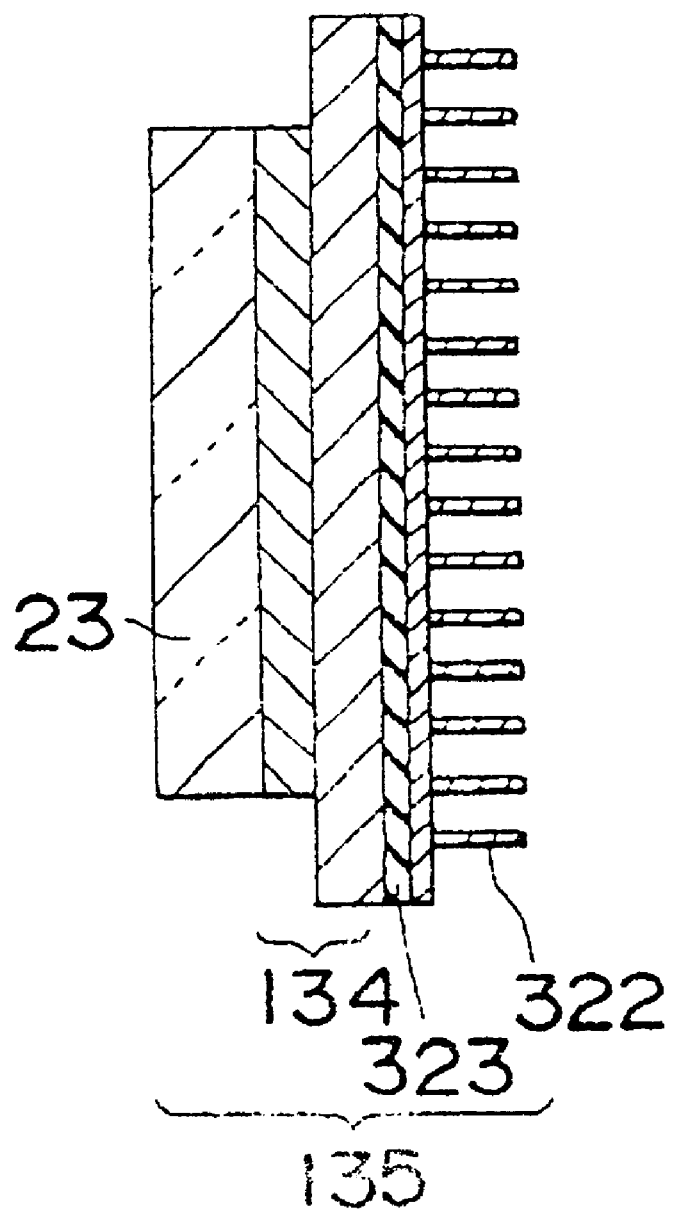
FIG. 32 is a sectional view of a reflection type display panel according to the present invention.

Furthermore, as shown in FIG. 32, if a heat radiating plate 322 is attached to the rear face of the display panel 134 with a bonding agent 323 made of such as a silicon material, heat radiation can be improved. This is a subject particular matter with regard to the reflection type display panel.

Also in the reflection type display panel, various configurations can be considered in the same manner as in the case of the transmission type display panels shown in FIG. 20.

Figure 33A:
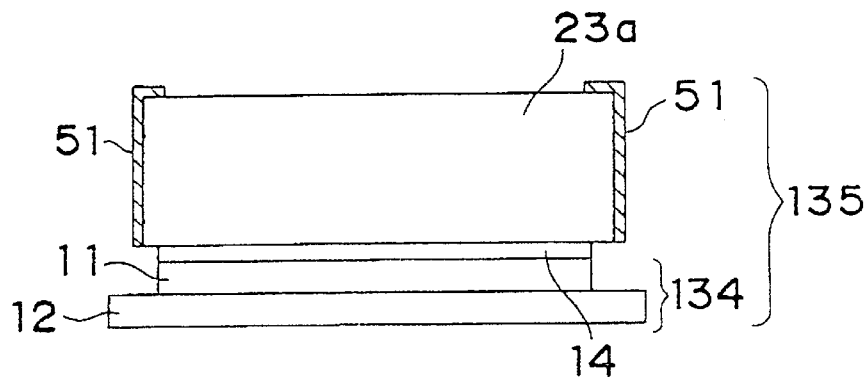
FIGS. 33A, 33B, 33C and 33D are views showing the configuration of a reflection type projection display panel according to the present invention.
Figure 33B:
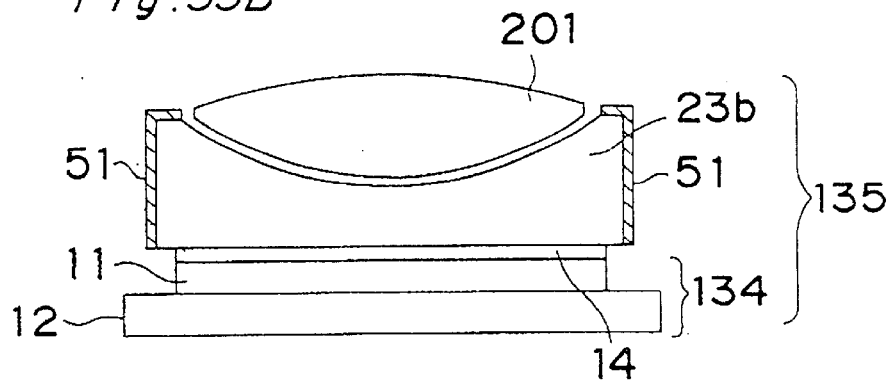
Figure 33C:
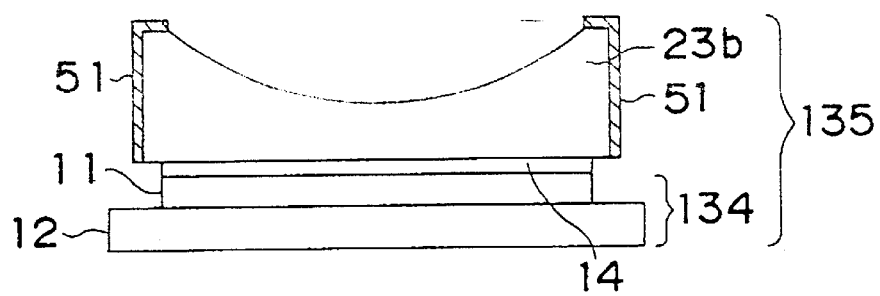
Figure 33D:
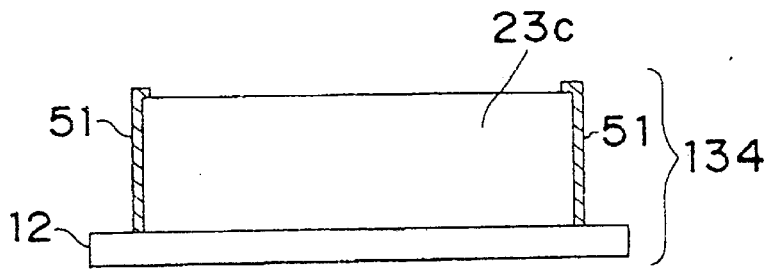

For example, there can be employed a configuration with a reflection light absorbing plate 23a applied to a display panel 134 as shown in FIG. 33A, a configuration with a concave-lens-shaped reflection light absorbing plate 23b installed on a display panel 134 as shown in FIG. 33C, further, a configuration with a positive lens 31 added to the configuration of FIG. 33c as shown in FIG. 33B or a configuration with the confronting substrate employed for the reflected light absorbing plate 23c as shown in FIG. 33D.

In the above embodiments, description has been made for the configuration where a reflection absorbing plate 23 is installed on the display panel or the configuration where a light absorbing film 20 is formed or arranged within the display panel. However, there are many cases in practical use where it is not necessary to completely absorb the reflection light. In such a case, the following configuration may be employed.

Figure 77A:
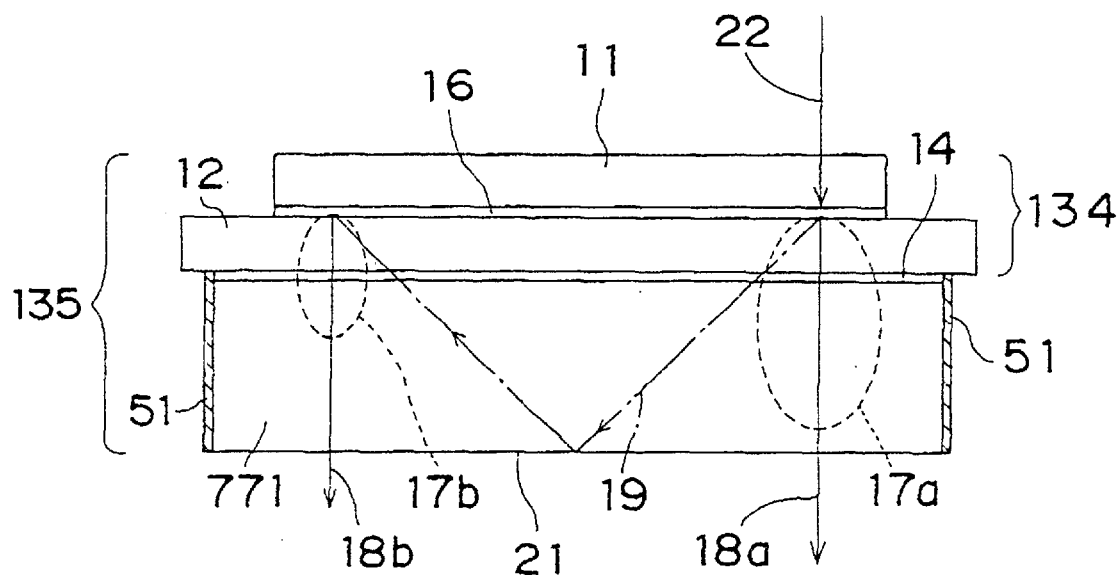
FIGS. 77A and 77B are sectional views of a display apparatus according to the present invention.

Firstly, as shown in FIG. 77A, a light absorbing film 20 is not formed within a transparent member 771 but light absorbing agent is added to be dispersed all over the transparent member (i.e., the transparent member 771 is dyed). For instance, colored acrylic resin or colored glass can be similar utilization. In the configuration of FIG. 77A, the mechanism for absorbing reflection light is described below.

The incident light 22 applied on the light modulation layer 16 of the display panel 134 is diffused and scattered to cause diffusion light 17a, or diffracted light. While a part of the diffused light or diffracted light is to be transmitted as transmitting light 18a thus to be emitted from the display panel, a part of the diffused light is reduced into reflection light 19. When the angle between the reflection light 19 and the normal of the outgoing interface 21 is larger than the critical angle, the light 19 is totally reflected. When the thickness of the transparent substrate 771 satisfies the equation (8)

$$t \geq d/4 \times \sqrt{n^2-1} \qquad (8)$$

the reflection light 19 will not again return to the liquid crystal layer 16. However, when the thickness of the substrate 771 is too thin, the reflection light 19 is incident on the liquid crystal layer 16, resulting in generation of the secondary diffusion light.

As described previously, in order to make the thickness of the transparent substrate 771 thick, the back focus of the projection lens 214 (shown in FIG. 21) has to be elongated in the optical design, which increases the restriction on the optical design, and further, results in an obstacle in the realization of reducing the size of the projection type display apparatus.

Therefore, it is intended in the system design to obtain a display contrast sufficient in the practical use, with the transparent substrate 771 being made thin in thickness. However, when the transparent substrate 771 is made too thin, a part of the light is incident on one end portion of the effective display area as shown in FIG. 77A and diffused, which the diffused light is incident on the other end portion of the effective display area as reflected light, resulting in decrease of the display contrast.

As is understood In FIG. 77A, the optical path length of the reflection light 19 taking from the outgoing from the liquid crystal layer to the entering again to the liquid crystal layer 16 is loner as compared with the light path taken by the transmission light 18a transmitted without being reflected on the outgoing interface 21.

In order to facilitate the understanding, when the critical angle is assumed to be about 45°, the optical path of the reflected light 19 is about three times the optical path of the transmitted light 18a. Therefore, the reflected light 19 is attenuated till it is incident again on the liquid crystal layer due to its long optical path, the rate of the secondary diffusion is decreased and the display contrast can be improved.

For example, assuming that the intensity of the incident light 22 is 1 when it is transmitted through the liquid crystal layer 16 emitted therefrom and that the transmitted light is attenuated to 0.9 (i.e., transmittance η=0.9) when the transmission light is emitted from the outgoing interface 21, since the optical path of the reflection light 19 is three time that of the transmitted light 18a, therefore the intensity of the reflection light 19 is three power of 0.9=0.7, when it is again applied to the liquid crystal layer 16. Similarly, with the transmittance η=0.8, the light intensity becomes 0.5. Furthermore, taking into consideration the optical path of the secondary diffusion light requiring to be reduced into transmission light 18b, the intensity is further reduced.

By dyeing the transparent substrate 771 per se so as to have the function of absorbing diffused or diffracted light, the occurrence rate of the secondarily diffused light can be lowered and thus the display contrast is improved.

By adding coloring agent such as dyed acrylic resin, dyed polycarbonate resin and the like to the transparent substrate 771, it is easily realized to provide the transparent substrate 771 with the light absorption function. The dyed color is desirably in the complementary relation with the color of the light to be modulated by the light modulating layer 16. For example, the light to be modulated in the light modulation layer is colored in blue, the substrate 771 may be dyed in yellow. Of course, the dyed color may be black but the selection range of coloring material becomes narrow. By properly selecting the color for coloring, the function of the color filter transmitting the light within a predetermined wavelength range can be provided in the substrate 771. This is effective and important for the counter measure for the PS dependency of a dichroic mirror and the like described referring to FIG. 81.

In this example, while the transparent substrate 771 is dyed, needless to say, the same effect is can be exhibited, even when the array substrate 12 or the confronting substrate 11 is directly dyed. In other words, the dyed component may be positioned between the light modulating layer 16 and the outgoing interface 21.

Figure 77B:
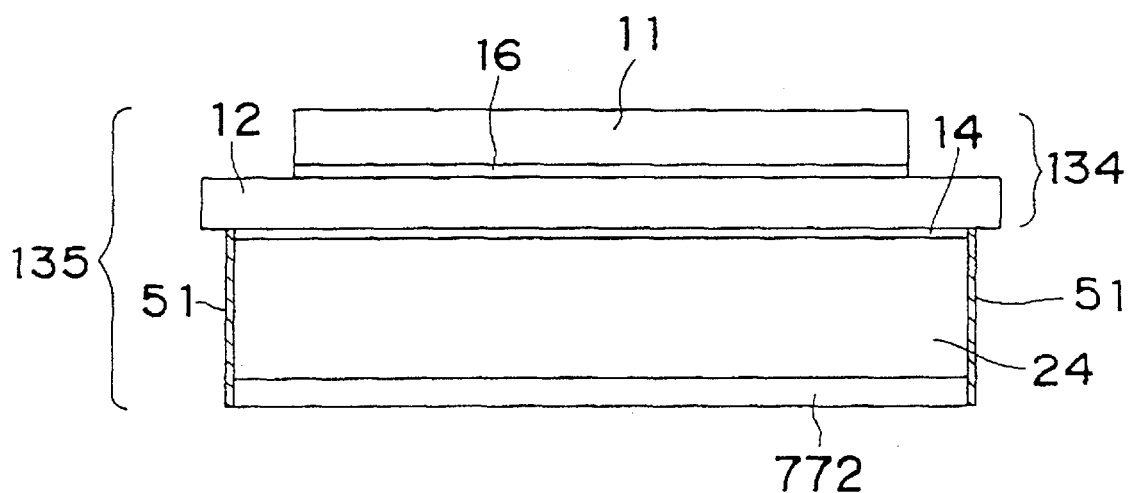

While the above example shown in FIG. 77A is adapted to dye the entire transparent substrate 771, as another example, there is available a method of optically bonding a light absorbing substrate 772 to the transparent substrate 24 as shown in FIG. 77B. As the light absorbing substrate 772, many color filters being placed on the marked may be used. In this case, also the optical path passing through the light absorbing substrate 772 differs only in the transmitted light 18a from the reflected light 19, a similar effect can be obtained as in the example of FIG. 77A.

In addition, it is noted here that, although a color filter means a filter for absorbing a part of the light to be modulated in the light modulating layer 16, this may be employed as a low-pass filter, a high-pass filter or a band-pass filter. For example, there may be available a filter adapted to have an effect of a narrow band filer filtering a light within a specified band as well as an-effect of absorbing a part of the light to be modulated in the light modulation layer for prevention of the secondary diffusion.

Figure 82:
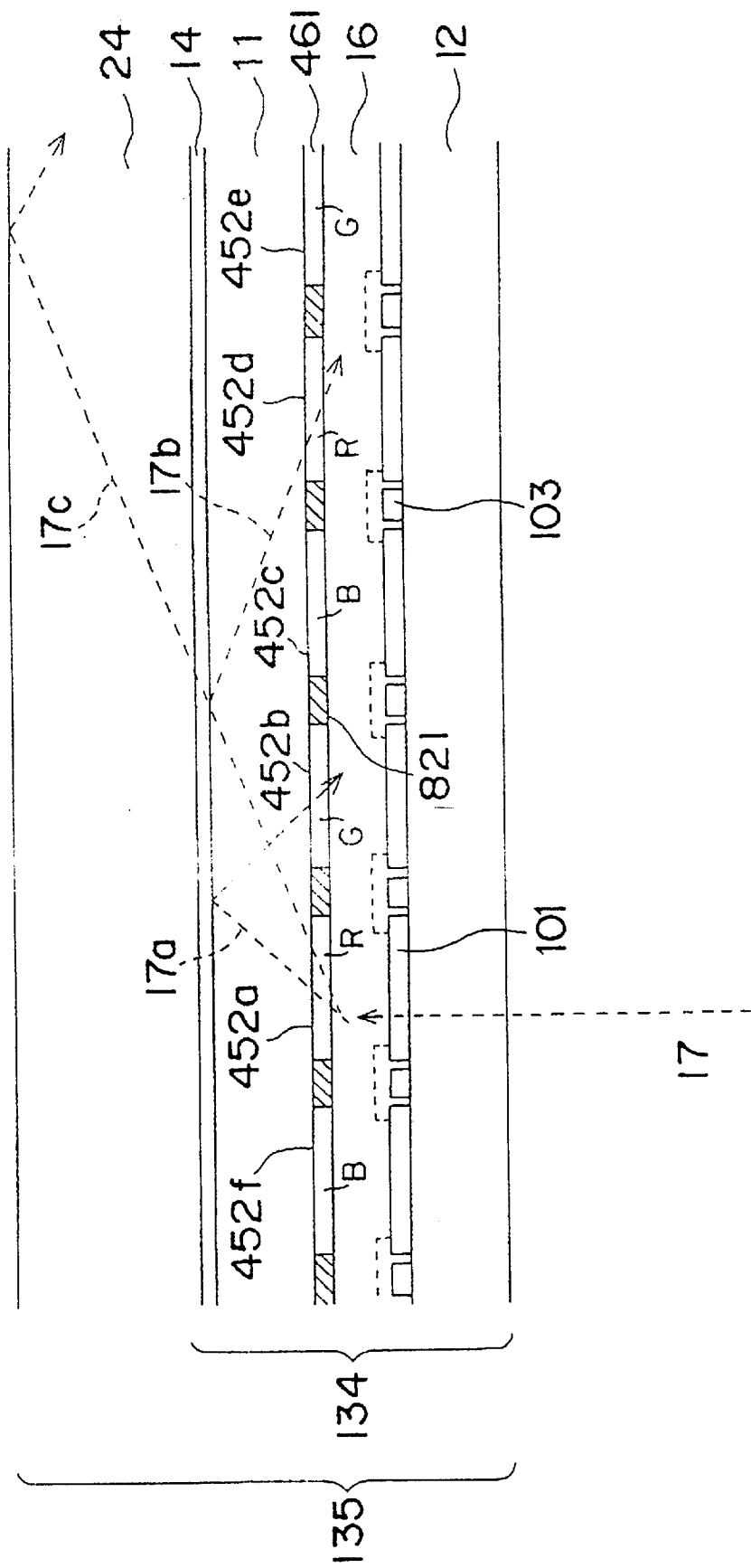
FIG. 82 is a sectional view of a display apparatus according to the present invention.

FIG. 82 shows another example employing a color filter 461 instead of using a colored or dyed substrate 771 or 772 shown in FIGS. 77A and 77B.

Figure 83:
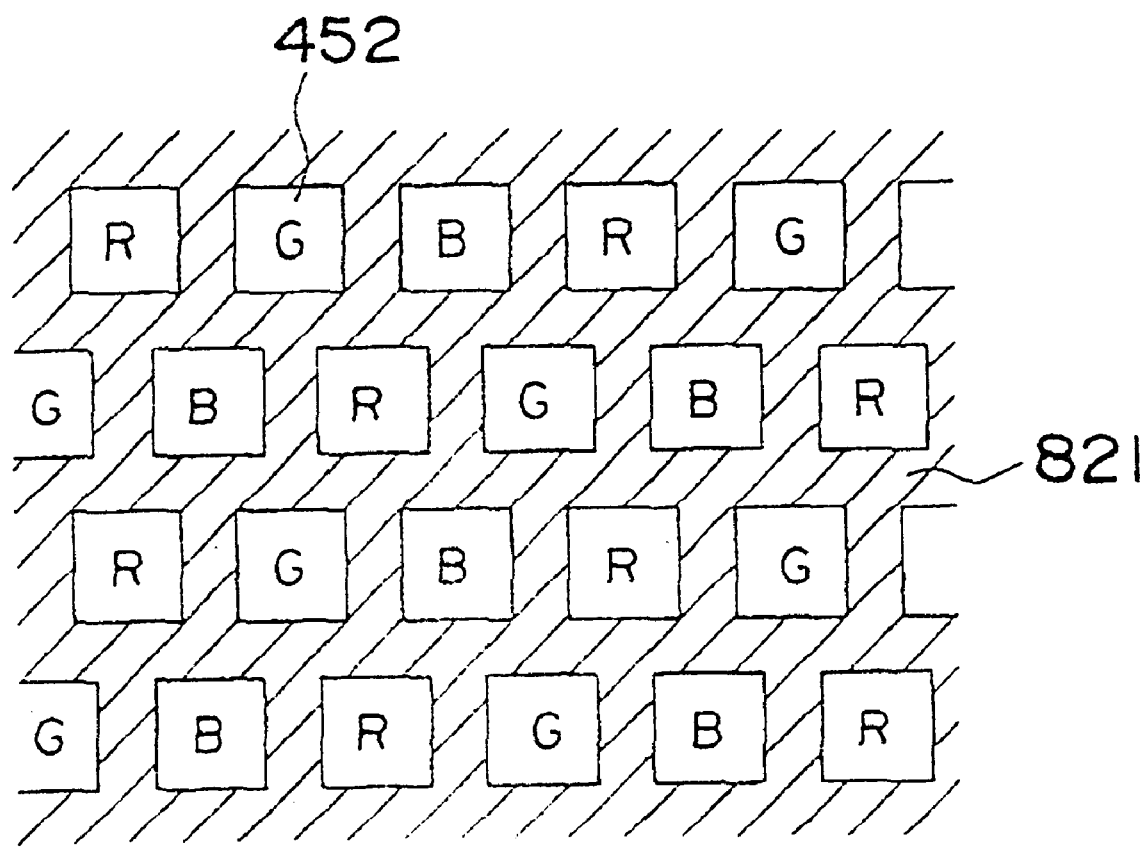
FIG. 83 is an explanatory view of a color filter.

FIG. 83 shows a schematic construction of the color filter 461 in which a plurality of R, G and B sections are arranged in a matrix shape corresponding to the pixel electrodes 101. In the spaces between the pixels, there is formed a black matrix 821 for preventing the light from transmitting therethrough. In the display apparatus of the present invention, the black matrix 821 is made of the resin material same as that of the light shielding film 132 shown in FIG. 13, and in particular, a black color resin material is preferable. A transparent substrate 24 is attached to the display panel 134 via an optical coupling member 14. As a transparent substrate 24, acrylic plate or glass plate may be utilized, and further a concave lens having a concave surface in the outgoing face or light absorbing plate 23 shown in FIG. 1 may be available.

Now assuming that the transparent substrate 24 is not provided and that a pixel 452a forming a color filter of R is applied by incident light 17, the incident light 17 is applied to the PD liquid crystal layer 16 via the array substrate 12 so as to be diffused in the layer 16 thereby to cause a diffusion light of R. The diffused light is reflected by the interface between the confronting substrate 11 and air and returned to the liquid crystal layer 16 again. The diffusion R light is applied to each color filter. The R light entered to G and B color filters is absorbed by the corresponding color filters per se regarding a diffusion light 17a. Therefore, the color filter 461 serves as the light absorbing substrate 772 shown in FIG. 77B.

However, a diffusion light 17b applied to a R color filter 452d is transmitted therethrough and entered the liquid crystal layer 16 again and is diffused to cause a secondary diffusion light. In order to prevent this occurrence of the secondary diffusion, the transparent substrate 24 is attached to the confronting substrate 11 or array substrate 12. By this arrangement, another diffusion light 17c is caused instead of the diffusion light b by preventing the reflection at the interface, the reflection light of the 17c is applied to the portion other than the effective display area.

Needless to say, by using the transparent substrate 24 as the colored substrate 771 shown in FIG 77A, a further effect can be obtained. Assuming that the transparent substrate has a configuration of thickness to effective display area d, and refraction index n thereof, it is preferable to satisfy the formula (6).

As described above, the diffusion light emitted from the R pixel 452a is absorbed by the G and B pixels 452b and 452c and is also absorbed by the black matrix (BM) 821 so as to prevent the occurrence of the secondary diffusion light, thus improving the display contrast. Similarly, the diffusion light emitted from the G pixel 452b is absorbed by the R and B pixels 452a, 452c and black matrix (BM) 821 and also similarly, the diffusion light emitted from the B pixel 452c is absorbed by the R and G pixels 452a, 452b and black matrix (BM) 821. In other words, the color filter 461 serves as a light absorbing plate.

The black matrix BM 821 is preferably made of acrylic group resin containing coloring matters and pigment added thereto. This is because, in the-display panel of the present embodiment, the light modulating layer 16 is formed with PD diffusion liquid crystals and the resin material of the liquid crystal layer is formed by using an acrylic group ultraviolet-ray hardening resin. Thus, both the BM 821 and the liquid crystal layer 16 are made of acrylic group resin, and therefore the contacting property is sufficient, preventing occurrence of peeling therebetween, improving reliability.

In addition, it is noted here that the BM 821 may be formed on the source signal lines 103 as shown by dotted line in FIG. 82. This is because, the dielectric constant of a acrylic group resin is generally lower than that of the liquid crystal components of the PD liquid crystal layer 16. By providing the BM 821 covering over the source signal lines, an electric field shielding effect can be obtained. By reducing the electric field intensity around the liquid crystal layer 16, there can be effectively suppressed such a phenomenon that the light transmits through the peripheral portions of the pixel electrodes 101 in particular, in the vicinity of the source signal lines 103, which the description is also mentioned with reference to FIG. 10.

While, in the examples of FIGS. 77A and 77B, the description is made as employing a transmission typed substrate, the same effect can be obtained when the transparent substrate is replaced by a plano-concave lens. Needless to say, in the case of FIG. 77B, it is required to dispose the light absorbing substrate 772 in optically coupled state between the plano-concave lens and the array substrate.

Figure 24:
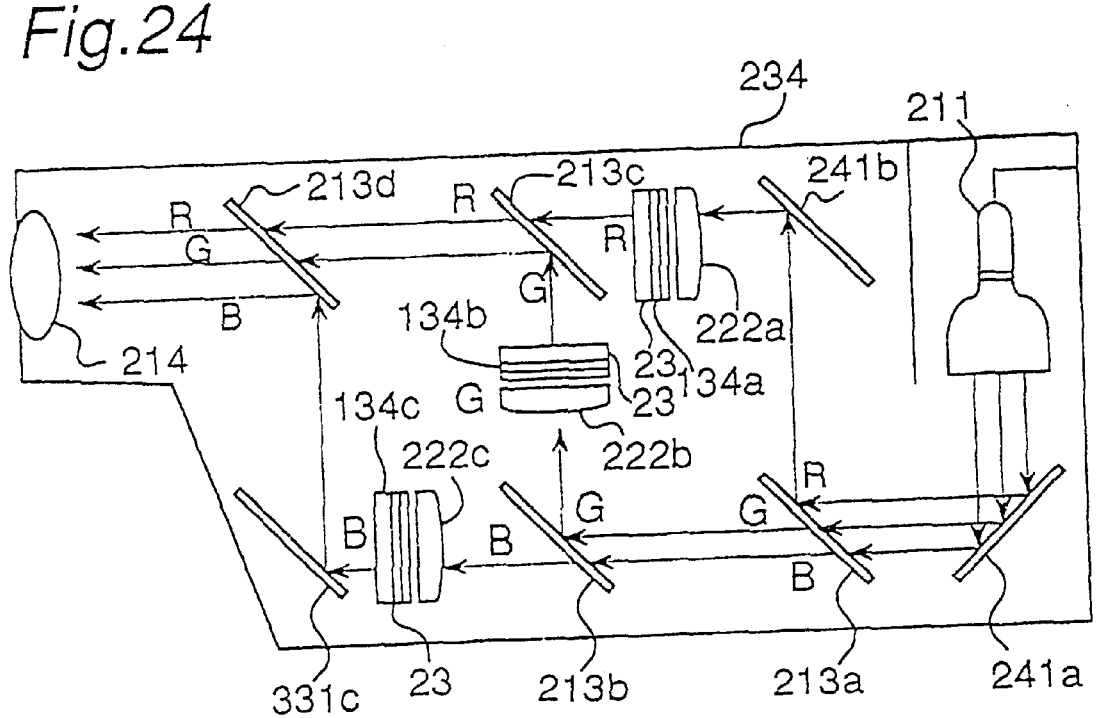
FIG. 24 is a view showing the configuration of a projection type display apparatus employing a transmission type display apparatus as a light valve.
Figure 51:
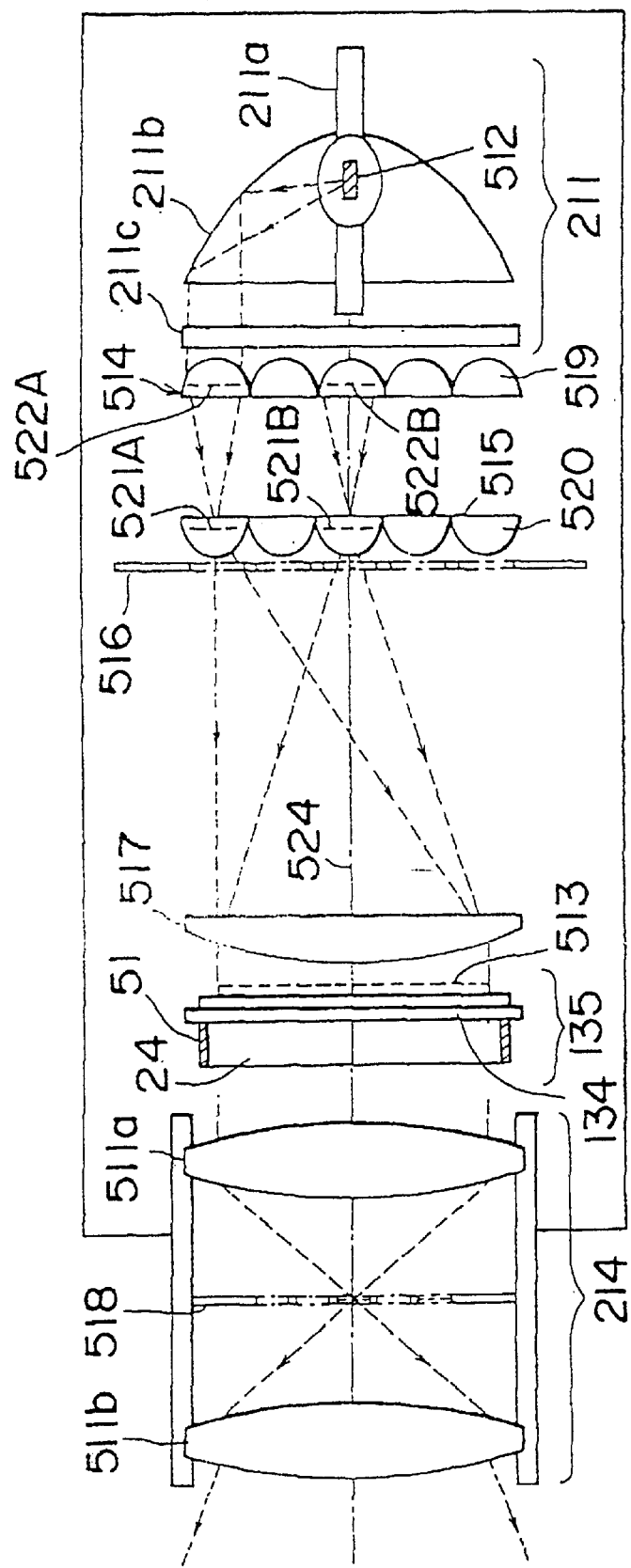
FIG. 51 is a view showing the configuration of a projection type display apparatus in another embodiment of the present invention.
Figure 80:
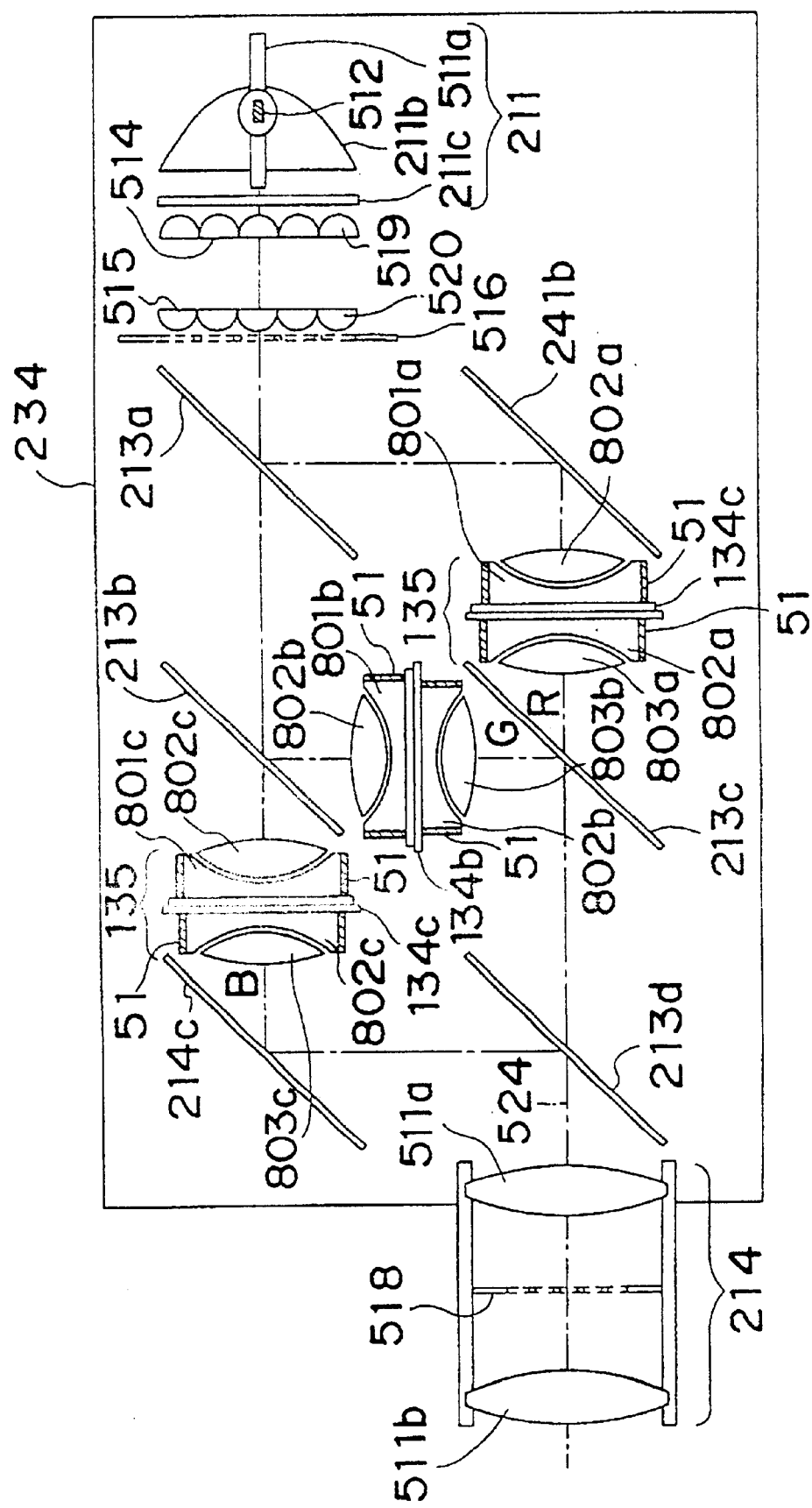
FIG. 80 is a view showing the configuration of a projection type display apparatus according to the present invention.

When the display panel of the present invention shown in FIG. 82 is used as a light valve for a projection type apparatus as shown in FIGS. 24, 51 and 80, the projection type display apparatus can be constructed.

FIG. 1 and others are configured to forma light absorbing wall 20 but the light absorbing wall 20 is not limited to that completely absorbing light. For example, said wall may be a wall attenuating light. For example, a configuration wherein a plurality of transparent columns are employed as in FIG. 2A and light absorbing members 781 are filled between said transparent columns may be employed. An example of said configuration is shown in FIG. 78. Plural transparent columns represented by numeral 15 constitute 'transparent substrate'. As the material for the transparent column 15, glass, resin such as acrylic resin are available and as the light absorbing member represented by numeral 781, dyed bonding agent and the like are mentioned. In addition, liquid such as colored ethyleneglycol maybe also employed, but it does not completely absorb light but absorbs or attenuates part of light.

Incident light 22 diffused or diffracted by the light modulating layer 16 and part of the light diffused or diffracted is reduced to reflected light 19. The reflected light 19 emitted from the light modulating layer 16 passes through five walls, 781$i$, 781$h$, 781$g$, 781$f$ and 781$e$ of the light absorbing member until it returns again to the light modulating-layer 16. If respective transmittance are 0.9, the reflected light 19 is attenuated to the intensity of five powers of 0.9=0.6. It the light transmittance is 0.8, the light intensity is reduced to five powers of 0.8=0.32. Therefore, the rate of the secondarily diffused light can be reduced. With such configuration, even when the height of transparent coelum (thickness of transparent substrate) is low, the occurrence rate of the diffused light can be sufficiently reduced.

Figure 78A:
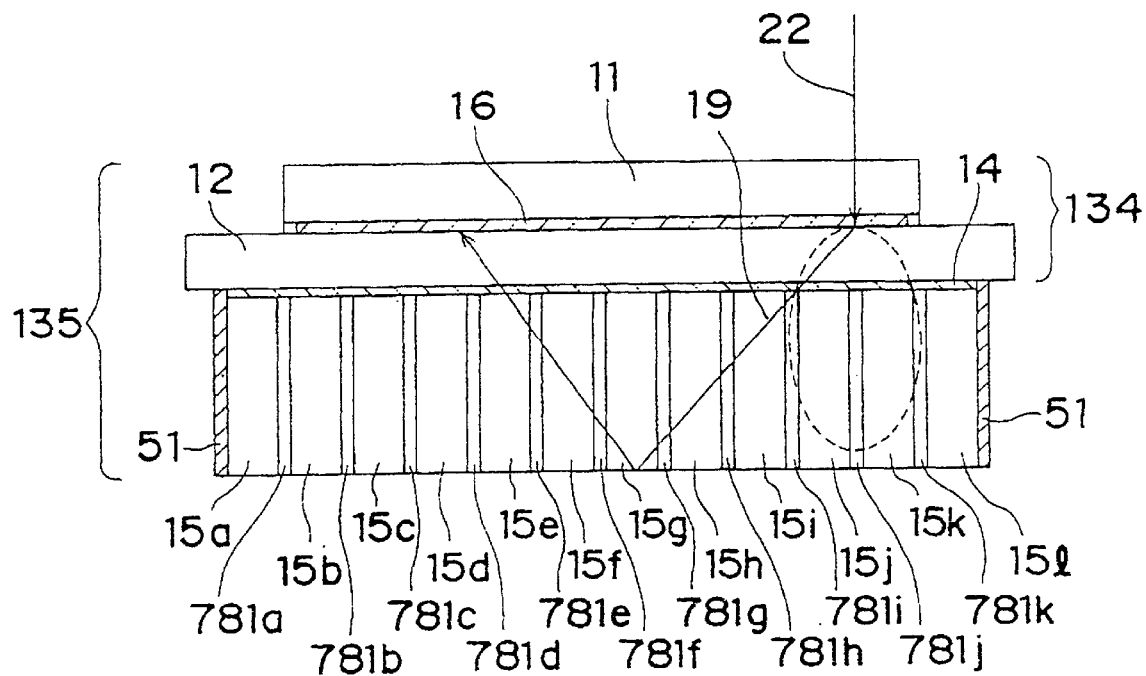
FIGS. 78A and 78B are sectional views of a display apparatus according to the present invention.
Figure 78B:
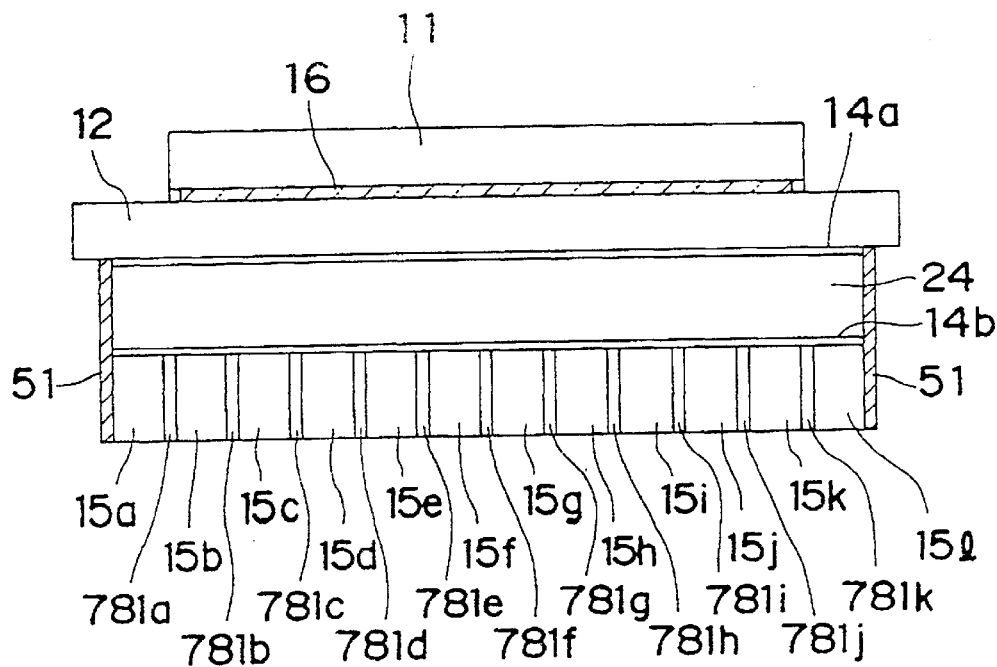

FIG. 78B is configured so that transparent columns 15 are optically coupled to the transparent substrate 24. Others are configured the same as in FIG. 78A. Because the light absorbing member 781 has the function of absorbing light, when disposed at a position close to the light modulating layer 16 (image forming face), the pattern of the light absorbing members may be projected on the image screen. If configured as shown in FIG. 78B, the light absorbing member 781 can be separated from the image forming face and said defect does not take place.

In addition, it is described referring to FIGS. 78A and 78B to employ rectangular transparent columns but they are not limited to this shape of columns but hexagonal or circular columns may be employed. As an example, a configuration wherein glass fibers are bundled and light absorbing materials 781 are charged among these glass fibers can be mentioned. For example, a fiber plate(MC-1000) marketed by Asahikasei Industry Co. may be employed.

In the configuration of FIG. 77B, a colored substrate 772 is described to be applied to the transparent substrate 24, but it is not limited to this colored substrate. For example, said colored substrate may be a colored sheet or a structure with paint being applied on the transparent substrate 24.

Meanwhile, a display panel employed for the light modulating element of a projection type display apparatus, a viewfinder and the like is called a light valve 135. As said light valve, a display valve itself may be called a light valve (for example, the configuration of FIGS. 18A and 18B), or a structure wherein a reflected light absorbing plate 23 is provided on the display panel 134 as shown in FIG. 13, 1 or FIGS. 20A–20K may be called a light valve. Furthermore, the configuration of FIGS. 77A and 77B or 78A and 78B may be employed as a light valve.

A projection type display apparatus according to the present invention is described below with reference to the attached drawings. Firstly, the specification common to the projection type display apparatuses according to the present invention is described. The following value or value range is an important item for the projection type display apparatus employing a display panel particularly provided with a light modulating layer of polymer dispersed liquid crystals as a light valve.

In the projection type display apparatus according to the present invention, when the effective display size of the panel display area of panel)is reduced from the view-point of improving the light utilization rate, it is necessary to enlarge the F number of illumination light. When the effective display size d of the display panel is enlarged, F number of the illumination light can be reduced, and as a result, a bright large screen display can be realized. However, if the panel effective display size is too large, the system size of the projection type display apparatus becomes undesirably large, and if the panel effective display size is made smaller, the light bundle incident on the panel effective display area per unit area is increased, undesirably resulting in heating of the panel.

In addition, when the luminance of the light emitting body is set constant at $1.2 \times 10^8$ (nt) taking the life thereof into consideration since the life of the lamp is remarkably reduced with increase of the luminance too high. Furthermore, the arc length is considered to be generally proportional to the power consumption. The efficiency of the metal halide lamp is 80 lm/W. The total light flux of a 50 W lamp is 4000 lm, the total light flux of a 100 W lamp is 8000 lm and the total light flux of a 150 W lamp is 12,000 lm. The arc length of the lamp and the power consumption are correlated with each other , and the arc length and the F number is correlated with each other.

In the projection type display apparatus, in order to obtain a projected image screen size of more than 40 inches and a view angle and image luminance of a practical use level, a light flux of more than 300 to 400 lm is required. Accordingly, it the light utilization rate of the lamp is about 4 percent, a lamp of more than 100 W is required.

In addition, when the panel effective display size is small, a sufficient display luminance can not be obtained. Assuming that the arc length is 5 mm and the effective F value of the illumination light is 7, an effective display size of about 3.5 inches is required. If the arc length is about 5 mm and the panel effective display size is slightly above two inches, the effective F value of the illumination light becomes slightly below 5. In this case, the luminance enters the practical use range but a good display contrast (CR) can not be expected.

As a result of various tests and examinations, it is found that if the F value of illumination light is above 5, a display luminance in the practical use range can be obtained.

However, in order to obtain a n excellent display luminance and display contrast and a proper power consumption and lamp life, it is found that the effective F value of illumination light (=effective F value of projected light) must be about 7, the arc length of the lamp must be in a range of about 4 mm to 5 mm and the wattage of the lamp must be about 150 W.

When the F number of the projection lens is decreased, the screen light flux reaching the screen becomes higher, resulting in the requirement of increasing the power consumption. Furthermore, if the power consumption of the lamp is increased from the view-point of lengthening the lamp life, the arc length becomes longer, considering the arc luminance to be constant. Naturally, the display contrast (CR) is deteriorated when F number becomes smaller. On the contrary, when the F number of the projection lens is increased, the display contrast is improved but the screen light flux becomes smaller.

As a result of various tests and examinations, in order to obtain a good display contrast, the arc length of the lamp must be more than 2.5 mm and less than 6 mm. In particular, the arc length is preferably in a range of more than 3 mm and less than 5 mm. In addition, the lamp must be of less than 250 W from the view-point of power consumption. And in order to obtain a screen luminance, a metal halide lamp of more than 100 W must be employed.

The diagonal length of the panel effective display area must be less than 4.5 inches from the view-point of the system size and further, more than 2 inches from the view-point of utilization efficiency Above all, in order to obtain a sufficient light condensing efficiency and miniaturize the system, preferably the diagonal length must be above 3 inches and below 4 inches.

The F number of the projection lens, the F number of the projection optical system in a wide sense must be more than 5 in order to obtain a good contrast (CR) and further, must be below 9 in order to obtain a sufficient screen luminance. In addition, considering the above-described arc length of the lamp, F number must be above 6 and below 8.

Furthermore, unless the light diverging angle (F number) of illumination light is made generally coincident with the light condensing angle (F number) of the projection lens, the light utilization rate is lowered. This is because the light utilization rate is regulated by the larger F number. In the projection type display apparatus according to the present invention, the F number of the illumination light thereof is generally coincident with the F number of the projection lens.

In the above description, for instance, the expression that the arc length of the lamp is 5 mm means that it is "substantially 5 mm". Even when the arc length is 8 mm, if the projection lens can not condense any light other than the light radiated from the vicinity of 5 mm at the central portion of the arc length among the entire light radiated from said arc, the arc length becomes substantially 5 mm. Similarly, F number means the effective F number. Even when the physical F number is 4, if light passes through only the vicinity of the centra portion of the lens aperture, F number is naturally more than 4.

Figure 21:
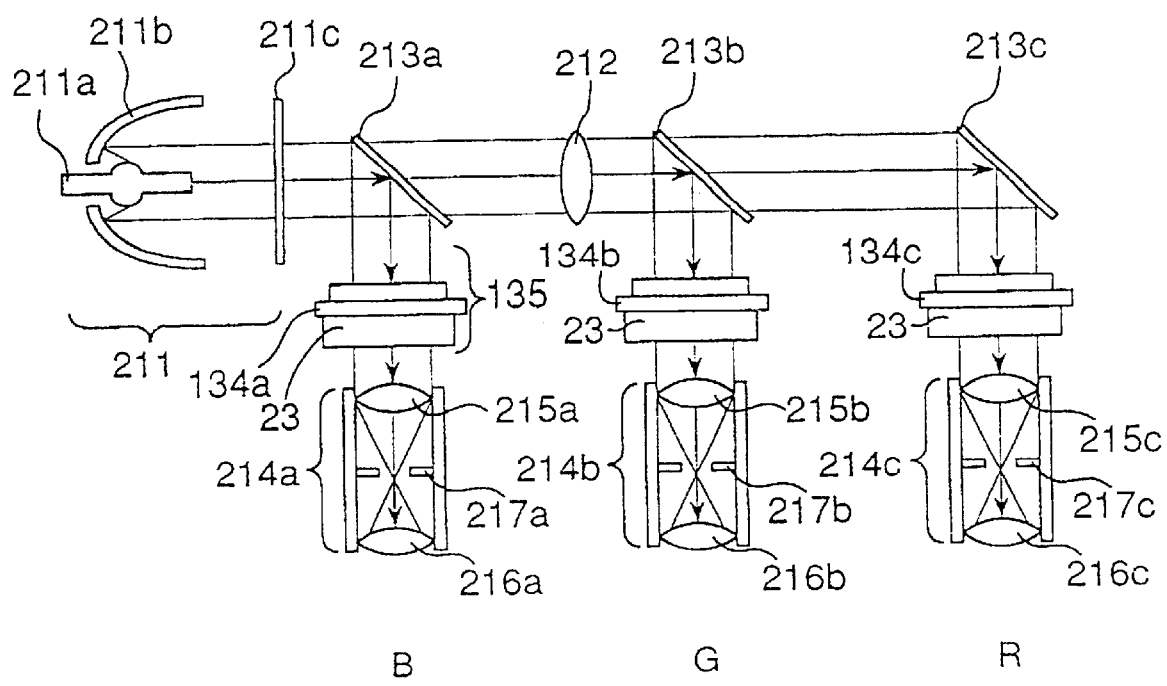
FIG. 21 is a view showing the configuration of a projection type display apparatus according to the present invention.

FIG. 21 is a view showing the configuration of a projection type display apparatus according to a first embodiment of the present invention, with components unnecessary for the explanation being omitted. A light source 211 has a concave mirror 211b and a metal halide lamp 211a or xenon lamp as a light generating means arranged therein. On the light emission side,there is arranged an UVIR cut filter for cutting ultra-violet rays (UV) and infra-red rays (IR). For the concave mirror 311b, an elliptic face mirror or a parabolic face mirror is employed. Reference numeral 213a denotes a dichroic mirror (BDM) for reflecting Blight, reference numeral 213b a dichroic mirror (GDM) for reflecting G light and reference numeral 213c denotes a dichroic mirror (RDM) for reflecting R light. It is to be noted here that the arrangement of BDM 213a to RDM 231c is not limited to this order. Needless to say, RDM 213c positioned at the foremost position may be replaced by a total reflection mirror.

The film thickness of the liquid crystal layer 16 of the display panel 134c for modulating R light is made thicker as compared with the film thickness of the liquid crystal layer of the display panels 234a and 234b for respectively modulating G and B light. In addition, the average particle diameter of liquid crystal droplets or the average hole diameter of polymer network is changed in accordance with the wavelength of the light to be modulated. Said average particle diameter or average hole diameter is enlarged as the wavelength of the light to be modulated becomes longer. This is because the diffusion characteristic tends to be lowered, resulting in the drop of contrast, as the wavelength of the light to be modulated becomes longer. Reference numerals 215 and 216 denote lenses, respectively, reference numeral 214 denotes a projection lens, and reference numeral 217 denotes an aperture as a stop. The aperture 217 is illustrated for the explanation of the operation of the projection type display apparatus. Because the an aperture 217 regulates the condensing angle of the projection optical system, it may be considered to be included in the function of the projection optical system. In other words, if the F value of the projection optical system is large, the hole diameter of the aperture 217 can be considered to be small. In order to obtain a high contrast display, a larger F value of the projection optical system is better. However, if it is too large, the luminance of white display is lowered. Concretely, the aperture is not used and the function of aperture is included in the function of the projection lens 214. Here in FIG. 21, reference numeral 212 denotes a relay lens.

Figure 22:
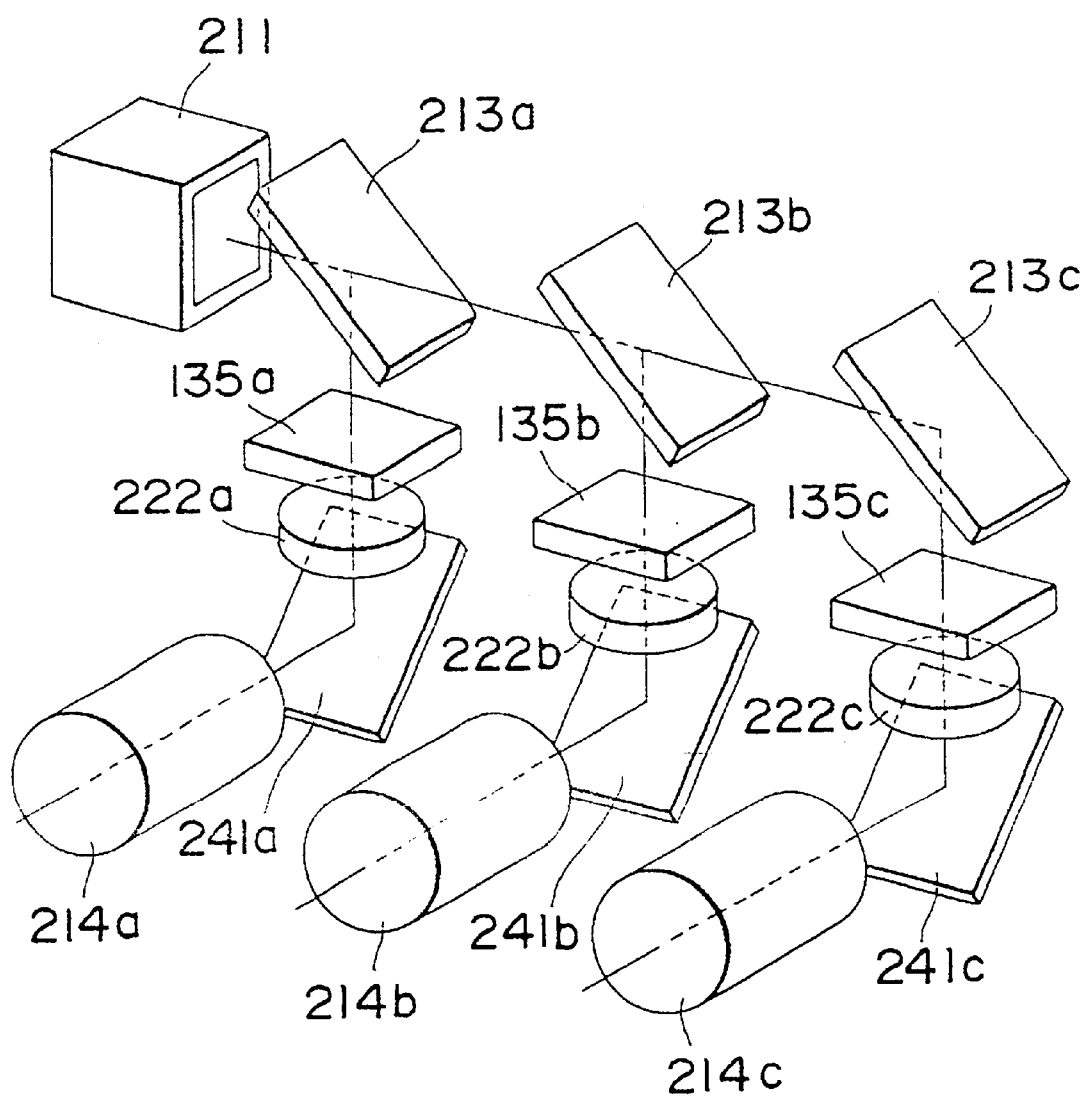
FIG. 22 is a perspective view of a projection type display apparatus according to the present invention.
Figure 23:
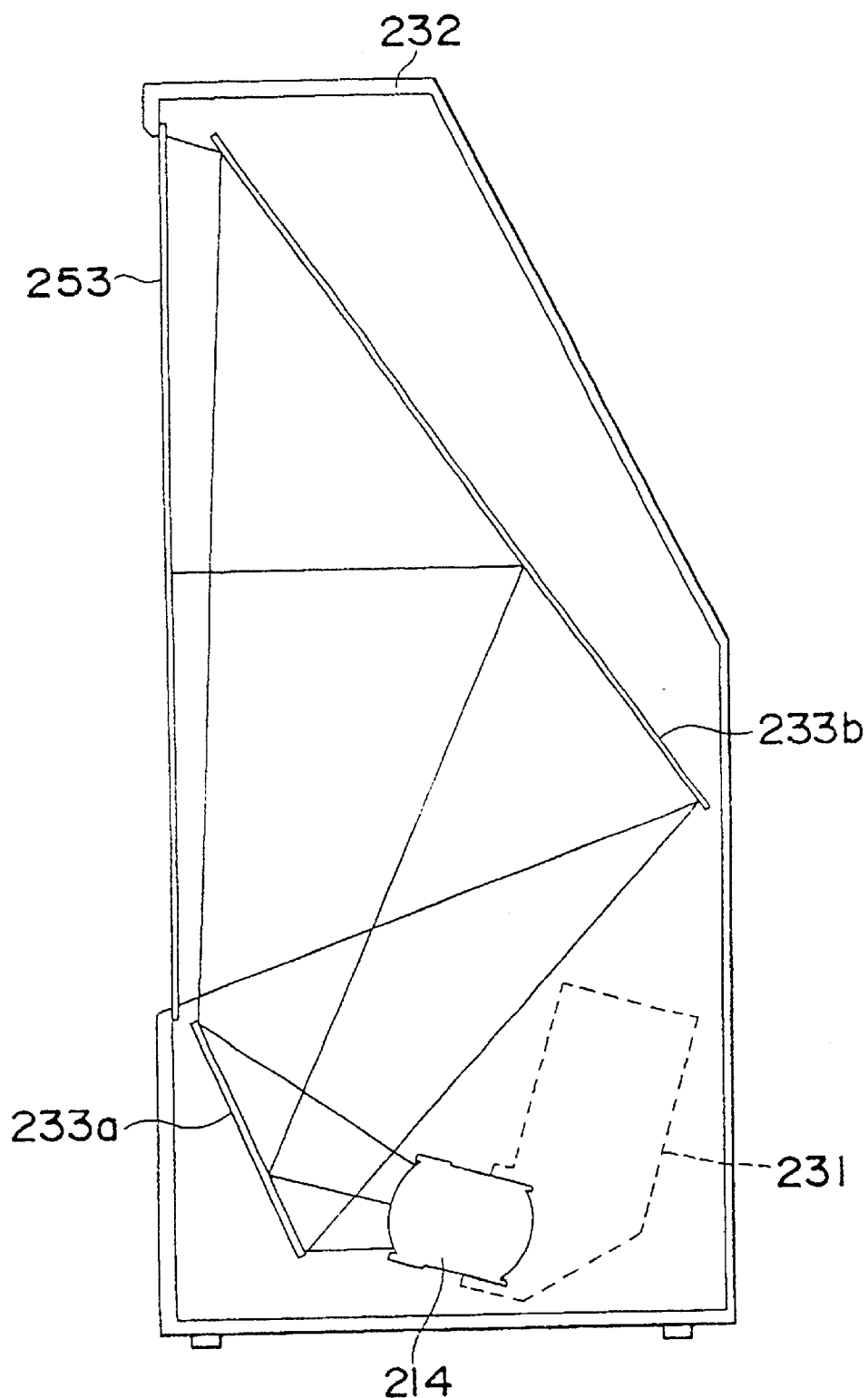
FIG. 23 is a view showing the configuration of a rear type projection display apparatus according to the present invention.

FIG. 22 is a perspective view for representing FIG. 21 concretely. Further, the configuration of a cabinet 232 of the projection type display apparatus employing a projection optical block 231 shown in FIG. 22 is shown in FIG. 23. A transmission type screen 253 is arranged on the upper front portion of the cabinet 232, a plane mirror 241a is arranged on the lower front portion of the cabinet 232 and a plane mirror 241b is arranged on the rear side of a screen 253. By shortening the projection distance (the light path length from the projection lens to the center of the screen) and miniaturing the projection optical block 231, the cabinet 232 can be miniatured.

The operation of the projection type display apparatus is described below. With respect to respective light modulating systems of R,G and B light, because they are nearly the same in operation, description is made of the light modulating system for B light.

Figure 70A:
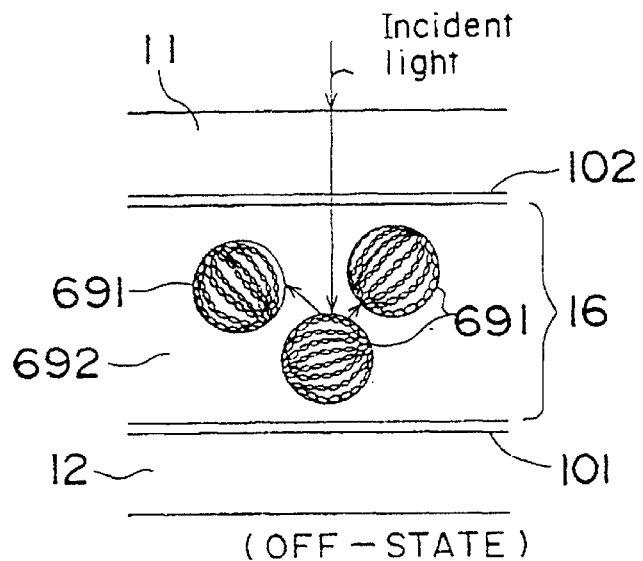
FIGS. 70A and 70B are explanatory views of the operation of a polymer dispersed liquid crystals.
Figure 70B:
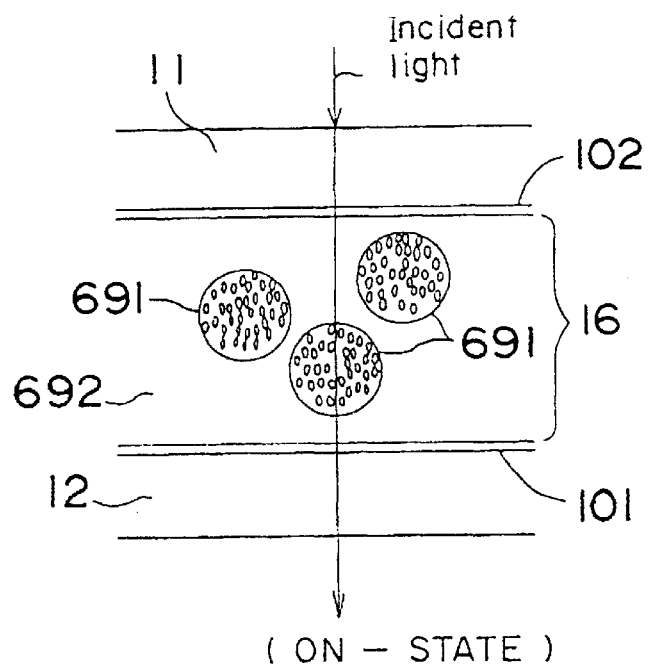

From the light source 211, white light is irradiated and the B light component of this white light is reflected by BDM 213a. This B light is incident on the display panel 134a. The display panel 134a controls, as shown in FIGS. 70A and 70B, the diffusion and transmission state of the incident light by the signal applied to the pixel electrode 101 and modulates the light.

The diffused light is shielded by the aperture 217a and on the contrary, parallel light or light within a pre-determined angle passes the aperture 217a. Modulated light is magnified and projected on the screen by the projection lens 214a. In this manner, B light component of an image is displayed on the screen. Similarly, the display panel 134b modulates G light component of light, and the display panel 134c modulates R light component of light, thus displaying a colored image on the screen.

FIG. 21 shows a system of magnifying and projection on the screen with 3 projection lenses 214 but there is also a system of magnifying and projecting on the screen with one projection lens 214. FIG. 24 is a block diagram showing the configuration of said system. For the display panel 134, said display panel of the present invention is employed.

Here, in order to facilitate the explanation, the display panel 134b is assumed as a display panel for displaying an image of G light, the display panel 134a as a display panel for displaying an image of R light, and the display panel 134c as a display panel for displaying an image of B light. Therefore, with respect to the wavelength of light transmitted or reflected by each dichroic mirror 213, the dichroic mirror 213a reflects R light and transmits G and B light, the dichroic mirror 213b reflects G light and transmits B light, and the dichroic mirror 213c reflects G light and transmits R light. In addition the dichroic mirror 213d transmits R and G light and reflects B light.

The light emitted from a metal halide lamp 211a is reflected by the total reflection mirror 241a to be changed in the light direction. Said light is divided into three light paths of R, G and B primary color light by the dichroic mirrors 213a, 213b, and R light is incident on a field lens 222a, G light on a field lens 222b and B light on a field lens 222c. Each field lens condenses each light, and each display panel changes the orientation of liquid crystals corresponding to its image signal, and modulates light. R light, G light and B light thus modulated are synthesized by the dichroic mirrors 213c, 213d and magnified and projected on the screen (not shown) by the projection lens 214.

In configuring a projection type display apparatus according to the present invention, it is necessary to consider MTF as described in FIG. 4 so that the image of the light absorbing wall 20(film) is not projected on the screen. To this end, it is necessary to separate the light absorbing wall 20 and the light modulating layer 16 from each other by a predetermined distance h. When the display panel is for display of NTSC signals, it is comparatively easy to hold MTF below a predetermined value, but when the display panel 134 is for display of high-vision signals, it is difficult to hold MTF below a predetermined value. But this difficulty can be coped with by the design of the projection lens 214.

The distance h required for making MTF below a predetermined value is determined. MTF of 20% is the first target, and MTF is preferably below-10%, and further preferably below 5%. To this end, it is required that the area id divided fine by the light absorbing walls 20 formed on the reflected light absorbing plate 23 and the distance h is lengthened. Needless to say, care must be taken so that the interference between the area division by the light absorbing walls 20 the pixel pitch of the display panel 134 may not result in moire.

Furthermore, needless to say, a simple matrix type display panel can be employed as a light valve in the projection type display apparatus according to the present invention. For example, a configuration wherein a reflected light absorbing plate 23 is applied to a simple matrix type display panel can be mentioned as an example. Furthermore, by arranging the structure shown in FIG. 24 in the cabinet 232 as a light projection unit 231, a rear type projection display apparatus shown in FIG. 24 can be constituted.

Figure 75:
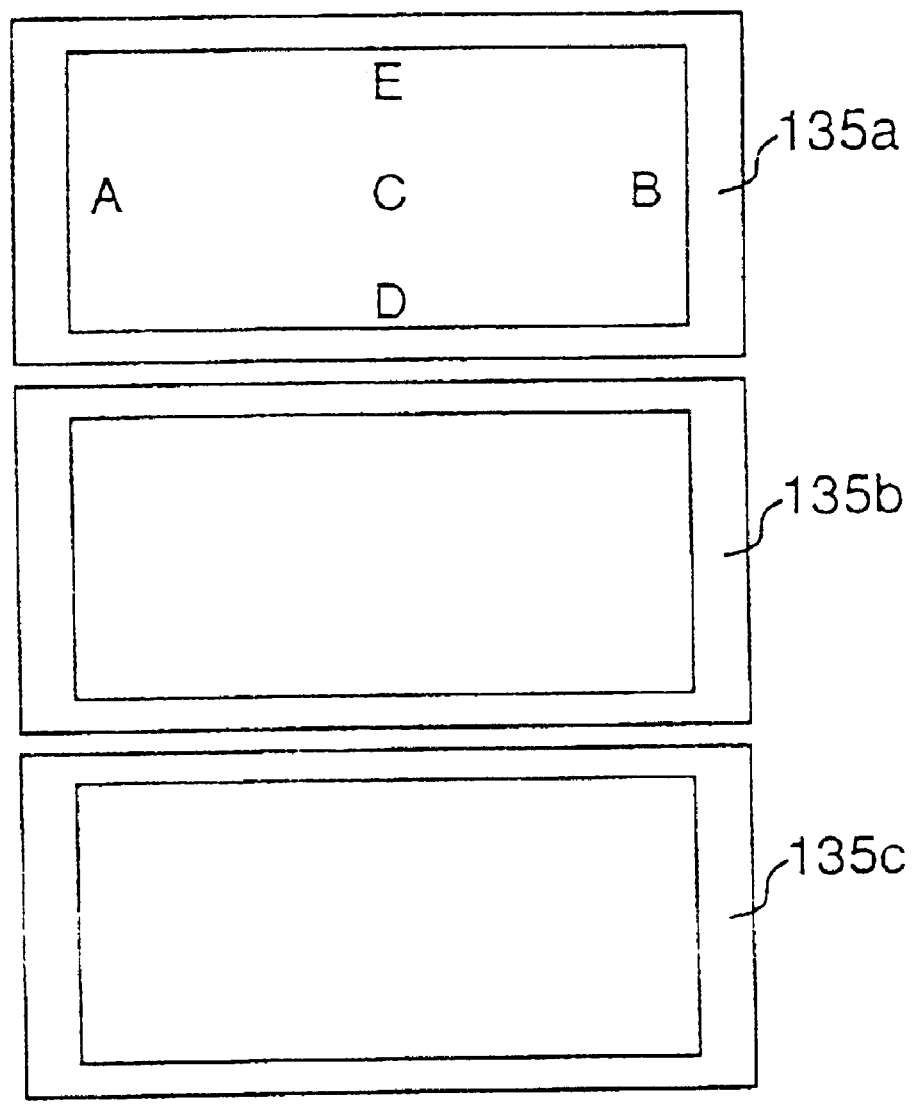
FIG. 75 is an explanatory view of a projection type display apparatus according to the present invention.

FIG. 22 shows a configuration in which light valves 135 (display panel 135) are arranged laterally in line, but display panels 135 may be arranged vertically in line as shown in FIG. 75. Because the effective display screen of the display panel is laterally long as 4:3 or 16:9, the vertical arrangement in line as is shown in FIG. 75 can reduce the space required for arrangement of display panels. Therefore, in the rear type projection display apparatus shown in FIG. 23, the set size (cabinet size) can be reduced.

In addition, in FIG. 23, reference numerals 233a and 233b denote planar mirrors and an optical system block 231 corresponds to the configuration of FIG. 22. The incident light is modulated by the light valve 135 in the optical system block 231 and then fed out through the projection lens 214 and thereafter reflected by the mirrors 233a and 233b to be projected onto the screen 253.

Figure 76:
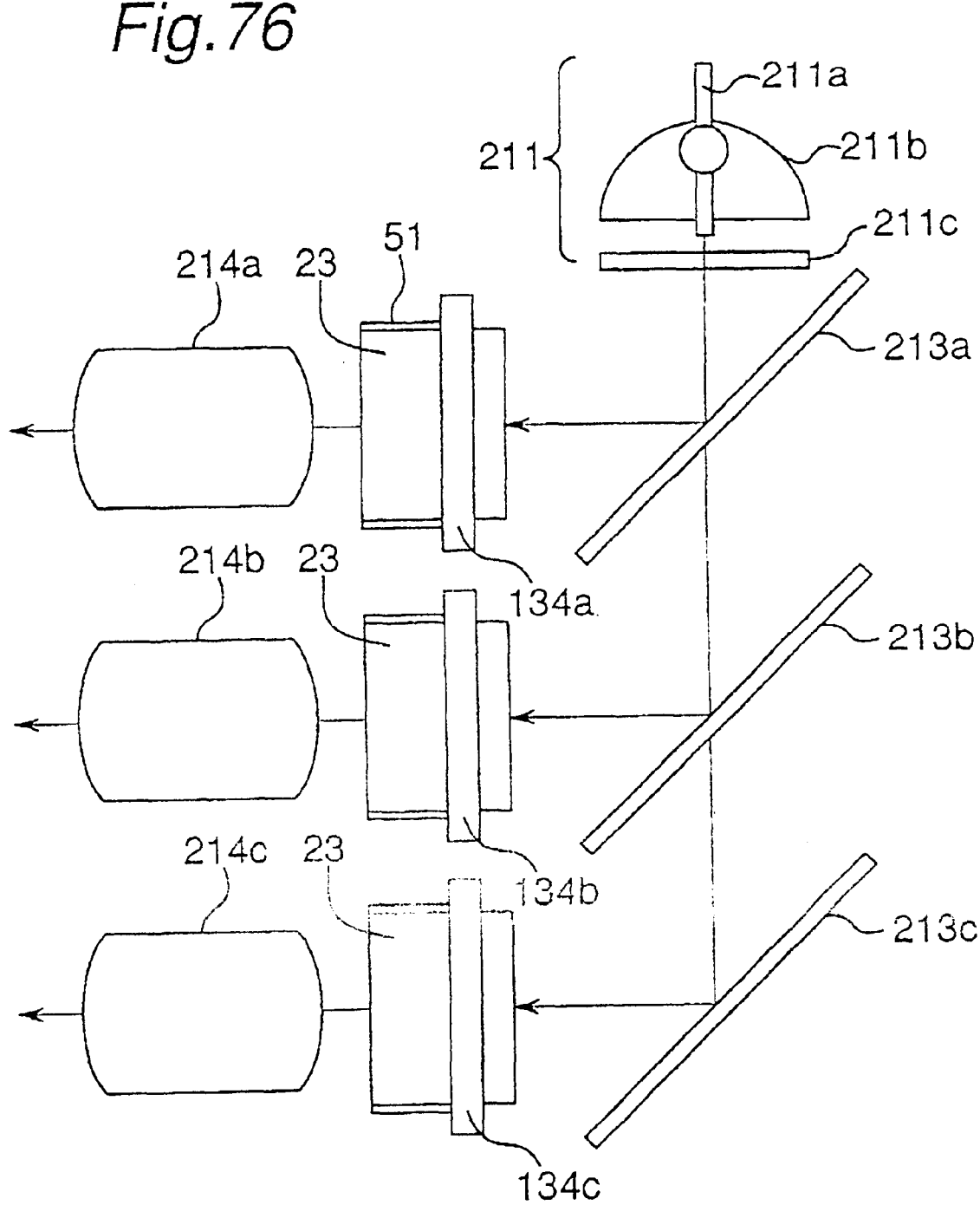
FIG. 76 is an explanatory view of a projection type display apparatus according to the present invention.

In the case of the arrangement shown in FIG. 75, a light source 211 is arranged on an upper or a lower position and the white light emitted from said light source 211 is separated into three primary color light of R,G and B by using dichroic mirrors 213 (dichroic prism) as shown in FIG. 76. Each light is incident on a display panel 134 to be modulated thereby and projected on a screen 253 by a projection lens 214. The display panel 134 employs a PD display panel, and it is desirable to arrange a reflected light absorbing plate 23 on the light emitting face of said display panel.

Furthermore, in the configuration shown in FIG. 76 light fringes do not take place in the lateral direction of the projected image. If the light incident on the dichroic mirror 213 is tele-centric, said color fringes do not take place. However, it often brings about difficulty on the design of the projection lens 214 to realize said tele-centricity. Normally, the light incident on the dichroic mirror 213 is reduced to converged light. In other words, the light incident on the display screen (refer to FIG. 75) is normal thereto at point C but is inclined slantly at points A and B, and of course, slantly inclined at points D and E. Points D and E are positioned in the direction where in the spectroscopic distribution of the light reflected by the dichroic mirror changes, while points A and B are positioned in the direction wherein the spectroscopic distribution of the light reflected by the dichroic mirror does not change. However, point D and E are spaced from the center C by a short distance and the incident light angle with the normal to the light separation face is small at point D and E, light fringes take place but they are small. At point A and B, although the incident light angle is comparatively large, light fringes do not take place. As described above, the configuration of FIG. 76 is formed in consideration of light fringes.

Figure 25:
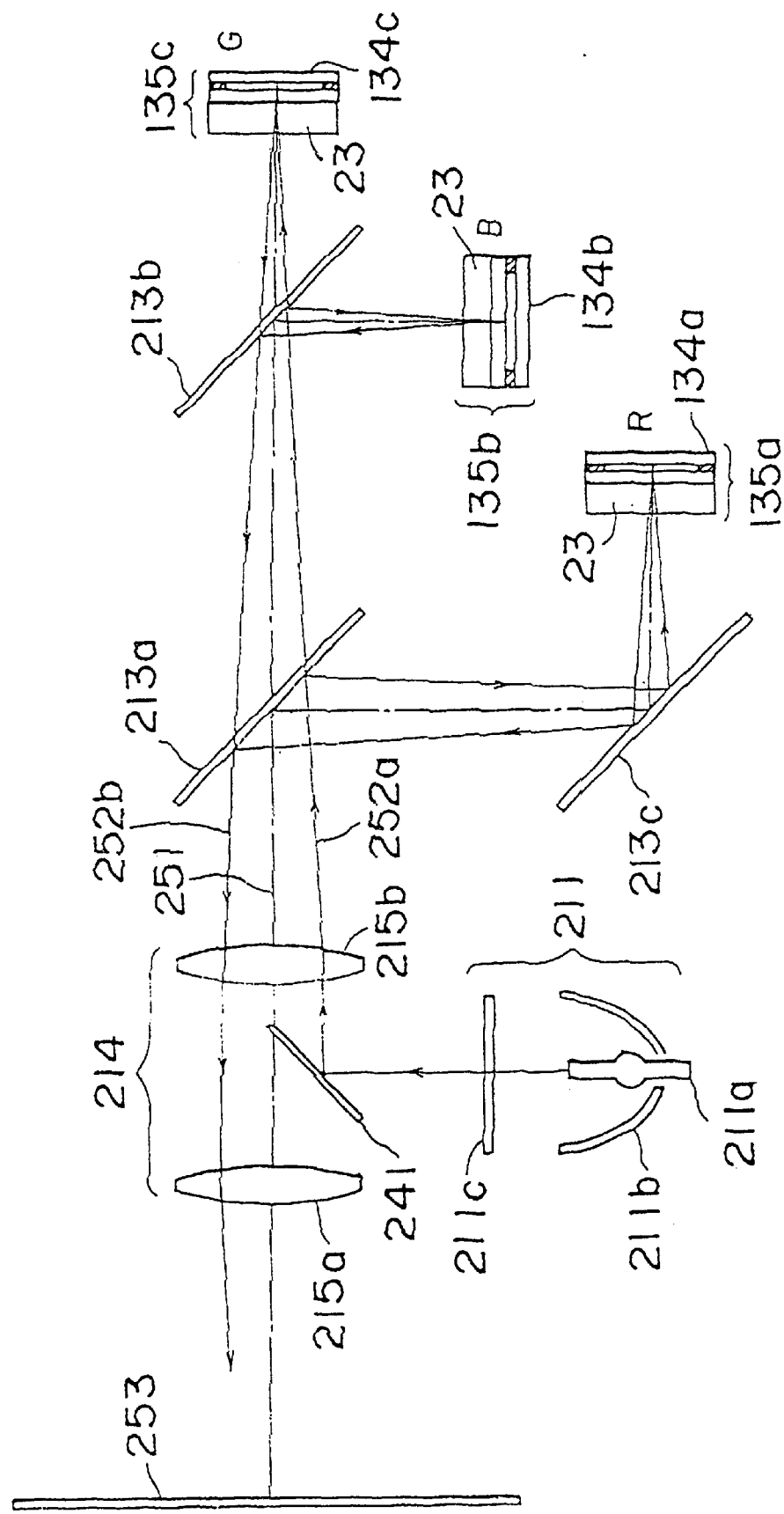
FIG. 25 is a view showing the configuration of a projection type display apparatus employing a reflection type display apparatus as a light valve.

Hereinbelow, an embodiment of a projection type display apparatus of the present invention employing a reflection type display panel shown in FIG. 27 and so on as a light valve is described with respect to its configuration. FIG. 25 is a view showing the configuration of one embodiment of the projection type display apparatus.

The projection lens 214 is composed of a first lens group 215b on the display panel side and a second lens group 215a on the on the screen side, and a plan-mirror 241 is arranged between the first lens group 215b and the second lens group 215a. About a half of the diffused light emitted from the pixel located at the center of the image face of the display panel 134 ad having passed the first lens group 215b is incident on the plane mirror 241 and the remaining half is incident on the second lens group 215a without being incident on the plane mirror 241. The normal od the plane mirror 241 is inclined at 45° with respect to the optical axis of the projection lens 241. The light from the light source 211 is reflected by the plane mirror 241, passes the first lens group 215b and in incident on the display panel 134. The reflected light from the display panel 134 passes the first lens group 215b and the second lens group 215a in this order and reaches the screen. The light emitted towards the screen from the center of the stop of the projection lens is made telecentric so as to be incident generally perpendicularly to the liquid crystal layer 16.

In order to facilitate explanation here, the description is made by assuming that the panel 134a is the display panel for modulation of R light, the panel 134b is the display panel for modulation of G light and the panel 134c is the display panel for modulation of B light.

Figure 26:
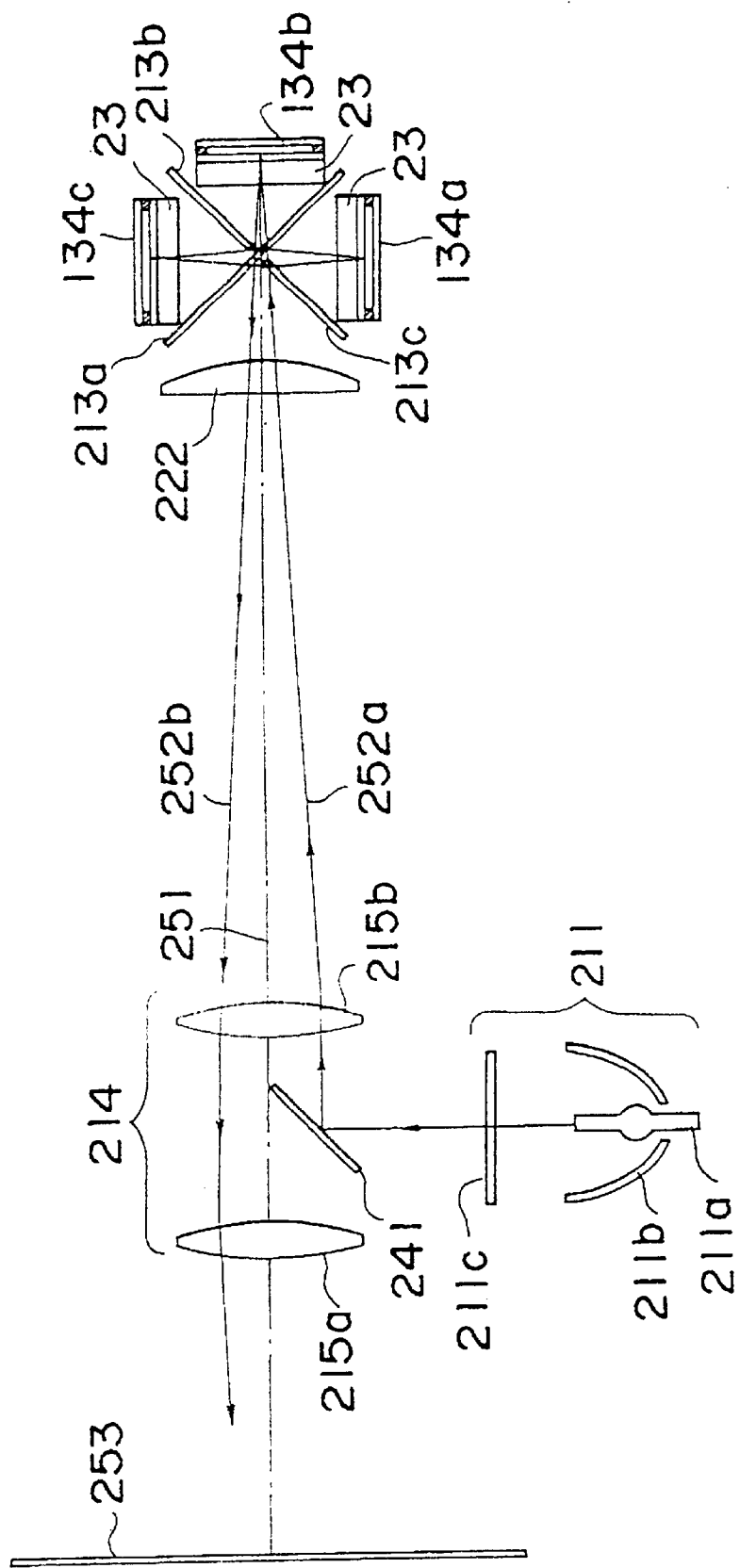
FIG. 26 is a view showing the configuration of a projection type display apparatus employing a display panel according to the present invention as a light valve.

In FIGS. 25 and 26, the dichroic mirrors 213 both functions of a color synthesis system and a color separation system. The white light emitted from the light source is changed in direction by the plane mirror 241 so as to be incident on the first lens group 215b of the projection lens 214, The band area of the filter 211c is 430 nm to 690 nm in the half-value width. Hereinafter, when the band area of light is described,it is expressed in the half-value width. The dichroic mirror 213a reflects R light and transmits G light and B light. R light is restricted in band area by dichroic mirror 213c and is incident on the display panel 134a. The band area of R light is 600 to 690 nm. On the other hand, the dichroic mirror 231b reflects B light and transmits G light. B light is incident on the display panel 134b and G light is incident on the display panel 134c. The band area of the incident Blight is 430 nm to 490 nm, and the band area of incident G light is 510 nm to 570 nm. The band area of each of these light is the same with other projection type display apparatus. On each display panel, optical image is formed as the change in the diffused state in accordance with its image signal. The optical system formed by each display panel 134 is color-synthesized with dichroic mirror 213 and incident on the projection lens 214 and magnified and projected on the screen 253.

By the way, the light two times incident on the display panel 134 passes through the liquid crystal layer 16 two times, namely, from the confronting electrode 271 to the reflection electrode 273 (incident path) and from the reflection electrode 273 to the confronting electrode 271 (emission path). As a result, it become virtually the same with the case where the film thickness of the liquid crystal layer 16 is formed two times as compared with the transmission type display panel. Therefore, the diffusion characteristic is improved as compared with the transmission type display panel, and a high contrast display can be realized.

Dichroic mirror 213 functions as a filter for reflecting (transmitting) light of a specified wavelength. For instance, the dichroic mirror 213b absorbs light of a specified wavelength, when light from the light source 211 is incident on the display panel 134b. In addition, it absorbs light of a specified wavelength when light reflected by the display panel 134b is incident on the projection lens 214.

One dichroic mirror 213 reflects light two times, when incident on the display panel and when leaving said panel. In the configuration of FIG. 25, one dichroic mirror performs the wavelength band limitation of light two times. Namely, the dichroic mirror functions a secondary filter. The cut-off characteristic of effecting band area limitation becomes more steep as compared with the dichroic mirror 219 of FIG, 24. As a result, no overlap takes place in the band area of the light incident on each display panel 134. Therefore, the color reproducibility becomes superior and an image display of a high quality can be realized.

Furthermore, by using the dichroic filter both for color separation and for color synthesis, miniaturization of the system size of the projection type display apparatus is realized.

In order to miniature the color separation system and color synthesizing system by using dichroic mirror, the configuration may be made as shown in FIG. 26. Here, in FIG. 26, reference numeral 222 denotes an auxiliary lens. Three dichroic mirrors 213a, 213b and 213c are arranged in a X-shaped combination. The incident light 252a is separated into three light of primary color R, G and B by said three dichroic mirrors 213a, 231b and 213c. For instance, dichroic mirror 213a reflects R light and dichroic mirrors 231b and 213c reflect B light. G light passes through three dichroic mirrors and reaches the display panel 134b. Each separated light is modulated by the display panel 134a, 134b and 134c of the present invention. The modulated light is emitted as light 252b and projected by the projection lens 214.

With the dichroic prism 342, a dichroic prism totally made of glass or resin can be mentioned. In addition, the dichroic prism may be made in such a configuration that the frame (container) is made of glass and other material, plates formed with light separation face 341 thereon is inserted into said frame and the space within said frame is charged with liquid such as ethyleneglycol having refraction index nearly equal to that of the frame material. Besides ethyleneglycol, silicon resin gel may be also employed. It is desirable to set the difference in refraction index between the frame material and said liquid or gel within 0.15 and the range of refraction index within the range of 1.38 to 1.55.

Figure 35:
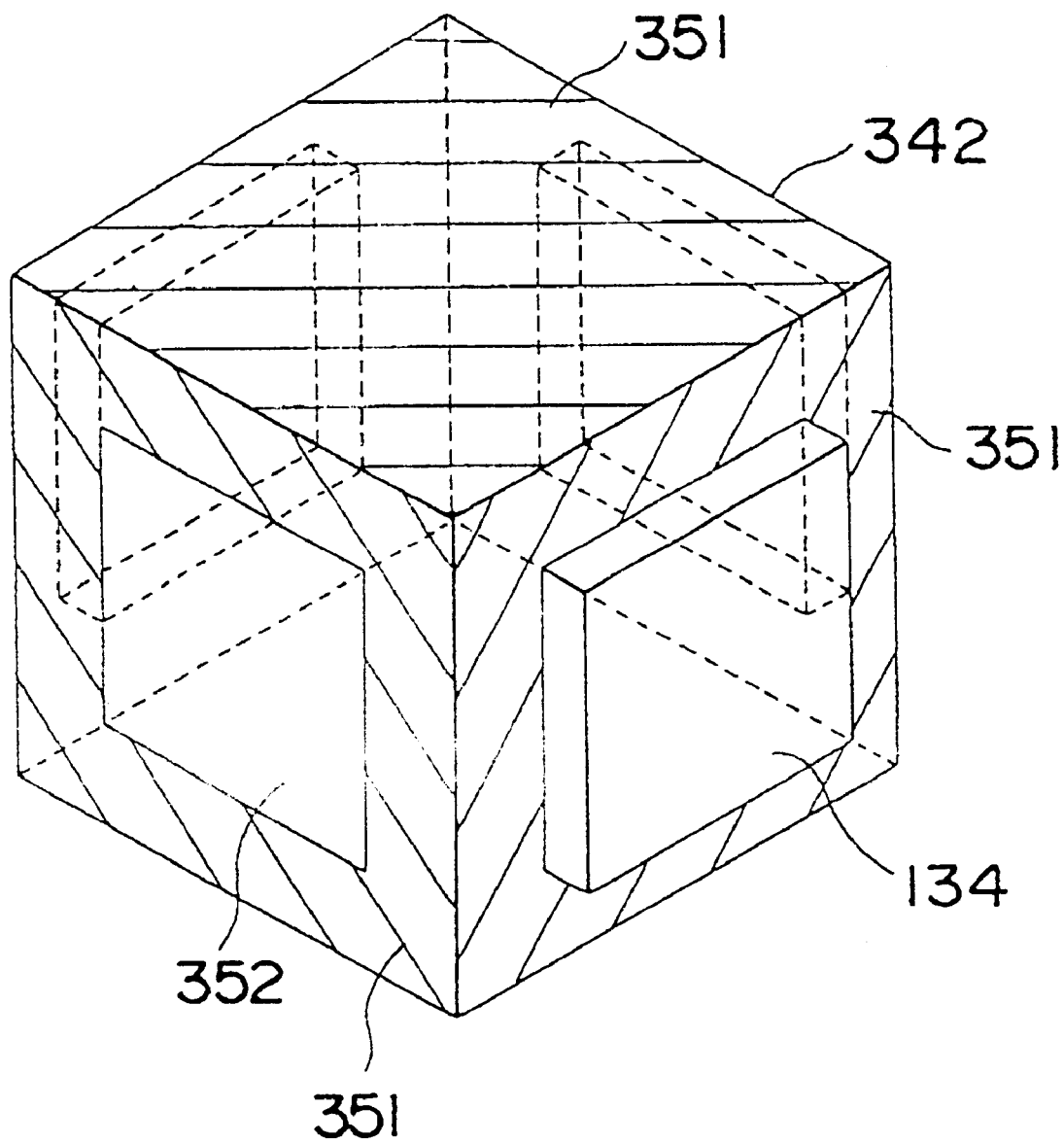
FIG. 35 is a view showing the configuration of a light separation (synthesis) element employed in a projection type display apparatus according to the present invention.

In the non-effective area of the dichroic prism 342 (light incident and outgoing face 352 and area other than the face whereon the display panel 134 is installed), a light absorbing film 351 (such as black paint) are applied as shown in FIG. 35. As the material, the same material as the light absorbing film 51 shown in FIG 13 and so on is employed. The light absorbing film 351 has the function of absorbing light diffused by the display panel 134. In other words, said film is-only required to have the function of absorbing the light diffused by the display panel 134 and is not limited to a black color film. For example, it may be a film of a color complementary to the color of the light modulated by light modulation layer 16.

By the way, the term "light absorbing film" should be considered to include other light absorbing means. For example, a configuration of forming a light absorbing film 351 on the non-effective area of the prism 342 by film vapor deposition method, a configuration of applying a light absorbing plate or film to the non-effective area of the prism 342 and a configuration of creating a light diffusion status on the non-effective area of the prism 342 by grinding can be mentioned by way of example.

For the light coupling layer 14, bonding material such as acrylic resin, gel having silicon resin ingredient and liquid such as ethyleneglycol may be mentioned as example. Many materials for these light coupling layer 14 have a refraction index close to that of the display panel substrate and available in the practical use. Concretely, transparent silicon resin KE 1051 manufactured by Shinetsu Chemical Industry Co. can be mentioned. Its thickness is less than 1 mm and refraction index is 1.40. The material is supplied in two liquid components, and when said two liquid are mixed and left at the room temperature or heated, this liquid mixture is hardened into a gel state by the addition polymerization reaction.

In addition to the above, liquid such as ethyleneglycol, epoxy resin group bonding material, transparent silicon resin setting in gel by irradiation of UV ray are available. In each case, it is necessary to apply so that no air layer is present, because the abnormality in image quality takes place if there is air layer between the confronting substrate 11 and the object of application.

Figure 34:
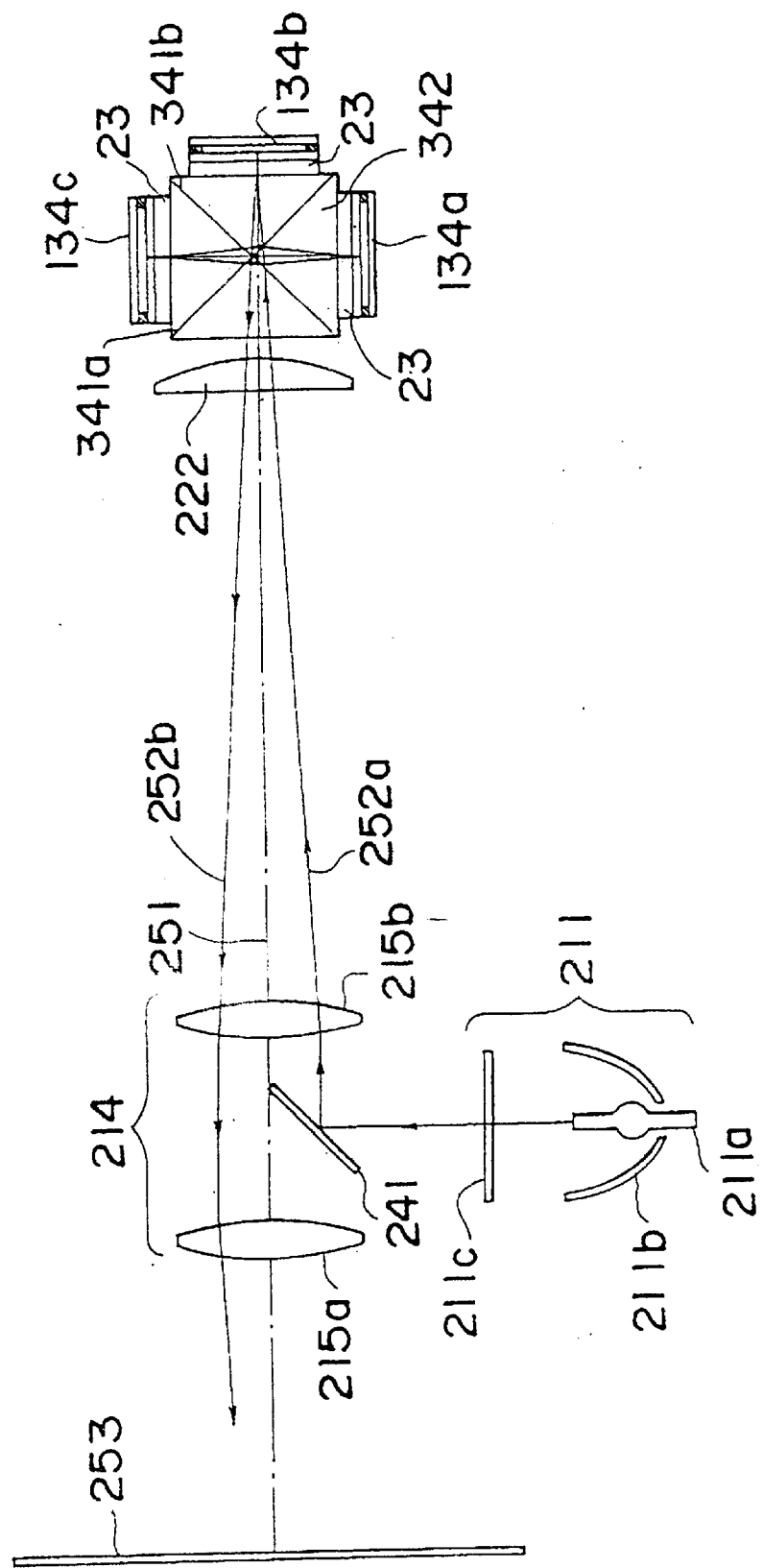
FIG. 34 is a perspective view of a light separation (synthesis) element employed in a projection type display apparatus according to the present invention.

FIG. 34 is a configuration view of a projection type display apparatus performing color separation and color synthesis by using a dichroic prism 342. The dichroic prism 342 has two light separation faces 341a and 341b, and white light is separated into three R,G nd B light on the light separation face 341. Each display panel 134 is installed on the dichroic prism 342 via the reflected light absorbing plate 23. Namely, said reflected light absorbing plate is optically coupled with said dichroic prism 342 with the light coupling layer 14 and to said reflected light absorbing plate 23, the display panel 134 is optically coupled with the light coupling layer 14.

The display panel 134 is installed on the prism 342 via the reflected light absorbing plate 23. The reflected light absorbing plate 23 and the prism 342 are applied to each other via the light coupling layer 14. On the non-effective area of the prism 342, the light absorbing film 351 is formed by painting.

Figure 42:
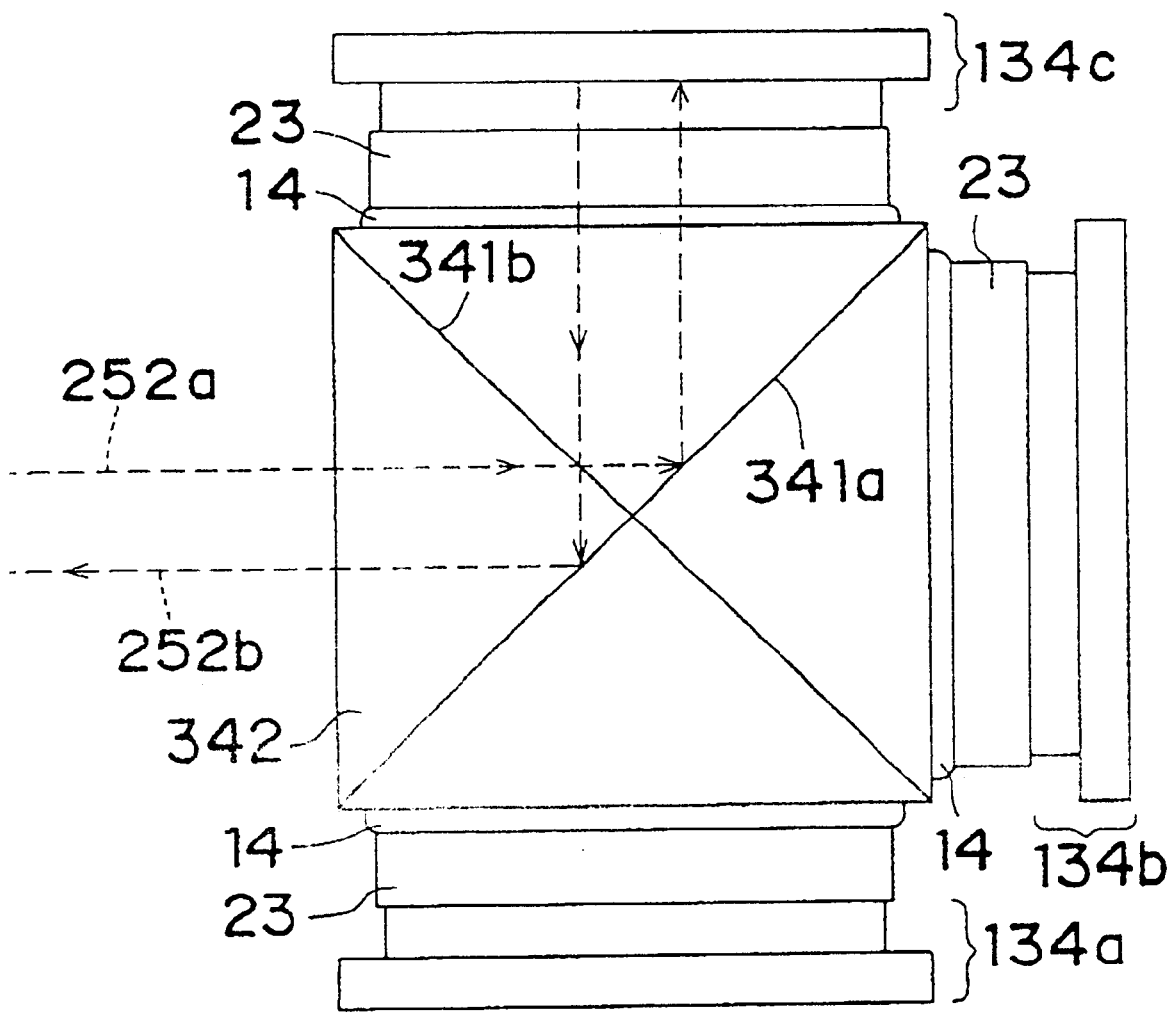
FIG. 42 is an explanatory view of a projection type display apparatus according to the present invention.

For example, in FIG. 42, the display panel 134c is assumed to modulate R light and the light separation face 341a is assumed to reflect R light. Incident light 252a is reflected on the light reflecting surface 341a and passing through the reflected light absorbing plate 23, is incident on the light modulating layer 16 of the display panel 134c. The light incident on the light modulating layer 16 is diffused in accordance with the magnitude of the voltage applied to the reflection electrode 273. The light not diffused passes through the reflected light absorbing plate 23 and is again reflected by the light separation surface 341a to be reduced to emission light. On the other hand, part of diffused light is absorbed by the light absorbing wall 20 of said reflected light absorbing plate 23 when passing the reflected light absorbing plate 23. Part of diffused light passes the reflected light absorbing plate 23 but is mostly incident on the light absorbing film 351 formed on the non-effective area of the prism 342 and absorbed thereby, when passing the reflected light absorbing plate 23. In addition, part of diffused light is reflected by the light separation surface 341a and may try to be again incident on the liquid crystal layer. But it is absorbed by the reflected light absorbing plate 23.

In this manner, the light diffused by the liquid crystal layer 16 is almost absorbed by the light absorbing film 351 and light absorbing wall 20. Therefore, diffused light is not reduced to emission light 252b.

Meanwhile, various configurations are considerable with respect to the configuration for absorbing diffused light with a prism and so on. Examples of said configuration are briefly described below.

Figure 36:
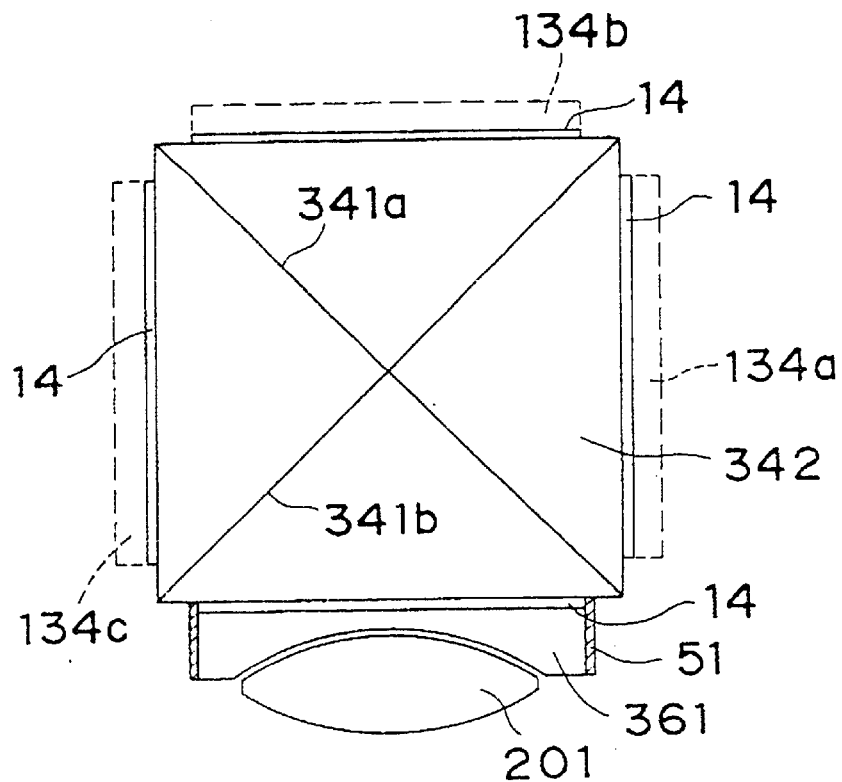
FIG. 36 is a view showing the configuration of a light separation (synthesis) element employed in a projection type display apparatus according to the present invention.

Firstly, the configuration shown in FIG. 36 is described. Between the display panel 134 and the prism 342, a reflected light absorbing plate 23 is not arranged. In- stead, a convex lens 361 is applied to the light incident and outgoing face 352 via a light absorbing layer 14. On the non-effective area of the convex lens 361, a light absorbing film 51 is formed. A positive lens 201 is arranged close to the convex lens 361. Therefore, this is a configuration wherein a reflected light absorbing plate 23b in a convex lens shape is replaced by a normal convex lens and a prism 342 is arranged between said convex lens and the display panel 134 in FIG. 33B. The prism 342 can be comparatively regarded as a transparent substrate 24. Namely, it is equivalent to the configuration wherein a thick transparent substrate 24 (prism) is applied to the display panel 134 and a convex lens 361 is arranged on said transparent substrate 24. The light diffused within the liquid crystal layer 16 of the display panel 134 is absorbed by the light absorbing film 351 formed on the non-effective area of the prism 342 and further by the light absorbing film 51 formed on the non-effective area of a convex lens arranged on the light incident and outgoing surface 352. Therefore, the secondary diffusion does not tale place absolutely, and an extremely excellent display contrast can be realized.

Figure 37:
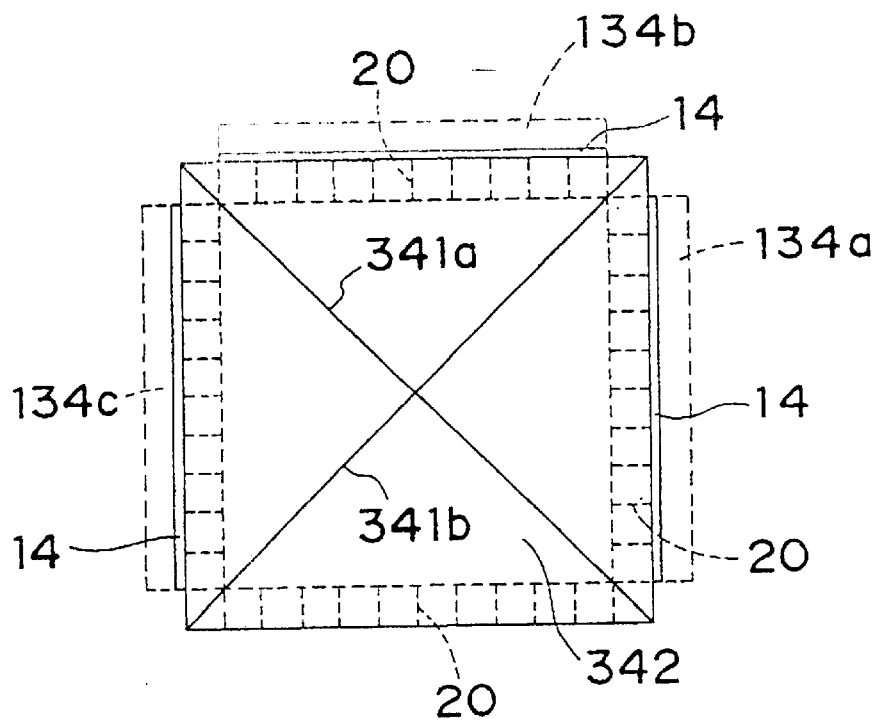
FIG. 37 is a view showing the configuration of a light separation (synthesis) element employed in a projection type display apparatus according to the present invention.

FIG. 37 shows a configuration wherein a light absorbing wall (film) 20 is formed in a prism 342. Said light absorbing wall is formed at least at the position where the display panel 134 is applied. This can be regarded as a structure where reflected light absorbing plate 23 is imbedded in a prism 342. The effect and others are the same as described in FIG. 42.

Figure 38:
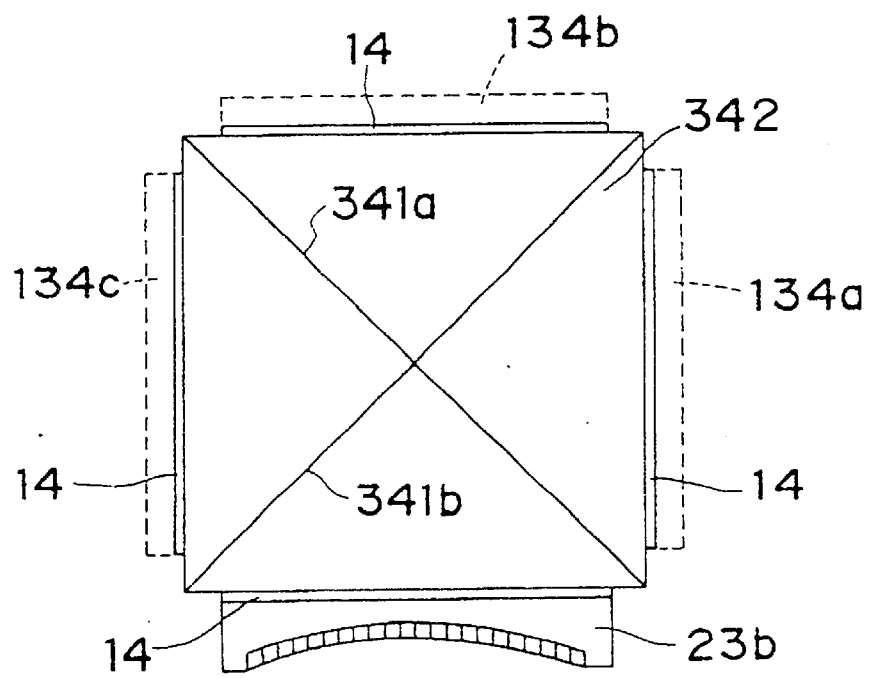
FIG. 38 is a view showing the configuration of a light separation (synthesis) element employed in a projection type display apparatus according to the present invention.

FIG. 38 shows a configuration wherein a display panel is applied to the prism 342 and a reflected light absorbing plate 23 is applied to the light incident and outgoing surface 352. Namely, it is a configuration wherein one reflected light absorbing plate 23 is applied to the prism 342 for all of the display panels 134. As a result, while three reflected light absorbing plates 23 are employed in FIG. 42, one reflected light absorbing plate 23 is sufficient for the purpose in FIG. 38, and thus, a low cost can be expected. The light diffused by each display panel 134 is absorbed by the light absorbing film 351 formed on the non-effective area of the prism 341 and the light absorbing wall 20 of the concave or plate-shaped reflected light absorbing plate 23b.

Figure 39:
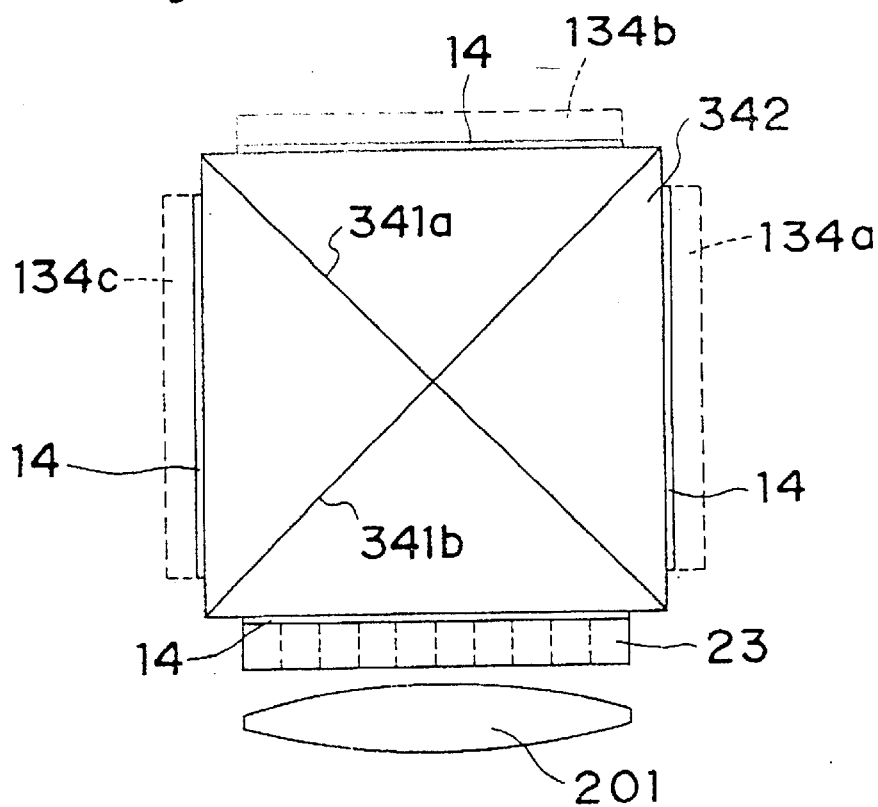
FIG. 39 is a view showing the configuration of a light separation (synthesis) element employed in a projection type display apparatus according to the present invention.

FIG. 39 show a configuration wherein in FIG. 38, the convex lens shaped reflected light absorbing plate 23b is replaced with a plate-shaped reflected light absorbing plate 23 and in front of the reflected light absorbing plate 23, a positive lens or a plan-convex lens 201 is arranged. The lens 201 has a function of guiding the light (transmitting light) straightly passing the liquid crystal layer of the display panel to the projection lens. The function of the reflected light absorbing plate is the same as in the case of FIG. 38. Because the light modulating layer of the display panel and the reflected light absorbing plate are separated from each other by a certain distance in the configurations of FIGS. 38 nd 39, the effect of MTF described in FIG. 4 becomes easy. Namely, the light absorbing wall 20 is not formed on the projected image, and a good image quality can be reproduced.

Figure 40:
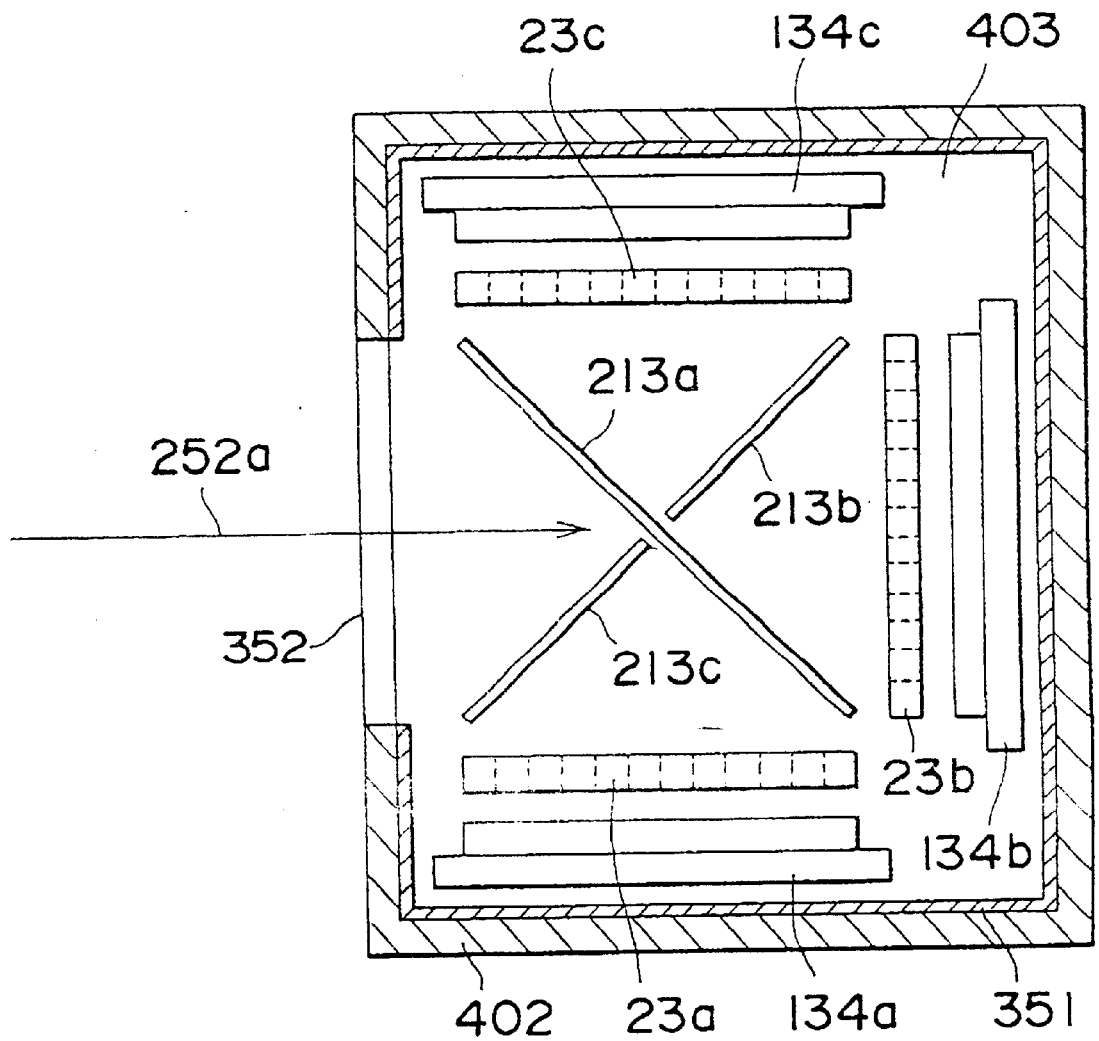
FIG. 40 is a view showing the configuration of a light separation (synthesis) element employed in a projection type display apparatus according to the present invention.

Furthermore, a configuration shown in FIG. 40 can be considered. Within a cube-shaped container 402, reflected light absorbing plates 23 and display panels 134 are arranged. A light absorbing film 351 as a means for absorbing light is formed on the inner face or outer face of the container 402. Liquid or gel 403 such as ethylenglycol is charged into the space within the container 402.

When configured as described above, it becomes unnecessary to optically couple the reflected light absorbing plate 23 and the display panel 134 (light coupling layer, unnecessary). The light absorbing film 351 in FIG. 40 functions as the light absorbing film 351 shown in FIG. 35. Furthermore, because the liquid or gel 403 has the function of liquid cooling the display panel, it is easy to cool the display panel 134.

The configuration of FIG. 40 is for the reflection type projection display apparatus or display panel, judging from FIGS. 25, 26, 27, and 33. But the technical concept of the present invention is applicable not only to the reflection type but also to the transmission type projection display apparatus.

Figure 41:
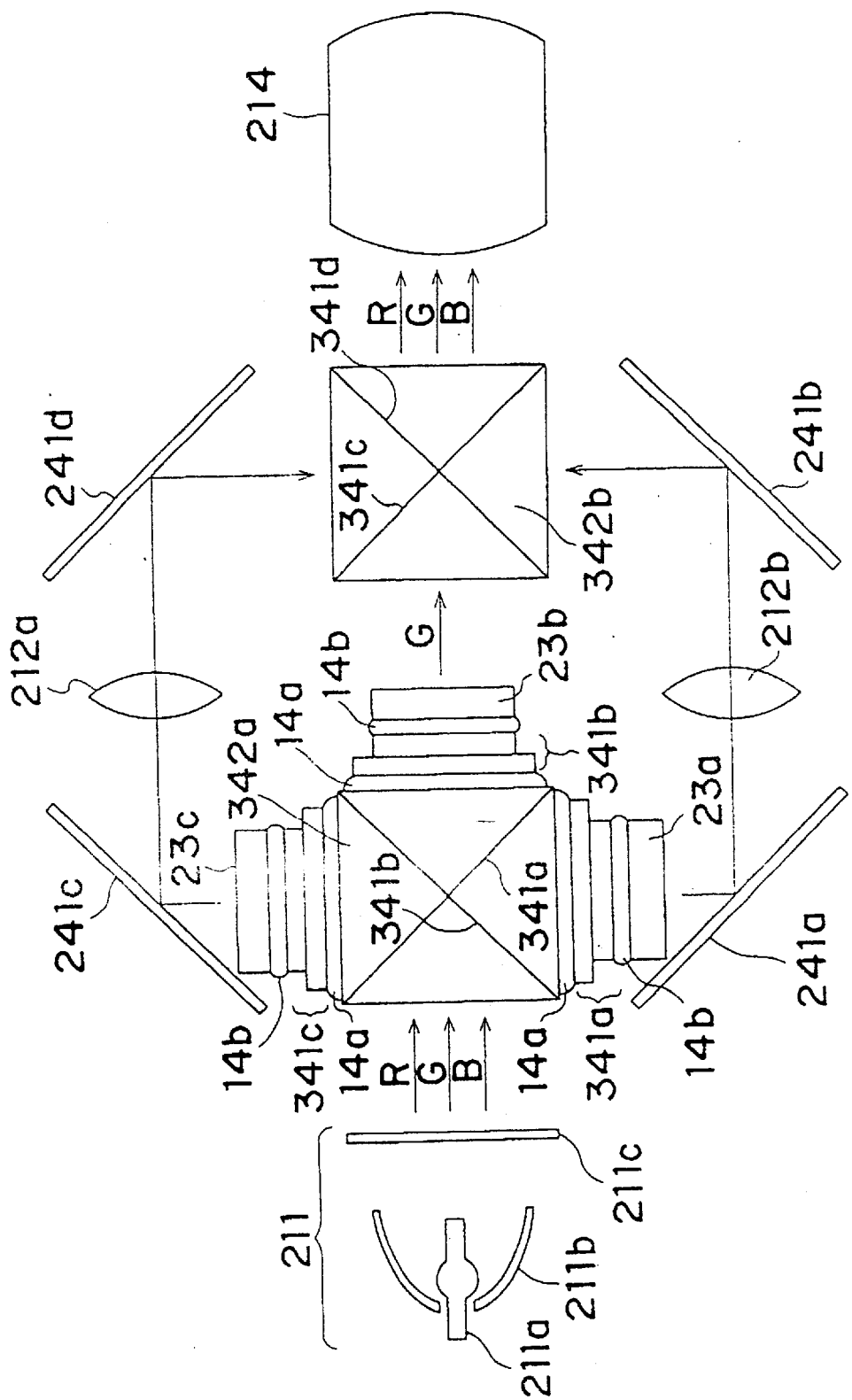
FIG. 41 is a view showing the configuration of a projection type display apparatus in another embodiment of the present invention.

Shown in FIG. 41 is a configuration of the transmission type projection display apparatus according to the present invention. Three display panels are optically connected to a dichroic prism 342a via light coupling layers 14. It is desirable to use a gel-shaped light coupling layer. It is because three display panels are required to be positioned so as to be exactly overlapped on the screen (not shown). If the positions of the display panels are perfectly fixed, the positioning is impossible but if the light coupling layer is gel-shaped, a slight change in position is possible. In the projection type display apparatus according to the present invention, when a configuration of applying the display panel to the prism is adopted, a mechanism of changing the position of display panel is added.

The white light emitted from a metal halide lamp is separated into three light paths of R, G and B primary color light by the light separation faces 341a and 341b of a dichroic prism 342a. R light is modulated by the display panel 134c and modulated light is reflected by mirrors 241c and 241d so as to be incident on a dichroic prism 342b. In this case, diffused light isis absorbed by the reflected light absorbing plate 23 and the occurrence of the secondary diffused light is prevented. G light proceeds straightly nd in incident on the display panel 134b., On the other hand, B light is reflected on the light separation surface 341a, is incident on the display panel 134a, subsequently is reflected on the mirrors 241a and 241b to be incident on the dichroic prism 342b. Because the light paths of R and B light are longer as compared with that of G light, it is desirable to arrange relay lenses 212 on the light paths of R light and B light. The light separation face 341c of the prism 342b reflects R light and the light separation face 341d reflects B light. The light synthesized on said light separation face 341 is incident on the projection lens 214 and projected thereby. The display panel is not limited to the configuration shown in FIG. 41 but a configuration wherein the light separation surface 442d reflects B light and the light separation surface 442c reflects G light may be adopted (not limited to the configuration wherein the display panel 134a modulates B light and the display panel 134b modulates G light).

On the non-effective area, a light absorbing film 351 is applied by painting, and because the light diffused by the display panel 134 is absorbed by said light absorbing film 351 and the reflected light absorbing plate 23, the occurrence of the secondary diffused light is suppressed, and a good display contrast can be realized.

In addition, while the display panel 134 is described to be applied to the prism 342a in FIG. 41, the configuration is not limited to this configuration but needless to say, it may be a configuration wherein the display panel is applied to the prism 342b for synthesizing light.

Furthermore, in the configuration of FIGS. 411 or 36 through 39, while the display panel is described to be applied to the prism 342 via the light coupling layer 14, the configuration is not limited to this. In other words, it may be a configuration wherein no light coupling layer is employed and air layer is present between the display panel 134 and the prism 342. This is because even with this configuration, the effect of absorbing the light diffusely reflected within the prism 342 with the light absorbing film 351 and thus, improving the display contrast, and the effect of absorbing reflected light with the reflected light absorbing plate 23 is not changed. Furthermore, in FIG. 34, the reflected light absorbing plate 23 is described to be applied to the prism 342 via the light coupling layer 14 but the configuration is not limited to this configuration. In other words, it may be a configuration wherein no light coupling layer is employed nd air layer is present between the reflected light absorbing plate 23 and the prism 342. This is because even in this case, diffused light can be absorbed by the reflected light absorbing plate 23 and thus, the secondary diffused light can be prevented.

Furthermore, while the PD display panel is described to be employed in the projection type display apparatus, the present invention is not limited to this panel but as shown in FIG. 7, a display panel of diffraction type may be employed. This is because the effect of the technical concept of the present invention of absorbing diffused light with the reflected light absorbing plate and so on is the same. This applies to the projection type display apparatus shown in FIG. 43.

Those described above are configurations of the projection type display apparatus performing the synthesis and separation of light by employing a dichroic prism 342. But the technical concept of the present invention lies in that the occurrence of the secondary diffusion by connecting the reflected light absorbing plate 23 and others with the display panel and thus, the display contrast is improved. Therefore, it is not to be limited to the dichroic prism but it may be a prism (herein, referred to as PBS) which separates light into P polarized light and S polarized light by the light separation face. Hereinbelow, a projection type display apparatus of the present invention employing PBS (polarized beam splitter) 431 is described.

Figure 43:
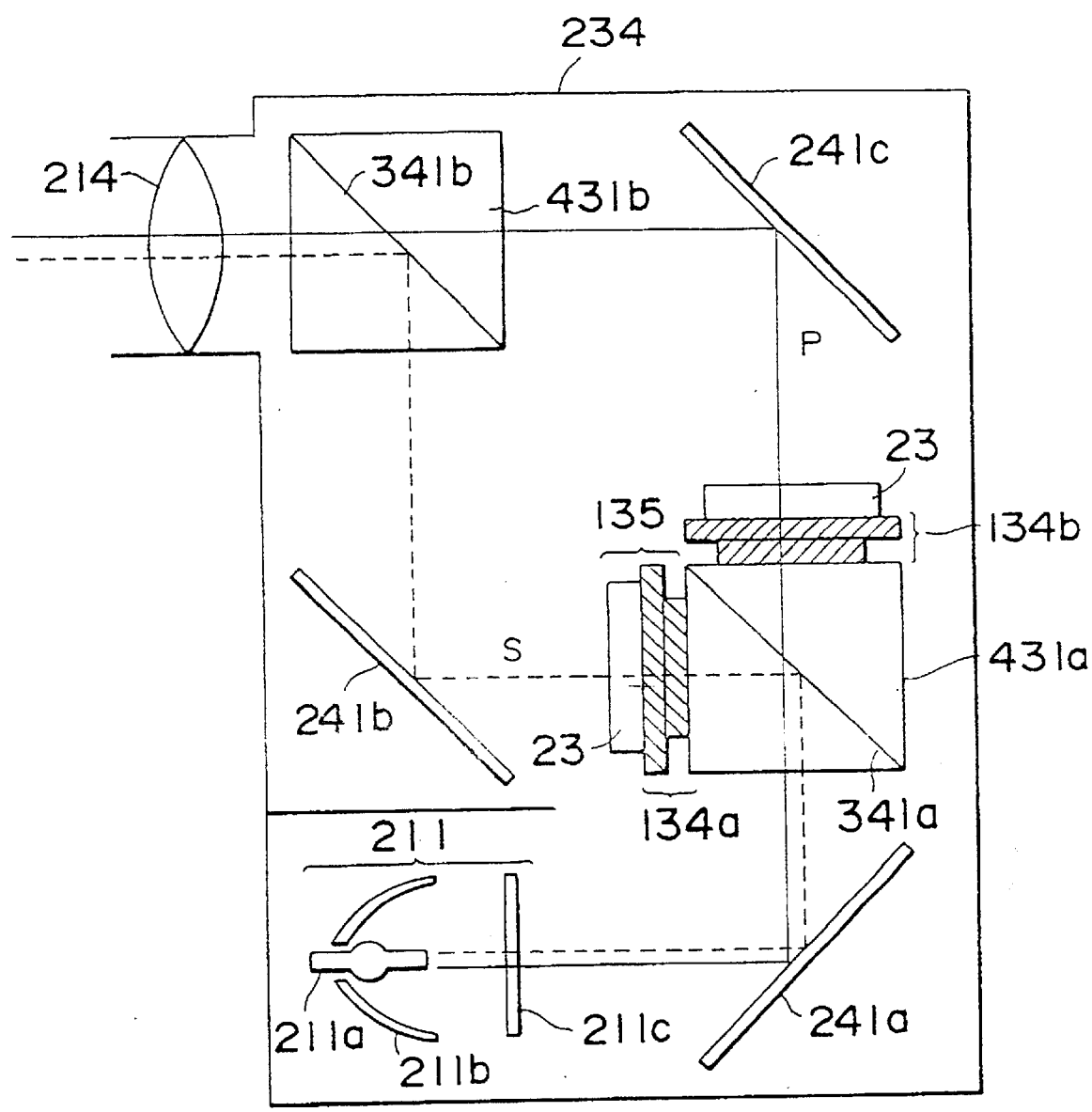
FIG. 43 is a view showing the configuration of a projection type display apparatus employing polarization according to the present invention.
Figure 46:
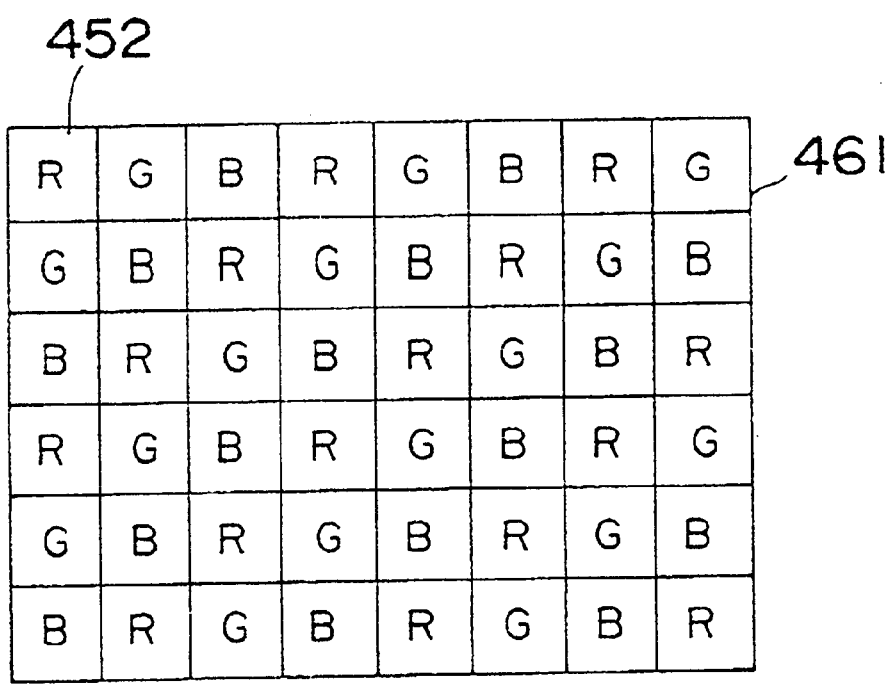
FIG. 46 is an explanatory view of a color filter.

FIG. 43 shows a configuration of an embodiment of the projection type display apparatus of the present invention using PBS 431. The visible light from a lamp 211a is reflected by a mirror 241a and incident on the PBS 431a. The PBS 431 is a cube-shaped polarizer which is formed by bonding a pair of right-angle prism on the inclined faces thereof. On the inclined face, a dielectric multi-layered film (light separation face 341) is formed. On the PBS 431, two display panels 134a and 134b are installed. On the pixel electrode 101, a color filter 461 is formed as shown in FIG. 46 and so on. The color filter 461 has three kinds of R, G and B primary colors, and a mosaic-shaped color filter id formed by confronting respective color filters with each pixel. The mosaicshaped color filter may be formed on the confronting electrode 102 as in the TN liquid crystal display panel, but in this case, it is difficult to separate the liquid crystal and the resin component in phase.

For resin 692, ultra-violet ray setting resin (hereafter, referred to as UV resin) is generally employed. At the time of manufacture, mixture of unset UV resin 692 and liquid crystal 691 is disposed between the confronting electrode 102 and the pixel electrode 101 and then, UV ray is irradiated thereon. However, the color filter 461 does not transmit UV ray. Therefore, in the case where the color filter 461 is formed on the confronting electrode 102, if UV ray is made incident from the confronting electrode side, liquid crystal 691 and the resin 692 can not be separated in phase. As a result, UV ray is made incident from the array electrode side. However, because TFT 131, signal line 103 and so on shield UV rays, the resin 692 on the TFT 131 and signal line 103 does not set. When unset resin remains, the stability of the panel is impaired, resulting in drop of reliability. Therefore, the color filter 461 is formed on the pixel electrode 101, no obstacle is formed on the confronting electrode 102, and UV ray is irradiated from the confronting electrode side. With this arrangement, the whole resin 692 can be set.

With the emission side of the display panel 134, a reflected light absorbing plate 23 is coupled via a light coupling layer 14. Between the array substrate 12 and the reflected light absorbing plate 23, a spacer (not shown) is provided on the periphery, and by this spacer, the thickness of the light coupling layer is regulated. Similarly as in FIG. 13, on the non-effective area of the reflected light absorbing plate 23, black paint 51 is applied, and on the effective area of the emission face of the reflected light absorbing plate 23, a reflection preventing film 141 is provided.

As the configuration of attaching the display panel to the PBS 431, a configuration shown in FIG. 14, a configuration using a concave lens 23b as shown in FIG. 16, a configuration wherein the array substrate 12 or the confronting substrate 11 is used as a reflected light absorbing plate 23. And so on can be mentioned.

Figure 44:
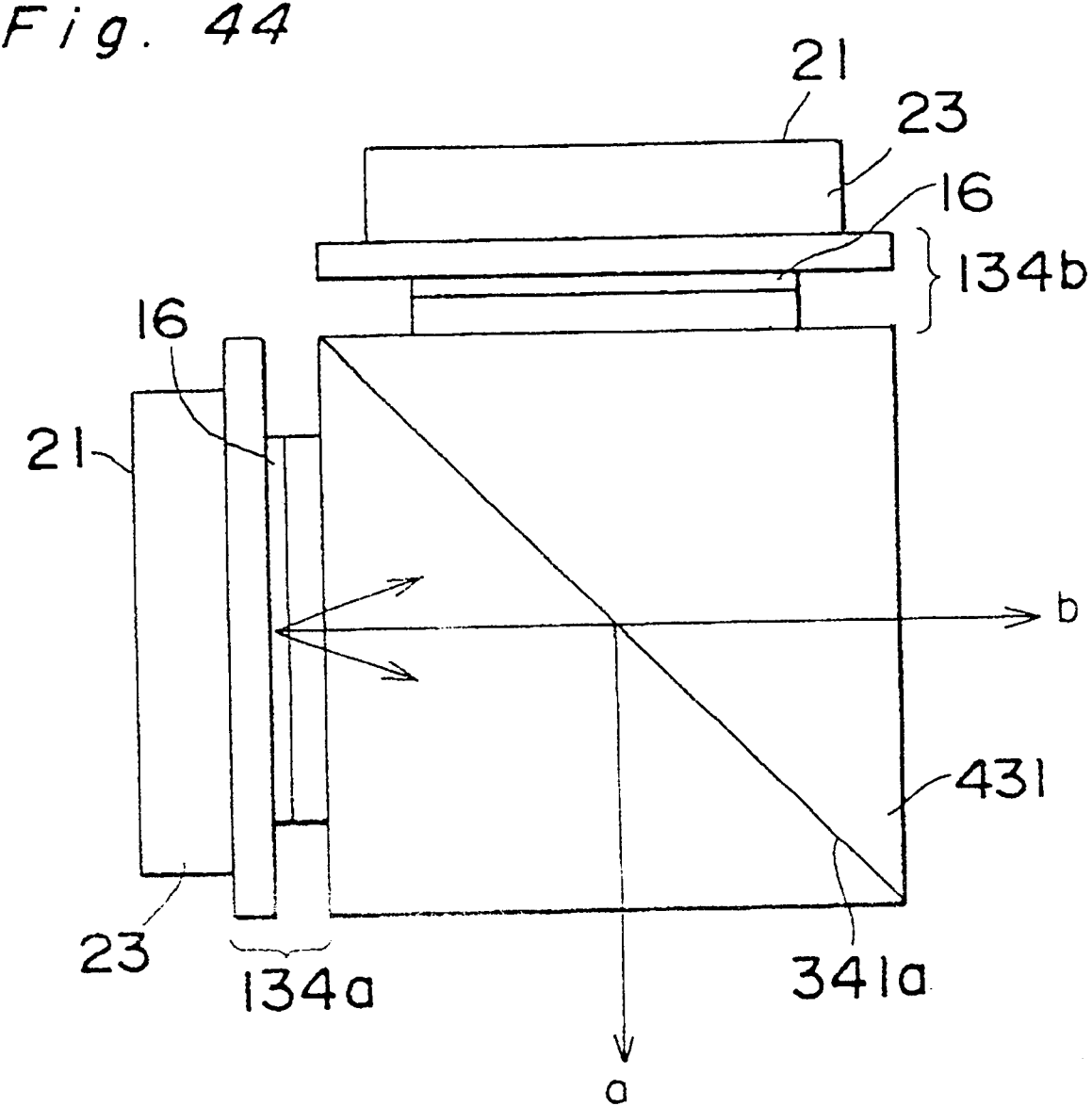
FIG. 44 is an explanatory view of the projection type display apparatus shown in FIG. 43.

Because the dichroic prism 342 and the PBS 431 differ with each other in function, the effect of the display panel provided with PBS 431 is described below with reference to FIG. 44.

It is assumed that on the display panel 134a, S polarized light is incident, and P polarized light is incident on the display panel 134b. S polarized light incident on the display panel 134a is diffused by the liquid crystal layer 16. When it is diffused, component of P polarized light is produced. The light diffused and then, reflected (S polarized light and P polarized light) is again incident on the confronting substrate 11 and returns to PBS 431. S polarized light of the light having thus returned is again reflected on the light separation face 341a and returns in the direction a. In other words, it return towards the light source side. P polarized light passes through the light separation face 341a and is emitted in the direction b. Thus, an effect equivalent to the effect of the case where a transparent substrate 24 is connected to the side of the confronting electrode 11 can be obtained. On the non-effective area of the PBS, a light absorbing film 351 is formed as shown in FIG. 35.

If the PBS 431 and the confronting substrate 11 is not optically coupled with each other, diffused light is reflected on the interface between the confronting substrate 11 and air and again returns to the liquid crystal layer 16, causing the secondary diffusion. Because PBS 431 can be regarded as a thick transparent substrate, reflected light hardly takes place and, as a result, the secondary light diffusion hardly takes place. Therefore, the display contrast is improved.

To the emission side of the display panel 134, a reflected light absorbing plate 23 is applied via a light coupling layer 14. The light diffused by the liquid crystal layer 16 and reflected by the interface 21 with air is absorbed by the reflected light absorbing plate 23, and thus, no secondary light diffusion takes place with respect to emission light, also. In this way, diffused light (emitted light, incident light) is almost absorbed, and therefor, the display contrast is improved and an excellent image display can be conducted.

Light having passed two display panels 134a and 134b are synthesized by PBS 341b and magnified and projected on the generally same position for image display.

As described above, the projection type display apparatus according to an embodiment of the present invention is configured so that the light emitted from the light source 211 is divided into two light paths of P polarized light and S polarized light by the PBS 431a, and son said respective light paths, display panels 314 are arranged. Namely, two display panels 134 are employed. Furthermore, there is provided a projection lens 214, which magnifies and projects light modulated by said display panels 134 on the screen. Images on the two display panels 134a and 134b are overlapped on each other and projected. However, for overlapping images it is desirable to shift images by more than one pixel row or one pixel column. It is because each display panel has color filters for three primary colors, R, G and B, and by shifting one by one pixel, two colors are subjected to additive color-mixing and the degree of fineness is improved.

Figure 45A:
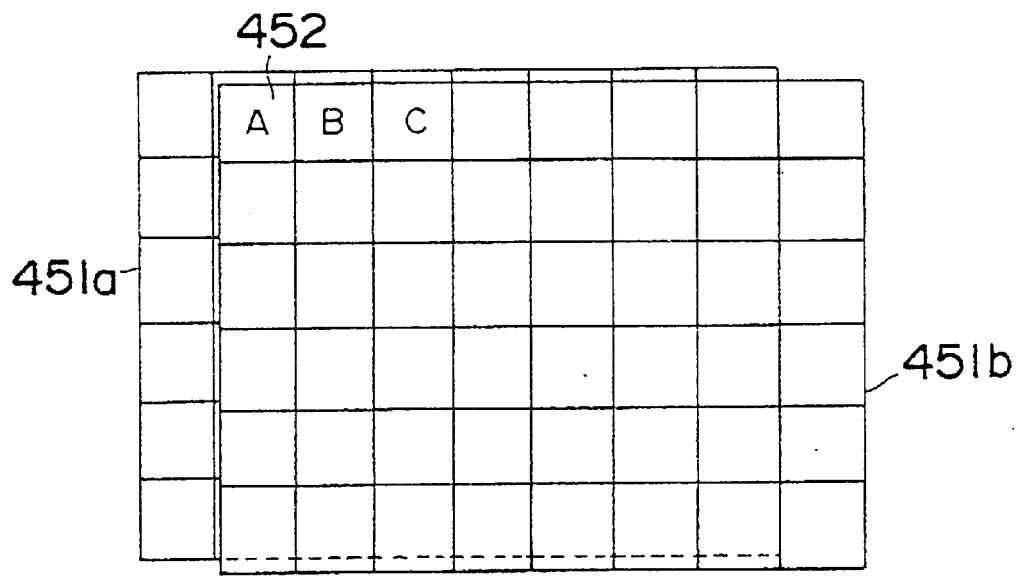
FIGS. 45A and 45B are explanatory views of the projection type display apparatus shown in FIG. 43.
Figure 45B:
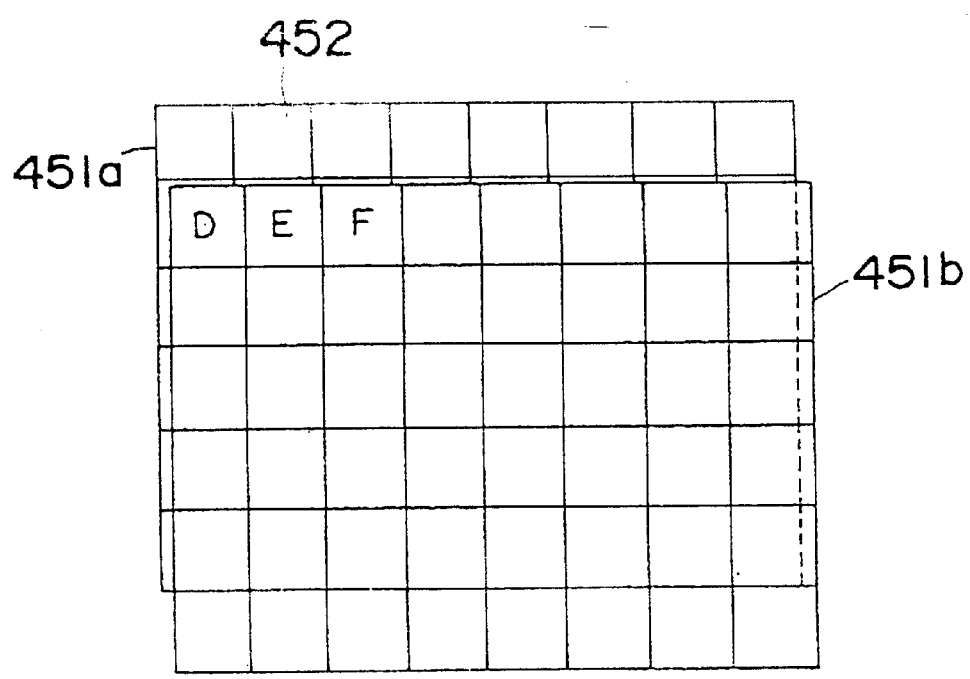

While the display panels 134a and 134b are projected on the screen (not shown) in overlap, the overlapping is performed as shown in FIGS. 45A and 45B. FIG. 45A shows the case wherein the projected images 451a and 451b are overlapped by shifting by one pixel column. If the arrangement of the color filters in projected images 451a and 451b is as shown in FIG. 46, at pixel A, the superimposed color of R and G is displayed, the superimposed color of G and B is displayed at pixel B and the superimposed color of B and R is displayed at pixel C. Naturally, it is necessary to effect sampling of image signals by shifting one pixel column.

If projected by overlapping as described above, the resolution of the projected image is improved as compared with that of the projected image of the projection type display apparatus (see FIG. 49) using one display panel 134, and the screen luminance is also improved. In addition, even if there is a pixel defect in one of two display panels 134, said pixel defect is difficult to be recognized. For example, even if A pixel of the projected image 451b has a point defect, it is extremely rare for the pixel of the display panel to be overlapped with pixel A of the projected image 451a to be also defective. Therefore, if the pixel of one one of the display panel is normal, the image is displayed to be normal, and no defect is recognized. However, the pixel defect must a black defect (pixel defect always displayed in black). To this end, the formation process of TFT must be controlled so that no white defect (pixel defect displayed in white at all times) will take place. In addition, white defects may be modified so as to become black by using laser light and so on.

As a matter of course, there is available a method of projecting projected images 451a and 451b by shifting one pixel row as shown in FIG. 45B. If the pixel color filters are positioned as shown in FIG. 46, the superimposed color of R and G is displayed at pixel D, the superimposed color of B and B is displayed at pixel E and the super-imposed color of B and R is displayed at pixel F. The effect and so on being the same, the description thereof is omitted.

While projection images are described to be overlapped on each other by shifting one pixel column or one pixel row in the above embodiment, it is not limited to this method, but projection images may be overlapped by shifting, for example, by two pixels. In addition, the projection images on the area not to be overlapped may be shielded so as not to be displayed by means of a mask and so on.

There is also available a method of shifting not by one pixel but by a half pixel. If shifted by a half pixel, between pixels of a display panel 134a, the image of a pixel of the display panel 134b is projected. As a result, the pixel outline does not become conspicuous and a smooth projection image can be advantageously obtained.

The above description is made of a case wherein the same color filters are provided on two display panels 134a and 134b. However, if a certain modification is applied to the color filter 461, images may be overlapped without shifting pixel positions. In other words, the projected images of the display panels 134a and 134b may be projected by making both pixel positions in agreement with each other. For example, if the upper left pixel of the color filter of the display panel 134b is a color filter 461 of R color, the upper left pixel of the color filter 461 of the display panel 134a may be made a color filter of G color.

In other words, color filter 451 is formed in a color arrangement different between the display panels 134a and 134b. In this case, two projected images are made perfectly coincident with each other. Needless to say, the color filters 461 must be formed so that two different colors are additively color-mixed in the manner that R color of the display panel 134a corresponds to G color of the display panel 134b when projected images are made coincident with each other.

The sampling of image signals may be at the same timing on two display panels. The term "projection by shifting pixels" should be considered including the above-described case where a color filter is formed by shifting R, G, B colors of the color filter 461.

In the projection type display apparatus of the present invention, in order to prevent the occurrence of flickers, signals different in polarity for each column or row are applied. The explanation thereof is made with reference to FIGS. 47 and 48.

Figures 47A, 47B, 48A, 48B:
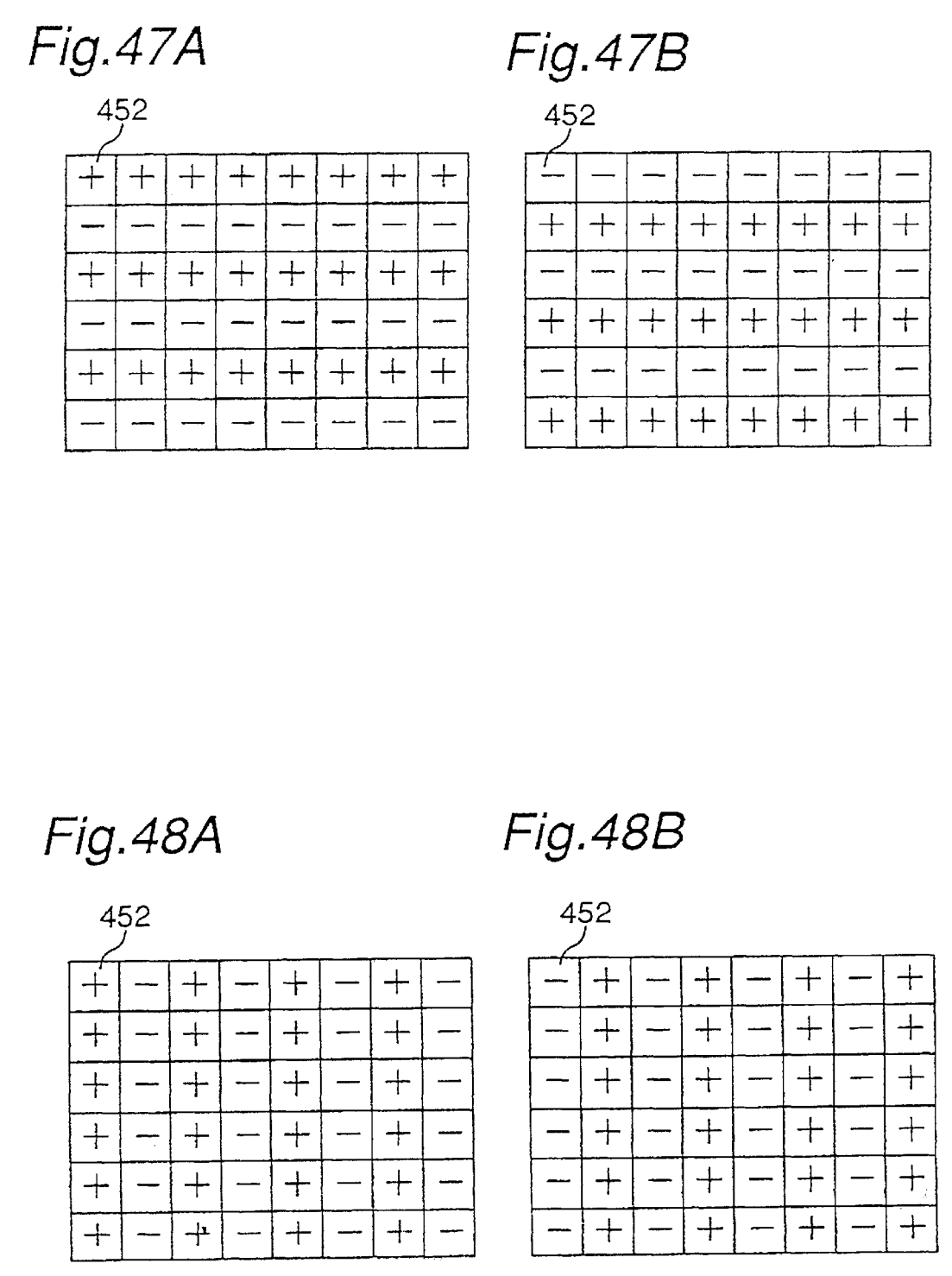

Shown in FIGS. 48A and 48B is a drive method called one column inverted drive. In the figures, a pixel written with a signal of positive polarity is represented by '+' and a pixel written with a signal of negative polarity is represented by '−'. FIG. 48A shows the polarities of signals written into pixels at a field of a certain time. Adjacent pixel columns are written with signals of opposite polarities. At the next field, signal polarities become as indicated in FIG. 48B. In other words, the pixel written with a signal of positive polarity is provided with a signal of negative polarity in the next field, and a pixel written with a signal of negative polarity is provide with a signal of positive polarity in the next field.

Shown in FIGS. 47A and 47B is a drive method called 1H inverted drive. FIG. 47A shows the polarities of signals written in one field at a certain time, and signals of positive polarity or of negative polarity for each row are written. In the next field, the signal polarities become as shown in FIG. 47B. In other words, as in the previous drive method, the polarity of the signal is inverted.

In the projection type display apparatus of the present invention, it is adapted so that in the overlapped pixels, positive polarity and negative polarity are overlapped on each other. In FIG. 45, if pixel A of the projected image 451a is modulated in light by a signal of positive polarity, the pixel of the projected image 461a to overlapped by pixel A is adapted to be modulated in light by a signal of negative polarity. By conducting the above-described drive, flickers can be reduced greatly.

As is clear from the above description, when projected images are overlapped as shown in FIG. 45A, one column inverted drive is effected. In addition when projected images are overlapped as shown in FIG. 45B, 1H inverted drive is effected. Any combination of those described above may be used but from the view-point of the drive capacity of source drive 1C, adopting one column inverted drive and shifting one pixel column results in a good system performance in many cases.

Besides the drive methods shown in FIGS. 47 and 48, there is a method called quasi-interlaced drive method. Although it is similar to 1H inverted drive method shown in FIG. 47, this is a method of writing signals of the same polarity for each two pixel rows. More correctly, the same image display is effected for each two pixel rows. In order to reduce flickers, pixel rows are shifted as shown in FIGS. 45A and 45B. But pixels are overlapped on each other by shifting two pixel rows.

The technical concept of overlapping two pixels as shown in FIGS. 45A and 45B, the technical concept of projecting by shifting the projected images by abut half pixel or the technical concept of making opposite the signal polarities of the pixels overlapped as described by using FIGS. 47 and 48 is applicable, with some modifications added, to the projection type display apparatuses shown in FIGS. 21, 24, 25, 26, 34, 41 and FIG. 57 to be later described. For example, these projection type display apparatuses are respectively provided with three display panels, but said technical concept may be applied to two of said display panels.

In addition, if the structure of FIG. 43, 34 or 24 is accommodated within the cabinet shown in FIG. 23, a rear type projection type display apparatus can be constructed.

The PBS 431 may be configured, needless to say to have a light separation face in the liquid as shown in FIG. 40.

Furthermore, while the display panel is described to be of the transmission type in the embodiment of FIG. 43, the present invention is not limited to this type but it may be a display panel of reflection type. In this case, the pixel electrode 101 may be formed on the reflection electrode by using a metal such as aluminum. The projection type display apparatus can be configured by adding s slight design modification to the configuration of FIG. 34 (for example a configuration wherein prism 342 is replaced by PBS 431 and two display panels is employed in FIG. 34).

In addition, the color filter is described to have three primary colors of R, G and B, but the present invention is not limited to this description but it may be a filter with two colors, and further, it may be a filter without B color. The present invention obtains the effect of improving resolution, reducing flickers and improving the screen luminance by projecting with two images being overlapped. This effect is not affected by the presence of the filter.

Figure 49:
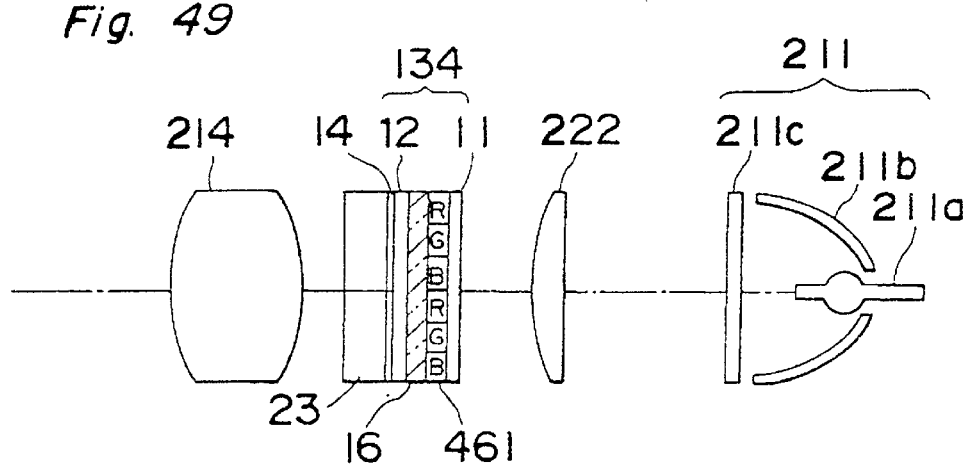
FIG. 49 is a view showing the configuration of a projection type display apparatus wherein a color image is displayed on one sheet of display panel.
Figure 50:
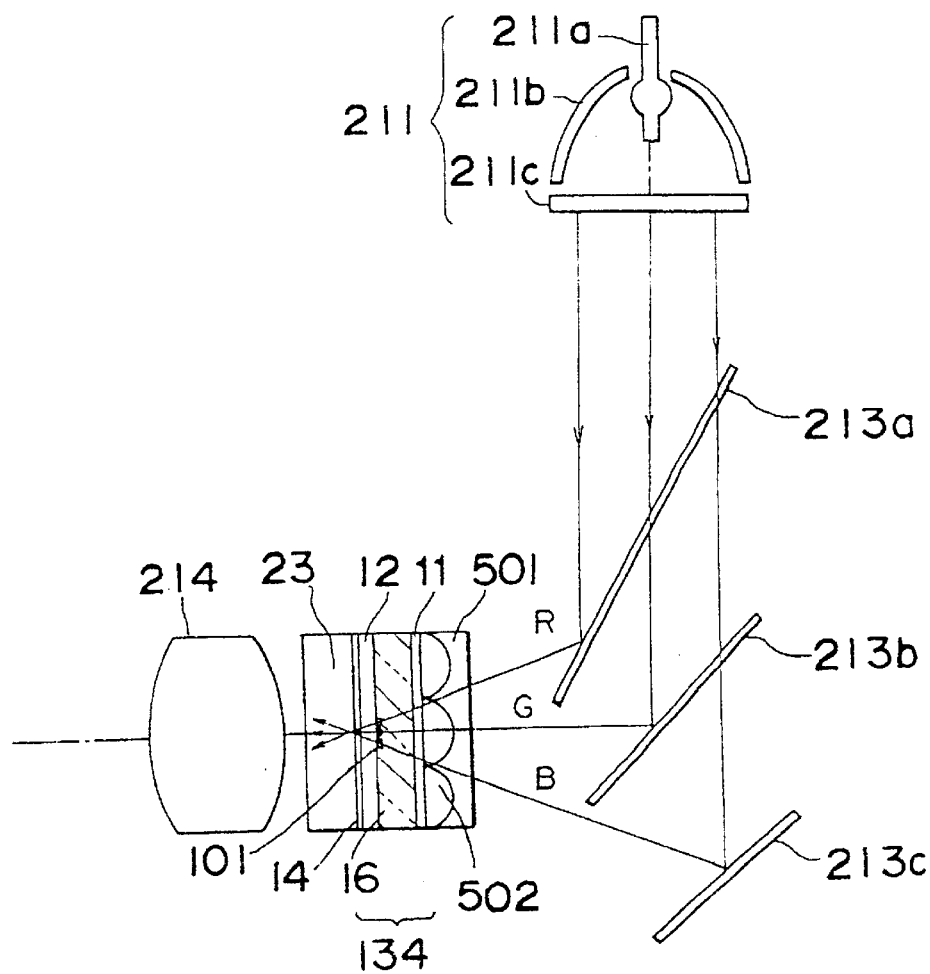
FIG. 50 is a view showing the configuration of a projection-type display apparatus wherein a color image is displayed on one sheet of display panel.

In order to realize color display by employing one display panel of the present invention, the display panel may be configured as shown in FIGS. 49 and 50. Shown in FIG. 49 is a configuration provided with a color filter. Shown in FIG. 50 is a configuration for realizing the full-color display without a color filter provided. The description on FIG. 49 will not necessary from FIG. 49 itself and the previous description. Therefore, FIG. 50 is described below.

In FIG. 50, a micro-lens array 501 is applied to the confronting substrate 11 of the display panel 134. On the micro-lens array 501, micro-lenses 502 are formed in a shape of matrix. On the array substrate 12 side of the display panel 134, a reflected light absorbing plate 23 is bonded via a light coupling layer 14.

The white light radiated from a lamp 211a is separated into three primary color light of R, G and B by dichroic mirrors 213. In other words, by the dichroic mirror 231a, R light is reflected and by the dichroic mirror 213b, G light is reflected and by the dichroic mirror 213c, B light is reflected and all light are incident on the display panel 134.

On the display panel 314, micro-lenses are disposed at positions corresponding to respective pixel electrode 101. Said micro-lens 502 condenses light of three primary colors to a specified pixels of the display panel 134 to form an image. Light having passed each pixel is incident on the projection lens 214 and projected on the screen. The reflected light absorbing plate 23 has the function of preventing the occurrence of the secondary diffused light as described by using FIG. 1.

When configured as described above, the light utilization efficiency is improved and a high luminance display can be realized. In addition, the PD display panel is required to separate liquid crystal component and polymer component in phase by irradiating UV rays at the time of manufacture. When a color filter 461 is formed on the display panel at this time, said color filter does not transmit UV rays and it is difficult to find out the condition for the separation in phase. If configured as shown in FIG. 50, the color filter is not formed and the manufacture of the PD display panel becomes easy. Also, the cost reduction can be expected by the cost occupied by the color filter to be eliminated.

In order to realize the color display by using one projection type display panel, needless to say, it is sufficient to take out an optical system for modulating light of one color of R, G and B colors in FIG. 25 and employ a display panel formed by providing a color filter 461 on the projection type display panel of the present invention shown in FIG. 27.

Next, a method for improving display contrast while maintaining a high luminance display is described. FIG. 51 shows a first embodiment for realizing said method. The projection lens 214 is composed of a front lens group 511*a* and the rear lens group 511*b*. The output section condensing lens 517 and the rear projection lens group 511*b* are set in the conjugating relation with respect to the stop 516 and stop 518.

Figure 52:
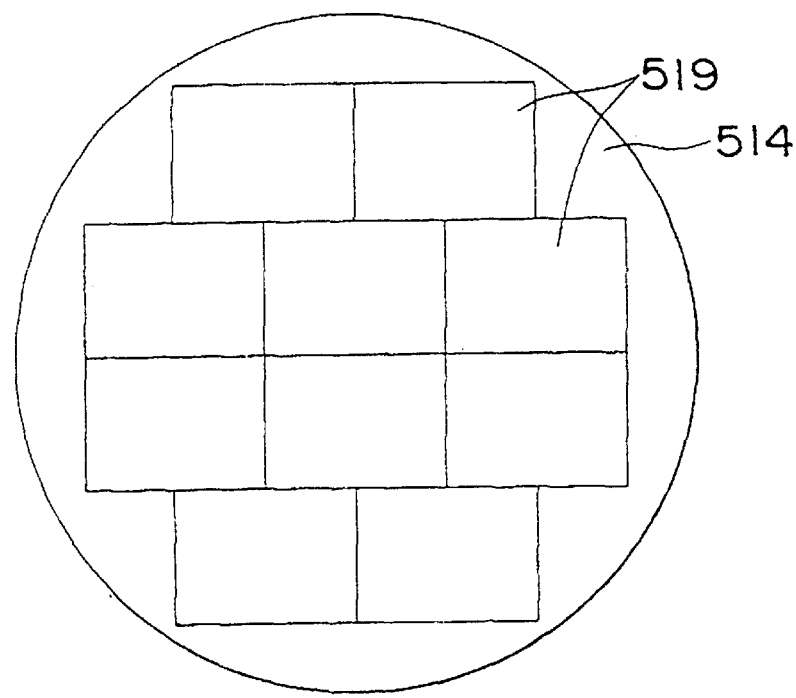
FIG. 52 is an explanatory view of the optical components of the projection type display apparatus shown in FIG. 51.

The input section condensing lens array 514 is constituted by arranging plural input section condensing lenses 519 in the two-dimensional manner. FIG. 52 shows its configuration. Ten pieces of input section condensing lenses 519 having a rectangular aperture are arranged so as to internally contact with an area of a perfect circular shape. Each of ten input section condensing lenses 519 is a plan-convex lens of the same aperture shape. The aspect ration of the rectangular aperture is set at 4:3.

Similarly, the central section condensing lens array 515 is constituted by arranging plural central section condensing lenses 520 in the two-dimensional manner. Central section condensing lenses 520 the same s the input section condensing lenses 519 in piece number and in the aperture shape are arranged in the same manner as with the input section lens array 514.

The procedure of illumination in the projection type display apparatus is described below. The light radiated from the light emitting body of the metal halide lamp 211*a* is reflected by the parabolic mirror 211*b* and proceeds generally in parallel with the optical axis 524 and is incident on the input section condensing lens array 514. Because the sectional shape of the flux of light reflected from the parabolic mirror 211*b* is in a regular circle, the input section lens array 514 is formed so that the total sum of the apertures of the input section condensing lenses 519 is internally in contact with said regular circle. The light flux having passed the input section condensing lens array 514 is divided into the same number of light fluxes as that of the input section condensing lens array 514, and each partial light flux illuminates the display area of the PD display panel 134.

Figure 57:
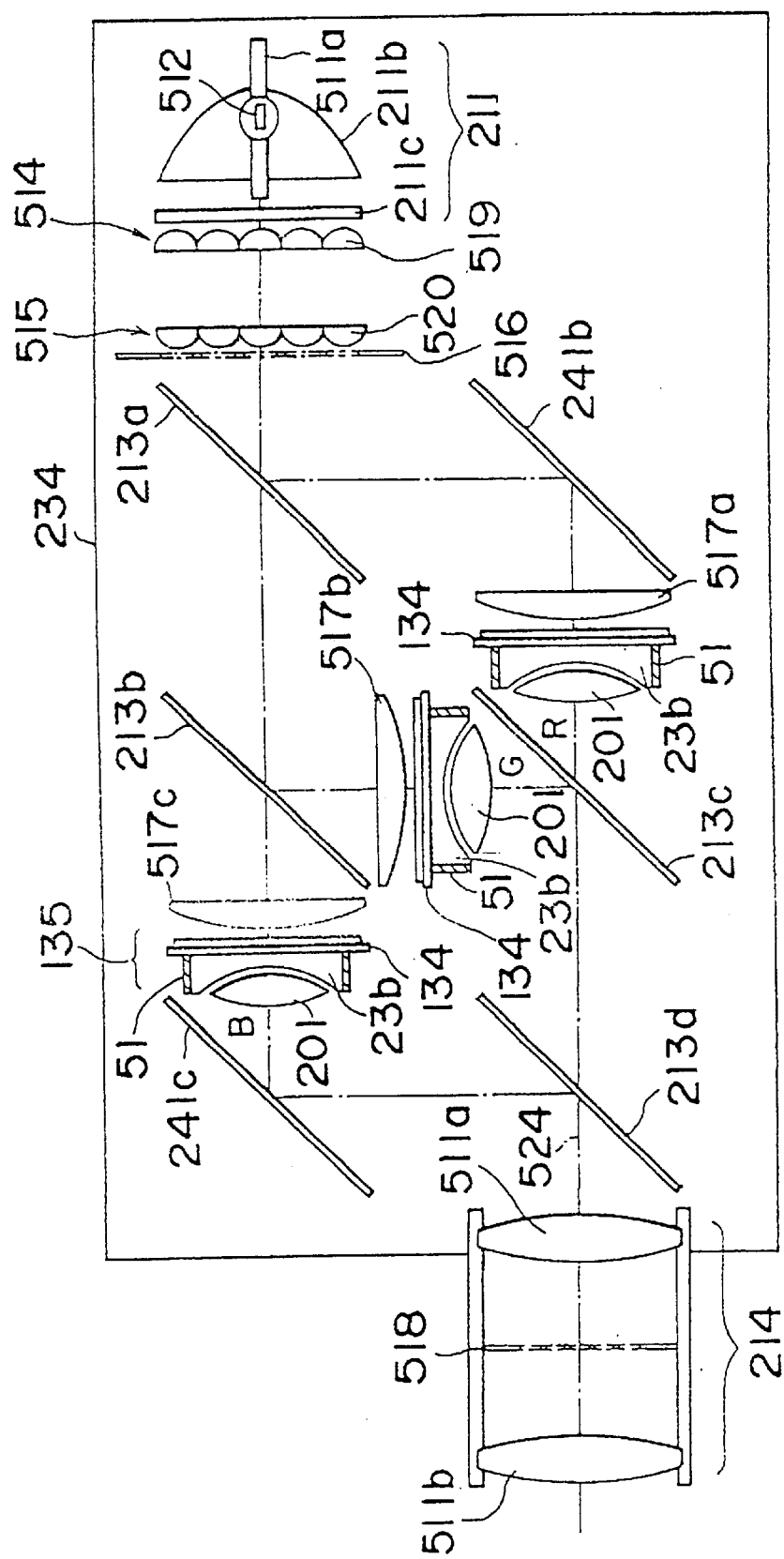
FIG. 57 is a view showing the configuration of a projection type display apparatus adapted to display in colors with the basic configuration shown in FIG. 51.

In the projection type display apparatus using the lens array 514 as shown in FIGS. 51 and 57, since a preferable display contrast and high luminance display can be realized with an effective diagonal of more than 2 inches and less than 4.5 inches of the display panel, therefore the arc length of the lamp should be made more than 2.5 mm and less than 6 mm, and in particular the arc length is preferable in the range of 3 to 5 mm. In addition, the F number of the projection lens 214 should be more than 6 and less than 10, preferably more than 7 and less than 9, which is very important matter.

Figure 53:
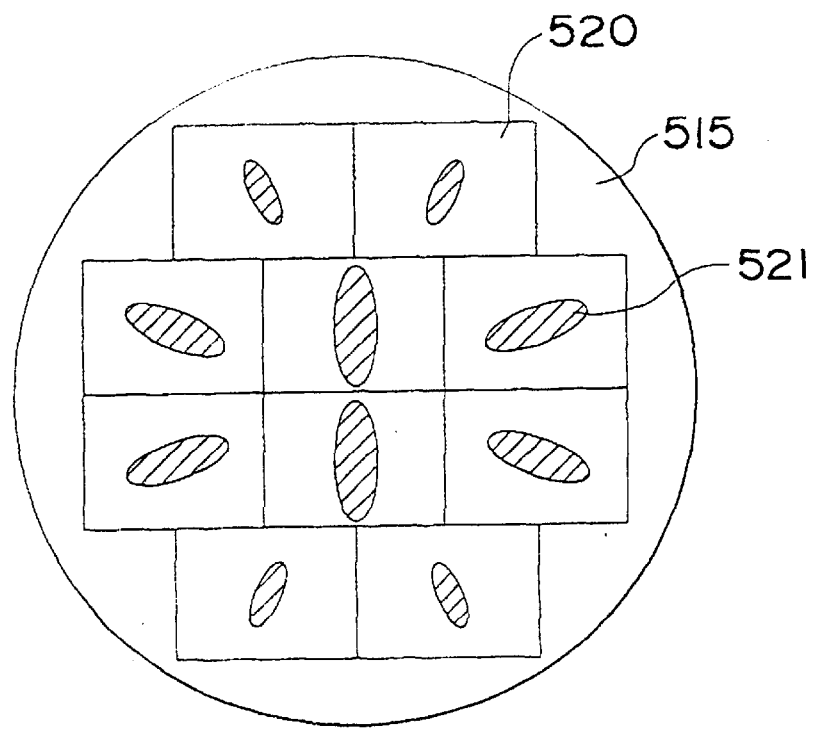
FIG. 53 is an explanatory view of the optical components of the projection type display apparatus shown in FIG. 51.

Each light having passed the input section condensing lens array 514 is guided to the aperture of corresponding central section condensing lens 520 to be condensed thereon. On each aperture of the central section condensing lens 520, a secondary light emitting body, for example, 521*a*, 521*b* is formed. One example of plural secondary light emitting bodies formed on the central section condensing lens array 515 is schematically shown in FIG. 53. Each central section condensing lens 520 effectively transmits the corresponding light to the display area of the PD display panel 134. Concretely, the solid image 513 of the objects on the main plane of the corresponding input section condensing lens 519, for example, 522*a*, 522*b* is formed in the vicinity of the display area of the PD display panel. But, each central section condensing lens 520 is properly offset to form a solid image 513 by superimposing plural images.

With the above-described configuration,the display area of the PD display panel and each aperture of the input section condensing lens 519 are brought into a generally conjugating relation. Therefore, if the aperture of the input section condensing lens 519 is formed in a similar shape to the display area of the PD display panel, the sectional shape of the illumination light flux is made in to agreement with the shape of the display area and thus, the light loss can be suppressed. Therefore, the input section condensing lens array 514 shown in FIG. 52 may be employed in combination with the PD display panel 134 displaying images of the aspect ratio corresponding to NTSC, 4:3.

Generally, there is a comparatively large luminance fringe in the light flux emitted rom the concave mirror such as parabolic mirror. If the light flux having a large luminance fringe is transmitted as it is to illuminate the display panel, the uniformity of the luminance of the display image is lowered. If only the area having comparatively uniform luminance is employed for illumination, because the light flux not utilized is increased, the light utilization efficiency is lowered. In contrast therewith, the projection type display apparatus according to the present invention has an advantage that highlight utilization efficiency and a projection image excellent in the uniformity of luminance can be obtained. The reason is described below.

The input section condensing lens array 514 divides a light flux having a comparatively large luminance fringe into plural partial light fluxes. The luminance fringe of each partial light flux on the aperture of the corresponding input section condensing lens 519 is smaller as compared with the luminance fringes of the light flux before said division. Each central section condensing lens 515 enlarges the partial light flux having a smaller luminance fringe into a proper size and superimposes on the display area of the PD display panel 134. Therefore, illumination excellent in the uniformity in luminance can be realized.

Because the total sum of the apertures of the input section condensing lenses 519 is formed so as to be internally in contact with the sectional area of the light flux, the light loss in the input section condensing lens array 514 is small. In addition, since each aperture of the center section condensing lenses 520 is made sufficiently large with respect to the secondary light emitting members 521, therefore the light loss in the center section condensing lens array 515 is small. Furthermore, because the sectional shape of the light flux incident on the PD display panel is made into agreement of the shape of the display area, the light loss in the PD display panel 134 is small. Therefore, the most portion of the light flux radiated from the light emitting body 512 is reflected by the parabolic mirror 211*b* and reaches the projection lens 214 via input section condensing lens array 514, central section condensing lens array 515, output section condensing lens 517 and PD display panel 134. Therefore, by suppressing the light loss in the projection lens 214, a high light utilization efficiency is realized, and a bright projected image excellent in the luminance uniformity can be obtained.

By the way, because plural secondary light emitting bodies 521 is dispersedly formed on the central section condensing lens array 515, the effective F number of illumination light flux in this case is required to be determined from the irradiation angle equivalently calculated from the total sum of the areas of the secondary light emitting bodies 521. On the other hand, the condensing angle of the light emitted from the PD display panel at the largest angle from the optical axis 524 is an angle larger than this equivalent angle. Therefore, in order to suppress the light loss, it is necessary to set the effective F number of the projection lens 214 to be smaller than the substantial effective F number of the illumination light. This has a problem because the contrast of the projected image is lowered in the case of the PD display panel.

Figure 54:
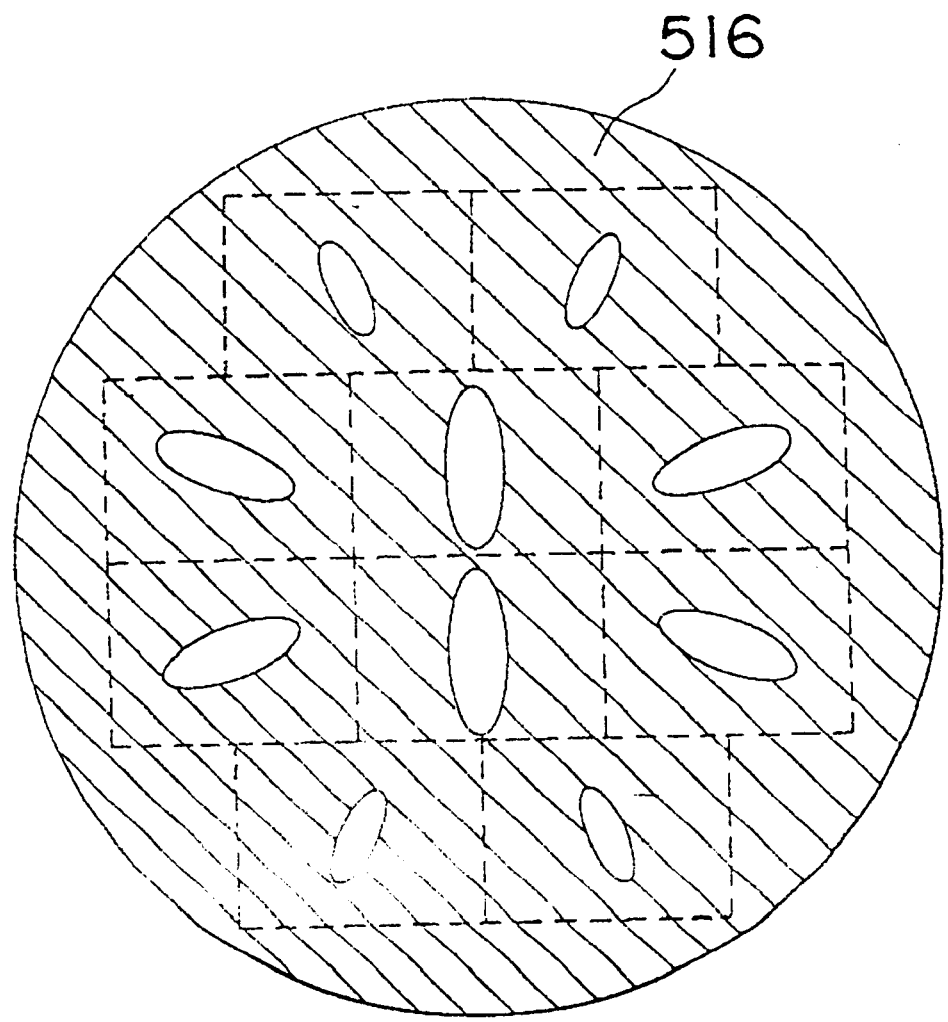
FIG. 54 is an explanatory view of the optical components of the projection type display apparatus shown in FIG. 51.

In contrast with this, the projection type display apparatus of the present invention is able to set the openings on the illumination light side and the projection lens side at the smallest required size by the functions of the stops 516 and 518, the fall in the contrast can be suppressed. Concretely, the opening of the stop 516 on the illumination light side is formed as shown in FIG. 54 in accordance with the effective areas of the secondary light emitting bodies formed dispersedly. The dotted line corresponds to each aperture of the central section condensing lens 520. The broken lines in FIG. 54 correspond to each aperture of the center section condensing lenses 520 of FIG. 53. Furthermore, because the solid image is formed on each opening of the stop 518 on the projection lens side, the shape of the opening of the stop 518 is made the same with that of the stop 516. With this configuration, because the light having passed the stop 516 passes the stop 518, a high light utilization efficiency can be realized. As a result, a bright and high quality projected image can be provided, and a great effect can be obtained.

Figure 55:
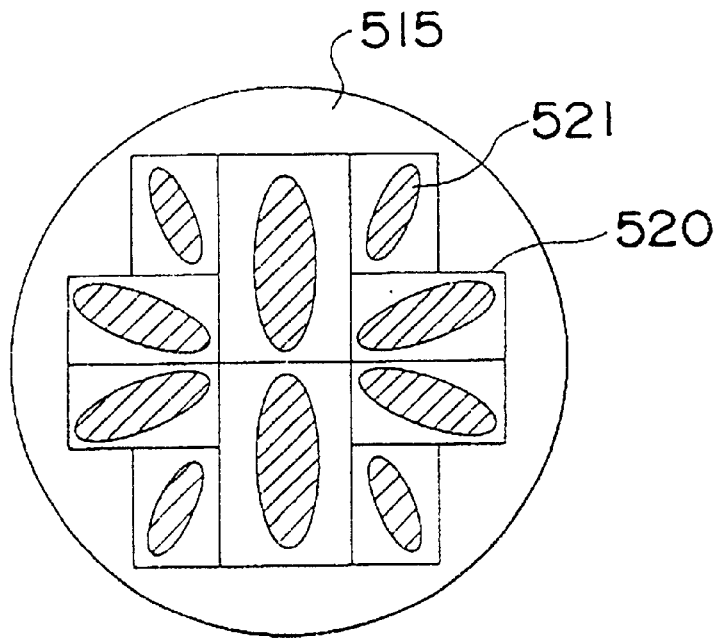
FIG. 55 is an explanatory view of the optical components of the projection type display apparatus shown in FIG. 51.

It is further desirable to form the input section condensing lens array 514, central section condensing lens array 515, stop 516 and stop 518 used in the projection type display apparatus of the present invention in the following manner. FIG. 55 shows the configuration of the central section condensing lens array 515 in this case. Generally, the size of the secondary light emitting body 521 is larger with the light emitting body formed by an input section condensing lens 519 positioned in the vicinity of the optical axis 524. Therefore, each aperture of the central section condensing lens 520 is not always required to be identical but is only required to be sufficient for each of the secondary light emitting body. If a central section condensing lens array wherein a plurality of central section condensing lens 520 with effectively varied aperture is condensedly arranged is employed, the total sum of the apertures can be advantageously reduced. The input section condensing lens array to be combined with the central section condensing lens array 515 is constituted in the same manner as shown in FIG. 54, and each of the input section condensing lenses is properly offset, and a secondary light emitting body 521 may be formed on the center of the aperture of the corresponding central section condensing lens 520.

Figure 56:
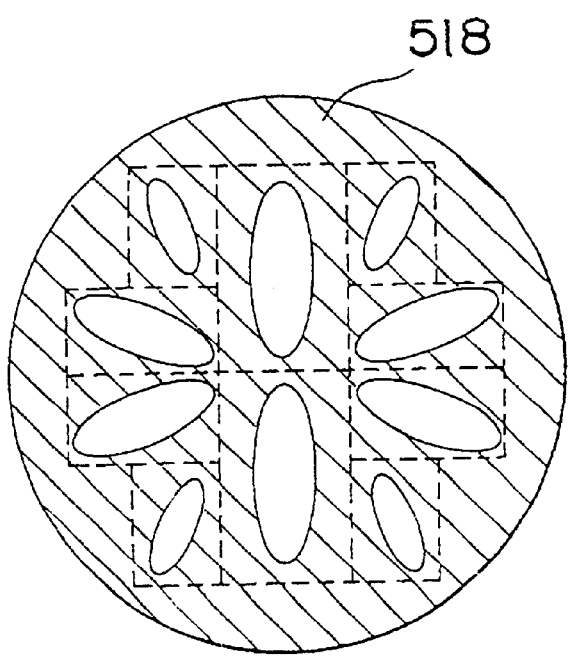
FIG. 56 is an explanatory view of the optical components of the projection type display apparatus shown in FIG. 51.

In this case, instead of the stop 516 on the illumination light side, a stop 518 having the aperture shape shown in FIG. 56 is to be used. The same applies to the stop 518 on the projection lens side. With this configuration, the aperture diameter of the central section condensing lens array can be reduced without causing the light loss and the lens diameter of the projection lens 214 can be reduced advantageously.

The projection type display apparatus of the present invention obtains a greater effect by dispersedly forming plural secondary light emitting bodies and illuminating the light valve 135 as described above. Even when a projection lens having a large largest light condensing angle is employed, because the stop dispersedly provided with plural apertures is provided, the smallest necessary opening can be provided to the light emitted from the light valve 135. As a result, a bright and high contrast projected image can be obtained.

The transparent substrate 24 is attached to the light outgoing face of the display panel 134 via the optical coupling layer 14. Alternatively, the substrate 11 or 12 of the display panel is made sufficiently thick. Preferably, assuming that the distance from the light modulation layer 16 to the light outgoing end of the transparent substrate is t, the effective diagonal of the display panel is d, and that refractive index of the transparent substrate 24 is n, the structure is so arranged as to satisfy the relation of equation (6), and further preferably satisfy the equation (3). The transparent substrate effectively suppresses the secondary diffusion light from taking place due to the scattered light diffused by the liquid crystal layer 16. In the projection type display apparatus having the lens arrays 514 and 515, since considerably intensive light is applied up to the peripheral portion of the display apparatus 135 to generate secondary diffusion light with high rate, therefore this effect of the transparent substrate is great.

In addition, it is needless to say that a concave lens nay be provided instead of the transparent substrate 24. This is already described with reference to FIG. 15, and explanation thereof is omitted here. Also, the reflection light absorbing plate 23 can be employed instead of the transparent substrate 24. In other words, by using the display apparatus of the present invention as shown in FIGS. 1, 15, 18 and 20 as a light valve for use in the projection type display apparatus, halation and secondary diffusion light can be effectively prevented from taking place.

Furthermore, by installing a mosaic-shaped color filter on the PD display panel, a colored image can be displayed with one display panel.

FIG. 57 shows a configuration of the projection type display apparatus performing a full-color display by using three display panels as an improvement of the projection type display apparatus shown in FIG. 51. With respect to the following embodiments, description is made primarily centering on the difference from the first embodiment. Three display panels corresponding to three primary color light are employed therein. Parabolic mirror 211*b*, input section condensing lens array 514, central section condensing lens array 515, and output section condensing lens 517 are the same as those shown in FIG. 51, and in the same procedure as shown in FIG. 51, respective display areas of the PD display panels 134*a*, 134*b* and 134*c* are illuminated. However, by the action of dichroic mirrors 213*a* and 213*b* and a planar mirror 214*b*, the illumination light are divided into three primary color light and guided to the display areas of respective corresponding display panels.

The PD display panel 134 is formed on its display area with an optical image corresponding to three primary colors in accordance with image signals supplied from the external area. The projection lens 214 is composed of the front lens group 214*a* and the rear lens group 214*b*, and magnifies and projects optical images of three primary colors on the screen. Those light emitted from the PD display panels 134 are synthesized into one light path by the action of dichroic mirrors 213*c* and 213*d* and a plane mirror 241*a*, and thus, a full-colored image can be obtained.

The stop 516 on the illumination light side and the stop 518 on the projection lens side are the same as those shown in FIG. 51 and employed for the same purposes. The output section condensing lens 517 and the rear lens group 511*b* are properly adapted so that the stop 516 and the stop 518 is brought into conjugating relation between each other.

On the emission side of the PD display panel 314, a plan-concave lens shaped reflected light absorbing plate 23 is coupled thereto with its concave face being directed towards the emission side by using a transparent bonding agent, with black paint 51 being applied to the side face of said plate 23 and a reflection preventing film 141 being vapor-deposited on said concave face. The reflection prevention film is made of acrylic resin by molding. Molding is good in mass productivity because it is able to make the same lens with a molding die.

On the emission side of the reflected light absorbing plate 23, a positive lens 201 is arranged close thereto. The radius of curvature of said positive lens 501 is equal to that of the convex surface of the reflected light absorbing plate 23. Between said concave face and the convex face of the positive lens 201, a thin air gap is provide. On both faces of the positive lens 201, a reflection preventing film 141 is vapor-deposited as in the case of the plan-concave lens. The projection lens 214 is adapted under the state where the reflected light absorbing plate 23 and the positive lens 201 is combined so that the optical image on the liquid crystal layer 16 is focused on the screen. The focus adjustment of the projected image is effected by moving the projection lens along the optical axis 524. Furthermore, in the design thereof, MTF described in FIG. 4 should be considered.

In addition, in the case where the transparent substrate 24 as shown in FIG. 51 is used instead of the light absorbing plate 23, it is not necessary to consider MTF because MTF is not caused.

In the PD display panel 134, the incident angle dependency of the optical characteristic is not so strong as that of Tn display panel, but in the case of a too large angle, because the light path length passing through the liquid crystal layer becomes large, the diffusion characteristic is changed. Namely, if the incident angle of the light incident on the liquid crystal layer is different depending on positions, the image quality of the projected image becomes non-uniform.

On the other hand, in order to reduce the radius of curvature of the concave face of the reflected light absorbing plate 23, it becomes necessary to make a light flux of a large condensing angle incident on the PD display panel 134 or to increase the effective radius of the projection lens 214. The former makes the image quality of the projected image non-uniform because the image quality is not uniform with the positions on the PD display panel, and the latter has a problem that the projection lens 214 is enlarged in size, resulting in the cost increase. In the case where the incident angle dependency of the diffusion characteristic of the PD display pane 134 is considerably large, by combining the concave lens 23 and the positive lens 201 as shown in FIG. 57, generally parallel light can be made incident on the PD display panel 134 without enlarging the projection lens 214 and therefore, it is easy to secure the uniformity in image quality of the projected image.

While FIGS. 51 and 57 show a configuration wherein a transmission type display panel is employed as a light valve, the technical concept of improving the display contrast with the stop 516 and so on is applicable to the reflection type projection display apparatus.

Figure 58:
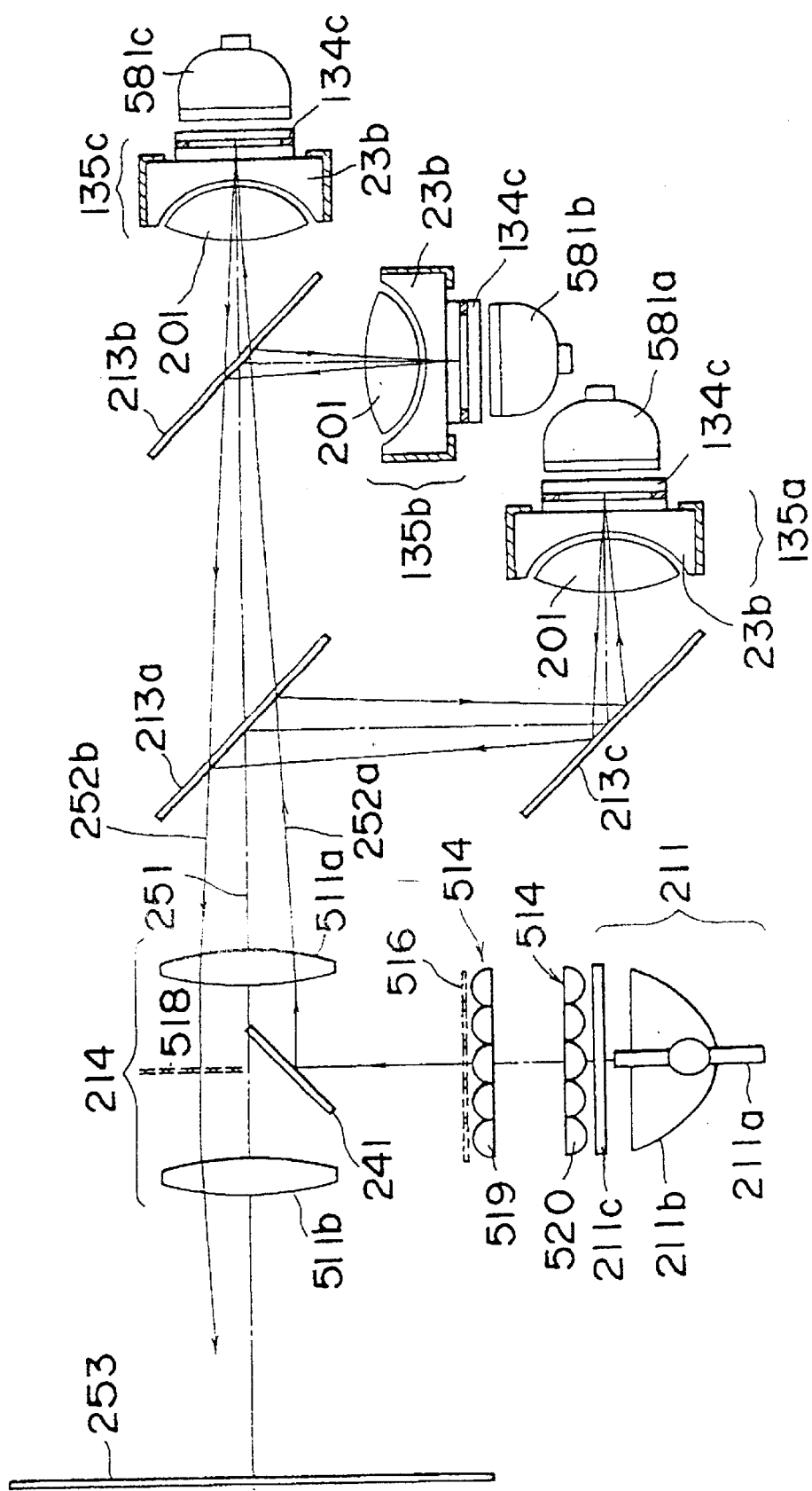
FIG. 58 is a view showing the configuration of a projection type display apparatus employing an optical write-in type display panel as a light valve.

FIG. 58 is an embodiment wherein the configuration shown in FIG. 51 is applied to the configuration shown in FIG. 25. In FIG. 58, the reflected light absorbing plate 23 is not limited to that of a concave lens shape. But may be of a plate shape as shown in FIG. 1.

In the reflection type projection display apparatus, a stop 518 id provided at the upper position of the projection lens 214, because the lower position is for the light path of the incident light. Configuration of other components being the same as those described in FIGS. 25 and 51, the description thereof is omitted.

FIG. 58 shows an example wherein an optical write-in type display panel is employed as a light valve. As said optical write-in type display panel, there is a display panel disclosed in the Japanese Patent Unexamined Laid-Open No. 93519/1990. The optical write-in type display panel is so configured that PD liquid crystals are filled between the substrate with a substrate electrode, light exciting layer, light shielding film, dielectric mirror laminated thereon in this order and the substrate formed with a confronting electrode. On the display panel 134, the image of CRT 581 is transferred and said transferred image is magnified and projected.

Figure 59:
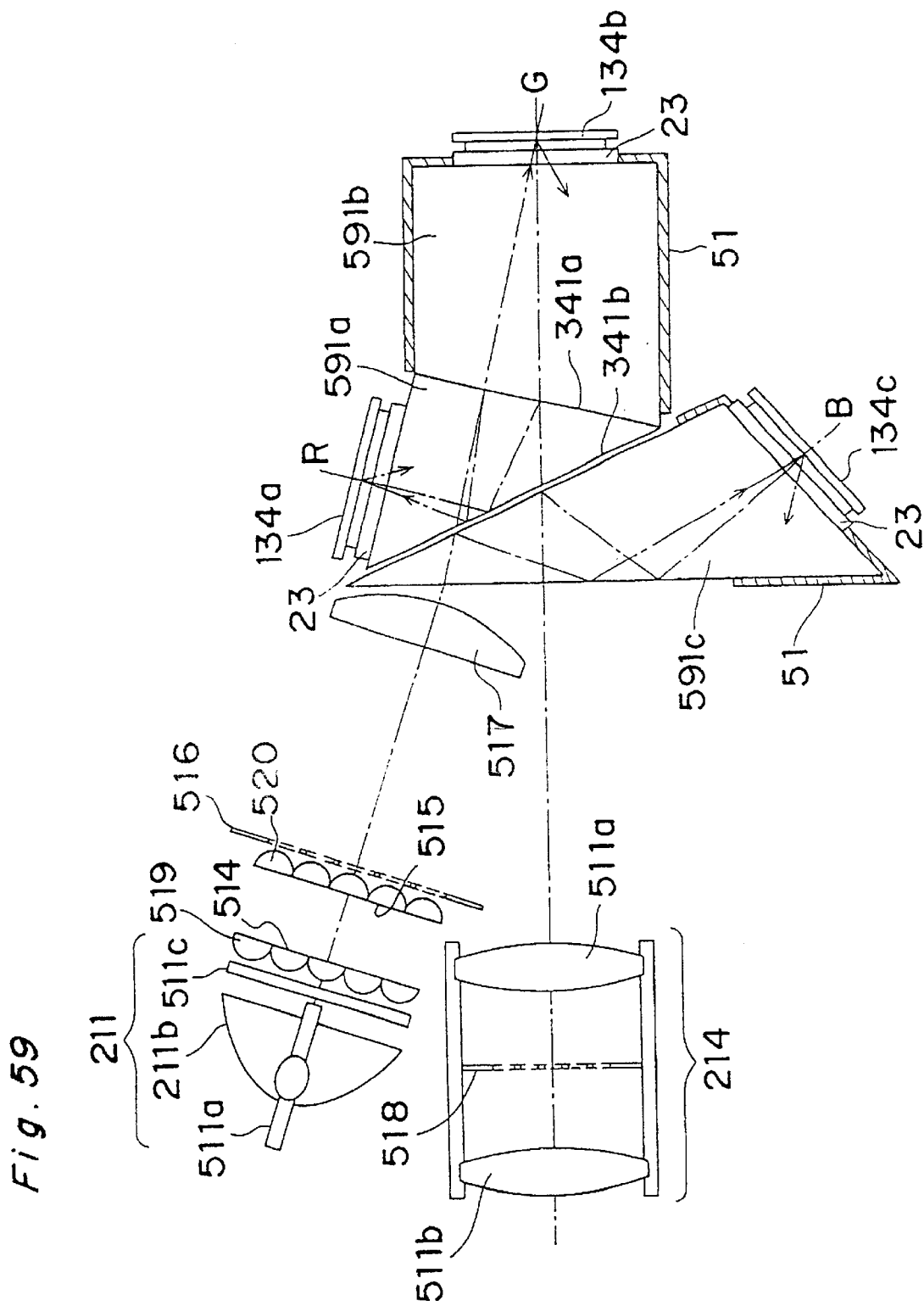
FIG. 59 is a view showing the configuration of a projection type display apparatus employing a prism.

FIG. 58 shows a configuration using dichroic mirrors 213 on the color separation and synthesis optical system, and FIG. 59 shows a configuration using a prism 591. The configuration of the prism 591 in FIG. 59 is adopted in the CCD section of the business use video camera and this belonging to the invention of Philips Co, no description thereof will be required. It is a configuration wherein on the three prism 591, display panels 134 and reflected light absorbing plates 23 are respectively arranged. It is preferable to apply the reflected light absorbing plate 23 to the prism 591 with a light coupling layer 14 because halation reflected by the plate 23 and so on can be prevented. In addition, the reflection light absorbing plate 23 can be replaced by the transparent substrate 24.

While PD liquid crystals are described to be employed as the light modulating layer 16, besides, a member forming an optical image as a change in the light diffusion state may be employed. For example, PN liquid crystals, dynamic scatter mode (DSM), PLZT and so on may be used.

Figure 71:
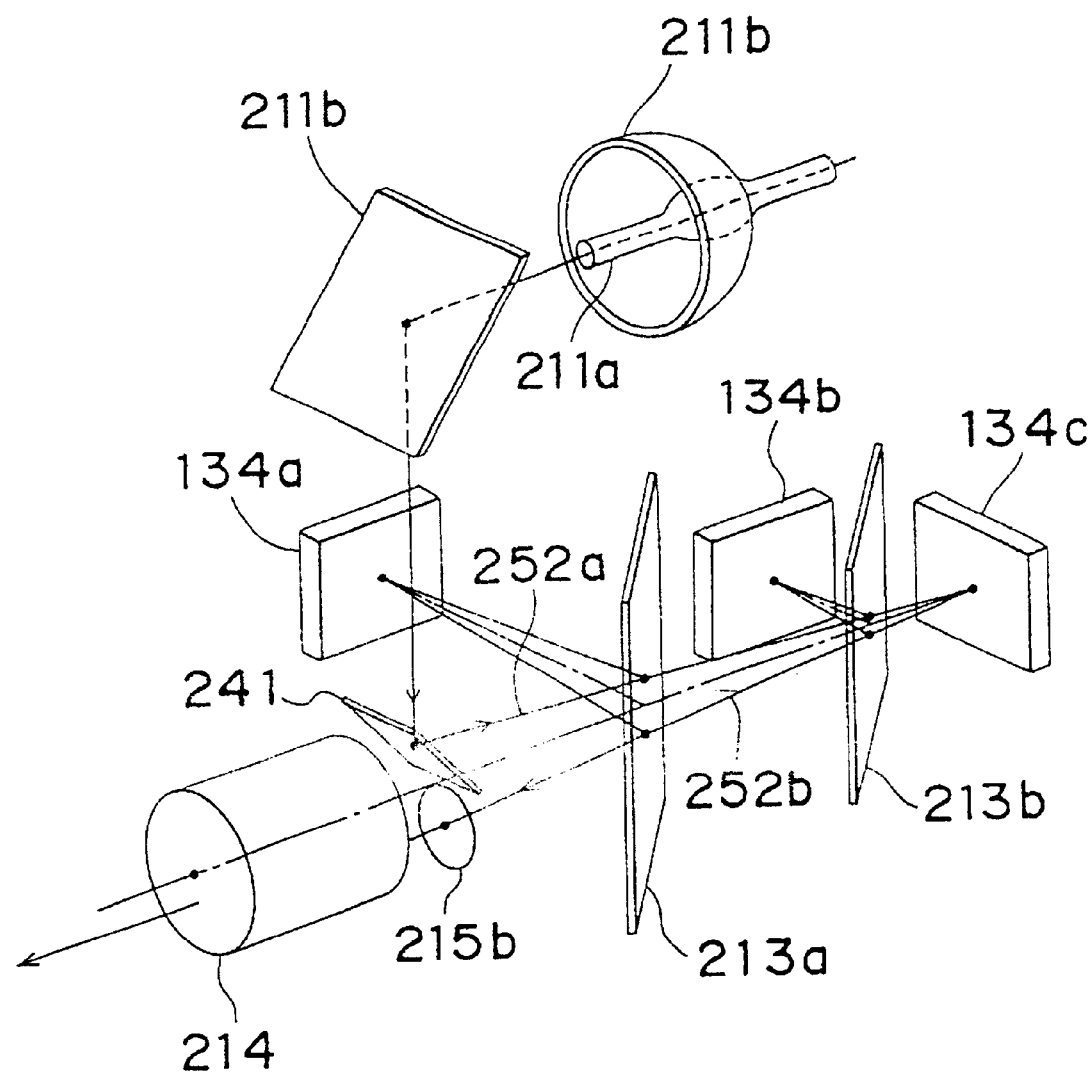
FIG. 71 is a perspective view of a reflection type display apparatus according to the present invention.

In the reflection type projection display apparatus (FIG. 25, FIG. 26, FIG. 34, FIG. 58, FIG. 59), it is necessary to pay attention to the incident direction and outgoing direction of the light incident on the light separation face. Concretely, FIG. 25 is required to be configured as shown in FIG. 71. FIGS. 25 and 26 are only to facilitate the illustration and the explanation thereof. The reason why the illustration is to be made as shown in FIG. 71 is described below.

In the case of the configuration shown in FIG 25, the optical axis 252a of the illumination light irradiated on the display panel 134 by the light emitted from the light source 211 and the optical axis 252b of the light reflected by the display panel 134 and reaching the screen 253 via the projection lens 214 have different incident angles with respect to the dichroic mirror 213. The dichroic mirror generally has a dielectric multilayered vapor -deposited on the transparent substrate and is employed to transmit or reflect a specified wavelength band of light. The dichroic mirror of this kind has the characteristic that the spectroscopic performance varies depending on the incident angle of light, and in the case where the light axis 252a and the light axis 252b are incident at different angles, spectroscopic characteristic for separating color and spectroscopic characteristic for synthesizing color are different from each other, and therefore, it is difficult to obtain a projected image of a desired color purity.

In the configuration of the projection type display apparatus shown in FIG. 71, the optical axis 252a of the illumination light and the optical axis 252b of the light reflected by the display panel and projected by the projection lens 214 can be made symmetric with respect to the plane including the central normal of the display panel and the central normal of the light separation face of the dichroic mirror. Therefore, the spectroscopic performance after color separation and the spectroscopic performance after color synthesis become coincident with each other and the projected image is able to obtain a desire color purity.

As is clear from the above-described advantage of the projection type display apparatus of FIG. 71, the color purity in the case of using the reflection type display panel utilizing natural light is good and the display of the projected image excellent in the color purity and in the color uniformity can be easily realized.

The dichroic mirrors 213a and 213b are formed by vapor-depositing a dielectric multi-layered film alternately laminated with a low refraction index layer and a high refraction index layer on the glass substrate, and the color separation and synthesis faces (color separation face 341) are arranged at an angle of 45° wit respect to the light modulating layers 16 of the display panels 134a, 134b and 134c.

The light emitted from the lamp 211a is sequentially incident on the dichroic mirrors 213a and 213b via a cold mirror 211b and a mirror 241. The light incident on the dichroic mirrors 213a and 213b is separated into three light of three primary colors R, G and B and respectively incident on the corresponding display panels 134a, 134b and 134c, and the reflected light thereof is gain incident on the dichroic mirrors 213a and 213b. Three primary color light of R, G and B are synthesized by the dichroic mirrors 213a, and 213b, and after passing the stop of the aperture, is magnified and projected on the screen (not shown) by the projection lens 214.

Among the lights incident on the display panels 134a, 134b and 134c, the light incident on the pixel in the scattered state and reflected as diffused light is mostly shielded by the aperture stop of the projection lens 214 or the inner wall of the lens barrel thereof and displayed in black. On the other hand, the light incident on a pixel not in the scattered state, reflected positively and proceeding straight passes through stop of the aperture of the projection lens 214 and the lens groups constituting the projection lens 214 and reaches the screen as a white display. In this manner, optical images modulated on the display panels 134a, 134b and 134c as a scattered mode or non-scattered mode are displayed as projected images on the screen.

Figure 72A:
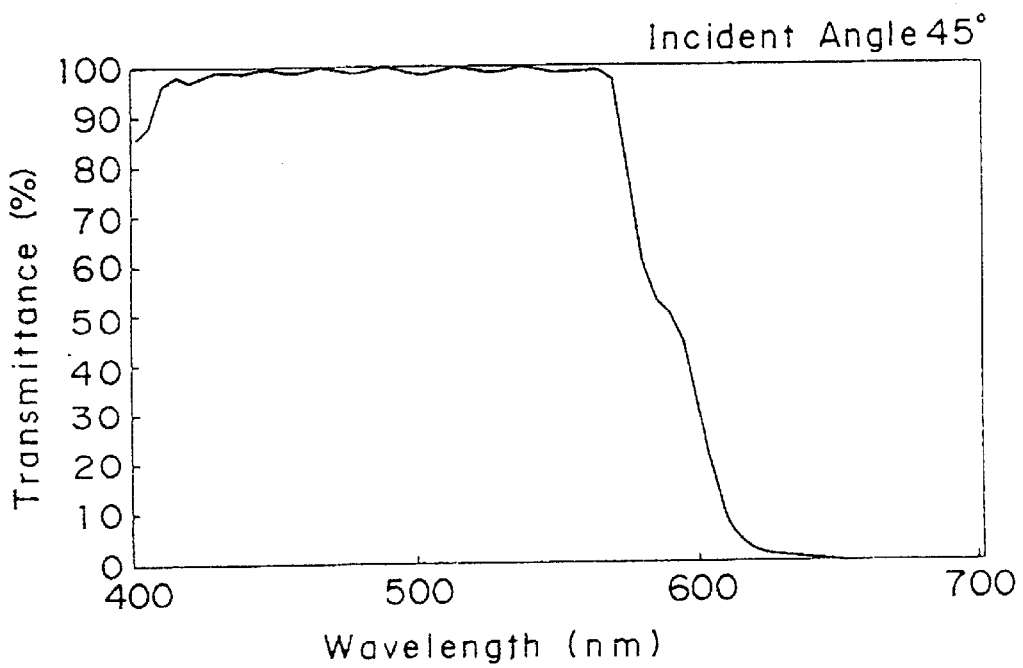
FIGS. 72A and 72B are spectroscopic characteristic diagrams of a dichroic mirror.
Figure 72B:
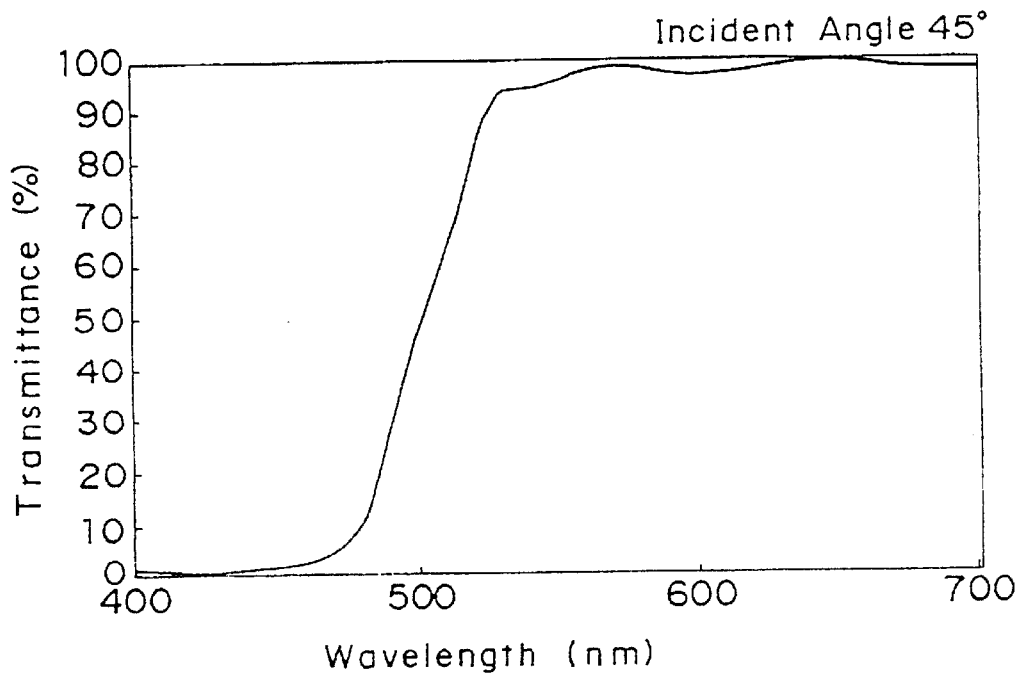

In the configuration shown in FIG. 71, because the plane including the optical axis 252a of the illumination light emitted from the light source 211 and the optical axis 252b of the projected light reflected by the display panel 134 is arranged normal to the plane including the central normals of the dichroic mirrors 213a and 213b, the plane including the optical axes 252a and 252b forms an angle of 450 with the color separation color synthesis faces of dichroic mirrors 213a and 213b. As a result, both the illumination light and the projected light can be made incident on the dichroic mirrors 213a and 213b at the same incident angle of 45°. The spectroscopic transmittance of the dichroic mirrors 213a and 213b is shown in FIGS. 72A and 72B. FIG. 72A shows the spectroscopic transmittance in the case where the light incidence angle on the dichroic mirror 213a is 45°, and the dichroic mirror is of a type of reflecting R light and transmitting G light and B light, while FIG. 72B shows the spectroscopic transmittance in the case where the light incidence angle on the dichroic mirror 213b is 45° and said dichroic mirror is of a type of reflecting B light and transmitting G light.

According to the present embodiment, because the spectroscopic performance after color separation and the spectroscopic performance after color synthesis coincide with each other the spectroscopic performance shown in FIGS. 72A and 72B ca be reflected in the projected image as it is.

Figure 73A:
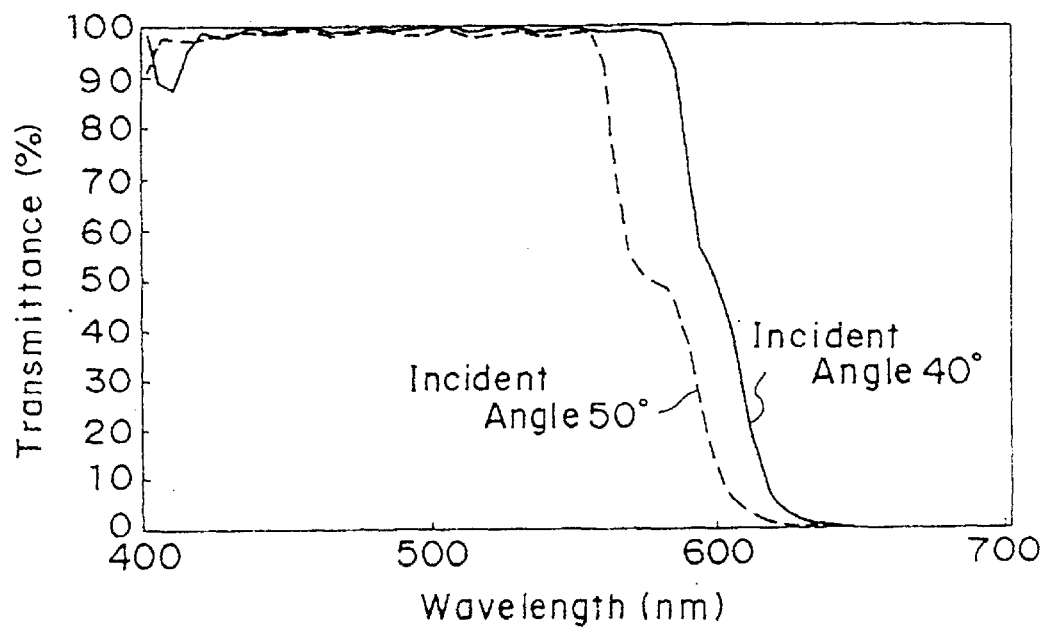
FIGS. 73A and 73B are spectroscopic characteristic diagrams of a dichroic mirror.
Figure 73B:
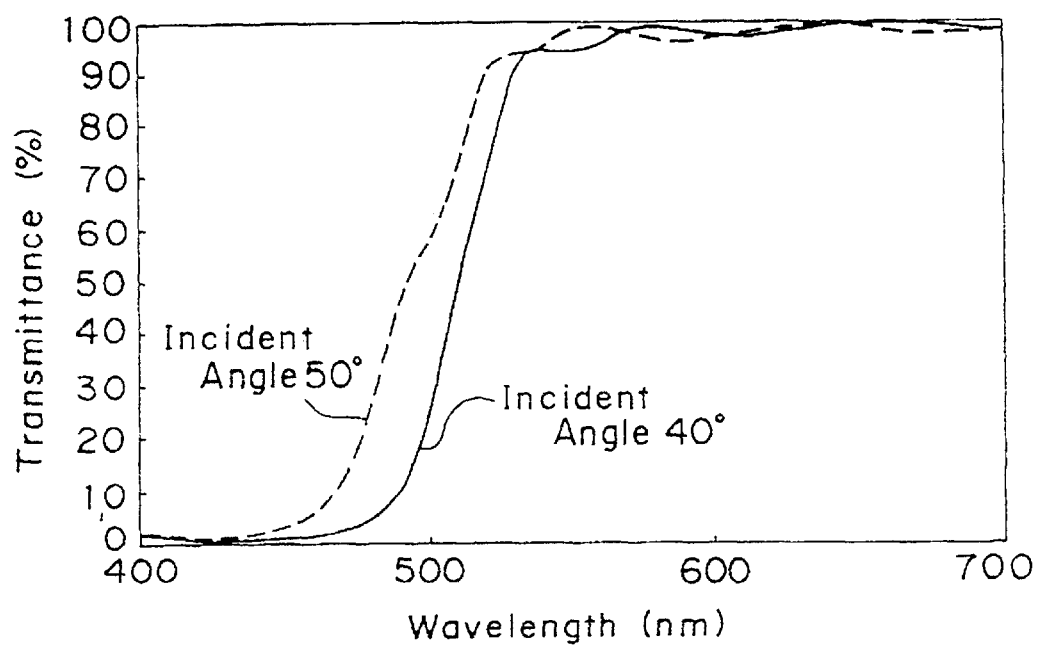

For comparison, the case where the projection type display apparatus is constituted as shown in FIG. 25 by employing the same dichroic mirrors as those shown in the embodiment of FIG. 71 is described. If the optical axis 252a of the illumination light is adapted to be incident on the display panels 134a, 134b and 134c respectively at an angle of 5°, the optical axis 252a of the illumination light and the optical axis 252b of the projected light forms an angle of 10°, and the incident angles of the illumination light on the dichroic mirrors 213a, and 213b are respectively 40°, and the incident angles of the projected light on the dichroic mirrors 213a and 213b are respectively 500. The spectroscopic transmittance in the case of 0° incidence angle and 50° incidence angle is shown in FIGS. 73A and 73B. FIG. 73A shows the spectroscopic transmittance of the dichroic mirror 213a, while FIG. 73B shows the spectroscopic transmittance of the dichroic mirror 213b, and the solid lines in these figures show the spectroscopic transmittance in the case of 40° incidence angle and the dotted lines show that in the case of 50° incidence angle. It is found from FIGS, 73A and 73B that the spectroscopic performance of the illumination light and that of the projected light differ greatly from each other due to wavelength shift arising from the incidence angle dependency and it is difficult to obtain a desired color purity without lowering the light utilization efficiency.

Similarly, the technical concept of considering the incidence angles of the illumination light and the projected light on the dichroic mirror 213 can be as it is applicable to FIGS. 26 and 58, and needless to say, it is similarly applicable even when the dichroic mirror 213 is replaced by the dichroic prism 591 as shown in FIGS. 34 and 59.

If the display panel of FIG. 77 according to the present invention is employed as a light valve, a desired color purity can be obtained without adopting the configuration of FIG. 71 (in the arrangement of FIG. 25). This method is described below with reference to FIG. 81.

FIGS. 81A to 81E show the spectroscopic distribution of light in the optical arrangement state shown in FIG. 25, wherein dotted lines show P polarized light distribution and solid lines show S polarized light distribution. However, in order to facilitate the explanation, the wavelength band areas are shown in model.

Firstly, P polarized light is defined. P polarized light is defined as the light vibrating on the plane including the normal of the plane of the dichroic mirror (in the case of the dichroic prism, the normal of the light separation face) and the proceeding direction, and S polarized light is defined as the light vibrating in the plane perpendicular to said vibrating direction of P polarized light.

It is know that the light reflected by the dichroic mirror has a wider band area in S polarized light component than that occupied by P polarized light component. On the contrary, the light transmitting the dichroic mirror has a wider band area in P polarized light component than that occupied by S polarized light.

For example, if the dichroic mirror is of a type reflecting R light, a wide wavelength band of S polarized light component od said R light is reflected and a wide wavelength band of P polarized light component of said R light is transmitted. As a result, S polarized light component of R light close to the wavelength band of G light is also reflected, and P polarized component of R light close to the wavelength band of G light is also transmitted. In other words, this means that R light can not be separated effectively by the dichroic mirror. As shown in the conventional example, this is the primary cause for the deterioration of color phase. In the TN liquid crystal display panel and so on, because light modulation is effected by using polarizing plates and only one of P polarized light and S polarized light, this will cause no problem but in the display panel not employing polarized light, this is problematic.

The light reflected from the lamp 211a is reflected by the mirror 241. The spectroscopic distribution of the light is shown in FIG. 81A. Plotted on the abscissa of each graph in FIGS. 81A to 81E is wavelength. The dichroic mirror 213a reflects R light and the spectroscopic distribution is shown in FIG. 81B. The dichroic mirror 213b reflects B light and transmits G light. The spectroscopic distribution of the reflected B light is shown in FIG. 81C and the spectroscopic distribution of the transmitted G light is shown in FIG. 81D. The dichroic mirror 213c narrows the wavelength band of R light to improve the color purity.

Figure 81:
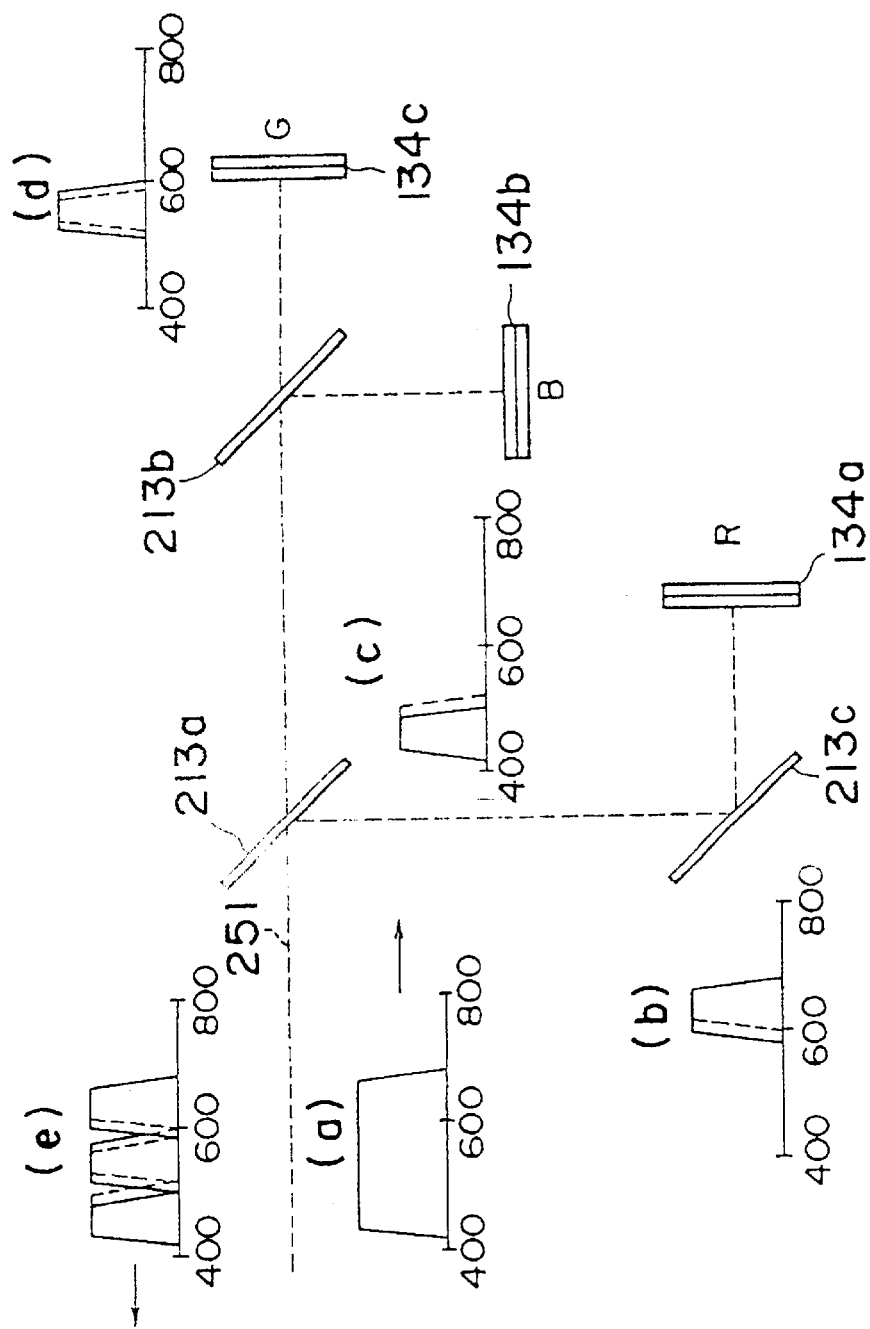
FIG. 81 is an explanatory view of a projection type display apparatus according to the present invention.

When the dichroic mirror is arranged, inclined at about 45° with respect to the optical axis as shown in FIG. 81, the spectroscopic distribution of the reflected light is theoretically wide in the band area of S polarized light and narrow in the band area of P polarized light. As the incidence angle becomes small, P polarized light and S polarized light approach each other in the band area thereof, but the optical system for the color separation and color synthesis becomes large-sized, A method for coping with this phenomenon is the configuration shown in FIG. 71.

When the liquid crystal layer 16 of the liquid crystal panel 134 is in the light transmission state, the light separated in color by the dichroic mirrors 213a and 213b (FIGS. 81B, 81C, 81D) is reflected by the reflection electrode 273 of the liquid crystal panel 134, and incident again on the dichroic mirrors 213a and 213b to be synthesized in color. Namely, the spectroscopic distributions shown in FIGS. 81B, 81C and 81D are maintained as they are. The spectroscopic distribution of the light synthesized by said dichroic mirror is shown in FIG. 81E. The light of said spectroscopic distribution is incident on the projection lens 214 and projected on the screen.

As in know in FIG. 81E, the band areas of R light, G light and B light are overlapped. This is caused because the band area of the light reflected by the dichroic mirror differs between P polarized light and S polarized light. The S polarized light of the light incident on the display panel for modulating G light includes light of the band areas of R light and B light. As a result, the display panel 134c modulates also R light and B light in spite of its original requirement of modulating G light. As a result, the color status of the projected image is lowered.

In order to solve this problem, in the present invention, the transparent substrate is provided with the function of limiting the band area as described in FIG. 77. In other words, when the light incident on the transparent substrate 771 (when the transparent substrate is provided with the function of light absorbing filter)is modulated by the liquid crystal layer 16 and again emitted from the transparent substrate 771, it limits the band area of light. Furthermore, when the transparent substrate 771 constitutes an interference filter with a interference film made of dielectric thin film provided thereon, before the light is incident on the liquid crystal layer, it is reflected in part of the band area of the incident light and subject to the band area limitation. The band area limitation limits in width the narrower one of the band areas of P and S polarized light components of the light incident on the light valve 135. With this configuration, the band area overlap shown in FIG. 81E is eliminated and a display image excellent in color purity can be realized.

FIG. 80 shows a configuration wherein on the incident side of the display panel 134, a plan-concave lens 801 is optically coupled, a positive lens 802 is arranged close to said plan-concave lens 801, thus to cause said plan-concave lens 801 and positive lens 802 as a whole to function as a convex lens with said convex lens serving as an output section condensing lens 517. Namely, in the configuration of FIG. 80, the output section condensing lens 517 shown in FIG. 57 is not used, and with the plan-concave lens 801, convex lens 802 and rear lens group 511a, the stops 516 and 518 are put into a conjugating relation.

The plan-concave lens 801 and convex lens 802 have the function of preventing the secondary diffused light, thus to improve the display contrast. Furthermore, because the convex lens 802 is disposed close to the plan-concave lens 801 and said two lenses as a whole are adapted to function as an output section condensing lens 517, space can be saved. Therefore, it is not necessary to lengthen the back-focus of the projection lens or the optical system and the design becomes easy. The above-described matter is applicable to other embodiments of the present invention. Of course,the plan-concave lens may be of a configuration of the reflected light absorbing plate 23 shown in FIG. 15, a configuration wherein a transparent substrate 24 is dyed as shown in FIG. 77 or a configuration having a light absorbing section 781 as shown in FIG. 78. The above matter is also applicable to the projection type display apparatus using a single of display panel 134 as shown in FIG. 51.

Figure 79:
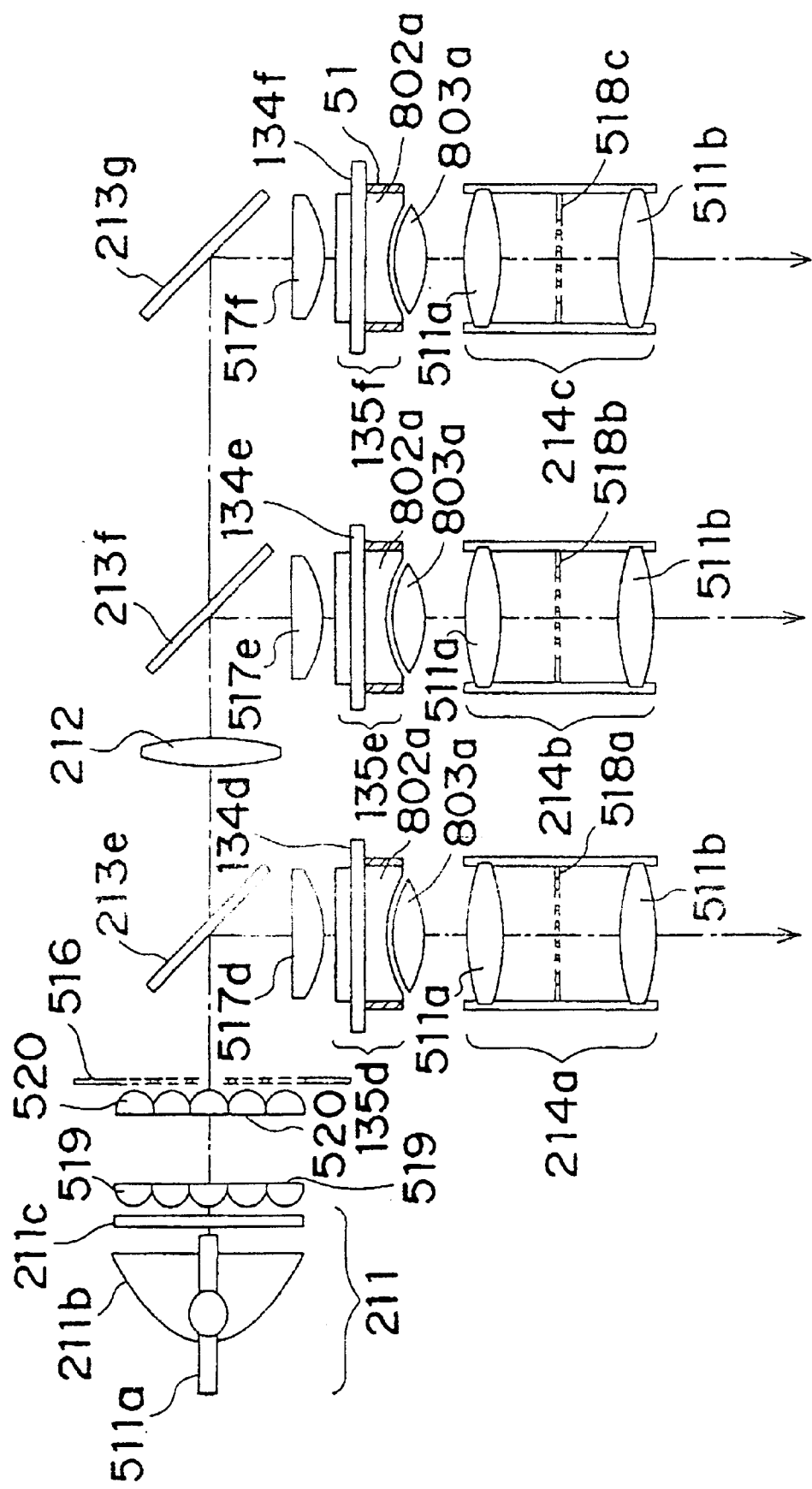
FIG. 79 is a view showing the configuration of a projection type display apparatus according to the present invention.

Furthermore, the configuration employing a lens array 514 and so on is applicable to a projection type display apparatus employing two projection lenses 214 as shown in FIG. 21. The configuration thereof is shown in FIG. 79. It may be considered to have 3 lines of the configuration of FIG. 52.

The technical concept regarding the reflected light absorbing plate 23 of the present invention is applicable not only to the light valve of the projection type display apparatus but also, for example, to the display device (called view-finder) of the video camera. Embodiments wherein the display panel of the present invention is employed as the light valve of the view-finder are described below.

Figure 60:
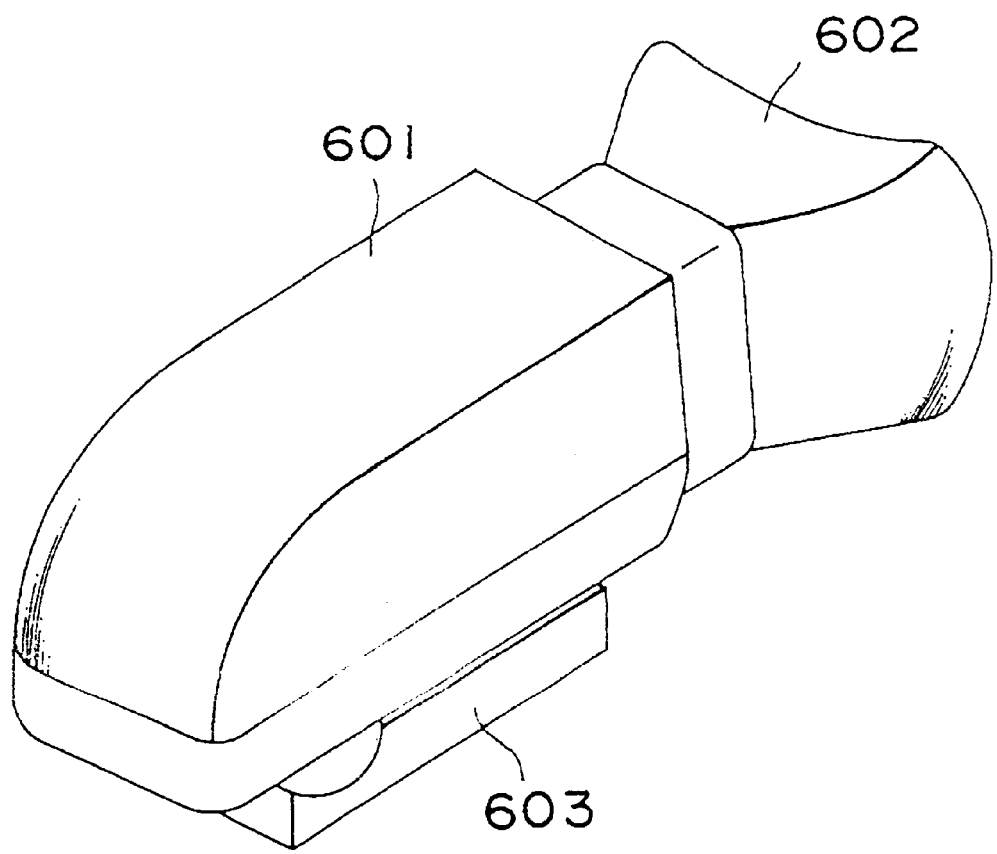
FIG. 60 is an appearance view of a view-finder according to the present invention.
Figure 61:
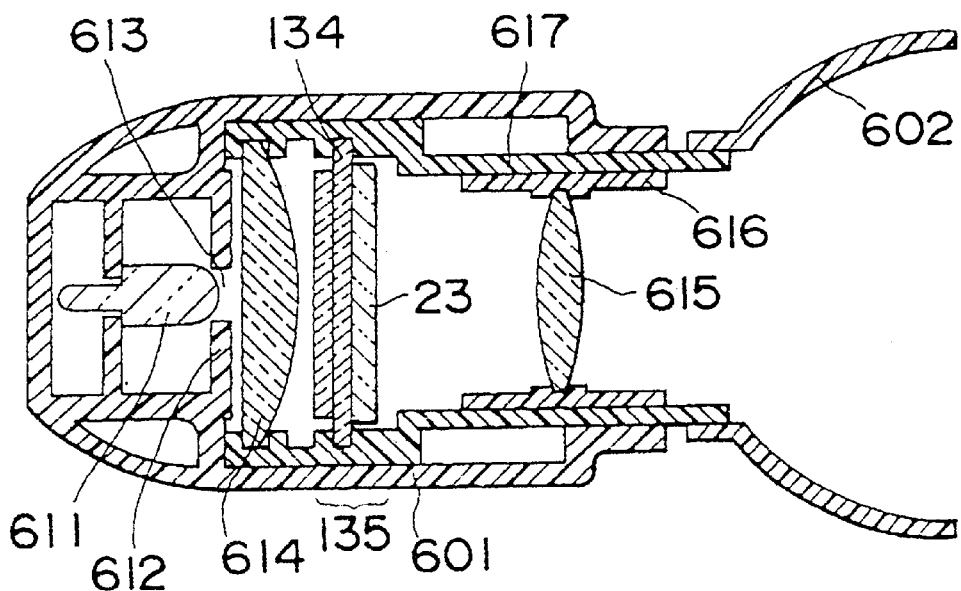
FIG. 61 is a sectional view of a view-finder according to the present invention (at non-use time)
Figure 62:
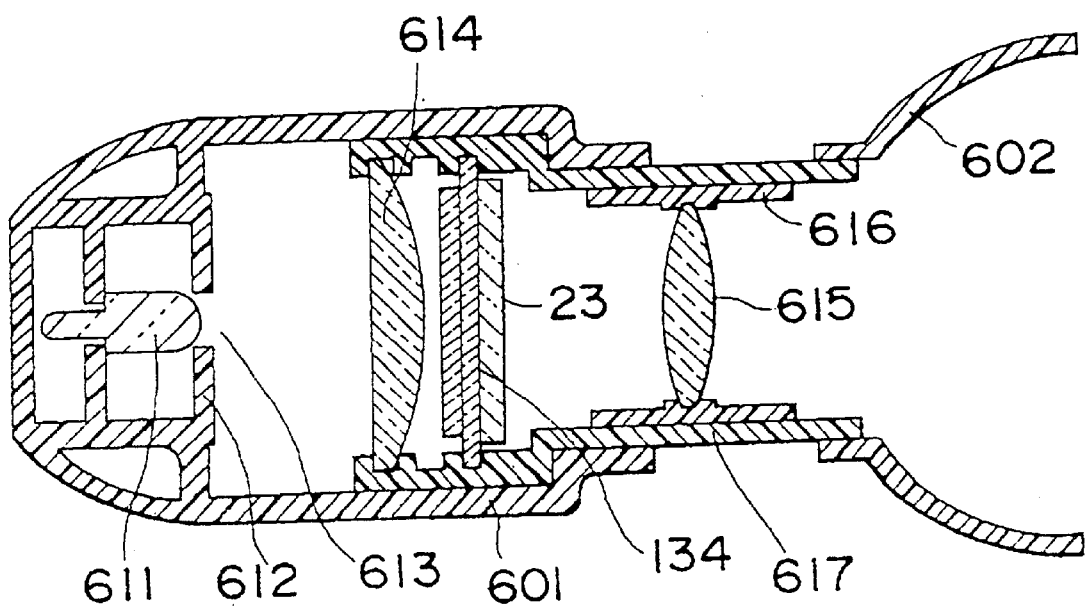
FIG. 62 is a sectional view of a view-finder according to the present invention (at use time)

FIG. 60 is an appearance view of a viewfinder according to the present invention. FIGS. 61 and 62 are sectional views of FIG. 60. Within the body 601, a mounting holder 617 with a condensing lens 614 and a display panel 314 installed thereon is arranged. Within the mounting holder 617, an eye ring 616 having a magnifying lens 615 is arranged. There is provided a fluorescent light generating tube 611 and the light radiated from the fluorescent light generating tube 611 is emitted from a hole 613 formed on the central portion of a light shielding plate 612. In order to absorb unnecessary light, the body 601 and so on are painted in black or dark color on the internal face thereof. For the fluorescent light generating tube 611, a light emitting diode (LED) or a fluorescent light generating element (VFD) may be employed. Or, a point light generating source may be used.

By pulling the mounting holder 617 towards the observer side, the mounting holder 617 is pulled out to the arrangement shown in FIG. 62. FIG. 61 shows the state where the viewfinder is not used, namely, it is accommodated. It is arranged so that in the state shown in FIG. 62, the focus of the condensing lens 614 is positioned on the light emitting face of the light emitting element 611. By moving the mounting holder 617, the volume of the viewfinder can be reduced at the accommodation time and the total length can be shortened.

As an example, the diagonal length of the display area of the display panel 134 is set at 28 mm, the effective diameter of the condensing lens 614 at 30 mm and the focal length thereof at 15 mm. The condensing lens 614 is of a plan-convex lens type with its side plane directed towards the light emitting element 611. The condensing lens 614, and the magnifying lens 615 may be replaced with Fresnel lense having sawteeth-like convex surface. By using Fresnel lenses, the view-finder may be reduced in volume and in weight, On the display panel 134, a reflected light absorbing plate 23 is applied thereto. Reference numeral 612 denotes a light shielding plate with a circular hole 613 on the central portion. This plate has a function of reducing the area wherein light is radiated from the light emitting element 611. When the area of the hole 613 is increased, the display image on the display panel 134 is increased in luminance but decreased in contrast. This is because the light amount incident on the condensing lens is increased but the directionality of the incident light is worsened.

The light radiated from the light emitting element 611 in a large solid angle is converted by the condensing lens 614 into a generally parallel light flux of a narrow directionality and is incident from the confronting electrode (not shown) side of the display panel 134. The observer looks at the displayed image of the display panel 134 with the eye tightly attached to the eye cover 602. Namely, The pupil position of the observer is almost fixed. When a case wherein the total pixels of the display panel 134 allow light to proceed straightly is assumed, the condensing lens 614 is adapted so that the light radiated from the and incident on the effective area of the condensing lens 614 is all incident on the pupil of the observer, after passing the magnifying lens 615. In this manner, the observer is able to magnify and look at a small displayed image on the display panel 134.

Because the pupil position of the observer is generally fixed, in the viewfinder, by the eye contact cover 602, the light source positioned behind said display panel 134 may be of a type of a narrow directionality. In the conventional viewfinder employing a fluorescent light tube as the light source, only the light proceeding from the area of nearly the same size as the display area of the display panel 134 in a certain direction within a small solid angle is utilized and the light proceeding in other directions is not utilized. Namely, the light utilization efficiency is very poor.

In the present invention, a light source having a small light emitting body is used and the light radiated from said light emitting body in a wide solid angle is converted into a generally parallel light flux. By this processing, the directionality of the light from the condensing lens 614 becomes narrow. If the view point of the observer is fixed, said light of a narrow directionality is sufficient for use in the viewfinder. If the light emitting body is small, the power consumption is naturally small. As described above, the viewfinder according to the present invention utilizes the fact that the observer look at the displayed image, with the view point being fixed. Although a certain view angle is required in the normal straight looking type display panel, in the viewfinder, if the displayed image can be observed from a pre-determined direction, it is sufficient for the use. Meanwhile, the viewfinder of the present invention is fixed to the video camera with a mounting fitting 603.

On the display panel 134, a color filter 461 is mounted as shown in FIG. 46. The pixel arrangement is of a so-called square-arrangement. In addition, it may be in a delta-arrangement. The color filter 461 transmits any one of R, G and B color light. By the constituting material of the color filter 461, the thickness of each color may be controlled. The film thickness of the color filter 416 is adjusted at the time of manufacture of the color filter. Namely, the film thickness of the color filter 461 is changed in accordance with R, G and B. By the film thickness of the color filter 461, the film thickness of the liquid crystal layer 16 on each pixel can be adjusted in accordance with the color of each corresponding color filter 461. On the R light pixel, the film thickness of the liquid crystal layer thereon is made thick. This is because in the PD display panel, the diffusion characteristic for R light is poor.

By adjusting the insertion degree of the eye-contact ring 616 into the body 601, the focus adjustment can be made in accordance with the vision of the observer. In addition, because the position of the observer's eye is fixed by the eye cover 602, the position of view point will be hardly shifted during the use of the viewfinder. If the view point is fixed, even when the directionality of the light incident on the display panel is narrow, the observer can see a good displayed image. In order to further improve the displayed image, the radiation direction of the light from the light emitting element 611 may be shifted to an appropriate direction.

Figure 63A:
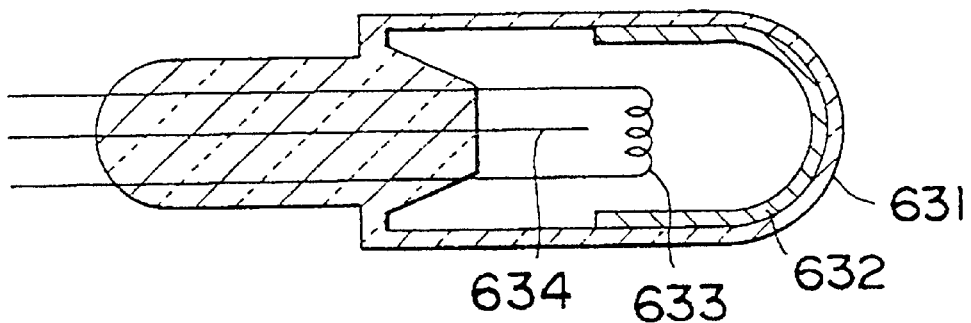
FIGS. 63A and 63B are views showing the configuration of a light emitting element to be used in a view-finder of the present invention.

FIG. 63 is a sectional view of a fluorescent light emitting tube as an embodiment of the light emitting element 611 employed for the viewfinder according to the present invention. As shown in FIG. 63, the fluorescent light emitting tube is of a shape of a miniature light valve in the appearance. The light emitting tube includes a glass casing 631 of 5 to 20 mm diameter and a filament 632. By applying a voltage of about DC 4 V, the filament 633 is heated. To the anode 634, DC voltage of about 15 to 25 V is applied. By the anode voltage, electrons discharged from the filament 633 are accelerated. Within the casing 631, mercury molecules (not shown) are charged, and said accelerated electrons radiate UV rays by colliding with mercury molecules. This UV ray excites the fluorescent body 632 so as to emit visible light. For such a light emitting element, There is available a fluorescent light emitting tube made by Minipyro Electric Co. (Luna-light 07 series). The diameter of the light emitting tube is 7 mm and heater voltage of DC 5 V and anode voltage of DC 23 V are applied to said light emitting tube.

By effecting the pulse drive, the amount of the radiated light can be adjusted. The period of the pulse is set at more than 30 Herz, preferably at more than 60 Herz. By making the voltage applied to anode a pulse signal, the radiated light amount can be made variable in proportion with the pulse width.

Figure 63B:
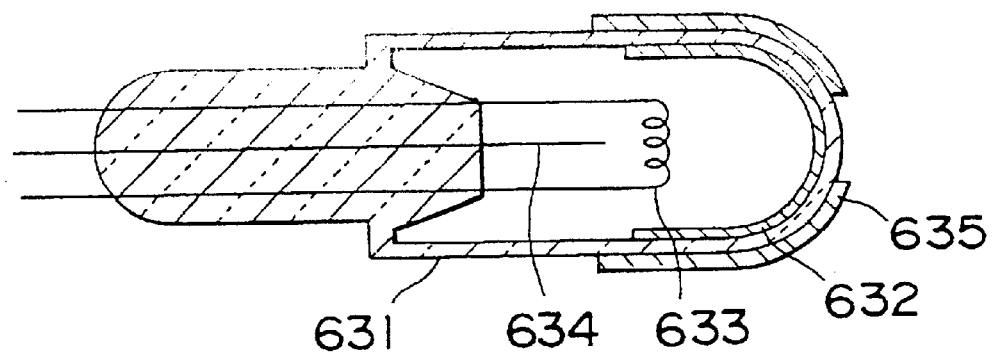

As shown in FIG. 63B, if a light shielding film 635 is formed on the casing 631 and the radiation area of the light from the light emitting element is made small, the light shielding plate 612 as shown in FIG. 61 is not necessary. In addition, the light shielding film 635 may be replaced by a light reflection plate with its inner surface having a light reflection function. Furthermore, the outer face of the casing 631 may be surrounded by the light reflection plate except for the light outgoing portion to thereby increase the outgoing light amount from the light outgoing face portion.

As described above, because the viewfinder according to the present invention efficiently condenses the light emitted from the small light emitting body of the light emitting element 611 in a wide solid angle by the condensing lens 614, the power consumption of the light source can be reduced to a great extent as compared with the case of using a face light source using a fluorescent tube as a back light. Furthermore, the reflected light absorbing plate 23 is also extremely thin, a sufficient halation preventing effect can be obtained and a high contrast display can be realized without enlarging the light valve 135.

In addition, because the distance between the condensing lens 614 and the light emitting element 611 is made variable, when using a viewfinder, the volume and the total length of the viewfinder can be reduced. With respect to the viewfinder, the compactness is desired, and when the viewfinder of the present invention is employed, both the low power consumption and miniaturization can be realized.

Figure 19:
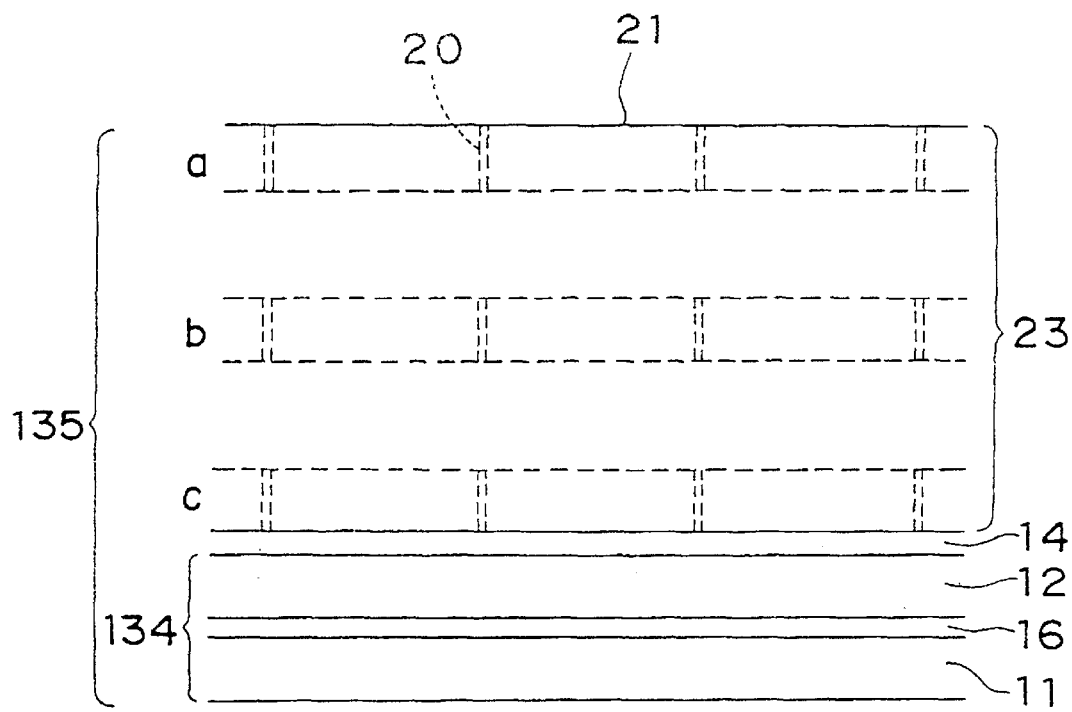
FIG. 19 is an explanatory view of a display panel in still another embodiment of the present invention.

The technical concept of the present invention is applicable to other types of viewfinders. For example, a direct looking type of monitor shown in FIG. 62 can be mentioned. The monitor manufactured by removing the magnifying lens 615 and others from the viewfinder shown in FIG. 52 and replacing the condensing lens 614 with a fresnel lens falls under the category of this direct looking monitor. The reason for using a fresnel lens is that display panel becomes comparatively large, more than three inches, condensing lens 614 becomes large if it is a convex lens, and the weight also becomes heavy. If a Fresnel lens is used, a large diameter lens can be easily made and the weight reduction can be realized. However, the pitch of the fresnel lens and the pixels of the display panel 134 may interfere each other resulting in moire fringes. The effect of moire can be reduced to an practically allowable level when FIGS. 18 and 19 are taken into consideration.

The light radiated from the light emitting element 611 is reflected by a mirror 241 and incident on the display panel 134. The display panel 134 modulates said white light in accordance with the image signal. The reflected light absorbing plate 23 is applied to the display panel 134 via a light coupling layer 14. Said reflected light absorbing plate 23 prevent the light diffused by said display panel 134 from becoming secondary diffused light.

Figure 64:
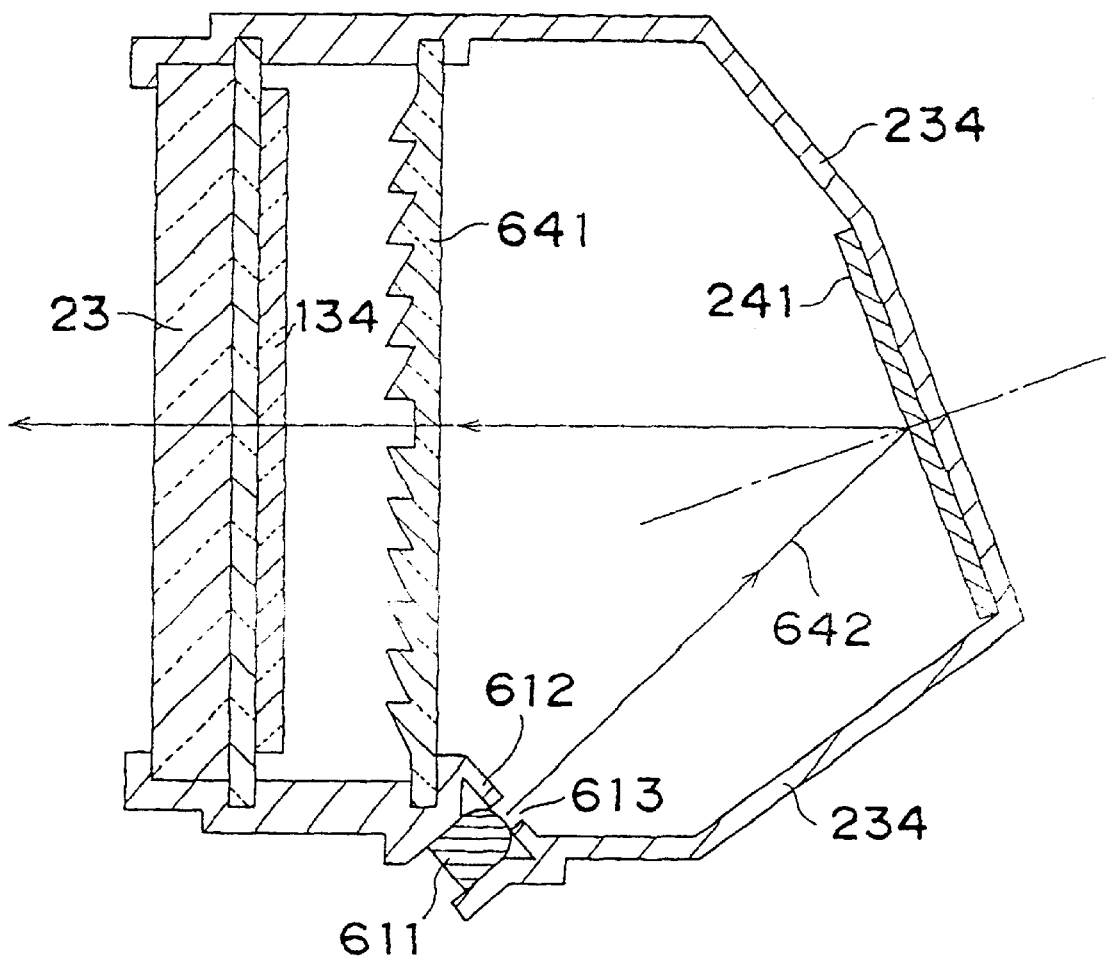
FIG. 64 is a sectional view of a display apparatus according to the present invention.

Shown in FIG. 64 is a monitor using a point light source by a planar light source may be employed therein. For example, FIG. 65 may be mentioned. On one end of a light guide plate 652, a rod -shaped fluorescent tube 651 is installed and the light radiated from said fluorescent tube is diffused within said light guide plate 652, and thus, the light guide plate 652 becomes a planar light source.

The prism plate 653 controls the light emitted from the light guide plate 652 in all directions so that only the light within a certain angle range of said light irradiates the display panel 134. The display panel 134 forms an optical image as a change in the diffused state in accordance with the image signal. The prism plate 653 is disposed so that the apex angle of the prism is directed toward the display panel.

Figure 66A:
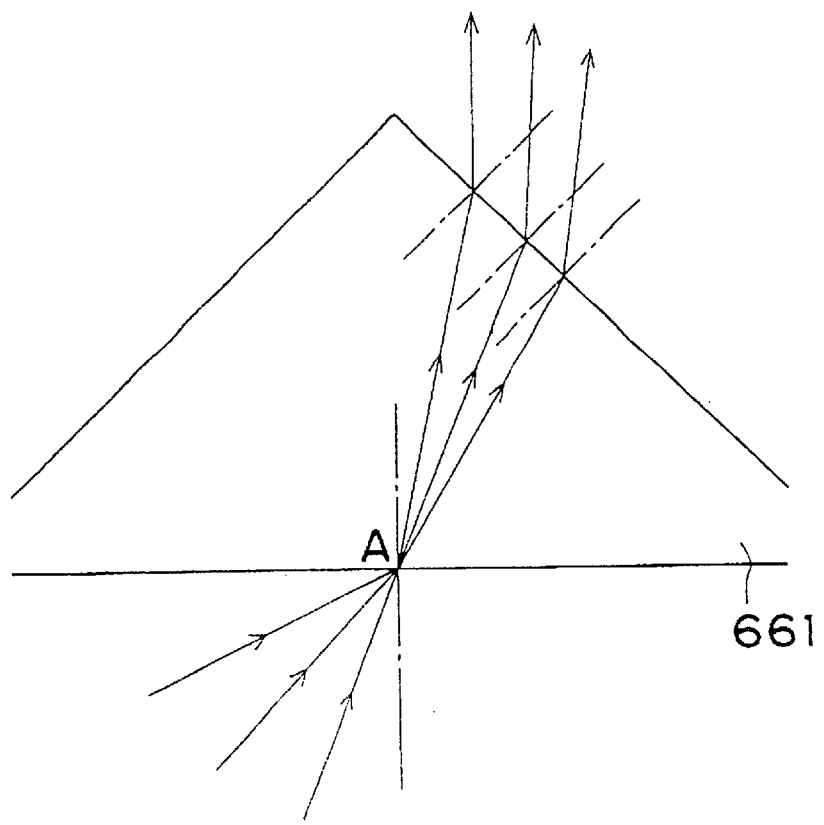
FIGS. 66A and 66B are explanatory views of a prism to be employed for the display apparatus according to the present invention.

The way whereby the directionality of the diffused light is controlled by the prism 661 is described by using FIG. 66A. In FIG. 66A, the proceeding direction of light is indicated by arrows. When diffused light is made incident from the planar side of the prism 661, light is incident on the point A on the plane of the prism 661 from all directions. When the light is incident on point A, the light is bent by the law of Fresnel on the interface between glass and air in accordance with the difference in refraction index between glass and air and emitted. Because the refraction index of glass is larger as compared with that of air, the bent angle becomes small in glass. The light emitted from the prism 661 is, the same as with the light incident from the side face of the prism, bent by the law of Fresnel and emitted. Contrarily with the case of incidence on the glass prism, in the case of outgoing, the bent angle becomes large but because the side face of the prism is inclined, the angle viewed from the direction perpendicular to the prism plate becomes small and thus, the directionality is high. Furthermore, as the apex angle of the prism 661 is made larger, namely, as the inclination of the side face is made larger, the directionality of the outgoing light is improved.

Figure 65:
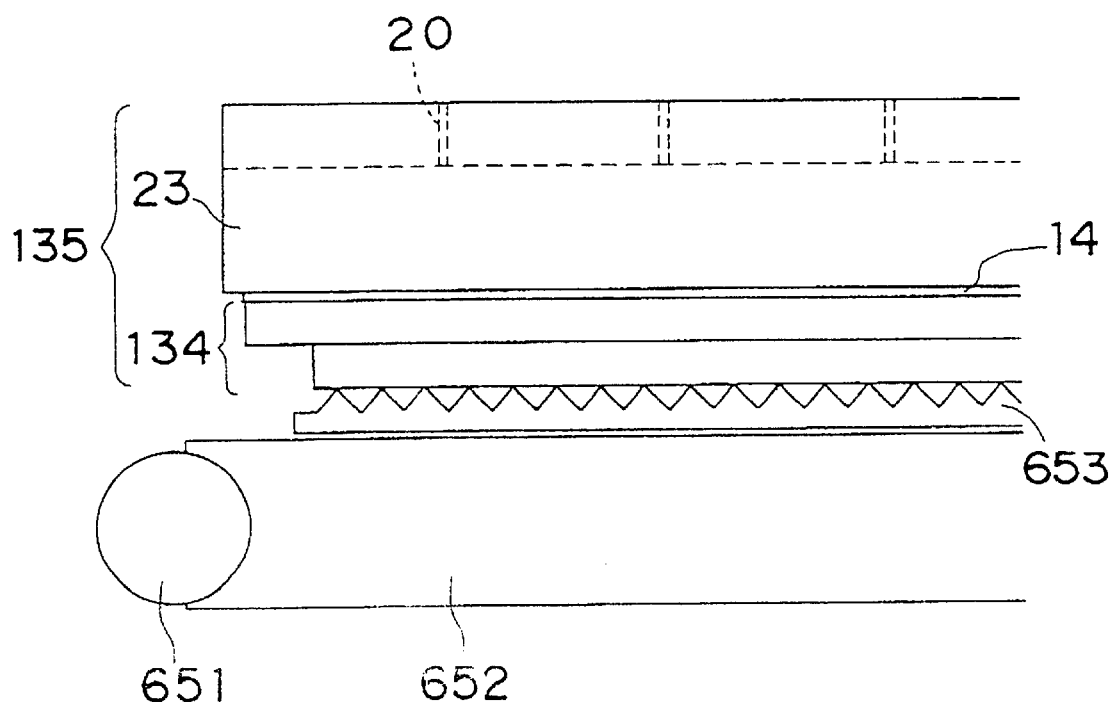
FIG. 65 is a sectional view of a straight looking type display apparatus according to the present invention.
Figure 66B:
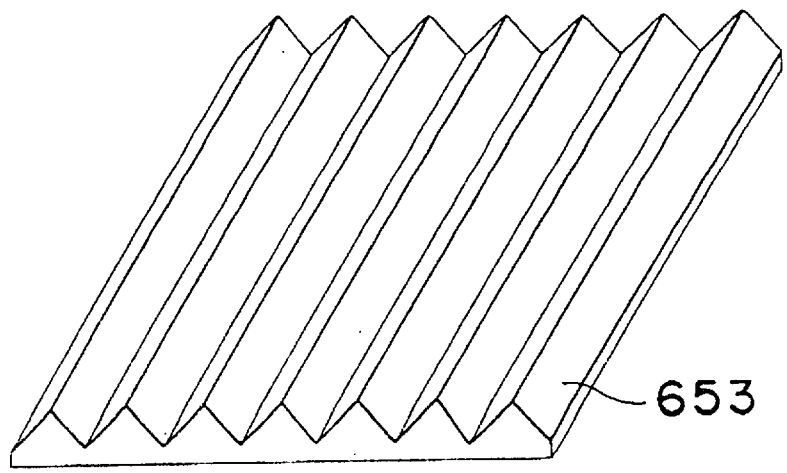
Figure 67:
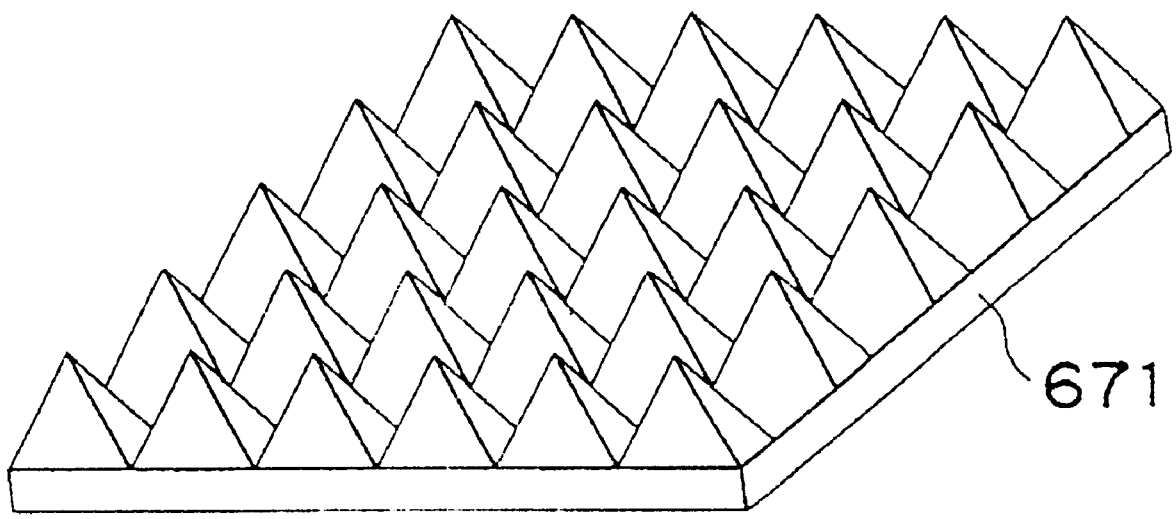
FIG. 67 is an explanatory view of a prism plate.
Figure 68:
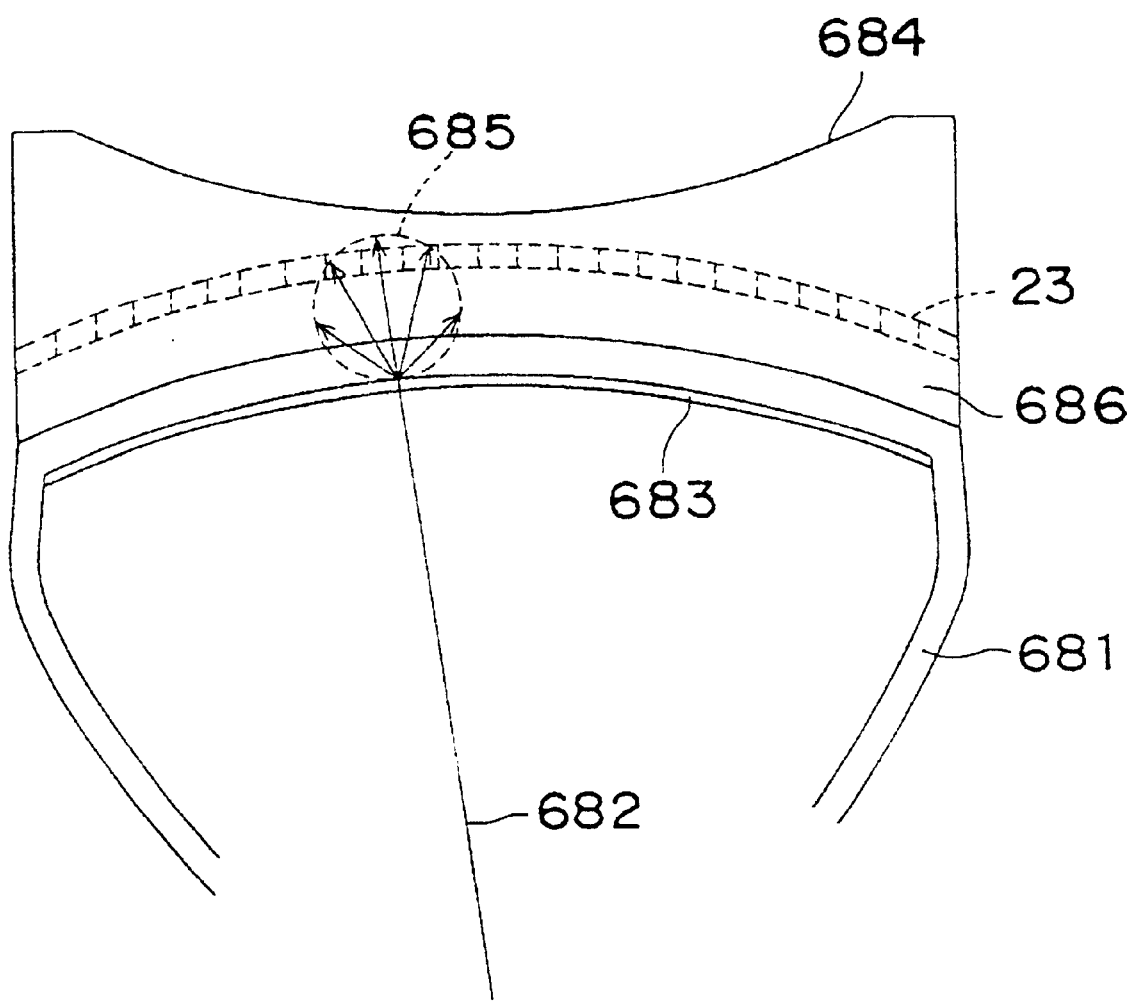
FIG. 68 is a view showing the configuration when a reflected light absorbing plate according to the present invention is applied to CRT.

FIG. 66B is a perspective view of the prism plate 653 in FIG. 65. The prism plate 653 is a sheet formed by arranging plural prisms 661 in a shape of stripe thereon. While such prism plate 653 as shown in FIG. 66b can improve the directionality in the direction of arranging prisms 661, it exhibits no effect in the direction perpendicular to the direction of arranging prisms. In order to raise the directionality in both directions, it is suggested to employ a prism plate 671 wherein plural quadrilateral prisms are arranged as shown in FIG. 67.

Needless to say, the display apparatus shown in FIGS. 61 and 57 is applicable to a pocket TV, a monitor of a portable peripheral unit, the display monitor of a laptop personal computer, a head-mount display and so on.

Figure 74A:
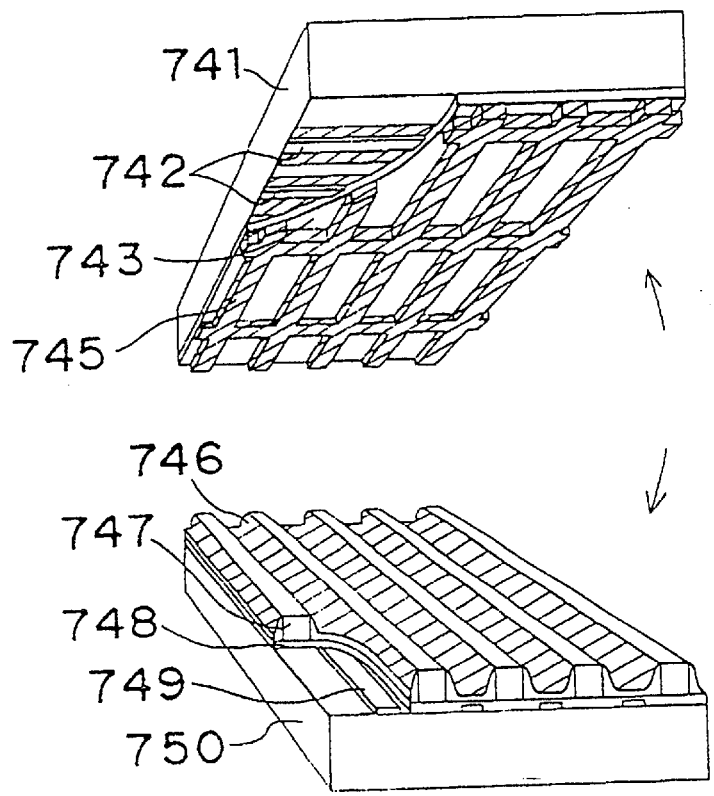
FIGS. 74A and 74B are explanatory views of a PDP display panel according to the present invention.
Figure 74B:
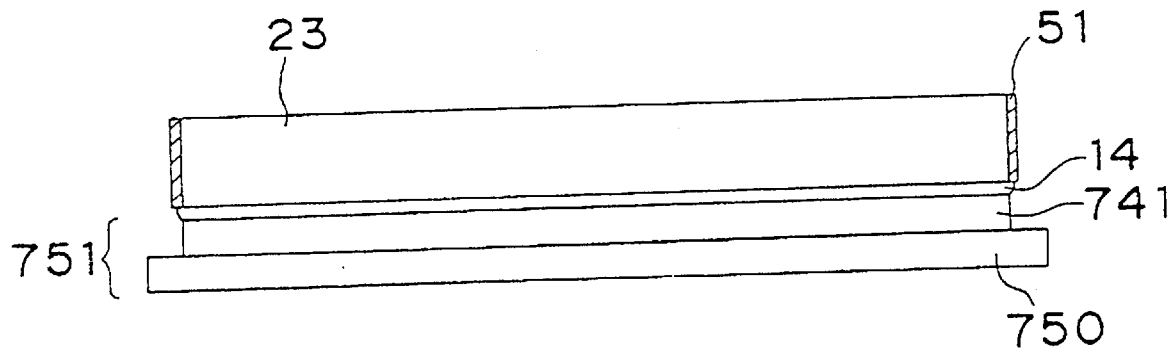

The light modulating means 134 is not limited to the PD display panel or a diffraction type display panel shown in FIG. 7 and so on, but it may be a plasma display panel 751 (PDP) shown, for example, in FIG. 74. IN PDP, the rear face glass substrate 750 is provided with a data electrode 749, a white dielectric layer 748, white partition wall 747, and fluorescent material layers (R, G, B) thereon, and the front face glass substrate 741 is provided with a face discharge electrode 742, transparent dielectric layer and black partition wall 745 thereon, and said two glass substrates are applied to each other.

While PDP 751 has two kinds of systems, that is, DC system and AC system, either may be used. PDP 751 has fluorescent material layer 746, and said fluorescent material layer diffuses light when it emits light. In the present invention, a reflected light absorbing plate 23 is arranged on the front face of glass substrate 741 of PDP 751. By said reflected light absorbing plate 23, halation by diffused light can be prevented.

In addition, the technical concept of the present invention is applicable to the Braun tube (CRT) 681 of direct looking type TV sets or projection type TV sets. CRT 681 also is provided with a fluorescent face 683, which emits light when hit by electron beams, and the light generated by said light emission becomes diffused light 685.

On the light emission face of the CRT 681 of the projection type TV set, a concave lens 686 is arranged. By arranging a reflected light absorbing plate 23 within the concave lens 686 or by forming a structure similar to the reflected light absorbing plate 23, unnecessary diffuse light can be absorbed. As a result, the display contrast, in particular, window contrast can be improved. On the direct looking type TV set, a reflected light absorbing plate 23 may be arranged or applied to the face glass thereof.

Figure 69:
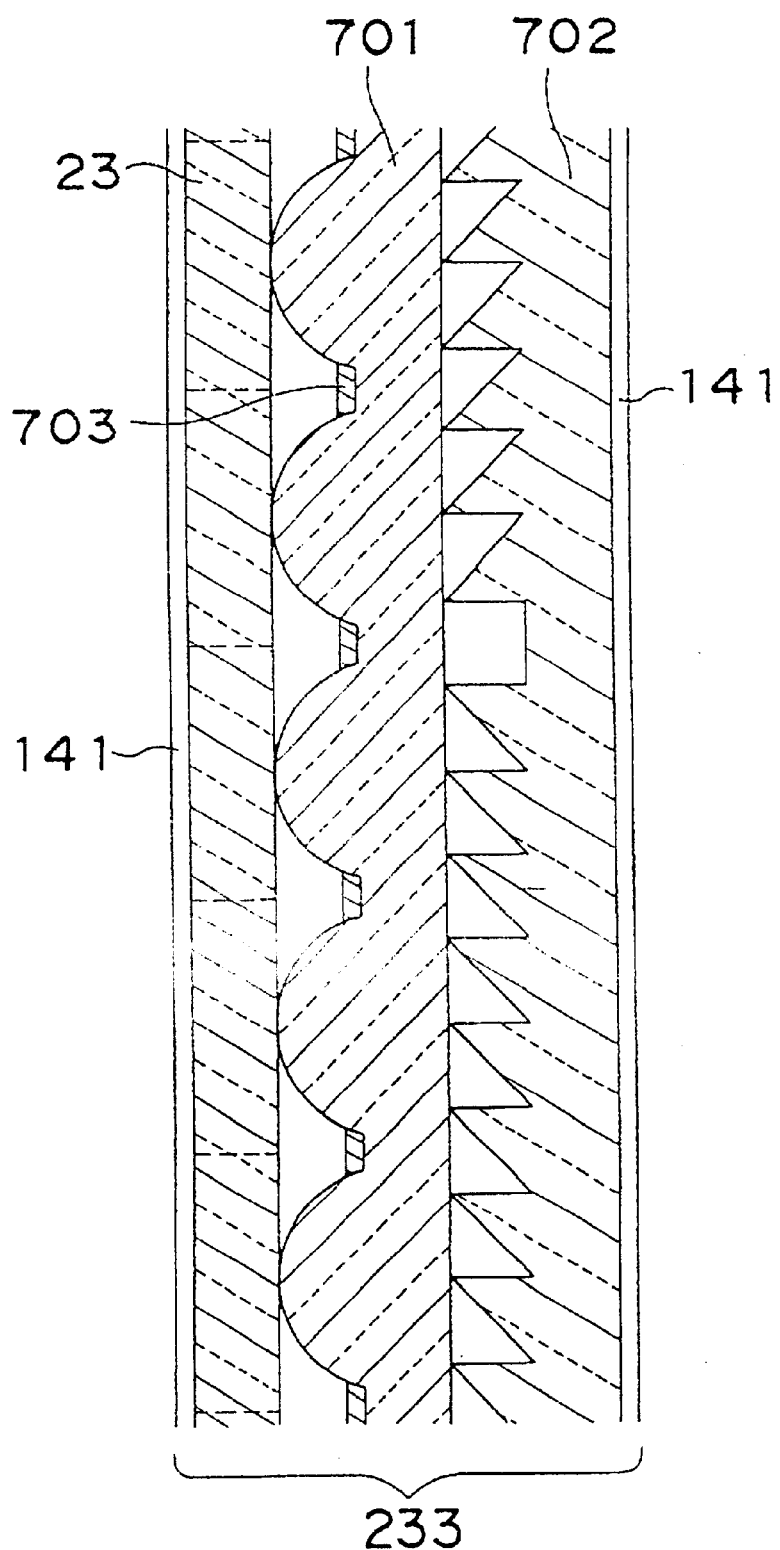
FIG. 69 is a view showing the configuration when a reflected light absorbing plate according to the present invention is applied to a screen.

In addition, the technical concept of the present invention is applicable also to the screen 253 used for the projection type TV set shown in FIG. 23. A configuration applying said concept is shown in FIG. 69. Generally, the screen 253 is a configuration wherein lenticular plate 701 and a Fresnel lens 702 are applied to each other. If a reflected light absorbing plate 23 is arranged on said lenticular plate, unnecessary reflected light can be prevented.

The reflected light absorbing plate 23 may be applied onto the planar portion of the lenticular plate 701 or the planar portion of the Fresnel lens 702. Similarly, the effect of preventing unnecessary reflected light can be exhibited.

In addition, it is desirable to form a light shielding film 703 between lenses of the Fresnel lens 702. This is because the space between said lenses does not contribute to the condensation or diffusion of light and the light passing said space adversely affect the displayed image. If the light shielding plate 703 is formed, the light passing said space can be absorbed or reflected, and thus, the adverse effect can be suppressed.

As described above, according to the present invention, by partitioning, with a light absorbing wall 20, the transparent plate into plural areas positioned in a predetermined relation, the light which may cause halation of secondary diffusion by the reflection on the interface with air can be prevented. Furthermore, by using said transparent plate (reflected light absorbing plate) on the display panel and so on, a projection type display apparatus which has a high display contrast and a high luminance can be constituted.

In addition, by providing the transparent substrate 24 and so on with the function of a color filter, the occurrence rate of the secondary diffusion can be suppressed and the display contrast can be improved. In addition, by providing the transparent substrate 24 and so on with the function of limiting the wavelength band area, the overlapping of respective colors can be prevented as described in FIG. 81 and a display image of a high color purity ca be realized. needless to say, an excellent image display can be performed by employing the display apparatus of the present invention for the projection type display apparatus of the present invention. When the plan-concave lens 802 and the positive lens 803 are combined as shown in FIG. 80, thus to provide the function of a field lens, there is an effect that the arrangement design of the dichroic mirrors of the color synthesis system and the conjugation design of the stops 516 and 518 become easy. Furthermore, when the plan-concave lens 801 and the positive lens 802 is combined as shown in FIG. 32 as an alternative of the output section condensing lens 517, the optical design becomes further easy, and as a whole, the reduction of the number of optical components and the manufacturing cost can be realized.

As described so far, in the projection type display apparatus according to the present invention, the effective F number of the illumination light and the projection light can be effectively and easily made coincident with each other, and the contrast of the projected image can be improved through reducing astray light within the projection lens. In particular, in the case of using polymer dispersed display panel, a projected image excellent in contrast can be provided without increasing the light loss. Furthermore, a projection type display apparatus which is able to adjust the luminance and white balance of the projected image without lowering the image quality can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A projection type display apparatus comprising:
   a light source being operable to emit light, said light source having an arc length greater than 2.5 mm and less than 5.0 mm;
   light modulating means for forming an optical image as a change in a diffuse state of light, said light modulating means having a light modulating layer;
   secondary light emitting means for emitting light by condensing and converging the light emitted from said light source;
   projecting means for projecting the optical image formed by said light modulating means;
   a first stop being operable to selectively pass primarily the light having passed an effective area of said secondary light emitting means, said first stop having an aperture shape and being arranged on a light incidence side of said light modulating means;
   a second stop being operable to selectively pass the light having passed said first stop in a light transmitting state of said light modulating layer of said light modulating means, said second stop having an aperture shape and being arranged on a light outgoing side of said light modulating means, wherein
   said light modulating means is illuminated by the light emitted from said secondary light emitting means.

2. A projection type display apparatus comprising:
   a light valve comprising:
      a light modulating layer operable to form an optical image as a change in a diffused state of light,
      a first electrode substrate, and
      a second electrode substrate, wherein said light modulating layer is held between said first and second electrode substrates;
   at least one transparent substrate being optically connected to at least one of said first and second electrode substrates;
   a light source being operable to emit light;
   secondary light emitting means for emitting light by condensing and converging the light emitted from said light source;
   projecting means for projecting the optical image formed by said light valve;
   a first stop being operable to selectively pass primarily the light having passed an effective area of said secondary light emitting means, said first stop having an aperture shape and being arranged on a light incidence side of said light valve; and
   a second stop operable to selectively pass the light having passed said first stop in a light transmission state of said light modulating layer of said light valve, said second stop having an aperture shape and being arranged on an outgoing light side of said light valve, wherein
   said light valve is illuminated by the light emitted from said secondary light emitting means, and said first and second stops are in an approximate conjugating relation with each other.

3. A projection type display apparatus as claimed in claim 2, wherein said at least one transparent substrate is a concave lens.

4. A projection type display apparatus as claimed in claim 2, wherein said secondary light emitting means comprises plural secondary light emitting bodies positioned discretely and at least one of said first and second stops comprises plural apertures positioned discretely.

5. A projection type display apparatus as claimed in claim 2 wherein said projecting means has a F number set at greater than about 5 and less than about 9.

6. A projection type display apparatus as claimed in claim 2, wherein said at least one transparent substrate absorbs part of the light emitted from said light modulating layer.

7. A projection type display apparatus as claimed in claim 2, wherein said projection type display apparatus satisfies the following condition:

$$t \geq d/8 \times \sqrt{(n^2-1)}$$

where n is a refraction index of said at least one transparent substrate, d is a largest diameter of an effective display area of said light modulating layer, and t is a distance from said light modulating layer to a contact face of said at least one transparent substrate with air.

8. A projection type display apparatus comprising:
   a light valve being operable to form an optical image as a change in a diffused state of light, said light valve comprising:

a light modulating layer,
a first electrode substrate, and
a second electrode substrate, wherein said light modulating layer is held between said first and second electrode substrates;
at least one plano-concave lens having a planar face, said planar face being optically connected to at least one of said first electrode substrate and said second electrode substrate,
a light source being operable to emit light;
secondary light emitting means for emitting light by condensing and converging the light emitted from said light source;
projecting means for projecting the optical image formed by said light valve;
a first stop being operable to selectively pass primarily the light having passed an effective area of said secondary light emitting means, said first stop having an aperture shape and being arranged on a light incidence side of said light valve; and
a second stop being operable to selectively pass the light having passed said first stop in a light transmitting state of said light modulating layer of said light valve, said second stop having an aperture shape and being arranged on an outgoing light side of said light valve, wherein
said light valve is illuminated by the light emitted from said secondary light emitting means, and said first and second stops are in an approximately conjugating relation with each other.

9. A projection type display apparatus as claimed in claim 8, wherein said secondary light emitting means comprises plural secondary light emitting bodies positioned discretely and at least one of said first and second stops comprises plural apertures positioned discretely.

10. A projection type display apparatus as claimed in claim 8, further comprising at least one positive lens arranged close to said at least one plano-concave lens.

11. A projection type display apparatus as claimed in claim 8, further comprising light absorbing film formed on a non-effective area of said at least one plano-concave lens.

12. A projection type display apparatus comprising:
a light valve comprising:
a first substrate with an electrode,
a light exciting, layer,
a light shielding layer,
a dielectric reflection mirror, wherein said first substrate with said electrode, said light exciting layer, said light shielding layer, and said dielectric reflection mirror are laminated in this order,
a second substrate with a confronting electrode, and
a light modulating layer operable to form an optical image as a change in a diffused state of light, wherein said light modulating layer is located between said first substrate with said electrode and said second substrate with said confronting electrode;
a light source being operable to emit light;
light condensing means for condensing the light emitted from said light source;
projecting means for projecting the optical image formed by said light valve;
a first stop arranged on a light incidence side of said light valve;
a second stop arranged on a light outgoing side of said light valve;
an input section condensing lens array comprising plural input section condensing lenses arranged in a two-dimensional form;
a central section condensing lens array comprising plural central section condensing lenses equal in number to said plural input section condensing lenses, said plural central section condensing lenses arranged in a two-dimensional form; and
an output section condensing lens, wherein
the light emitted from said light condensing means is incident on said light valve via said input section condensing lens array, said central section condensing lens array, and said output section condensing lens,
each of said plural input section condensing lenses comprises plural secondary light emitting bodies in a vicinity of a main plane of each corresponding one of said plural central section condensing lenses,
each of said plural central section condensing lenses is operable to form, together with said output section condensing lens, an image of objects positioned in a vicinity of the main plane of each of said plural input section condensing lenses in a vicinity of an effective display area of said light valve in superimposed form,
said output section condensing lens allows the light emitted from said plural secondary light emitting bodies to effectively reach said projecting means,
said first stop is arranged in a vicinity of said plural secondary light emitting bodies, has an aperture shape, and is operable to selectively pass the light having passed effective areas of said plural secondary light emitting bodies,
said second stop has an aperture shape, and is operable to effectively pass the light having passed said first stop in a light transmitting state of said light modulating layer of said light valve, and
said first and second stops are in an approximately conjugating relation with each other.

13. A projection type display apparatus comprising:
a light valve comprising:
a light modulating layer operable to form an optical image as a change in a diffused state of light,
a first electrode substrate, and
a second electrode substrate on a light outgoing side of said light valve, wherein said light modulating layer is held between said first and second electrode substrates;
a plano-concave lens optically connected to said second electrode substrate;
a positive lens arranged close to said plano-concave lens, wherein said plano-concave lens and said positive lens function together as a field lens;
a light source being operable to emit light;
light condensing means for condensing the light emitted from said light source;
projecting means for projecting the optical image formed by said light valve;
a first stop arranged on a light incidence side of said light valve;
a second stop arranged on a light outgoing side of said light valve;
an input section condensing lens array comprising plural input section condensing lenses arranged in a two-dimensional form;

a central section condensing lens array comprising plural central section condensing lenses equal in number to said plural input section condensing lenses, said plural central section condensing lenses arranged in a two-dimensional form; and an output section condensing lens, wherein
the light emitted from said light condensing means is incident on said light valve via said input section condensing lens array, said central section condensing lens array, and said output section condensing lens, each of said plural input section condensing lenses comprises plural secondary light emitting bodies in a vicinity of a main plane of a corresponding one of said plural central section condensing lenses, each of said plural central section condensing lenses is operable to form, together with said output section condensing lens, an image of objects positioned in a vicinity of the main plane of each of said plural input section condensing lenses in a vicinity of an effective display area of said light valve in superimposed form, said output section condensing lens allows the light emitted from said plural secondary light emitting bodies to effectively reach said projecting means, said first stop is arranged in a vicinity of said plural secondary light emitting bodies, has an aperture shape, and is operable to selectively pass the light having passed effective areas of said plural secondary light emitting bodies, said second stop has an aperture shape, and is operable to effectively pass the light having passed said first stop in a light transmitting state of said light modulating layer of said light valve, and said first and second stops are in an approximately conjugating relation with each other.

14. A projection type display apparatus comprising:
a light source being operable to emit light, said light source having an arc length greater than 2.5 mm and less than 5.0 mm;
a light valve operable to form an optical image as a change in a diffuse state of light, said light valve having a light modulating layer;
at least one condensing lens being operable to condense the light emitted from said light source;
a projection lens operable to project the optical image formed by said light valve;
a first stop being operable to selectively pass primarily the light having passed an effective area of said at least one condensing lens, said first stop having an aperture shape and being arranged on a light incidence side of said light valve;
a second stop being operable to selectively pass the light having passed said first stop in a light transmitting state of said light modulating layer of said light valve, said second stop having an aperture shape and being arranged on a light outgoing side of said light valve, wherein
said light valve is illuminated by the light emitted from said at least one condensing lens.

15. A projection type display apparatus comprising:
a light valve comprising:
a light modulating layer operable to form an optical image as a change in a diffused state of light,
a first electrode substrate, and
a second electrode substrate, wherein said light modulating layer is held between said first and second electrode substrates;
at least one transparent substrate being optically connected to at least one of said first and second electrode substrates;
a light source being operable to emit light;
at least one condensing lens being operable to condense the light emitted from said light source;
a projecting lens being operable to project the optical image formed by said light valve;
a first stop being operable to selectively pass primarily the light having passed an effective area of said at least one condensing lens, said first stop having an aperture shape and being arranged on a light incidence side of said light valve; and
a second stop operable to selectively pass the light having passed said first stop in a light transmission state of said light modulating layer of said light valve, said second stop having an aperture shape and being arranged on an outgoing light side of said light valve, wherein
said light valve is illuminated by the light emitted from said at least one condensing lens, and said first and second stops are in an approximate conjugating relation with each other.

16. A projection type display apparatus as claimed in claim 15, wherein said at least one transparent substrate is a concave lens.

17. A projection type display apparatus as claimed in claim 15, wherein said at least one condensing lens comprises plural secondary light emitting bodies positioned discretely and at least one of said first and second stops comprises plural apertures positioned discretely.

18. A projection type display apparatus as claimed in claim 15, wherein said projection lens has a F number set at greater than about 5 and less than about 9.

19. A projection type display apparatus as claimed in claim 15, wherein said at least one transparent substrate absorbs part of the light emitted from said light modulating layer.

20. A projection type display apparatus as claimed in claim 15, wherein said projection type display apparatus satisfies the following condition:

$$t \geq d/8 \times \sqrt{(n^2-1)}$$

where n is a refraction index of said at least one transparent substrate, d is a largest diameter of an effective display area of said light modulating layer, and t is a distance from said light modulating layer to a contact face of said at least one transparent substrate with air.

21. A projection type display apparatus comprising:
a light valve being operable to form an optical image as a change in a diffused state of light, said light valve comprising:
a light modulating layer,
a first electrode substrate, and
a second electrode substrate, wherein said light modulating layer is held between said first and second electrode substrates;
at least one plan-concave lens having a planar face, said planar face being optically connected to at least one of said first electrode substrate and said second electrode substrate;
a light source being operable to emit light;
at least one condensing lens being operable to condense the light emitted from said light source;
a projecting lens operable to project the optical image formed by said light valve;

a first stop being operable to selectively pass primarily the light having passed an effective area of said at least one condensing lens, said first stop having an aperture shape and being arranged on a light incidence side of said light valve; and a second stop being operable to selectively pass the light having passed said first stop in a light transmitting state of said light modulating layer of said light valve, said second stop having an aperture shape and being arranged on an outgoing light side of said light valve, wherein said light valve is illuminated by the light emitted from said at least one condensing lens, and said first and second stops are in an approximately conjugating relation with each other.

22. A projection type display apparatus as claimed in claim 21, wherein said at least one condensing lens comprises plural secondary light emitting bodies positioned discretely, and at least one of said first and second stops comprises plural apertures positioned discretely.

23. A projection type display apparatus as claimed in claim 21, further comprising at least one positive lens arranged close to said at least one plan-concave lens.

24. A projection type display apparatus as claimed in claim 21, further comprising light absorbing film formed on a non-effective area of said at least one plano-concave lens.

25. A projection type display apparatus comprising:
a light valve comprising:
a first substrate with an electrode,
a light exciting layer,
a light shielding layer,
a dielectric reflection mirror, wherein said first substrate with said electrode, said light exciting layer, said light shielding layer, and said dielectric reflection mirror are laminated in this order,
a second substrate with a confronting electrode, and
a light modulating layer operable to form an optical image as a change in a diffused state of light, wherein said light modulating layer is located between said first substrate with said electrode and said second substrate with said confronting electrode;
a light source being operable to emit light;
at least one condensing lens operable to condense the light emitted from said light source;
a projection lens being operable to project the optical image formed by said light valve;
a first stop arranged on a light incidence side of said light valve;
a second stop arranged on a light outgoing side of said light valve;
an input section condensing lens array comprising plural input section condensing lenses arranged in a two-dimensional form;
a central section condensing lens array comprising plural central section condensing lenses equal in number to said plural input section condensing lenses, said plural central section condensing lenses arranged in a two-dimensional form; and
an output section condensing lens, wherein
the light emitted from said at least one condensing lens is incident on said light valve via said input section condensing lens array, said central section condensing lens array, and said output section condensing lens,
each of said plural input section condensing lenses comprises plural secondary light emitting bodies in a vicinity of a main plane of each corresponding one of said plural central section condensing lenses,
each of said plural central section condensing lenses is operable to form, together with said output section condensing lens, an image of objects positioned in a vicinity of the main plane of each of said plural input section condensing lenses in a vicinity of an effective display area of said light valve in superimposed form,
said output section condensing lens allows the light emitted from said plural secondary light emitting bodies to effectively reach said projection lens,
said first stop is arranged in a vicinity of said plural secondary light emitting bodies, has an aperture shape, and is operable to selectively pass the light having passed effective areas of said secondary light emitting bodies,
said second stop has an aperture shape, and is operable to effectively pass the light having passed said first stop in a light transmitting state of said light modulating layer of said light valve, and
said first and second stops are in an approximately conjugating relation with each other.

26. A projection type display apparatus comprising:
a light valve comprising
a light modulating layer operable to form an optical image as a change in a diffused state of light,
a first electrode substrate, and
a second electrode substrate on a light outgoing side of said light valve, wherein said light modulating layer is held between said first and second electrode substrates;
a plano-concave lens optically connected to said second electrode substrate;
a positive lens arranged close to said plano-concave lens, wherein said plano-concave lens and said positive lens function together as a field lens;
a light source being operable to emit light;
a condensing lens operable to condense the light emitted from said light source;
a projecting lens operable to project the optical image formed by said light valve;
a first stop arranged on a light incidence side of said light valve;
a second stop arranged on a light outgoing side of said light valve;
an input section condensing lens array comprising plural input section condensing lenses arranged in a two-dimensional form;
a central section condensing lens array comprising plural central section condensing lenses equal in number to said plural input section condensing lenses, said plural central section condensing lenses arranged in a two-dimensional form; and
an output section condensing lens, wherein
the light emitted from said light condensing lens is incident on said light valve via said input section condensing lens array, said central section condensing lens array, and said output section condensing lens,
each of said plural input section condensing lenses comprises plural secondary light emitting bodies in a vicinity of a main plane of a corresponding one of said plural central section condensing lenses,
each of said plural central section condensing lenses is operable to form, together with said output section condensing lens, an image of objects positioned in a vicinity of the main plane of each of said plural input section condensing lenses in a vicinity of an effective display area of said light valve in superimposed form, said output section condensing lens allows the light emitted from said plural secondary light emitting bodies to effectively reach said projecting lens, said first stop is arranged in a vicinity of said plural secondary light emitting bodies, has an aperture shape, and is operable to selectively pass the light having passed effective areas of said plural secondary light emitting bodies, said second stop has an aperture shape, and is operable to effectively pass the light having passed said first stop in a light transmitting state of said light modulating layer of said light valve, and said first and second stops are in an approximately conjugating relation with each other.

* * * * *